US008467456B2

(12) United States Patent
Oshima et al.

(10) Patent No.: US 8,467,456 B2
(45) Date of Patent: *Jun. 18, 2013

(54) OPTICAL DISK FOR HIGH RESOLUTION AND THREE-DIMENSIONAL VIDEO RECORDING, OPTICAL DISK REPRODUCTION APPARATUS AND OPTICAL DISK RECORDING APPARATUS

(75) Inventors: Mitsuaki Oshima, Kyoto (JP); Hiromu Kitaura, Osakasayama (JP); Hideki Fukuda, Katano (JP); Hideshi Ishihara, Katano (JP); Toshiyuki Kawara, Hirakata (JP)

(73) Assignee: Panasonic Corporation, Osaka (JP)

( * ) Notice: Subject to any disclaimer, the term of this patent is extended or adjusted under 35 U.S.C. 154(b) by 1419 days.
This patent is subject to a terminal disclaimer.

(21) Appl. No.: 11/928,530

(22) Filed: Oct. 30, 2007

(65) Prior Publication Data
US 2008/0063386 A1 Mar. 13, 2008

Related U.S. Application Data

(63) Continuation of application No. 10/342,826, filed on Jan. 15, 2003, now Pat. No. 7,317,868, which is a continuation of application No. 09/319,476, filed as application No. PCT/JP97/04429 on Dec. 3, 1997, now Pat. No. 6,573,819.

(30) Foreign Application Priority Data

| | | |
|---|---|---|
| Dec. 4, 1996 | (JP) | 8-323770 |
| Dec. 26, 1996 | (JP) | 8-347284 |
| Feb. 28, 1997 | (WO) | PCT/JP97/00615 |
| Aug. 29, 1997 | (JP) | 9-234320 |
| Oct. 21, 1997 | (JP) | 9-288099 |

(51) Int. Cl.
*H04N 7/12* (2006.01)
*H04N 11/02* (2006.01)
*H04N 11/04* (2006.01)

(52) U.S. Cl.
USPC ......... 375/240.26; 348/43

(58) Field of Classification Search
USPC ......... 375/240.01; 348/43
See application file for complete search history.

(56) References Cited

U.S. PATENT DOCUMENTS 4,736,246 A * 4/1988 Nishikawa ......... 348/56
5,001,555 A * 3/1991 Park ......... 348/43

(Continued)

FOREIGN PATENT DOCUMENTS

| EP | 0 299 829 | 1/1989 |
| EP | 0 602 943 | 6/1994 |

(Continued)

OTHER PUBLICATIONS

Japanese Office Action for corresponding application No. 2007-248072 issued Mar. 27, 2009.

(Continued)

*Primary Examiner* — Mehrdad Dastouri
*Assistant Examiner* — Jeremaiah C Hallenbeck-Huber
(74) *Attorney, Agent, or Firm* — Renner, Otto, Boisselle & Sklar, LLP

(57) ABSTRACT

The present invention has an objective of providing an optical disk having a high resolution picture and a system for reproducing data on the optical disk, which are compatible with a conventional system for reproducing an ordinary resolution picture. A high resolution signal is divided into a main signal and a sub signal by picture division means and MPEG-encoded. The main signal and the sub signal are divided into frames each having 1 GOP or more. The resultant first interleave block 54 and second interleave block 55 are recorded alternately on an optical disk. A high resolution reproduction apparatus reproduced both the first and second interleave blocks, so that a high resolution picture is obtained. A non-high resolution reproduction apparatus reproduces only the first or second interleave block, so that an ordinary resolution picture.

1 Claim, 98 Drawing Sheets

Progressive/3D picture arrangement information (MADM identifier)

| VTS (title) | Cell | TXTDT file | | PGC file in each VTS | | | |
|---|---|---|---|---|---|---|---|
| | | TXTDT information | | Angle | Start address | Termination address | Identification information |
| | | Attribute | Number of multiple angles | | | | |
| 1 | 1,2 | 3D Cell1, 2 | 2 | 1 Main | a1 | a3 | 3D-right |
| | | | | 2 Sub | a2 | a4 | 3D-left |
| | 1,2 | 3D Cell1, 2 | 2 | 1 Main | a5 | a7 | 3D-right |
| | | | | 2 Sub | a6 | a8 | 3D-left |
| 2 | 3,4 | Progressive 525P x multiple angles (Cell1, 2) | 4 | 1 Main | a9 | a13 | 1-525P-main |
| | | | | 2 Sub | a10 | a14 | 1-525P-sub |
| | | | | 3 Main | a11 | a15 | 2-525P-main |
| | | | | 4 Sub | a12 | a16 | 2-525P-sub |
| 3 | 1,2 | Wide 525P (Cell1, 2) | 2 | 1 Main | a17 | a19 | Wide 525i-main |
| | | | | 2 Sub | a18 | a20 | Wide 525i-sub |
| 4 | 1,2 | Wide 525P | 4 | 1 Main | a21 | a22 | Wide 525P-main main |
| | | | | 2 Sub | a23 | a24 | Wide 525P-main sub |
| | | | | 3 Main | a25 | a26 | Wide 525P-sub main |
| | | | | 4 Sub | a27 | a28 | Wide 525P-sub sub |
| 5 | 1,2 3,4 | 3D 525P | 4 | 1 Main | a29 | a30 | Right 525P-main |
| | | | | 2 Sub | a31 | a32 | Right 525P-sub |
| | | | | 3 Main | a33 | a34 | Left 525P-main |
| | | | | 4 Sub | a35 | a36 | Left 525P-sub |

U.S. PATENT DOCUMENTS

| | | | | |
|---|---|---|---|---|
| 5,012,351 A * | 4/1991 | Isono et al. | | 386/338 |
| 5,043,806 A * | 8/1991 | Choquet et al. | | 348/43 |
| 5,122,873 A | 6/1992 | Golin | | |
| 5,193,000 A * | 3/1993 | Lipton et al. | | 348/43 |
| 5,461,420 A * | 10/1995 | Yonemitsu et al. | | 375/240.15 |
| 5,485,279 A | 1/1996 | Yonemitsu et al. | | |
| 5,572,250 A * | 11/1996 | Lipton et al. | | 348/43 |
| 5,734,743 A * | 3/1998 | Matsugu et al. | | 382/154 |
| 5,907,364 A * | 5/1999 | Furuhata et al. | | 348/459 |
| 6,038,208 A | 3/2000 | Shikunami et al. | | |
| 6,141,036 A * | 10/2000 | Katayama et al. | | 348/47 |
| 6,208,804 B1 | 3/2001 | Ottesen et al. | | |
| 6,282,362 B1 | 8/2001 | Murphy et al. | | |
| 6,573,819 B1 | 6/2003 | Oshima et al. | | |

FOREIGN PATENT DOCUMENTS

| | | |
|---|---|---|
| EP | 0 648 056 | 4/1995 |
| EP | 0 655 869 A2 | 5/1995 |
| GB | 2 301 265 | 11/1996 |
| JP | 1-109990 | 4/1989 |
| JP | 6-38244 | 2/1994 |
| JP | 6-350968 | 12/1994 |
| JP | 7-30925 | 1/1995 |
| JP | 07-107434 A | 4/1995 |
| JP | 7-143443 | 6/1995 |
| JP | 07-193840 | 7/1995 |
| JP | 07-298307 | 11/1995 |
| JP | 08-125973 | 5/1996 |
| JP | 8-249814 | 9/1996 |
| JP | 8-265695 | 10/1996 |
| JP | 08-294048 | 11/1996 |
| WO | 95/12274 | 5/1995 |
| WO | 96/10889 | 4/1996 |
| WO | 96/30906 | 10/1996 |

OTHER PUBLICATIONS

European Search Report for corresponding Application No. 01101177.2 dated Apr. 2, 2008.

European Search Report for corresponding European Application No. EP 10 17 9038 dated Mar. 11, 2011.

Kanai et al., "MPEG2 3D Player System", IEEE Transactions on Consumer Electronics, IEEE Service Center, New York, NY US, vol., 41, No. 3, Aug. 1, 1995, p. 716-722, XP000539528, ISSN: 0098-3063.

Canadian Office Action dated Mar. 17, 2000 in connection with Canadian Application No. 2,273,891.

International Search Report dated Mar. 24, 1998.

Sibling Continuation Applications U.S. Appl. No. 10/342,826 filed Jan. 15, 2003 and filed concurrently (copies of corresponding claims attached (specification same as present application)).

European Office Action for corresponding European Application No. EP 10 179 038.4 dated Nov. 18 2011.

European Office Action for corresponding European Application No. EP 10 179 042.6 dated Nov. 18 2011.

European Office Action for corresponding European Application No. EP 10 179 050.9 dated Nov. 18 2011.

Tseng et al., "Compatible Video Coding of Stereoscopic Sequences using Mpeg-2's Scalability and Interlaced Structure", Signal Processing of HDTV, VI: Proceedings of the International Workshop on HDTV '94, Turin, Italy, Oct. 26, 1994, pp. 1-10, XP002562128, ISBN: 978-0-444-82283-3.

Office Action for corresponding Japanese Application No. 2011-063412 issued Mar. 14, 2012.

* cited by examiner

FIG. 2
(1) Input signal (frame information)
(2) Signal (frame unit)
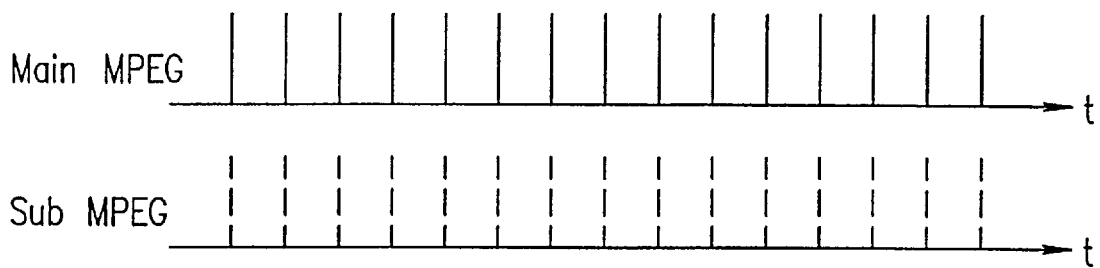
(3) Recording signal (interleave signal)
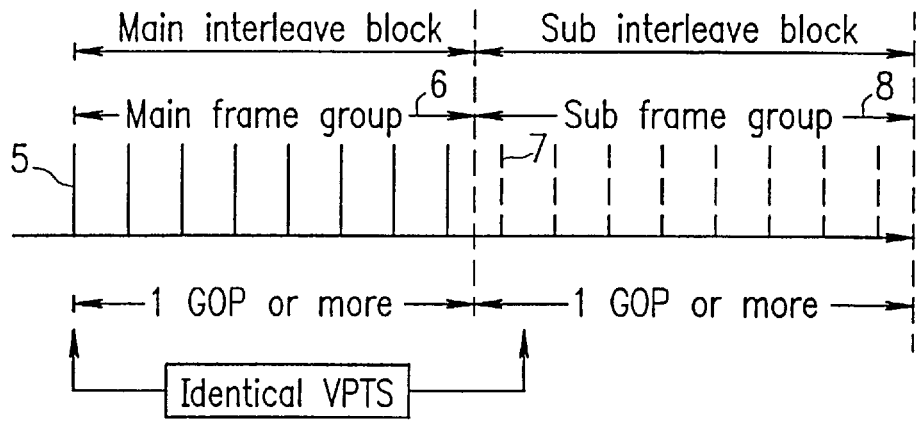
(4) Disk rotation (1 pulse/rotation)
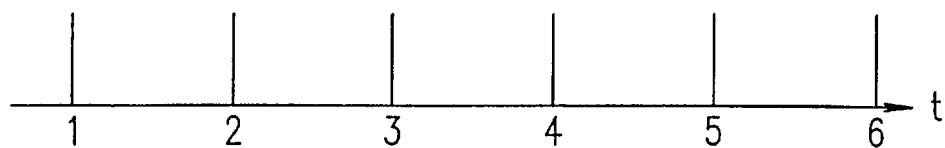

FIG. 4

Progressive/3D picture arrangement information (MADM identifier) 83

| VTS (title) | Cell | TXTDT file — TXTDT information | | PGC file in each VTS | | | |
|---|---|---|---|---|---|---|---|
| | | Attribute | Number of multiple angles | Angle | Start address | Termination address | Identification information |
| 1 | 1,2 | 3D Cell1, 2 | 2 | 1 Main<br>2 Sub | $a_1$<br>$a_2$ | $a_3$<br>$a_4$ | 3D-right<br>3D-left |
| 2 | 1,2 | 3D Cell1, 2 | 2 | 1 Main<br>2 Sub | $a_5$<br>$a_6$ | $a_7$<br>$a_8$ | 3D-right<br>3D-left |
| | 3,4 | Progressive 525P x multiple angles (Cell1, 2) | 4 | 1 Main<br>2 Sub<br>3 Main<br>4 Sub | $a_9$<br>$a_{10}$<br>$a_{11}$<br>$a_{12}$ | $a_{13}$<br>$a_{14}$<br>$a_{15}$<br>$a_{16}$ | 1-525P-main<br>1-525P-sub<br>2-525P-main<br>2-525P-sub |
| 3 | 1,2 | Wide 525P (Cell1, 2) | 2 | 1 Main<br>2 Sub | $a_{17}$<br>$a_{18}$ | $a_{19}$<br>$a_{20}$ | Wide 525i-main<br>Wide 525i-sub |
| 4 | 1,2 | Wide 525P | 4 | 1 Main<br>2 Sub<br>3 Main<br>4 Sub | $a_{21}$<br>$a_{23}$<br>$a_{25}$<br>$a_{27}$ | $a_{22}$<br>$a_{24}$<br>$a_{26}$<br>$a_{28}$ | Wide 525P-main main<br>Wide 525P-main sub<br>Wide 525P-sub main<br>Wide 525P-sub sub |
| 5 | 1,2<br>3,4 | 3D 525P | 4 | 1 Main<br>2 Sub<br>3 Main<br>4 Sub | $a_{29}$<br>$a_{31}$<br>$a_{33}$<br>$a_{35}$ | $a_{30}$<br>$a_{32}$<br>$a_{34}$<br>$a_{36}$ | Right 525P-main<br>Right 525P-sub<br>Left 525P-main<br>Left 525P-sub |

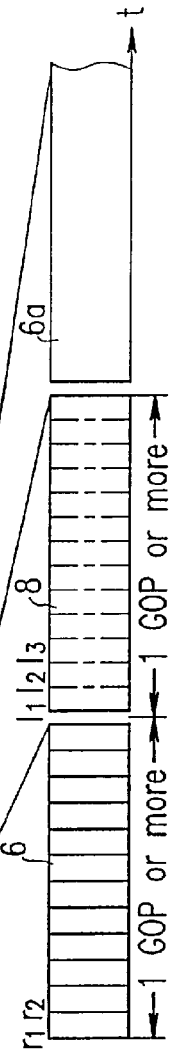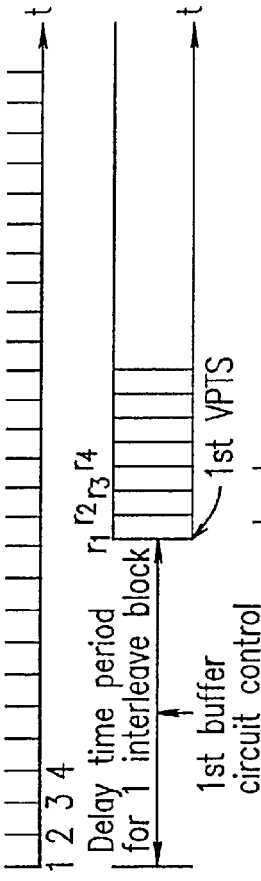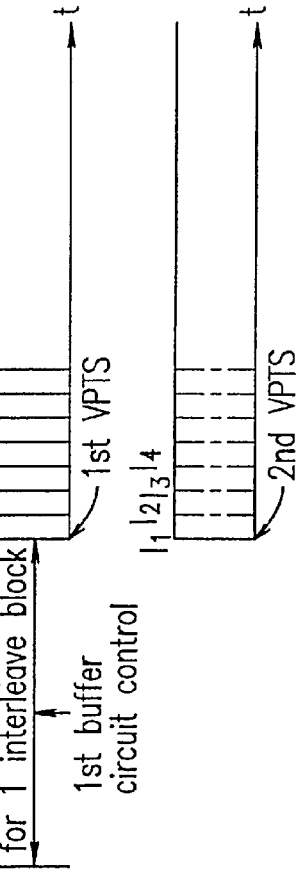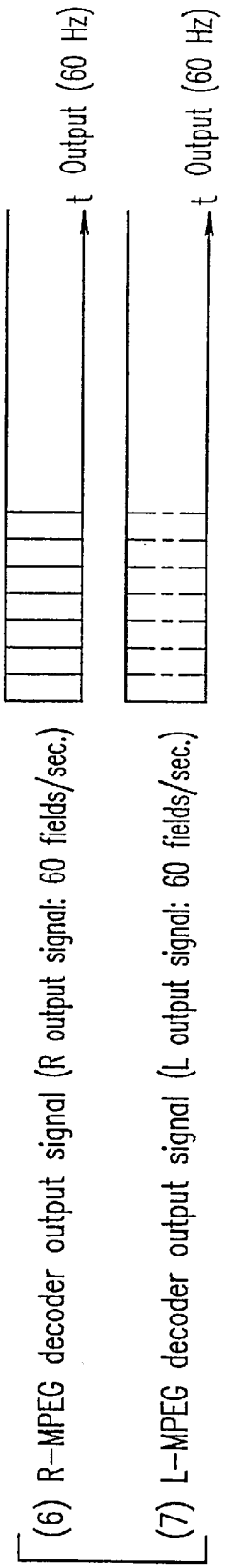

Conventional time chart

FIG. 18

3D/PG video logical arrangement table — 53, File 51

| Logical hierarchy | | | | | | | | | | | | |
|---|---|---|---|---|---|---|---|---|---|---|---|---|
| Video title layer (VTS) | Title 1 | | | | | | 2 | 3 | 4 | | | |
| | 001 | | | | | | 110 All cells are 3D cells. | 000 No 3D cells. | 101 All cells are PG cells. | | | |
| | 3D/PG cell and non-3D/PG cell | | | | | | | | | | | |
| (Part of video title layer) (PVT) | Chapter number | | | | | | | | | | | |
| | 1 | | | | | | 2 | 3 | 4 | | | |
| | 001 | | | | | | 000 No 3D cells | 110 All cells are 3D cells | 101 All cells are PG cells. | | | |
| | 3D/PG cell and non-3D/PG cell | | | | | | | | | | | |
| Cell layer (Cell) | Cell number | | | | | | | | | | | |
| | 1 | 2 | 3 | 4 | 5 | 6 | 7 | 1 | 2 | | | |
| | 1-R | 1-L | 2-R | 2-L | 00 | 00 | 00 | | | | | |

FIG. 31
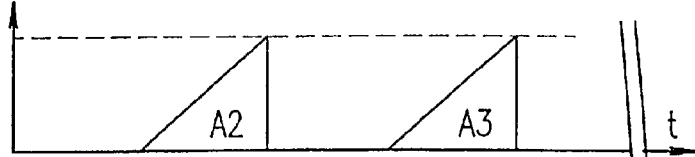
(1) Reproduction data of stream A
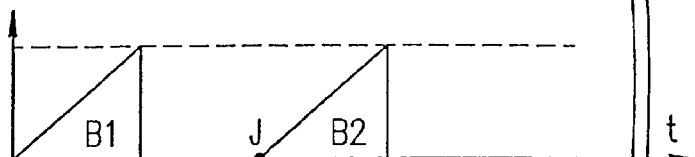
(2) Reproduction data of stream B
(3) System clock (SCR)
Time of input from buffer to decoder
(4) Audio APTS (sub picture)
Reproduction time of audio decoder
(5) System clock STC
(6) Video
Time of reproduction of 2nd video decoder
(7) Video
Time of reproduction of 1st video decoder
STC switching timing

FIG. 35

FIG. 43
(a) 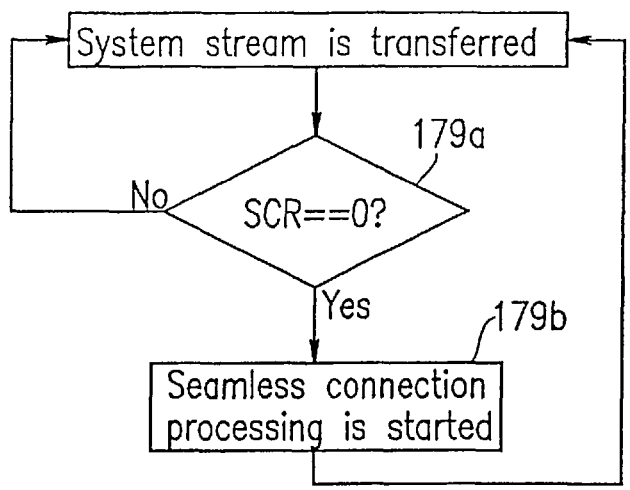
(b) 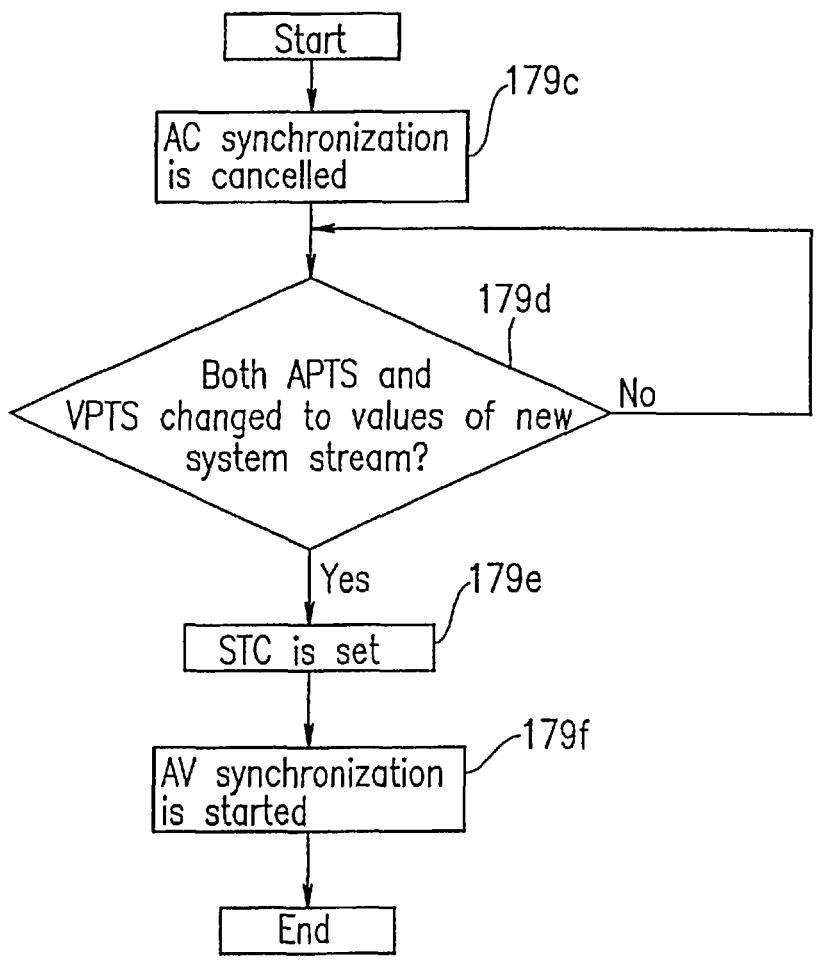

FIG. 49

FIG. 56
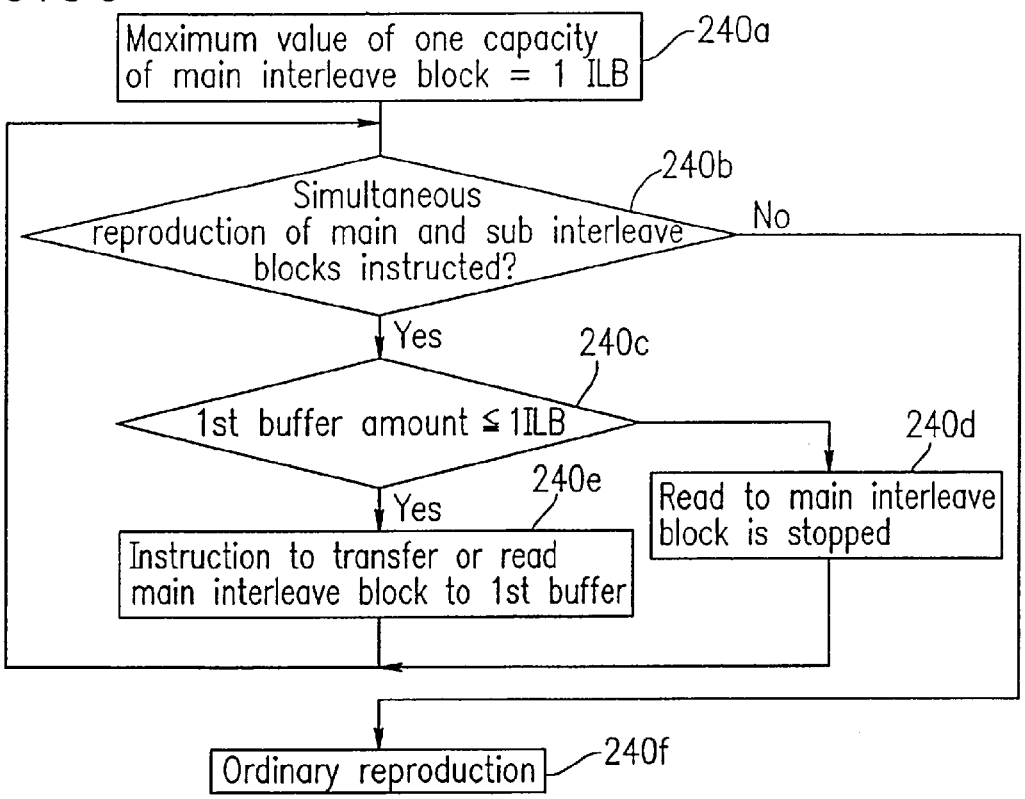
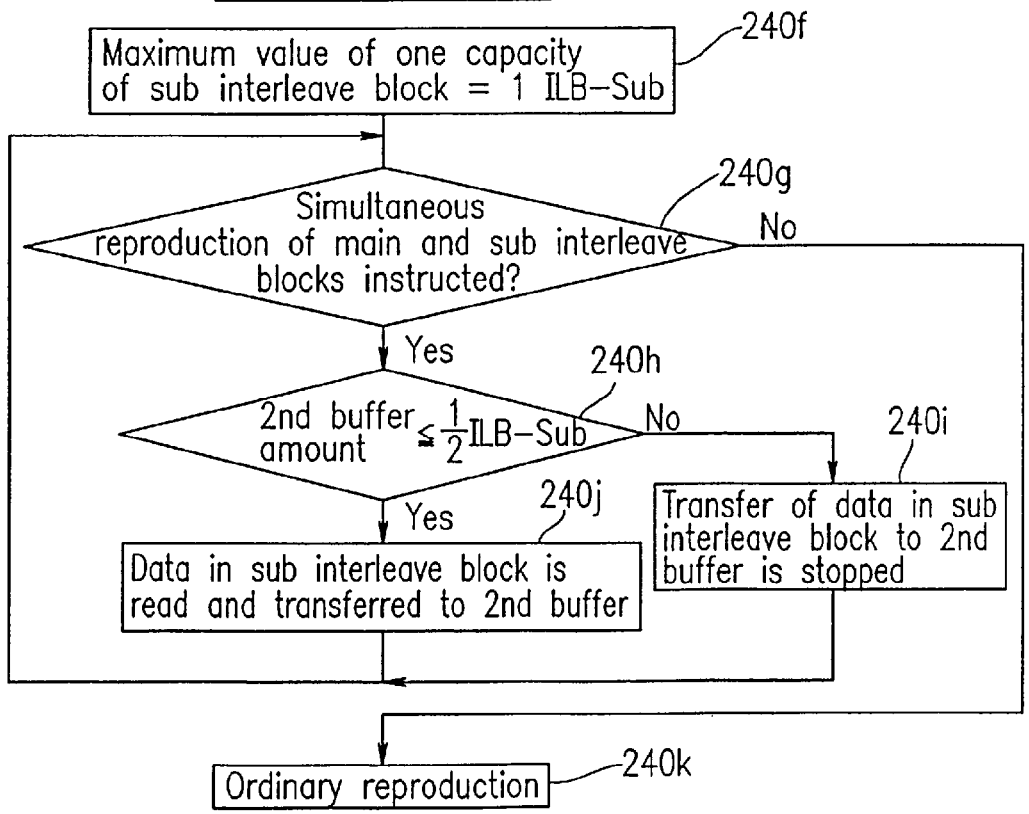

FIG.58 Principle of multiple angle video data division multiplex system (MADM)

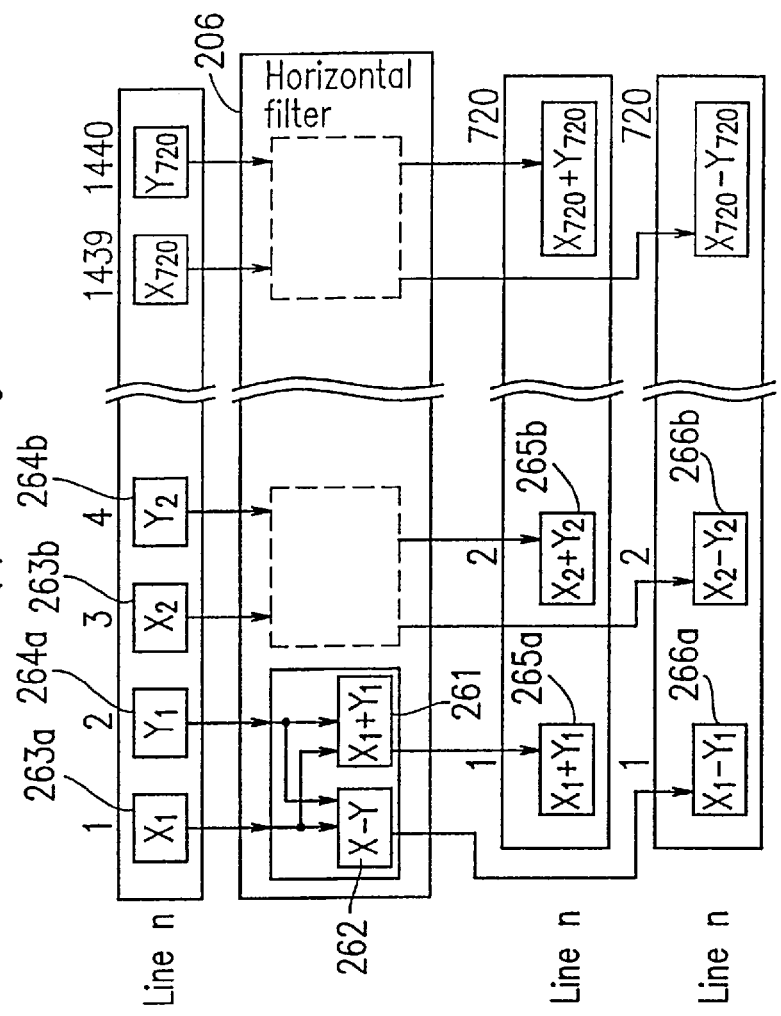
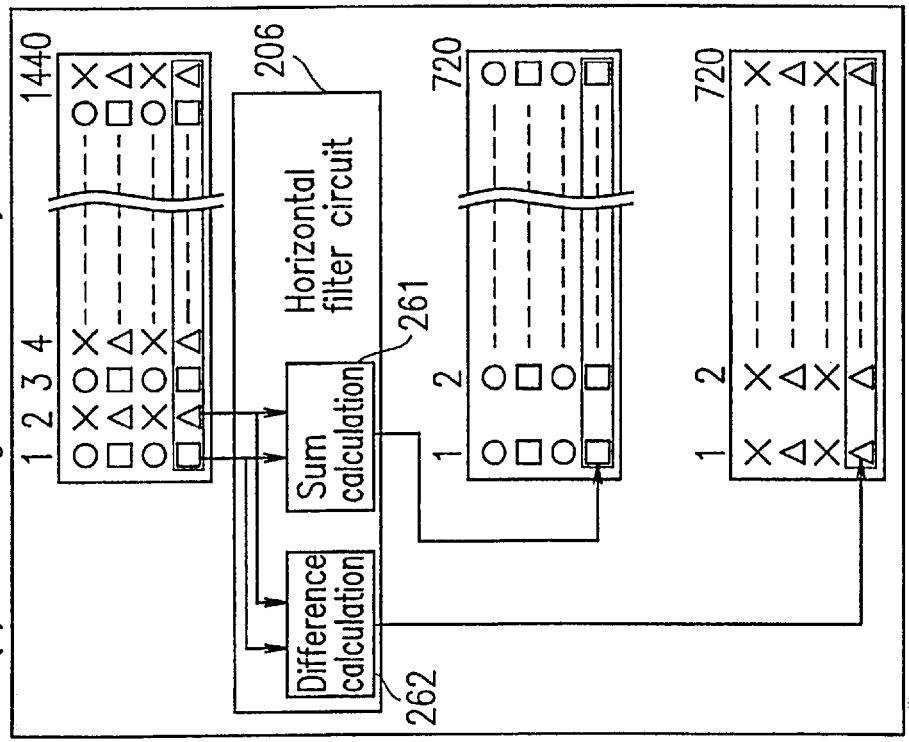
FIG. 59

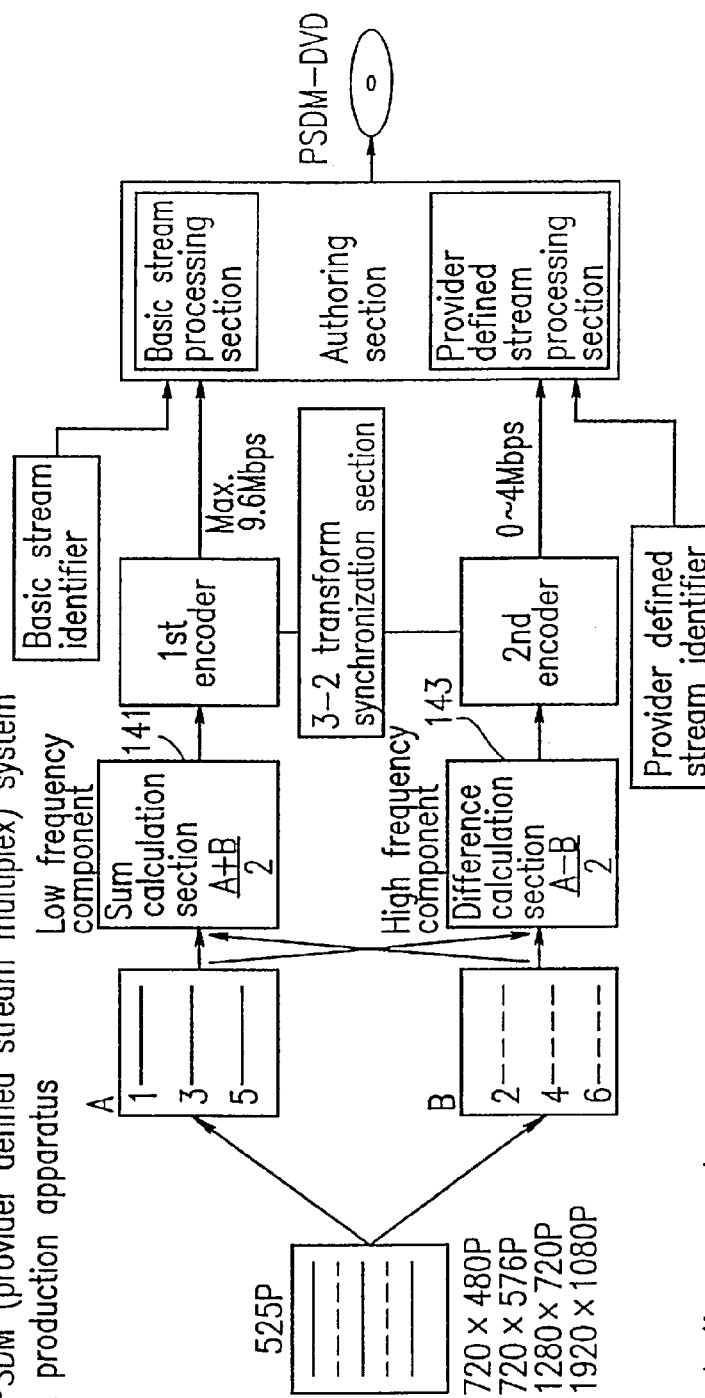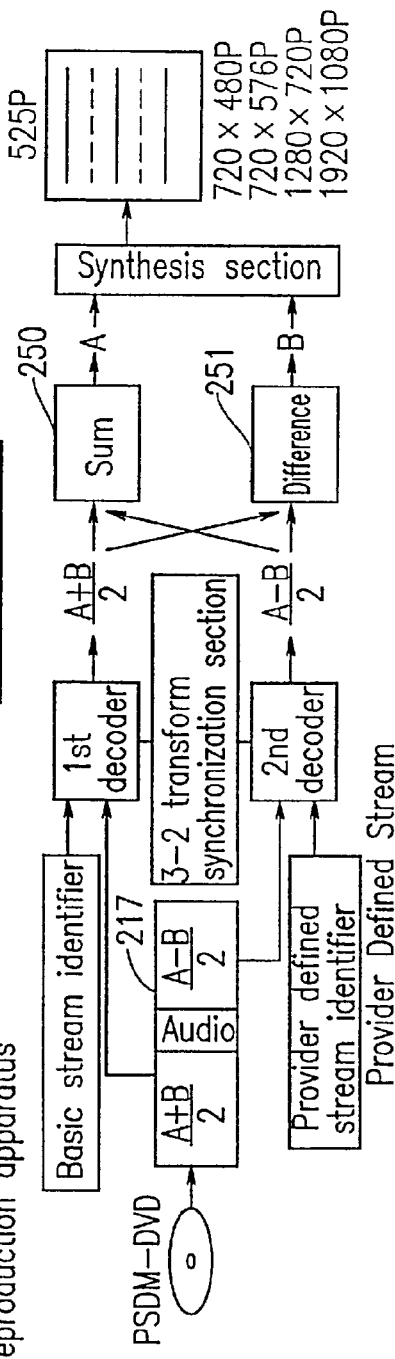
FIG. 61

FIG. 62

FIG. 91 Principle of horizontally dividing and re-synthesizing high resolution signal (luminance signal)

FIG. 92 Principle of horizontally dividing and re-synthesizing high resolution signal (color signal)

Operation of conventional reproduction apparatus (compatibility)

FIG. 96 MADM reproduction principle

FIG. 97 MADM reproduction principle

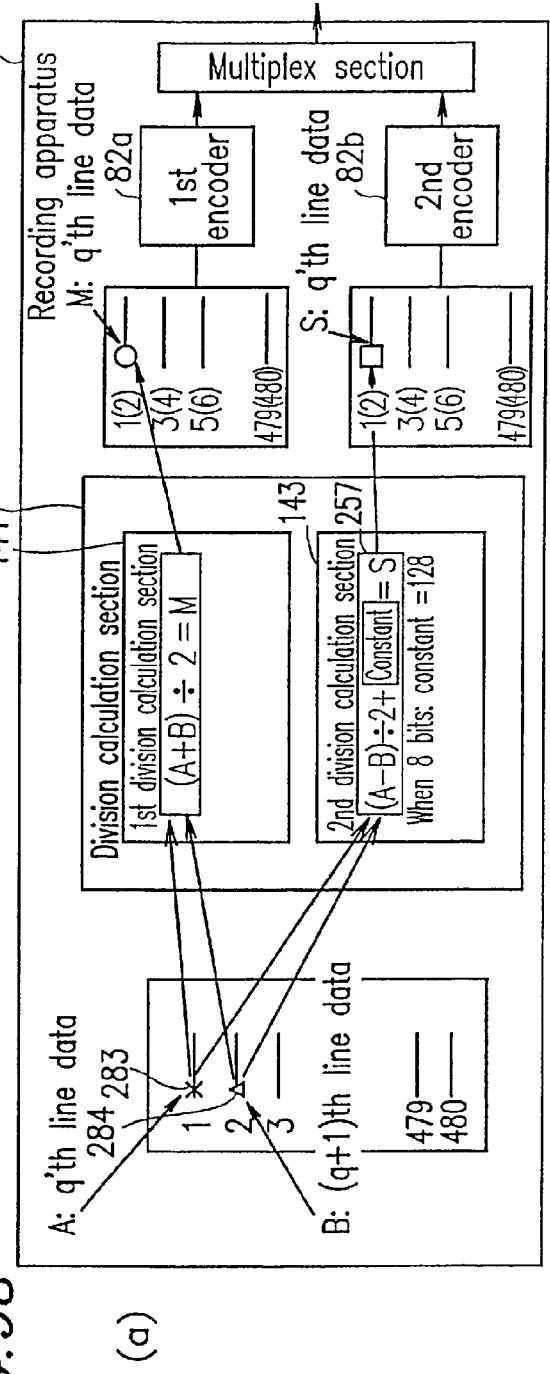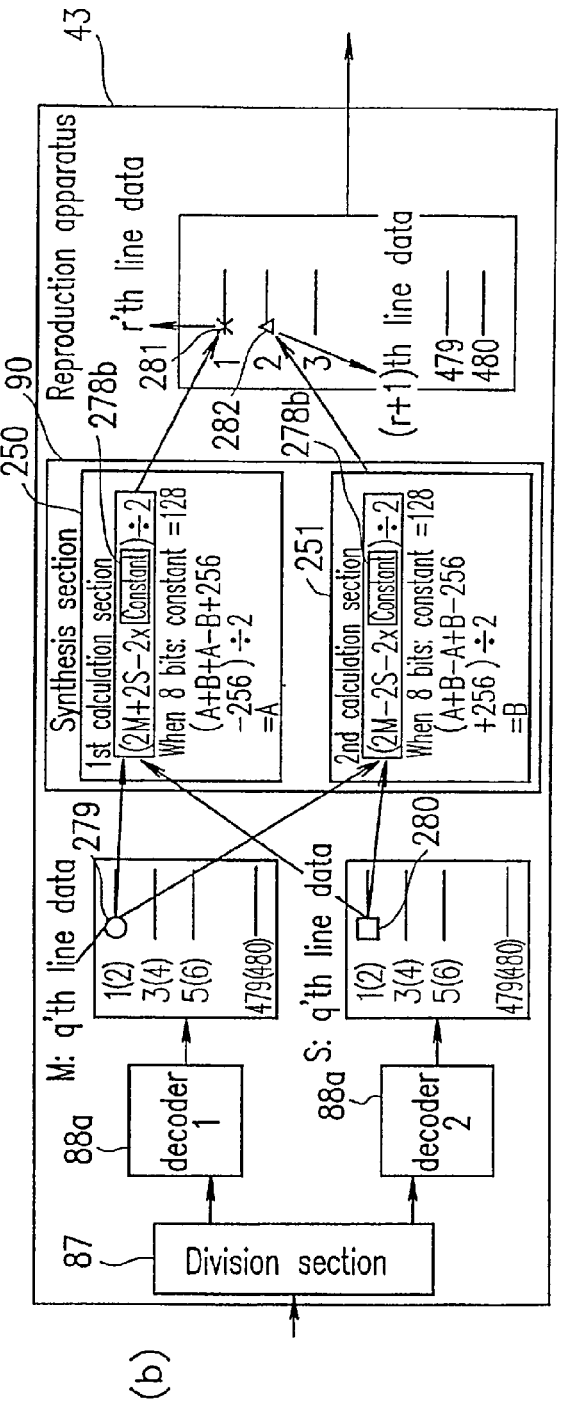
FIG.98

OPTICAL DISK FOR HIGH RESOLUTION AND THREE-DIMENSIONAL VIDEO RECORDING, OPTICAL DISK REPRODUCTION APPARATUS AND OPTICAL DISK RECORDING APPARATUS

This application is a continuation of U.S. patent application Ser. No. 10/342,826 filed Jan. 15, 2003 now U.S. Pat. No. 7,317,868, which is a continuation of U.S. application Ser. No. 09/319,476 filed Jun. 4, 1999, now U.S. Pat. No. 6,573,819, which is a §371 of International Application No. PCT/JP97/04429, filed Dec. 3, 1997.

TECHNICAL FIELD

The present invention relates to an optical disk having a three-dimensional (3D) picture and a high definition picture stored thereon, and an apparatus for recording data to or reproducing data from the optical disk.

BACKGROUND ART

A conventionally known optical disk having a 3D moving picture stored thereon is as shown in FIG. 10. An optical disk 201 has a picture for the right eye (right-eye picture) stored in even fields 204, 204a and 204b and a picture for the left eye (left-eye picture) stored in odd fields 203, 203a and 203b. The right-eye picture and the left-eye picture are recorded alternately. When the data stored on the optical disk 201 is reproduced by an existing optical disk reproduction apparatus 205 shown in FIG. 11, a right-eye picture and a left-eye picture appear on a TV screen 206 alternately every 1/60 second. The naked eye recognizes only a picture in which the right-eye picture and the left-eye picture are overlapped. With 3D spectacles 207, in which a shutter for the right-eye picture and a shutter for the left-eye picture are switched over every 1/60 second, a 3D picture is recognized. As shown in FIG. 12, a right-eye picture and a left-eye picture are each encoded alternately in every other field as an interlace signal in 1 GOP of an MPEG signal.

For high definition pictures, progressive systems referred to as 525P and 720P have been studied.

A first problem of the conventional art will be described. When data in a conventional 3D optical disk is reproduced by an ordinary, conventional 2D reproduction apparatus, even a non-3D picture, i.e., even a 2D picture is not output. Data in the 3D optical disk is only reproduced by a reproduction apparatus connected to a 3D display. Accordingly, it is required to create two types of optical disks, i.e., a 3D optical disk and a 2D optical disk for the same contents. The same is true with the high definition picture. In other words, the conventional 3D and high definition optical disks are not compatible with ordinary optical disks. A first objective of the present invention is to provide a 3D or high definition optical disk which is compatible with ordinary optical disks, and a reproduction system for the 3D or high definition optical disk.

The term "compatibility" is clearly defined as similar to the compatibility between monaural records and stereo records discussed in the past. In other words, data in a novel 3D or high resolution disk according to the present invention is output as a "monaural" vision, i.e., as a 2D picture or an ordinary resolution picture by an existing reproduction apparatus developed for DVDs or the like, and is reproduced as a "stereo" vision, i.e., a 3D picture or a high resolution picture by the novel reproduction apparatus according to the present invention.

A second problem of the conventional art concerns a synchronization system. According to a conventional synchronization system, decoding starts when decoding conditions for each compressed video signal are provided. The conventional synchronization system has problems in that, for example, when the data becomes out of synchronization for some reason during reproduction, compensation is not performed; and that audio data is not synchronized.

A second objective of the present invention is to provide a reproduction apparatus for reproducing a plurality of compressed video signals or a plurality of compressed audio signals in synchronization with one another and performing compensation when the data becomes out of synchronization during reproduction.

DISCLOSURE OF INVENTION

The present invention includes the following means to achieve the above-described objectives.

An optical disk according to the present invention is obtained in the following manner. Two moving pictures each having a frame rate of 30 frames/sec. are input. A plurality of frames of each picture, which correspond to 1 GOP or more of the disk, are set as a picture unit. These picture units of the two pictures are arranged on the optical disk alternately as interleave blocks. Each interleave block corresponds to one rotation or more. The two moving pictures can be, for example, a picture for the right eye and a picture for the left eye; or includes field components of a progressive picture.

When such an optical disk is reproduced by an ordinary reproduction apparatus for two-dimensional (2D) display, an ordinary two-dimensional is reproduced.

A reproduction apparatus for 3D and high definition pictures according to the present invention includes means for reproducing picture identification information from an optical disk, means for reproducing a two-dimensional picture in a conventional process, means for reproducing a 3D or high definition picture, and means for outputting the 3D or high definition picture.

The present invention includes the following means to achieve the second objective.

A reproduction apparatus according to the present invention includes reference time signal generation means for generating a reference time signal; and a plurality of picture extension/reproduction means having a function of extending a compression video stream and controlling reproduction time of the extended video signal in accordance with the difference between the reference time signal and the picture reproduction time information.

Another reproduction apparatus according to the present invention includes a plurality of picture extension/reproduction means having a function of generating a reference time signal, extending a compression video stream and controlling reproduction time of the extended video signal in accordance with the difference between the reference time signal and the picture reproduction time information. The reference time signals in the plurality of picture extension/reproduction means are corrected using identical information at substantially the same time.

Still another reproduction apparatus according to the present invention includes reference time signal generation means for generating a reference time signal; and a plurality of audio extension/reproduction means having a function of extending a compression audio stream and controlling reproduction time of the extended audio signal in accordance with the difference between the reference time signal and the audio reproduction time information.

Yet another reproduction apparatus according to the present invention controls reproduction time by changing the frequency of the clock by which the audio extension/reproduction means performs extension and reproduction.

BRIEF DESCRIPTION OF DRAWINGS

FIG. 2 is a timing diagram showing the relationship between an input signal and a recording signal in one example according to the present invention.

FIG. 4 is a view illustrating 3D picture arrangement information one example according to the present invention.

FIG. 6 is a timing diagram illustrating the relationship between a recorded signal and a picture output signal in a reproduction apparatus in one example according to the present invention.

FIG. 18 is a view showing a 3D picture identifier in a 3D picture logical arrangement table in one example according to the present invention.

FIG. 31 is a timing diagram showing a data stream which is reproduced and output through a buffer of the decoder in one example according to the present invention.

FIG. 35 is a timing diagram showing reproduction of an interleave block when one video stream is switched to another in one example according to the present invention.

FIG. 43 is a flowchart for seamless connection in one example according to the present invention.

Figure 49:
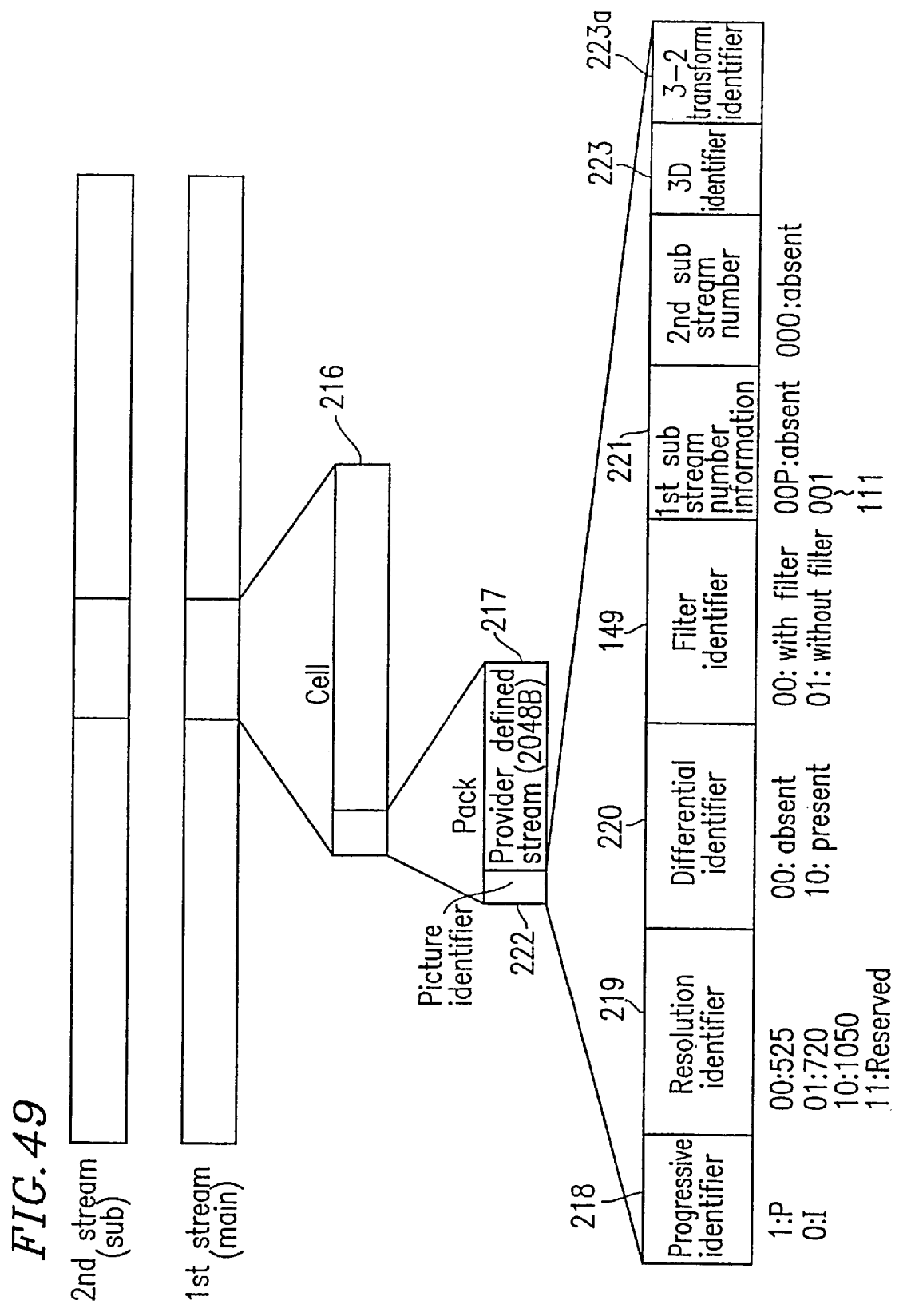

FIG. 49 shows a signal format of a picture identifier in one example according to the present invention.

FIG. 56 is a flowchart illustrating a method for controlling two buffers in one example according to the present invention.

In FIG. 59, (a) is a view illustrating processing of an entirety of a horizontal filter circuit in one example according to the present invention, and (b) is a view illustrating processing of each line of the horizontal filter circuit in one example according to the present invention.

FIG. 61 is a view illustrating the principle of a provider defined stream multiplex system (vertical division) in one example according to the present invention.

FIG. 62 is a view illustrating the principle of a provider defined stream multiplex system (horizontal division) in one example according to the present invention.

FIG. 98 is a block diagram of a recording apparatus and a reproduction apparatus for dividing a progressive video signal into two streams and synthesizing the signals into the progressive video signal in the first example according to the present invention.

BEST MODE FOR CARRYING OUT THE INVENTION

The best mode of the present invention will be described with reference to the figures.

In this specification, a recording and reproduction system for simultaneously reproducing a plurality of streams according to the present invention will be referred to as an "MADM" system.

In the first example of the present invention, a method for recording and reproducing a 3D picture and a high definition picture will be first described, and then a method for realizing the high definition picture will be described, both as applications of the MADM system according to the present invention. In the second through eighth examples, practical methods for synchronization used for reproducing data according to the MADM system will be described.

Example 1

According to the present invention, a 3D picture and a wide screen picture are recorded in the state where the picture is divided into two pictures of a right-eye picture and a left-eye picture, or divided into two screen pictures separated from each other along a horizontal line. These two pictures are field pictures starting from an odd line, and a signal representing such a field picture is referred to as an Odd First signal. A progressive picture is recorded as being divided into two screen pictures separated from each other along a vertical line. These two screen pictures are represented by a field signal starting from an odd line and a field signal starting from an even line. These signals are referred to as an Odd First signal and an Even First signal. In this specification, a recording unit of picture information of 1 GOP or more which has been processed with interleaving is referred to as an interleave block or a frame group. The system according to the present invention is referred to as a multiple angle video data division multiplex (MADM) system.

Figure 1:
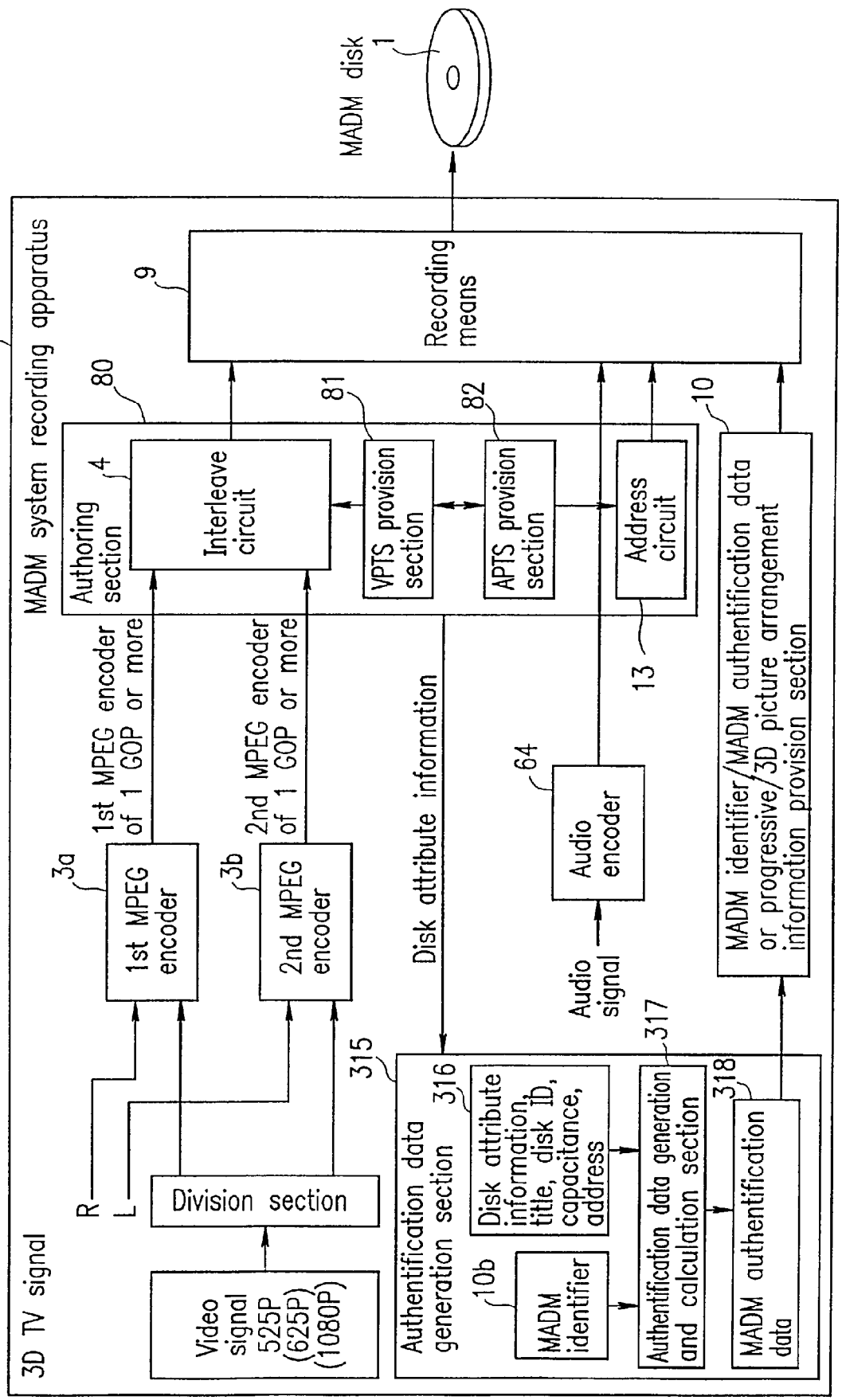
FIG. 1 is a block diagram showing a recording apparatus in one example according to the present invention.

FIG. 1 is a block diagram of an MADM system recording apparatus 2 for an optical disk according to the present invention. A progressive signal and a 3D signal can both be recorded. A right-eye signal of the 3D picture is referred to as an R-TV signal, and a left-eye signal is referred to as an L-TV signal. The R-TV signal and the L-TV signal are compressed into MPEG signals by MPEG encoders 3a and 3b. As a result, an R-MPEG signal and an L-MPEG signal as shown in part (2) of FIG. 2 are obtained. These signals are processed with interleaving by an interleave circuit 4, so that an R-frame group 6 including R-frames 5 corresponding to 1 GOP or more of the R-MPEG signal and an L-frame group 8 including L-frames 7 corresponding to 1 GOP or more of the L-MPEG signal are alternately arranged as shown in part (3) of FIG. 2. The recording unit is referred to as an interleave block, and may also be referred to as a frame group in this specification. The R-frame group 6 and the L-frame group 8 include an identical number of frames having an identical time period, so that the right-eye signal and the left-eye signal are synchronized with each other when being reproduced. The frame group is also referred to as a picture data unit. One picture data unit corresponds to 0.4 to 1 second. A rotation speed of a DVD is 1440 rpm, i.e., 24 Hz along the innermost track. Accordingly, an interleave block corresponds to one or more rotations or further, 10 to 20 rotations as shown in part (4) of FIG. 2. Returning to FIG. 1, address information is output from an address circuit 13. Progressive/3D picture arrangement information is output from a progressive/3D picture arrangement information output section 10. These pieces of information are recorded on the optical disk by a recording circuit 9. The progressive/3D picture arrangement information includes an identifier which indicates whether or not a progressive or 3D picture is present on the optical disk, or a progressive/3D picture arrangement table 14 shown in FIG. 4. As shown in FIG. 4, a TEXTDT file 83 includes, for each VTS, 3D pictures for the right and left eyes and angle numbers and cell numbers in which the progressive signal is located. Since a PGC file of each VTS includes a starting address and a termination address of each cell, the starting address and the termination address of each cell are included in the progressive/3D picture arrangement information. Based on the arrangement information and identification information, the reproduction apparatus outputs a progressive picture or a 3D picture correctly as progressive outputs or R and L outputs. When ordinary pictures of different contents from each other are output as R and L outputs in error, the user will feel uncomfortable since the pictures for the right eye and the left eye are not related to each other. The progressive/3D picture arrangement information or progressive/3D picture identifier have an effect of avoiding the output of such unpleasant pictures. The manner of using the progressive/3D picture arrangement information and progressive/3D picture identifier will be described in detail later together with a description of the reproduction apparatus.

In the recording apparatus shown in FIG. 1, a 525P or other progressive signal can be recorded with multiple angles. Specifically, a progressive signal is divided into a sum component and a difference component by a division section 38, thereby creating two interlace signals. The two interlace signals are encoded by the two MPEG decoders 3a and 3b. In this case, a VPTS which is synchronized with an APTS of an audio signal is provided to a first MPEG signal and a second MPEG signal by a VPTS provision section 81. Such provision will be described in detail later.

A specific method for creating 3D picture arrangement information will be described. A DVD-format optical disk has files of a directory or table of contents stored in a standardized manner in a recording starting area thereof. However, these files do not include any description on 3D pictures. Accordingly, a 3D picture logical arrangement file 53 including a 3D/PG picture logical arrangement table shown in FIG. 18 is provided, so that a reproduction apparatus conforming to 3D reproduction reads the file. An ordinary 2D reproduction apparatus cannot read the 3D/PG picture logical arrangement file 53 but provides no problem since such an ordinary 2D reproduction apparatus does not reproduce a 3D picture.

Hereinafter, the table in FIG. 18 will be described. DVD video information includes a three-layer logical hierarchy. The three layers are a video title set (VTS) layer representing a movie or other work, a part of video title (PVT) layer representing a chapter in the title, and a cell (Cell) layer representing a stream in the chapter.

The arrangement of 3D pictures in each layer will be described. "000" indicates that there is no 3D or progressive cell; "110" indicates that all cells are 3D cells; and "001" indicates that there are 3D cells and non-3D cells.

In FIG. 18, regarding the VTS layer, the status of title 1 is "001"; i.e., the VTS layer of title 1 includes both 3D and ordinary cells. The status of title 2 is "110"; i.e., all the cells in the VTS layer of title 2 are 3D cells. The status of title 3 is "000"; i.e., there are no 3D cells in the VTS layer of title 3. Accordingly, information on 3D pictures is not necessary regarding the lower layers of titles 2 and 3.

Regarding PVT layer of title 1, the status of chapter 2 is "000"; i.e., there are no 3D cells in the PVT layer of chapter 2. The status of chapter 3 is "110"; i.e., all the cells are 3D cells in the PVT layer of chapter 3. The status of chapter 1 is "001"; i.e., there are both 3D cells and the ordinary cells in the PVT layer of chapter 1. Regarding the cell layer of chapter 1, cells 1 and 2 correspond to R and L data of a first stream. Cells 3 and 4 correspond to R and L data of a second stream. In cells 5 and 6, ordinary pictures are recorded. In the embodiment where the 3D/PG picture logical arrangement file 53 is separately recorded on the optical disk in this manner, the conventional file is not altered. Accordingly, compatibility between the 3D/PG pictures and the ordinary pictures is realized. The logical information reveals all the physical information on the optical disk. Accordingly, a malfunction of displaying ordinary pictures of two different contents for the right eye and the left eye is prevented. Moreover, the 3D picture can be appropriately reproduced and decoded so that R and L data are provided to the right eye and the left eye from the correct output sections.

Figure 19:
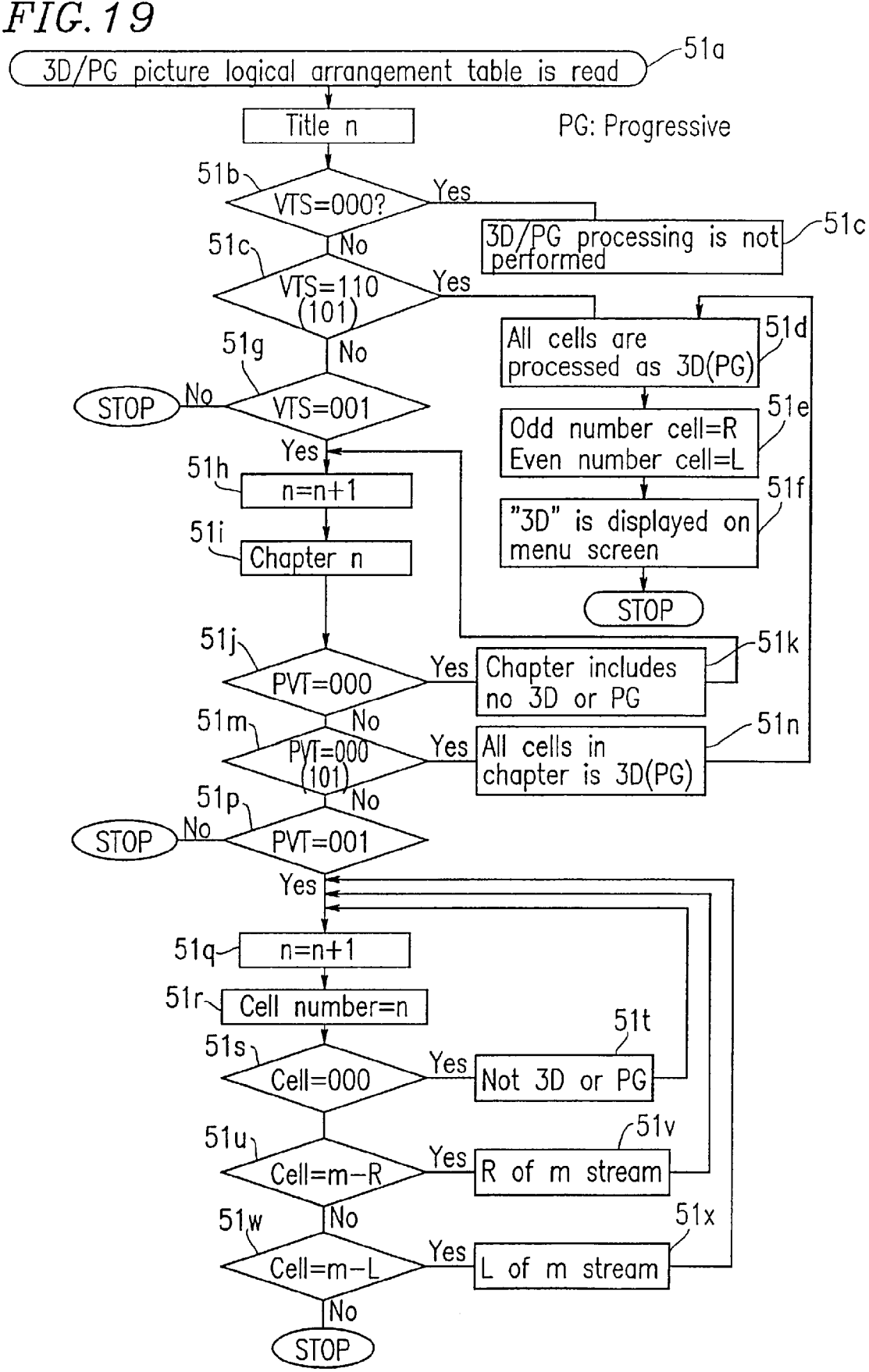
FIG. 19 is a flowchart showing a method for specifying the attribute of each chapter, cell and interleave block of a 3D picture based on a 3D picture identifier in the 3D picture logical arrangement table in one example according to the present invention.

With reference to the flowchart of FIG. 19, a process for determining whether or not each cell includes a 3D or progressive picture based on the 3D/PG picture logical arrangement table 52 will be described. In step 51a, the 3D/PG picture logical arrangement table 52 is read from a first recording area of the optical disk. In step 51b, the VTS layer of title n as shown in FIG. 18 is checked. When the status of the VTS layer is "000", it is determined that no 3D or progressive cell is included and thus 3D processing is not performed. When VTS=110 in step 51c, all the cells are processed as 3D cells in step 51d. In step 51e, odd cells are processed as including a left-eye picture and even cells are processed as including a right-eye picture. In step 51f, a menu screen is caused to indicate that all the cells in title n are 3D cells. When VTS=001 in step 51g, the arrangement information of chapter n of the lower layer is checked in step 51i. When PVT=000 in step 51j, it is determined that chapter n include no 3D or PG cells in step 51k. When PVT=110 in step 51m, it is determined that all the cells in chapter n are 3D cells in step 51n. Then, the processing goes to step 51d, where the menu screen indicates that the all the cells in chapter n are 3D cells. When PVT=001 in step 51p, each of the cells in that chapter is checked. When Cell=000 in step 51s regarding one cell, it is determined that the cell is not a 3D cell and the processing goes back to step 51q. When Cell=m-R in step 51u, it is determined that the cell corresponds to R data of stream m in step 51v. When Cell=m-L in step 51w, it is determined that the cell corresponds to L data of stream m in step 51x. Then, the next cell is checked in step 51q.

In the embodiment where the 3D/PG picture logical arrangement table 52 is additionally recorded in this manner, it is effectively determined whether or not each of all the video titles, chapters and cells includes 3D data, PG data or neither of such data.

Figure 3:
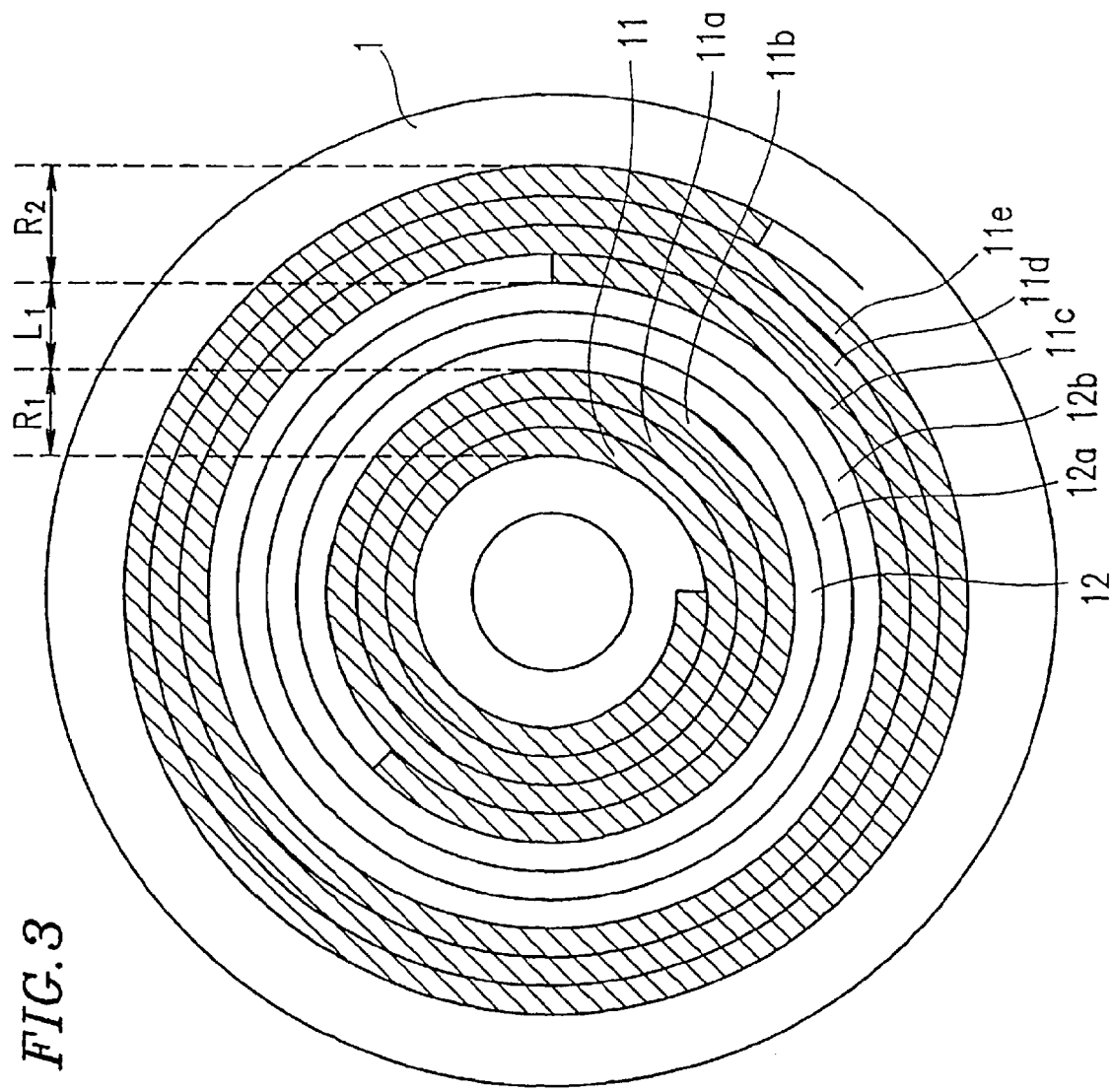
FIG. 3 is a top view of an optical disk showing the interleave block arrangement in one example according to the present invention.

This will be described with respect to the top view of the optical disk in FIG. 3. An optical disk 1 has one spiral track formed therein. The R-frame group 6 is recorded on a plurality of R tracks 11, 11a and 11b. In actuality, the R-frame group 6 is recorded on 5 to 24 tracks. The L-frame group 8 is recorded on L tracks 12, 12a and 12b, and the next R-frame group 6a is recorded on R tracks 11c, 11d and 11e.

Hereinafter, a reproduction operation will be described with reference to the block diagram of the 3D reproduction apparatus according to the present invention in FIG. 5 and the timing diagram in FIG. 6. When a signal from the optical disk 1 is reproduced by an optical head 15 and an optical signal reproduction circuit 24 and a 3D picture identifier is detected by a 3D picture arrangement information reproduction section 26, or when picture data which has been determined to have a 3D picture based on a 3D picture arrangement table 14 shown in FIG. 4 is to be reproduced and an input section 19 or the like issues an instruction to output a 3D picture; a switch section 27 is controlled so that an R signal and an L signal are output from an R output section 29 and an L output section 30 and so that the R and L signals are output alternately on a field-by-field basis from an RL mixture circuit 28. The control of the switch section 27 is performed simultaneously with the processing of the 3D picture.

Figure 5:
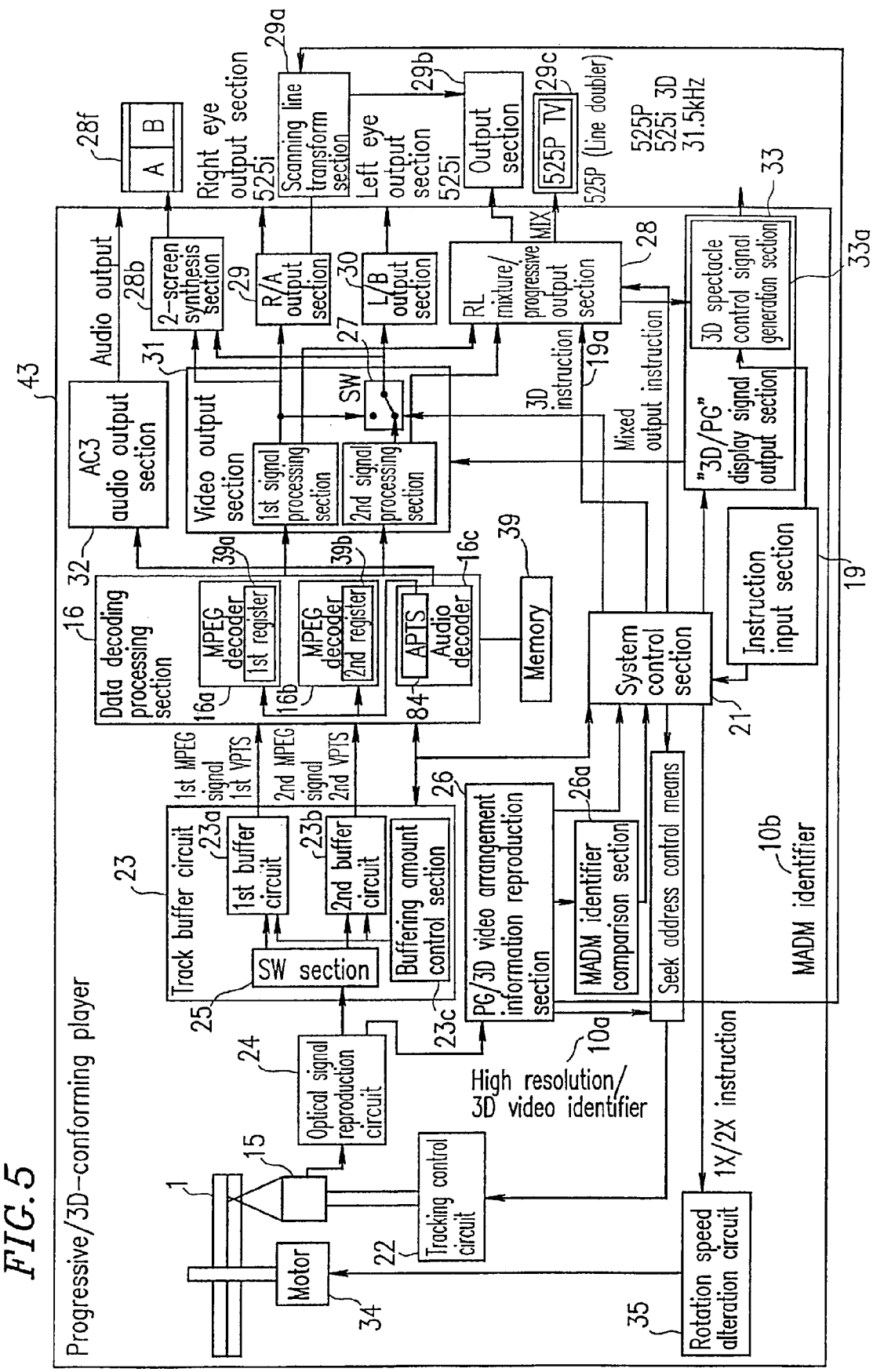
FIG. 5 is a view showing a reproduction apparatus in one example according to the present invention.
Figure 85:
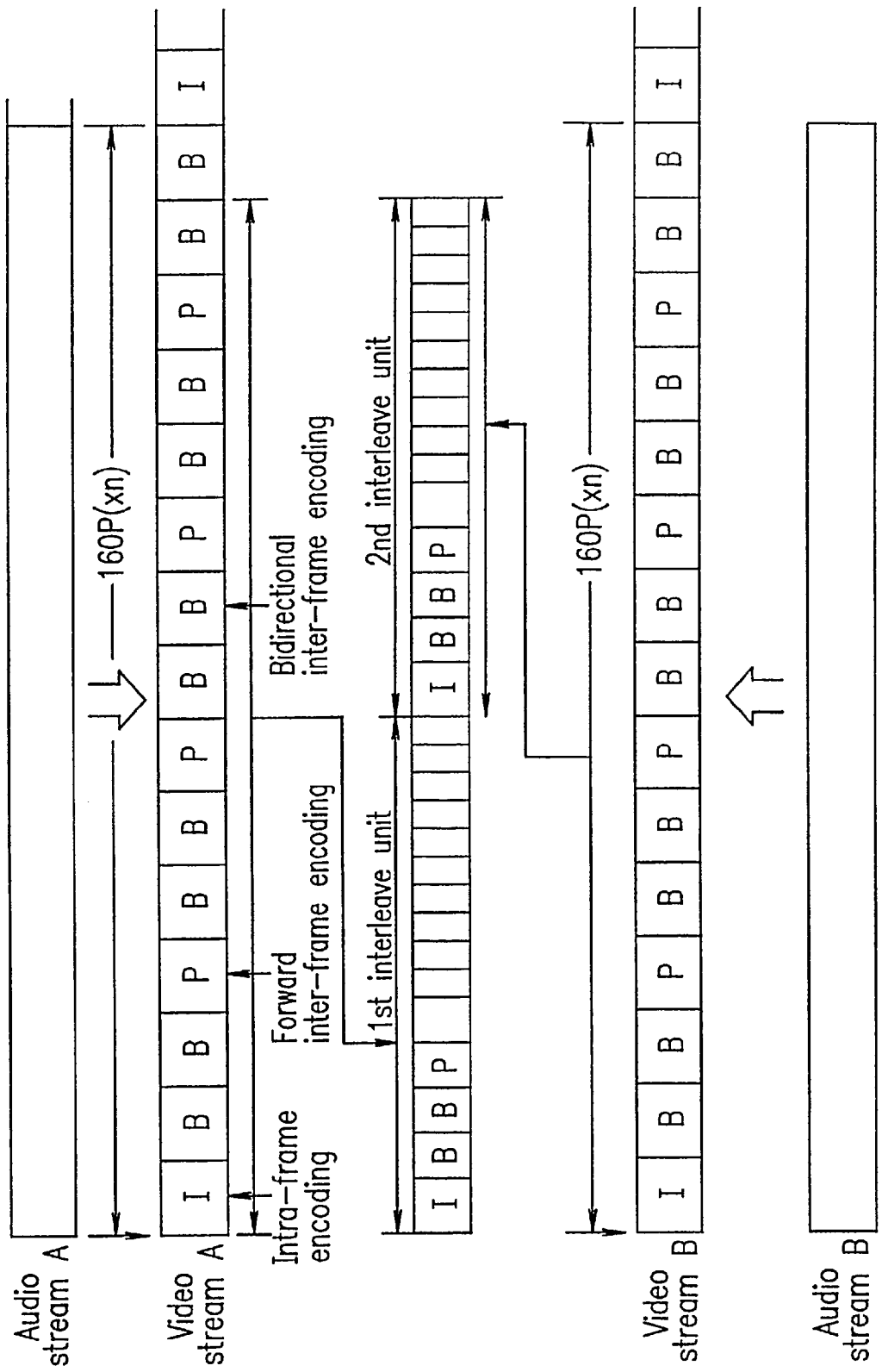
FIG. 85 is an IP structural view of an MADM stream in one example according to the present invention.

With reference to FIGS. 5 and 6, an operation for reproducing a 3D picture will be described. As described with reference to part (3) of FIG. 2, the R-frame group 6 and the L-frame group 8 are alternately recorded on the optical disk. The R-frame group 6 and the L-frame group 8 each include frames corresponding to n GOPs, where n is an integer of one or more. FIG. 85 represents such a state in detail. Two (right and left) streams are recorded on the disk alternately. Each stream includes intra-frame encoded frame data represented as I and inter-frame encoded frame data represented as B or P, and is divided into interleave units with the intra-frame encoded frame as a disconnection point.

In FIG. 6, part (1) shows the entirety of the disk, and part (2) shows a part thereof. An output signal from an optical signal reproduction circuit 24 in FIG. 5 is represented as part (2) of FIG. 6. The signal is divided into an R signal and an L signal by a switch section 25, and the time axes of the R signal and the L signal are matched to an original time axis respectively by a first buffer circuit 23a and a second buffer circuit 23b. By this operation, input signals, shown in part (4) of FIG. 6, to be input to R- and L-MPEG decoders are obtained. The signals are respectively processed by MPEG decoders 16a and 16b in FIG. 5. Thus, R and L output signals which are synchronized with each other as shown in parts (6) and (7) of FIG. 6 are sent to a picture output section 31. An audio signal is extended by an audio output section 32 and then output.

Since the two (R and L) signals are output simultaneously in this manner, a flickerless picture is obtained by sending a 60 fps (frames/sec.) signal from each of the R output section 29 and the L output section 30 to the 3D TV having two (R and L) outputs. In the embodiment where an RL mixture signal having 60 fields/sec. is sent from the RL mixture circuit 28, a 3D picture can be viewed with an ordinary TV and 3D spectacles, although the picture flickers. In the embodiment where an RL mixture signal having 120 fields/sec. is output, a flickerless 3D picture can be viewed with a 2× scan TV and 3D spectacles. In the case where a 3D picture is not being output as a 3D picture, a signal is added by a "3D" display signal output section 33 so that the TV screen display a symbol indicating "3D". Then, the user is notified that he/she is viewing 3D software in a 2D mode and is urged to switch to the 3D output mode. In the embodiment where a 3D control signal generated by a 3D spectacle control signal generation section 33a for switching right and left shutters of the 3D spectacles is detected from a frame synchronization signal for a decoding signal or from the RL mixture circuit 28 and output to an external device, a synchronization signal for the 3D spectacles is obtained.

Figure 90:
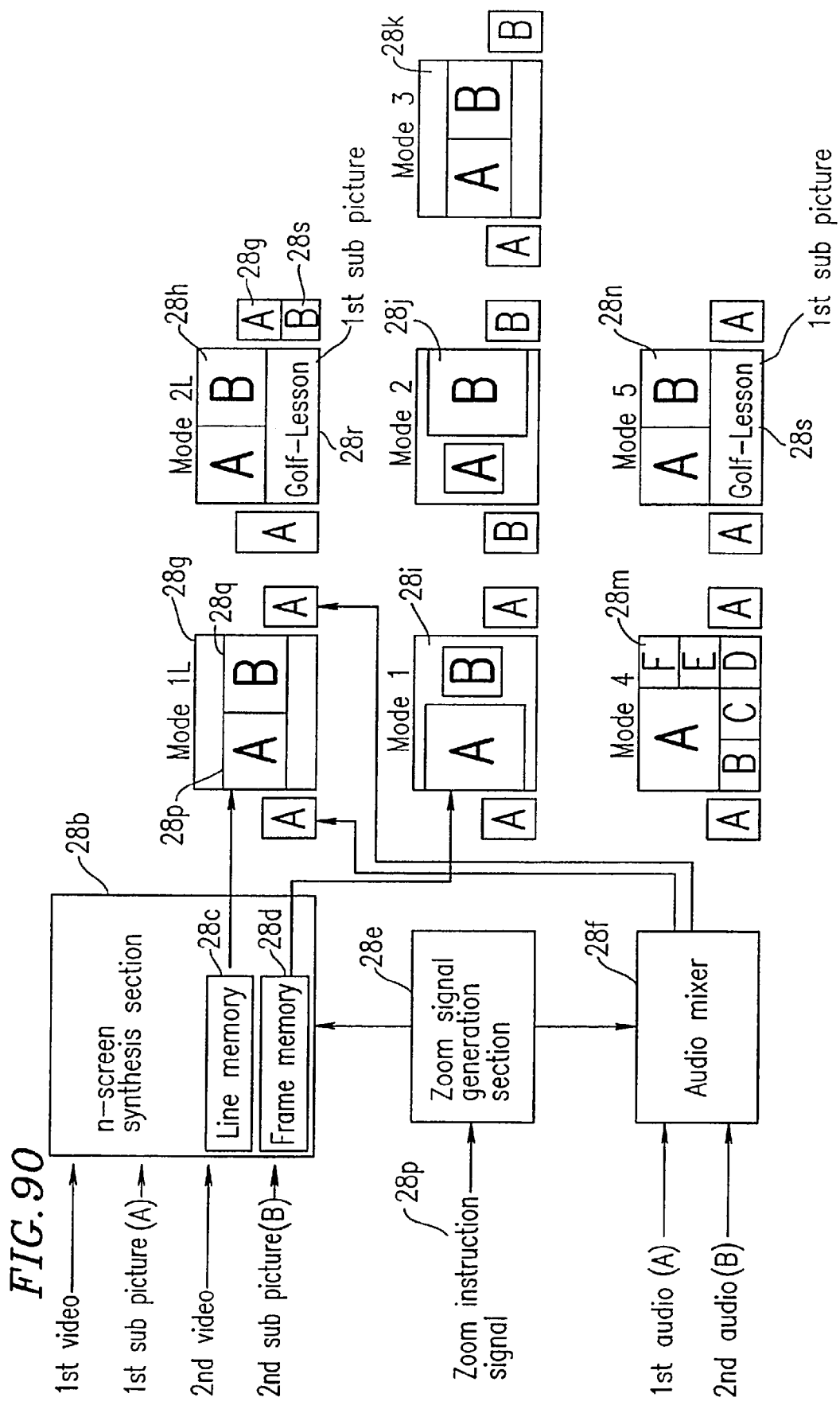
FIG. 90 is a block diagram of multiple (2) screen in one example according to the present invention.

When a line memory 28c of an n-screen synthesis section 28b in FIG. 90 is used, n pieces of pictures (e.g., two pictures) are output on a TV screen as one NTSC signal picture in which the two pictures are synthesized. Therefore, two angles can be viewed with an ordinary TV. A conventional 1× reproduction apparatus inconveniently displays only one angle at one time out of multiple angles. The present invention allows two streams to be reproduced simultaneously with a 2× reproduction apparatus and the MADM reproduction system, and also allows two screens to be displayed simultaneously. Accordingly, it is not necessary to switch the multiple angles.

As shown in FIG. 90 in detail, when the line memory 28c of the n-screen synthesis section 28b is used, a two-picture display 28f of two pictures A and B having the same size is obtained. Since a line memory has a simple structure and is integrated into an IC, the n-screen picture display is obtained with a simple structure. When a frame memory 28d is used, a two-picture display 28g of two pictures having different sizes is obtained by a zoom signal from a zoom signal generation section 28e. Since the user can arbitrarily set the size by remote control, the TV picture can be advantageously viewed at an optimum size.

In the block diagram in FIG. 5, two MPEG decoders are used. The structure is simplified by the circuit configuration shown in FIG. 7. The first MPEG signal and the second MPEG signal are synthesized into one MPEG signal by a synthesis section 36, and a 2× clock is generated by a 2× clock generation section 37. A 2× calculation is performed by a 2× clock-type MPEG decoder 16c, and the data is extended and output as R and L video signals through a division section 38. Such a circuit configuration advantageously limits an increase in the cost since it is only necessary to add a 16 MB SD-RAM to a memory 39 of an existing 2D reproduction apparatus.

Figure 7:
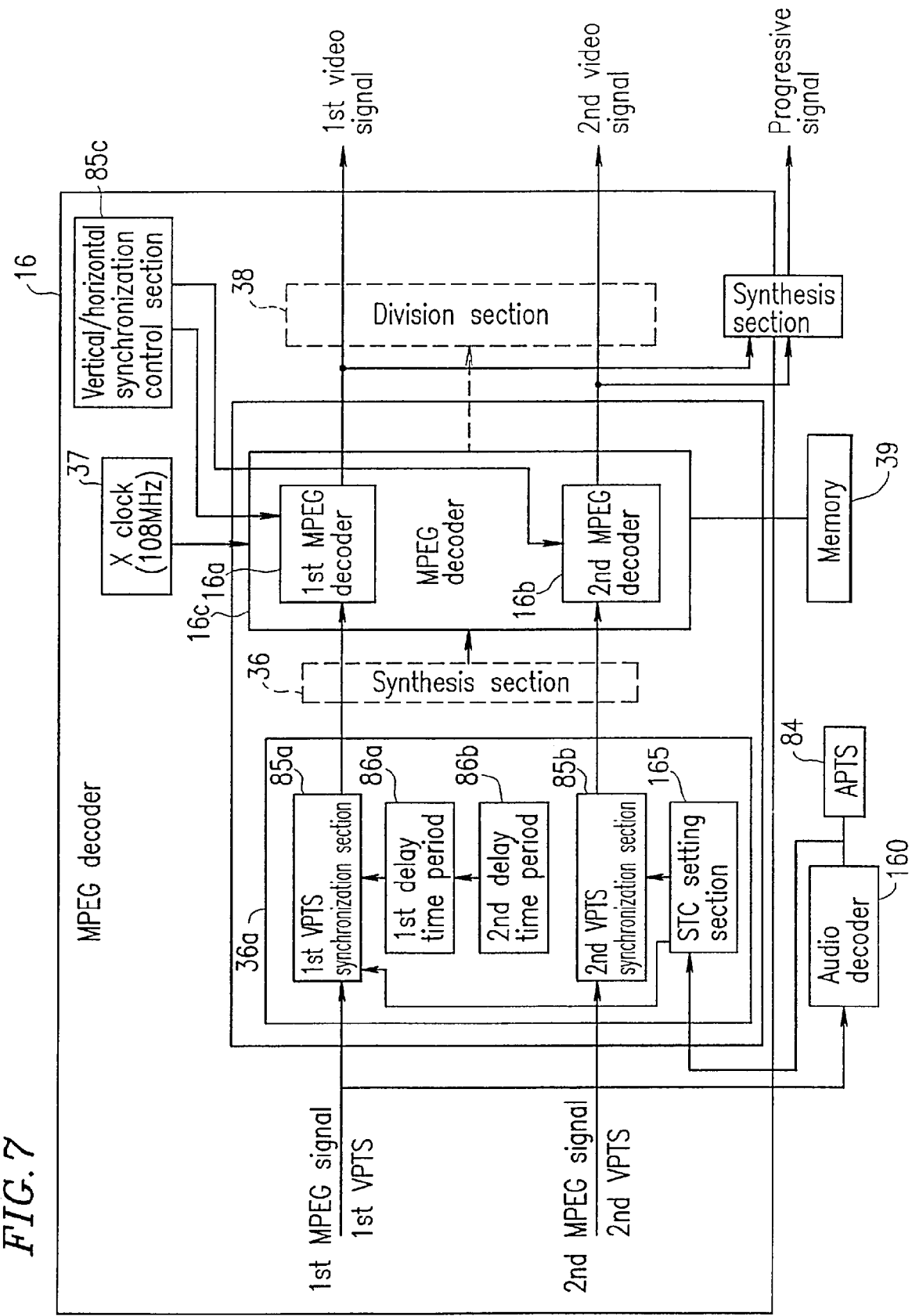
FIG. 7 is a block diagram showing an MPEG decoder of a different system of a reproduction apparatus in one example according to the present invention.
Figure 57:
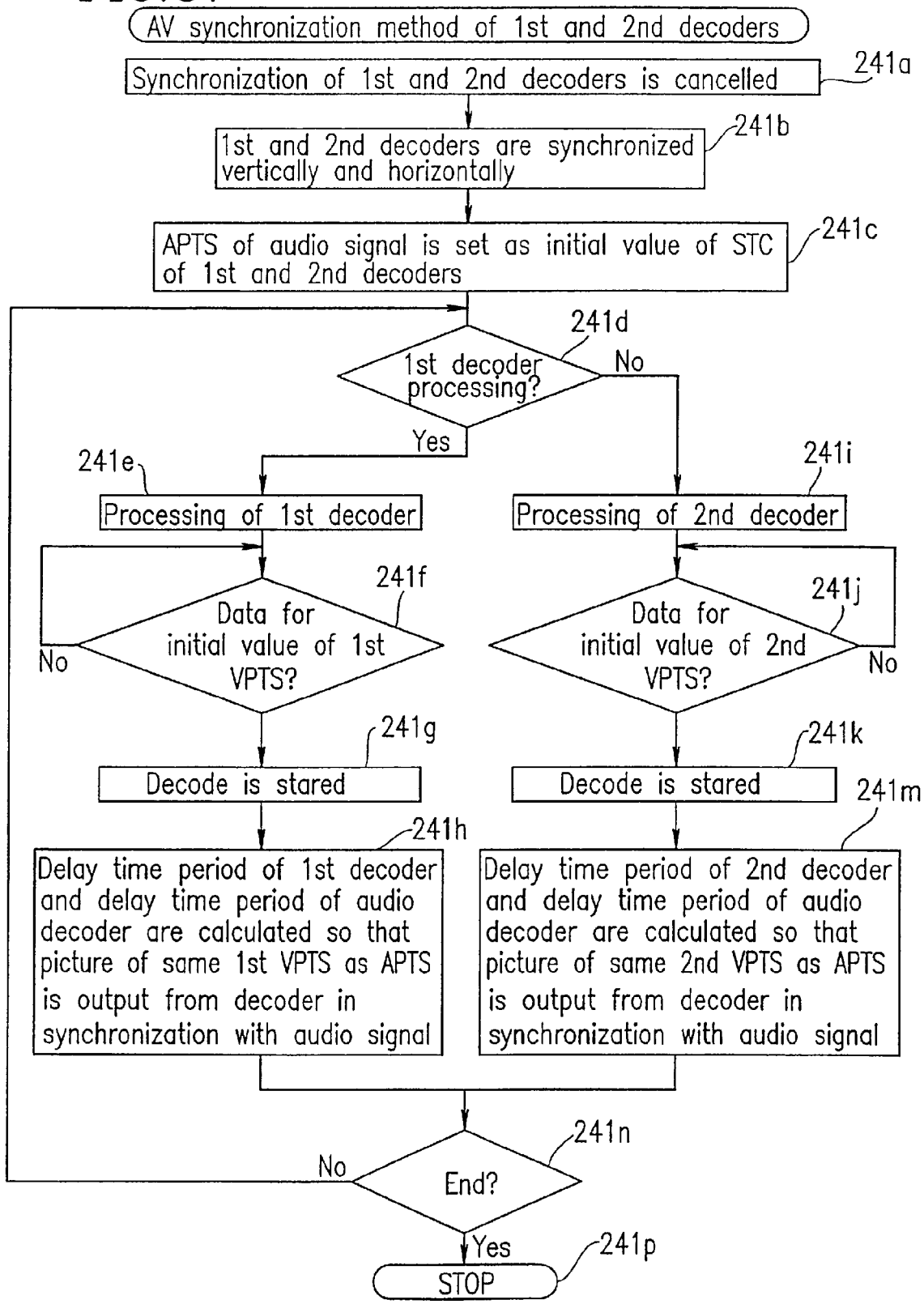
FIG. 57 is a flowchart illustrating a method for performing AV synchronization of a first decoder and a second decoder in one example according to the present invention.

With reference to FIG. 7, synchronous reproduction of two streams which is important in decoding 3D picture data and progressive picture data will be described. First, it is necessary to adjust vertical and horizontal synchronization of two streams within a single line. In order to do this, a first MPEG decoder 16a and a second MPEG decoder 16b are started substantially simultaneously by a vertical/horizontal synchronization control section 85c to synchronize the decoders 16a and 16b. Then, it is necessary that the outputs from the two decoders should be pictures having an identical VPTS. This will be described with reference to the flowchart in FIG. 57 and FIG. 7. In step 241a, the synchronization of a first decoder and a second decoder is cancelled. In step 241b, the decoders are synchronized with each other vertically and horizontally. In step 241c, an APTS of an audio signal is read, and the APTS value is set as an initial value of an STC of the first decoder and an STC of the second decoder. In step 241e, processing of the first decoder is started. In step 241f, it is checked whether or not a first VPTS has reached the initial value. If yes, decoding is started in step 241g. In step 241h, a processing delay time period of the first decoder is calculated, and the VPTS of the decoder output is adjusted so that the APTS and the VPTS are synchronized with each other. Since the second decoder is processed in the same manner, the picture from the first decoder and the picture from the second decoder are synchronized with each other. Thus, the decoder outputs, i.e., the first MPEG signal and the second MPEG signal are synchronized within one line. Then, the synchronization on a dot-by-dot basis is obtained by a video signal synchronization section 36a of the synthesis section 36. An original progressive picture is obtained even by a sum calculation. As shown in FIG. 5, in the case where an APTS 84 is read by the audio decoder 16c and an identical APTS is set in registers 39a and 39b of the STCs of the two MPEG decoders 16a and 16b, an audio stream and the two video stream are automatically synchronized with one another.

In the present invention, when the buffer circuits 23a and 23b underflow, either one of the pictures is disconnected, as a result of which a disturbed progressive picture is output. In order to avoid this, the buffering amounts of the two buffer circuits are controlled by a buffer amount control section 23c as shown in FIG. 5. This operation is illustrated in the flowchart shown in FIG. 56. First, in step 240a, a maximum interleave value among the NAVI information of each disk is read, and a maximum value of 1 ILB in one main interleave block is set. The maximum value is usually 512 sectors, i.e., about 1 MB. When the maximum value is set below 1 MB by a specific format, that value is set as the maximum value. Next, when an instruction to simultaneously reproduce the main and sub interleave blocks is issued in step 240b, if the buffering amount of the first buffer circuit 23a is 1 ILB or less in step 240c, reproduction is performed from the main interleave block, and an instruction to transfer the data to the first buffer circuit 23a is issued. Then, the processing goes back to steps 240b and 240a. The transfer is stopped in step 240d when the buffering amount of the first buffer circuit exceeds 1ILB. Since the data in the buffer circuit 23a becomes 1ILB or more in this manner, underflow is prevented.

In step 240f, a maximum value of a sub interleave block of 1 ILB-Sub is set in the buffer circuit 23b. Simultaneous reproduction is performed in step 240g. When the data in the second buffer circuit 23b is ½ ILB-Sub or less, data is read into the buffer circuit in step 240i. When the data is more than ½ ILB-Sub in step 240i, the reading is stopped in step 240j.

Figure 45:
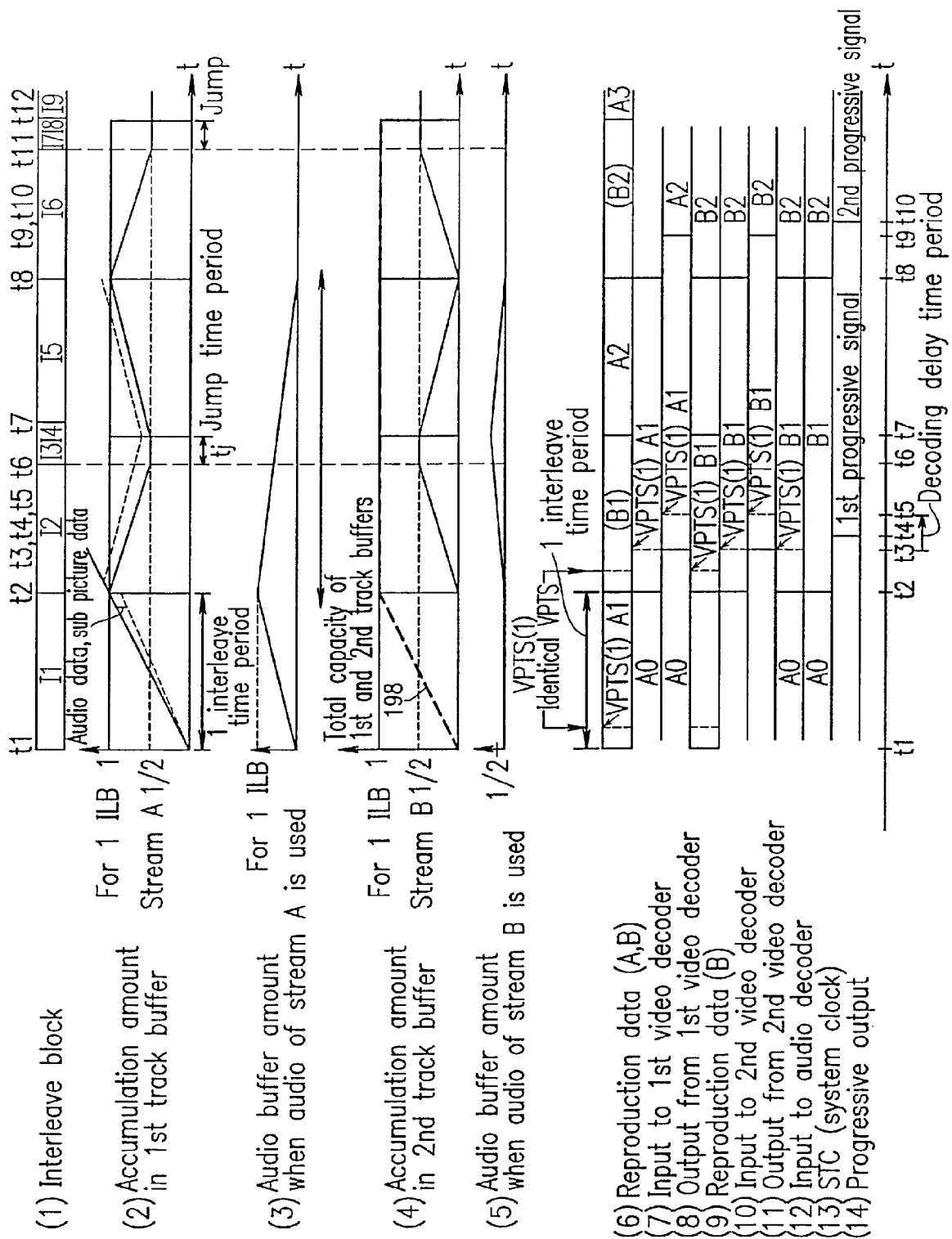
FIG. 45 is a timing diagram of reproduction of progressive, 3D and wide signals with respect to the data amount in buffer in one example according to the present invention.

As shown in part (4) of FIG. 45, the data amount of ½ ILB is sufficient in the second buffer circuit. Accordingly, the buffering amount can be reduced to half. The buffer control in FIG. 56 eliminates the underflow of the buffer circuits, thus reducing disturbance in the synthesized picture during reproduction.

Next, a process for reproducing only an R signal by 1× rotation of the optical disk will be described. The standard rotation speed of a DVD reproduction apparatus is referred to as "1×", and the speed twice the standard rotation speed is referred to as "2×". Since it is not necessary to rotate the motor at 2×, a 1× instruction is sent from a control section 21 to a rotation speed alternation circuit 35 to reduce the rotation speed. A process for reproducing only an R signal at 1× rotation from an optical disk storing the R signal and an L signal will be described with reference to the timing diagram in FIG. 8. As described with reference to parts (1) and (2) of FIG. 6, the optical disk according to the present invention has the R-frame group 6 and the L-frame group 8 alternately recorded. This is shown in parts (1) and (2) of FIG. 8.

Figure 8:
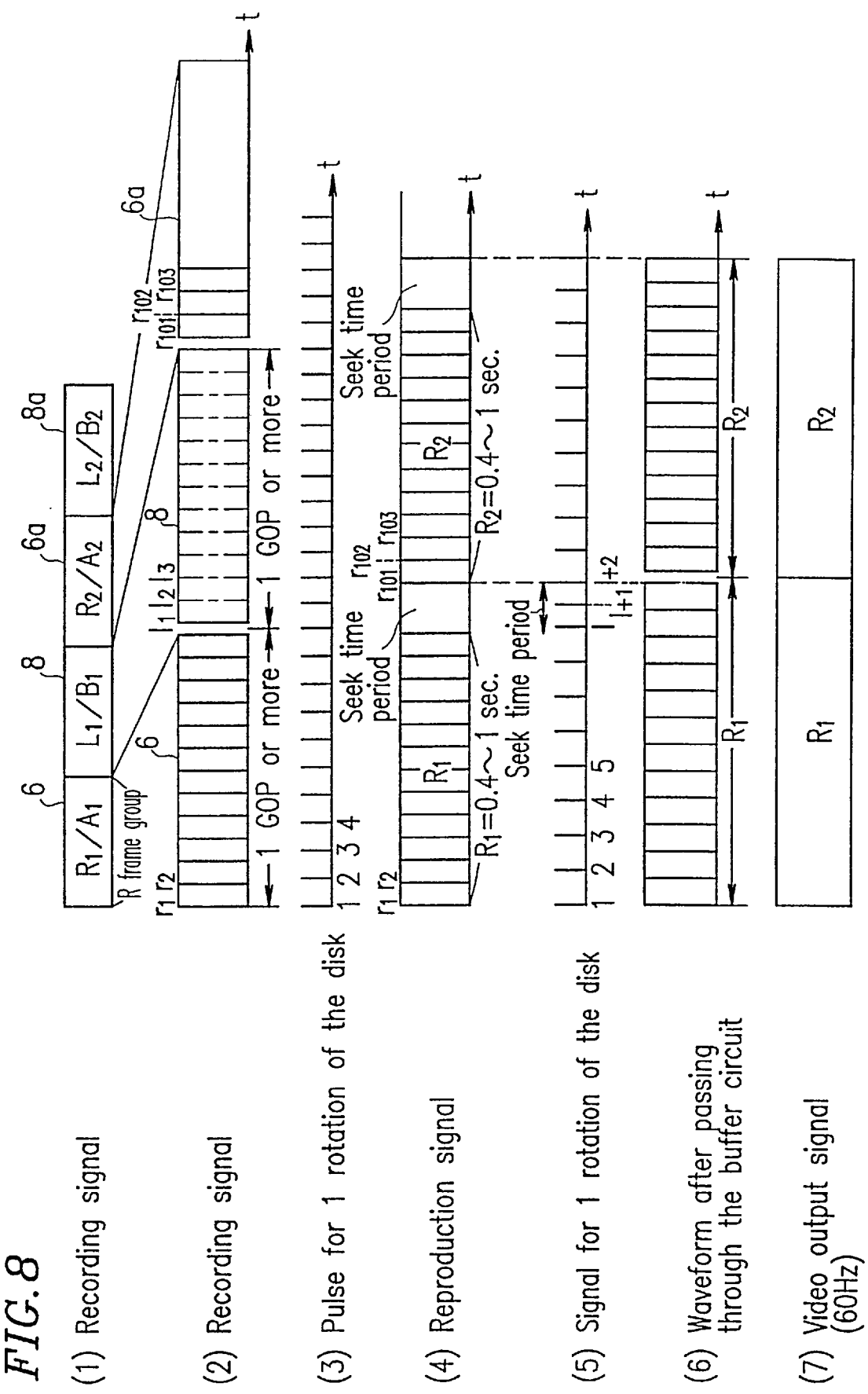
FIG. 8 is a timing diagram showing the relationship between a recording signal and an output signal when 2D reproduction is performed with a reproduction apparatus in one example according to the present invention.

A comparison between the signal shown in parts (1) and (2) of FIG. 8 and a signal shown in part (3) of FIG. 8 corresponding to one rotation of the disk indicates that the optical disk rotates 5 to 20 times while one frame group is reproduced. A track jump of the optical head from the R-frame group 6 to the next R-frame group 6*a* requires several tens of milliseconds. Where the wait time period is one rotation, which is the maximum, the data in the R-frame group 6*a* can be reproduced within two rotations. This is shown in parts (4) and (5) of FIG. 8, which are timing diagrams of the reproduction signal and the signal corresponding to one rotation of the disk. The time axis of the reproduction signal in part (4) of FIG. 8 is adjusted by the buffer circuit 23*a* in FIG. 5, and an MPEG signal having continuous R frames as shown in part (6) of FIG. 8 is output from the buffer circuit 23*a*. This signal is extended to be an R video signal as shown in part (7) of FIG. 8 by the MPEG decoder 16*a*. By selecting a different channel in the same manner as the case of the R signal, a 2D signal of the L channel is obtained. According to the present invention, the R or L channel is assigned to a frame group of 1 GOP or more and the frame group is recorded continuously over a plurality of tracks. Thus, even when a 3D optical disk is reproduced by a 1× reproduction apparatus, a 2D output of only the R channel is obtained.

Figure 9:
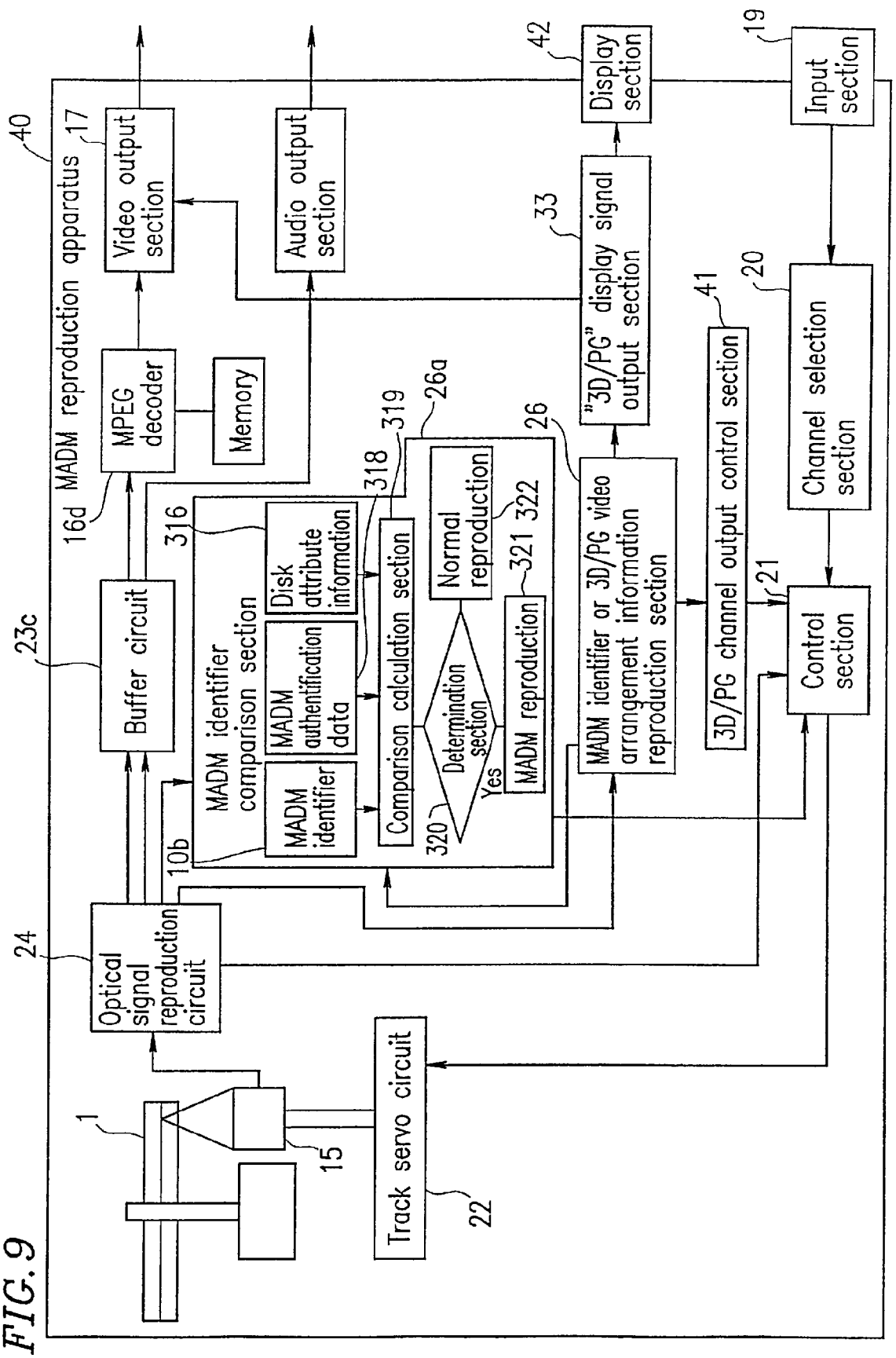
FIG. 9 is a block diagram showing a 2D reproduction apparatus in one example according to the present invention.
Figure 10:
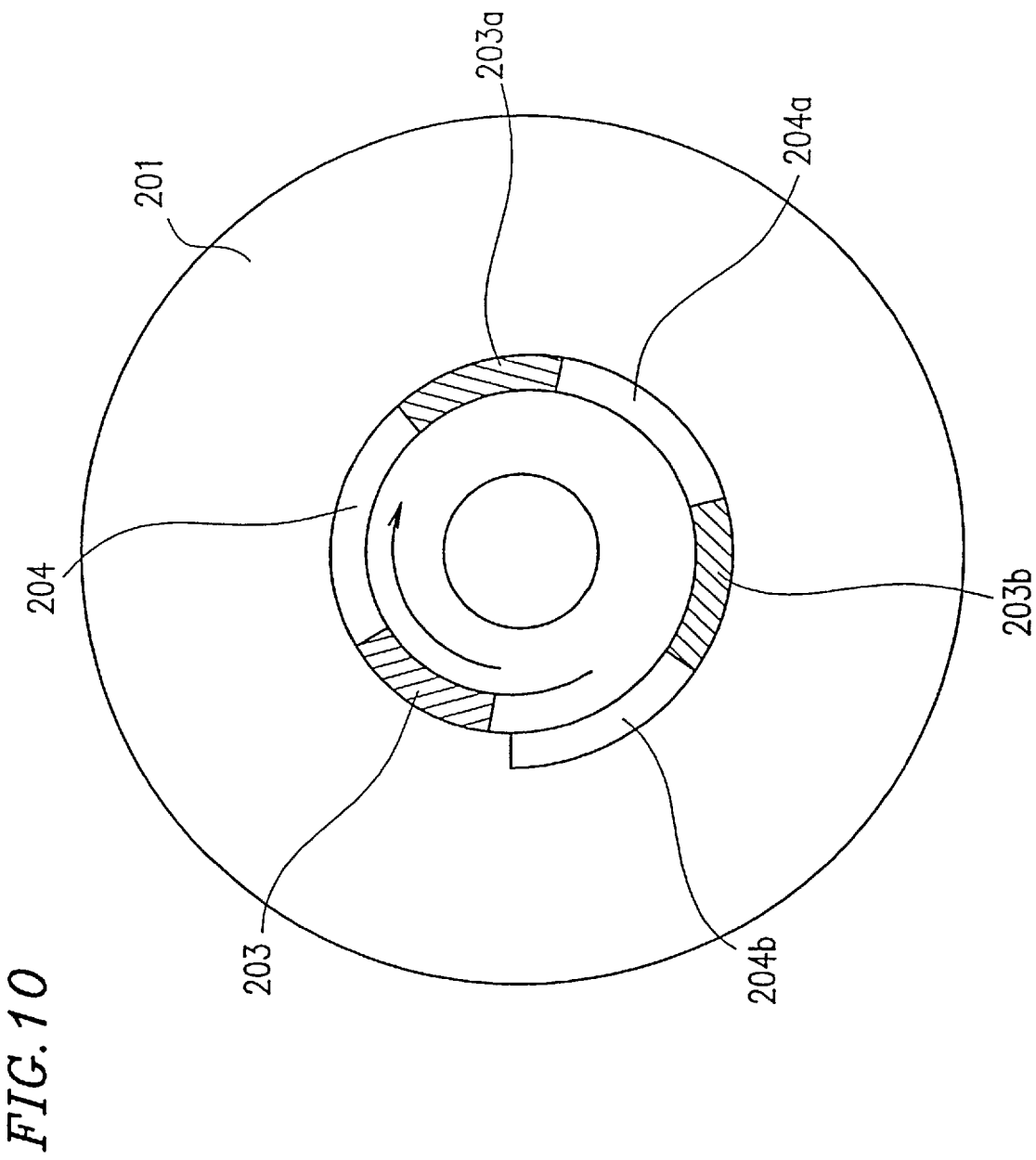
FIG. 10 is a top view showing data arrangement of a conventional optical disk having a 3D picture.
Figure 11:
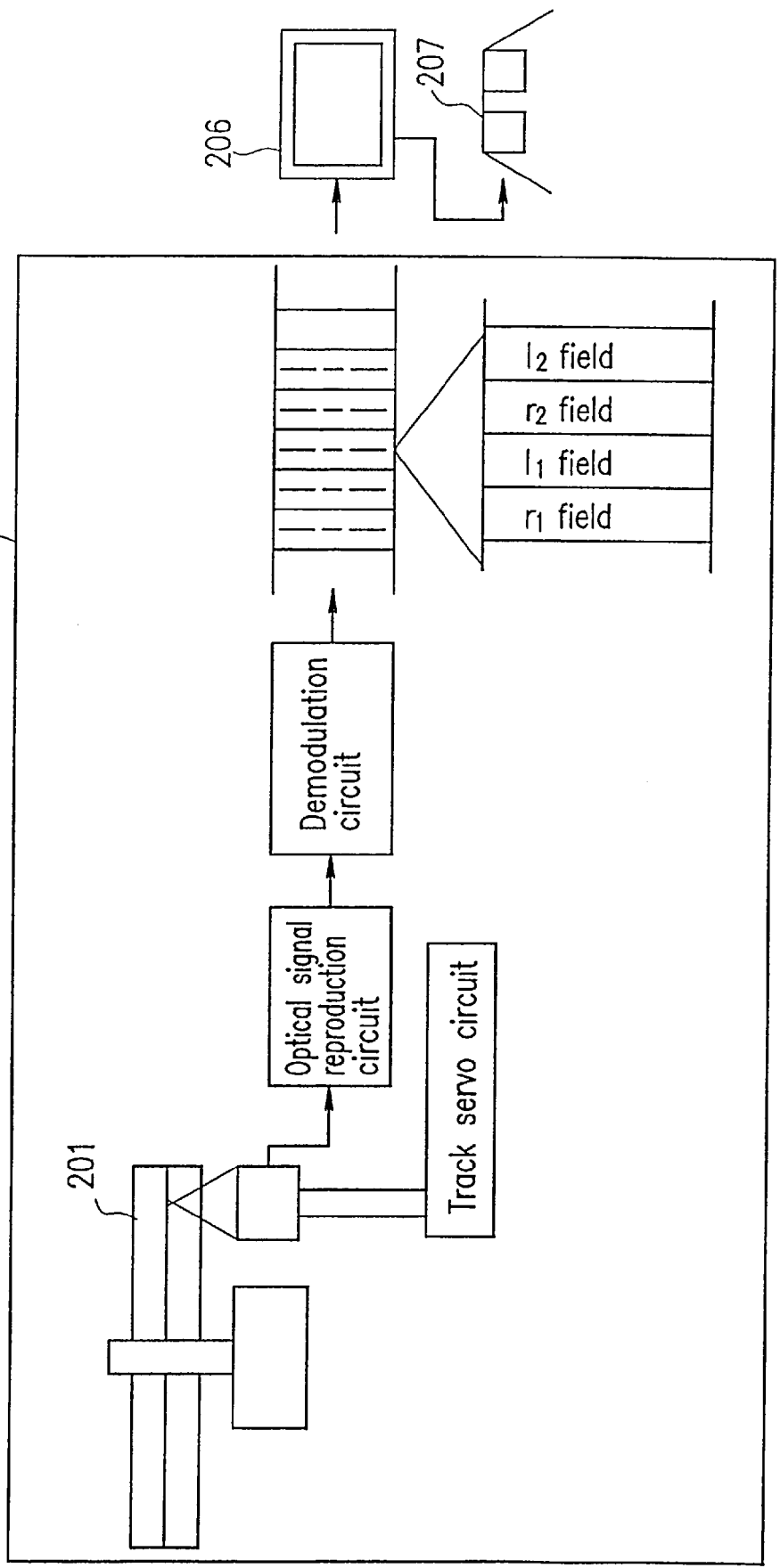
FIG. 11 is a block diagram showing a reproduction apparatus for reproducing a conventional optical disk having a 3D picture.
Figure 12:
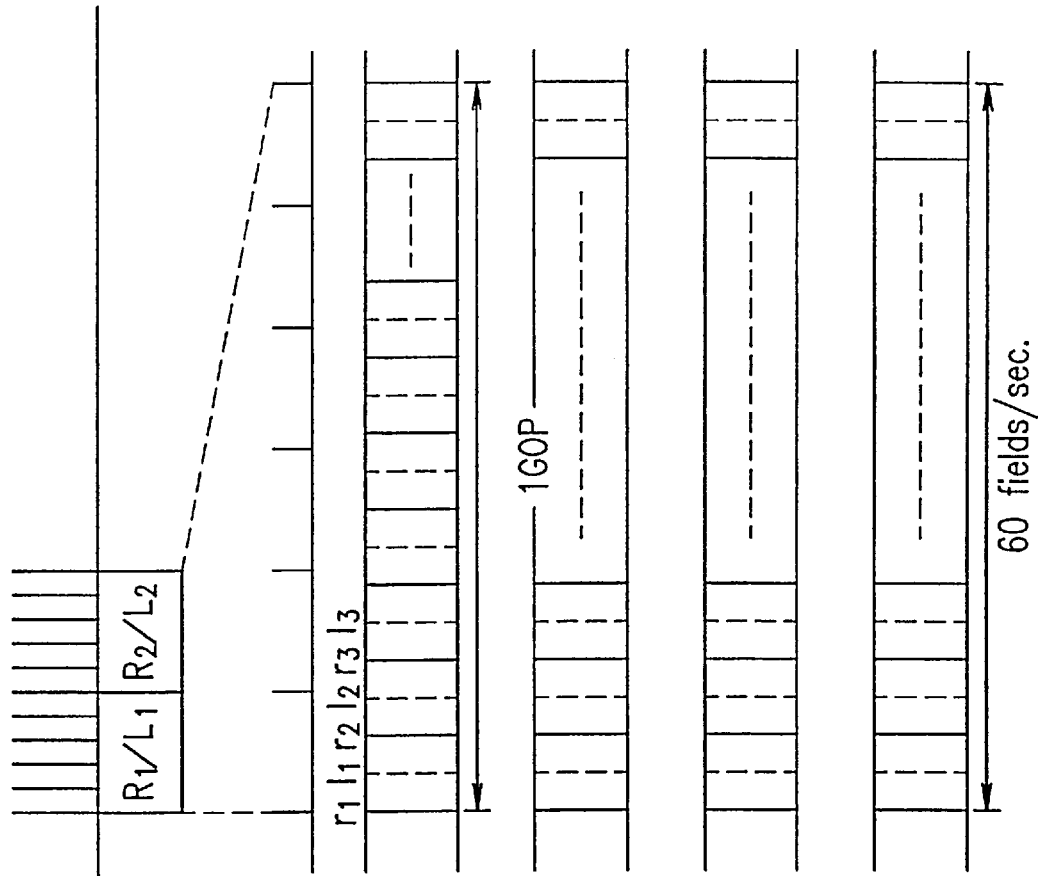
FIG. 12 is a timing diagram showing the relationship between a recording signal obtained by reproducing a conventional optical disk having a 3D picture and a picture output signal.

As can be appreciated from this, as shown in the block diagram of FIG. 9, a reproduction apparatus specifically for 2D display is obtained by altering the structure of the 3D reproduction apparatus in FIG. 5 so that there is only one buffer circuit 23 in lieu of two, one MPEG decoder 16 in lieu of two, and one picture output section 17. Such a 2D reproduction apparatus 40 includes the 3D picture arrangement information reproduction section 26, and therefore, reproduces a 3D picture identifier and arrangement information of the 3D optical disk 1. Accordingly, when the data in the optical disk 1 is reproduced by the 2D reproduction apparatus, data in either one out of the R and L channels is output. Since the R and L channels correspond to an identical picture, it is a waste of time to output the pictures in the R and L channels by switching the channels by a channel selection section 20. According to the present invention, a 3D channel output control section 41 restricts data to be output from only either channel, for example, the R channel, using the 3D picture identifier. Thus, data in only the R or L channel of identical video contents is output, avoiding the situation in which the user selects an unnecessary channel.

When a 3D picture is provided, the "3D" display signal output section 23 displays the symbol "3D" on the screen or a display section 42 of the reproduction apparatus. Therefore, the user can recognize that the picture is a 3D picture. The optical disk according to the present invention provides both 2D and 3D pictures when reproduced by the 3D reproduction apparatus 43 in FIG. 5 and a 2D picture when reproduced by the 2D reproduction apparatus in FIG. 9. In this manner, the compatibility between the 2D reproduction apparatuses and 3D reproduction apparatuses realized.

Now, returning to the 3D reproduction apparatus, use and effect of a 3D picture identifier will be described.

Figure 13:
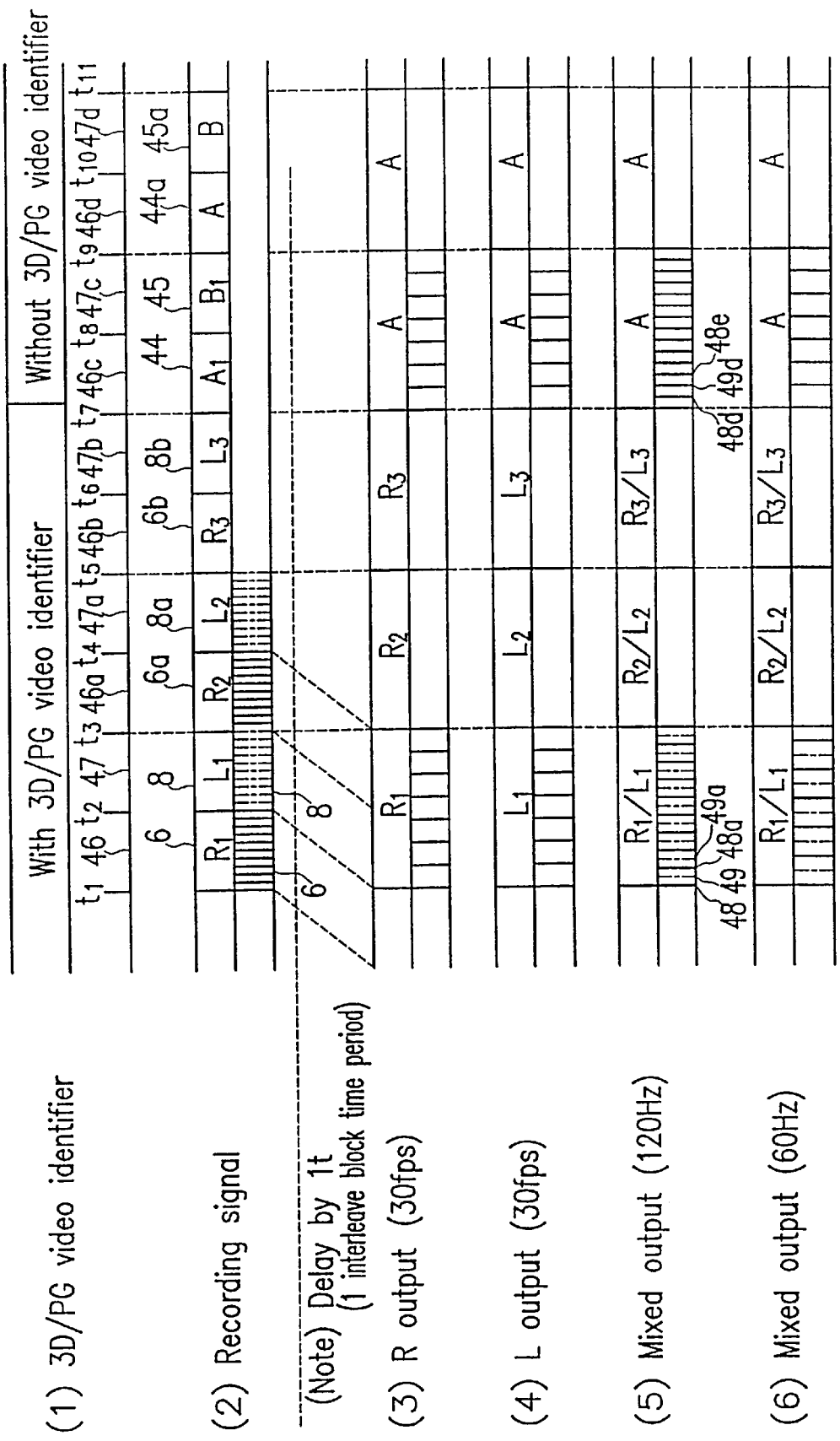
FIG. 13 is a timing diagram showing the relationship among a virtual 3D identifier, an R output and an L output in one example according to the present invention.

FIG. 13 is a timing diagram of a 3D picture identifier and an output signal. One interleave block is defined as a time unit "t". In parts (3) through (6) of FIG. 13, a delay time period of 1t is generated although not shown. As shown in part (1) of FIG. 13, the state of the 3D picture identifier is changed from "1" to "0" at t=t7. As shown in part (2) of FIG. 13, the R-frame groups 6, 6*a* and 6*b* and the L-frame groups 8, 8*a* and 8*b* of a 3D picture are recorded from t1 through t7. From t7 through t11, pictures A and B of different contents are recorded. In more detail, first-frame groups 44 and 44*a* of picture A and second-frame groups 45 and 45*a* of picture B are recorded. Since the DVD format does not define 3D pictures, a 3D picture identifier is not included in the data or directory information of the disk. Accordingly, a 3D picture arrangement information file needs to be read when the optical disk is started. As shown in parts (3) and (4) of FIG. 13, from t1 through t7, data in first time domains 46, 46*a* and 46*b* can be output to the R channel, and data in the second time domains 47, 47*a* and 47*b* can be output to the L channel. After t=t7, no 3D picture identifier is available. Accordingly, data in, for example, first time domains 46*c* and 46*d* is output to both the R and L channels. As shown in parts (5) and (6) of FIG. 13, a different output system is adopted for a mixture output. From t1 through t7 when the 3D picture identifier is "1", even field signals 48 and 48*a* and odd field signals 49 and 49*a* are alternately output from one output at a field frequency of 60 Hz or 120 Hz. In more detail, data in the first time domains 46 and 46*a* is output as the even field signals, and data in the second time domains 47 and 47*a* is output as the odd field signals.

After t=t7 when the 3D picture identifier is not available, data in the first time domains 46*c* and 46*d* is output as both the even field signals 48*d* and 48*e* and the odd field signals 49*d* and 49*e*.

As described above, the manner of outputting signals to the 3D display is changed in accordance with whether or not the 3D picture arrangement information indicates the absence of the 3D picture. In this manner, it is prevented that pictures of different contents from each other are presented for the right and left eyes of the user. Without such a function, the following inconvenience occurs. In the case where the first time domain and the second time domain of the optical disk start to include different contents from each other while the user is viewing a right-eye picture and a left-eye picture of the same contents, a picture of content A is presented to the right eye and a picture of content B is presented to the left eye. Such an abnormality makes the user feel uncomfortable.

Figure 17:
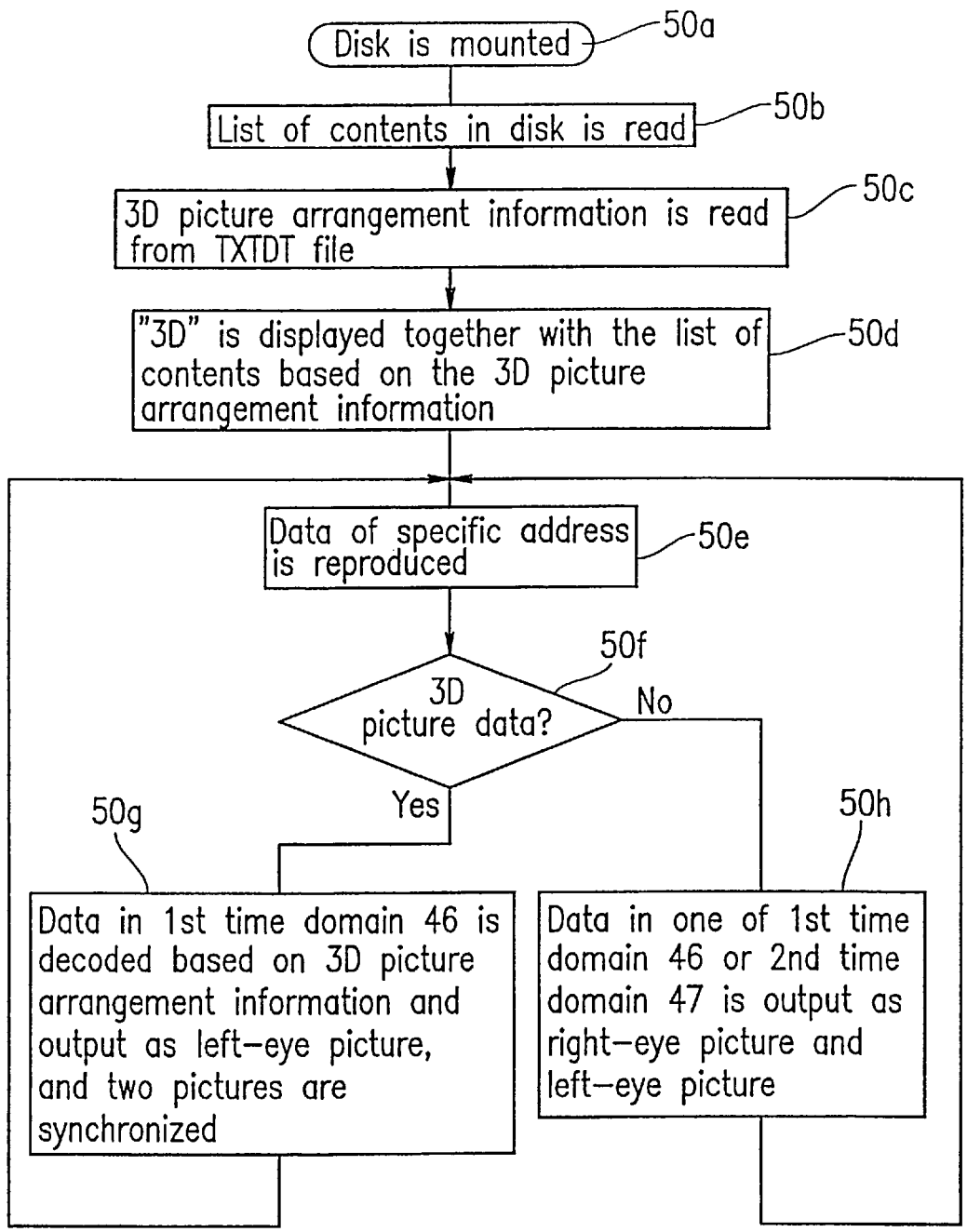
FIG. 17 is a flowchart showing how the manner of output is changed in accordance with whether the signal to be reproduced is a 3D video signal or not by a 3D reproduction apparatus in one example according to the present invention.

With reference to the flowchart of FIG. 17, the above-described process will be described in detail. In step 50*a*, an optical disk is mounted. In step 50*b*, a file of a list of contents in the optical disk is read. The file does not include a 3D picture identifier. In step 50*c*, a 3D picture arrangement information is read from a TXTDT file of the disk.

In step 50*d*, the list of contents is displayed based on the 3D picture arrangement information. At this point, "3D" is displayed for each of the contents on the menu screen, so that the user can recognize that 3D contents are available. This information can be in one area of the optical disk or included in navigation information provided on a data-by-data basis.

In step 50*e*, data in a specific address is reproduced. In step 50*f*, it is determined whether or not the data is 3D data with reference to the 3D picture arrangement information. If yes, in step 50*g*, signals are decoded. For example, an R signal in the first time domain 46 and an L signal in the second time domain 47 are decoded. The data in the first time domain 46 is output as the right-eye picture, and the data in the second time domain 47 is output as the left-eye picture. The pictures are synchronized. For reproduction of the next data, the processing goes back to steps 50*e* and 50*f*, where it is determined whether or not the picture is a 3D picture. If no, the processing goes to step 50*h*, where the data in either one of the first time domain 46 or the second time domain 47 is output as both the right-eye picture and the left-eye picture. In other words, the same picture is output for the right eye and the left eye. Thus, pictures of different contents are prevented from being output to the right eye and the left eye.

According to the present invention, an ordinary picture and a 3D picture both of the interleave block system are reproduced in different manners. This will be described, hereinafter.

Figure 14:
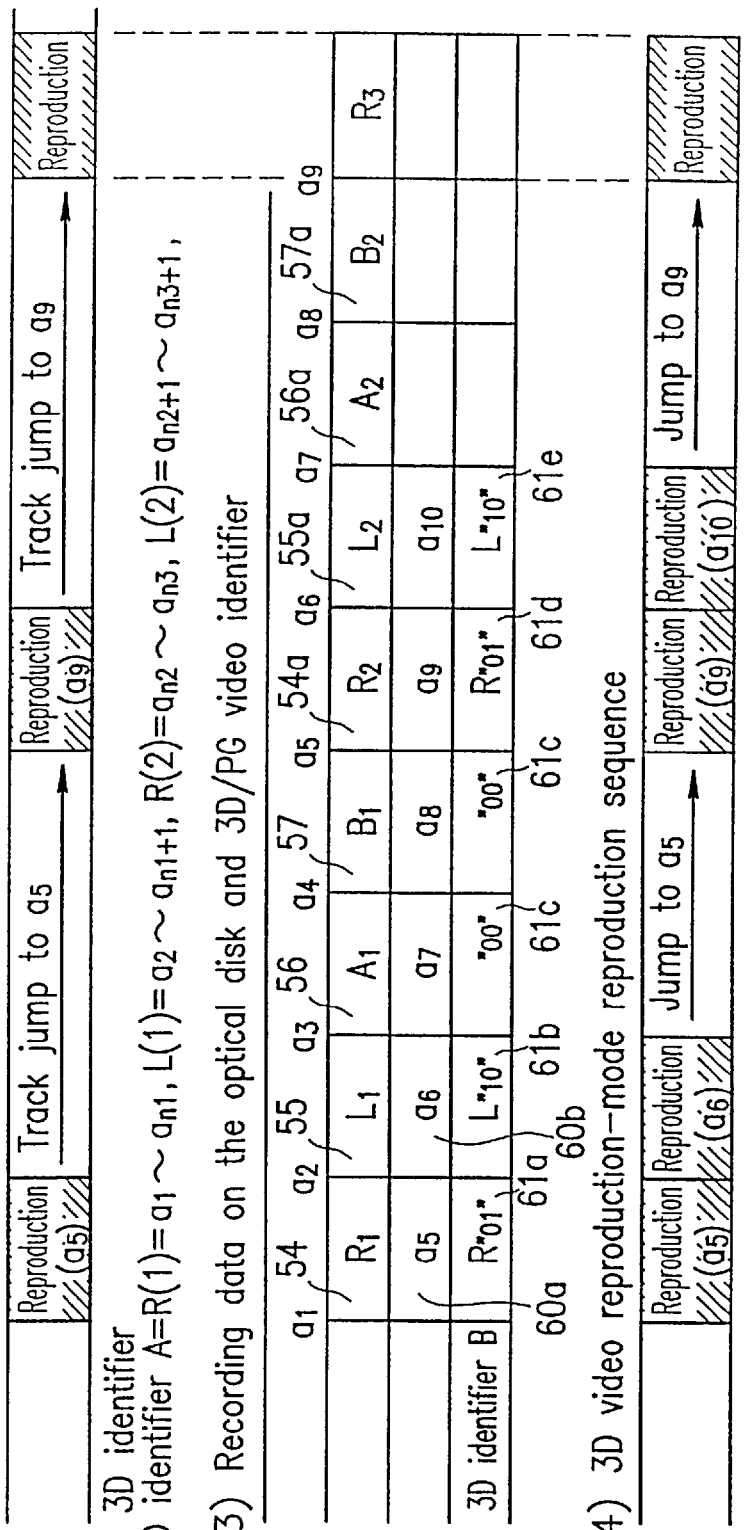
FIG. 14 is a reproduction sequence view showing the difference of f pointer accessing in an ordinary picture reproduction mode and a 3D reproduction mode in one example according to the present invention.

With reference to FIG. 14, part (1) shows data recorded on the optical disk. A first interleave block 56 includes data A1 and a leading address a5 of the first interleave block 56 to be accessed next, i.e., the next pointer 60. Accordingly, as shown in part (2) in FIG. 14, when reproduction of the first interleave block 56 is terminated, only the address of the pointer 60*a* needs to be accessed. Thus, the optical head performs a track jump to access the next first interleave block 56*a* within 100 ms and reproduces data A2. Data A3 is reproduced in same manner. In this manner, contents A1 through A3 are reproduced.

Part (3) of FIG. 14 is related to an optical disk having 3D pictures for R and L outputs. The optical disk includes the same pointer 60 in order to have the same format as in part (1) of FIG. 14 for compatibility. Accordingly, a 3D picture is not reproduced unless the pointer 60 is ignored.

A 3D picture identifier 61 of each cell is defined based on the 3D picture logical arrangement table. Accordingly, 3D picture identifiers 61 of interleave blocks 54, 55, 56 and 57 are logically defined. This is shown in part (3) of FIG. 14. The pointer cannot be used as it is in order to reproduce data R1 and L1 and then reproduce data R2 and L1 after a track jump. Specifically, when reproduction of the R interleave block 54 is completed, the address of the pointer a5 is not accessed. Rather, after reproduction of the next L interleave block 55, the optical head performs a track jump to the pointer a5 of the R interleave block. In this case, the pointer 60*b* of the L interleave block 55 is ignored. For reproducing an interleave block where the 3D picture identifier is available, it is advantageous to change the manner of accessing the pointer address from the case of the reproduction of an ordinary picture, the advantage being that R and L pictures are continuously reproduced as shown in part (4) of FIG. 14.

Figure 15:
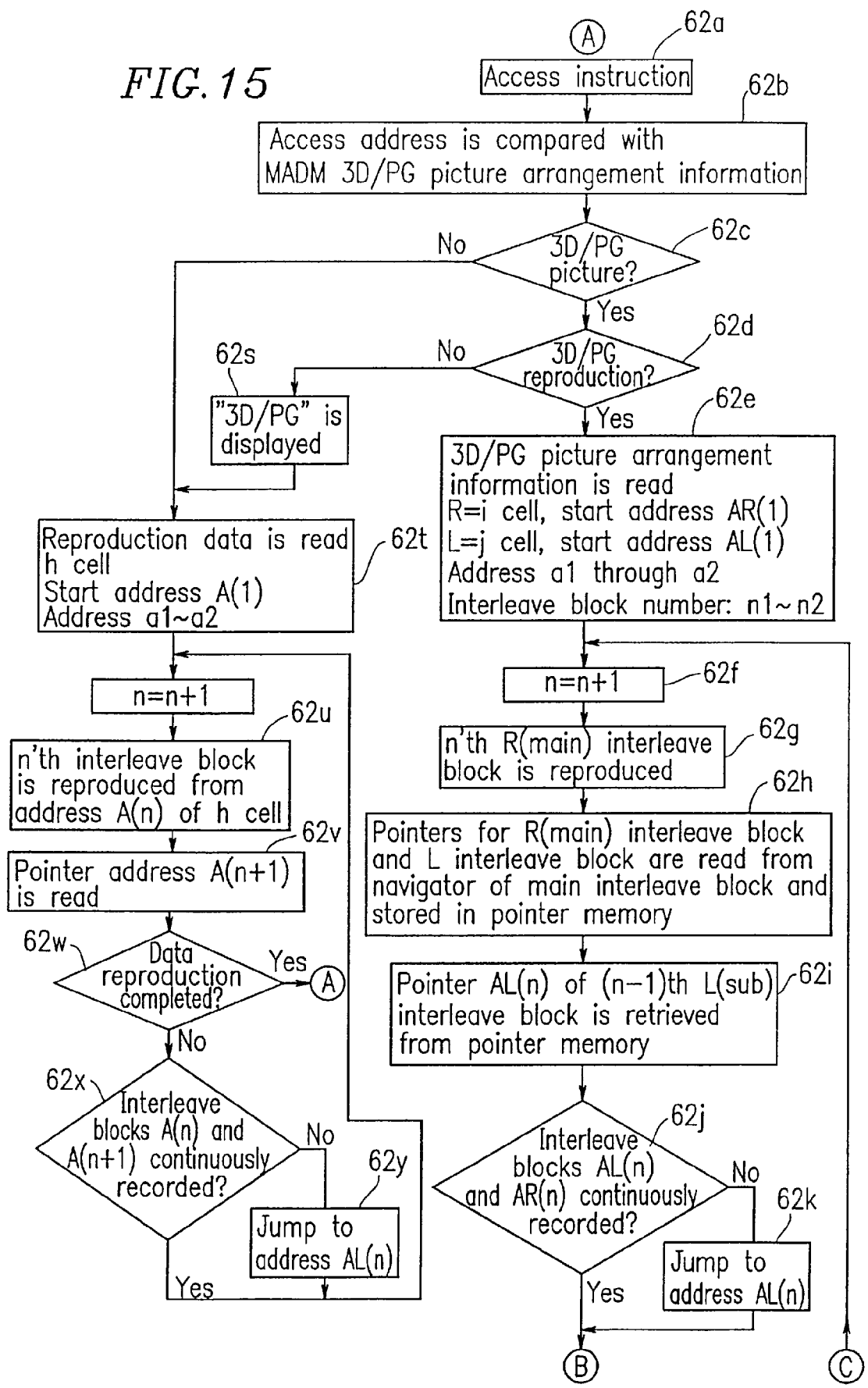
FIG. 15 is a flowchart (I) illustrating how a process of accessing a pointer is changed in accordance with whether a 3D video signal is reproduced or not in one example according to the present invention.

With reference to flowcharts in FIGS. 15 and 16, a process of changing the manner of accessing the pointer address when reproducing an interleave block using a 3D picture arrangement information will be described.

In step 62*a*, an access instruction to an address of a specific cell is issued. In step 62*b*, it is determined whether or not the picture to be accessed is 3D with reference to the 3D picture arrangement information. If the picture is determined not to be 3D in step 62*c*, the processing goes to step 62*t*, where the picture is processed as an ordinary picture. If the picture is determined to be 3D in step 62*c*, the processing goes to step 62*d*, where it is checked whether or not the user intends to reproduce the picture as a 3D picture. If no, the "3D" mark is displayed on the screen and the processing goes to step 62*t*.

If yes in step 62*d*, the 3D picture arrangement information is read in step 62*e*, and the locations of the R and L interleave blocks are calculated based on, for example, the chapter number, R cell number and L cell number. In step 62*g*, the n'th R interleave block is reproduced. In step 62*h*, the pointers recorded in the R interleave block and the L interleave block are read and stored in the pointer memory. In step 62*i*, the previous pointer (i.e., the (n−1)th pointer AL (n)) is read from the pointer memory. In step 62*j*, it is checked whether or not pointers AL(n) and AR(n) are continuous with each other. If no, a jump to the address AL(n) is performed in step 62*k*.

Figure 16:
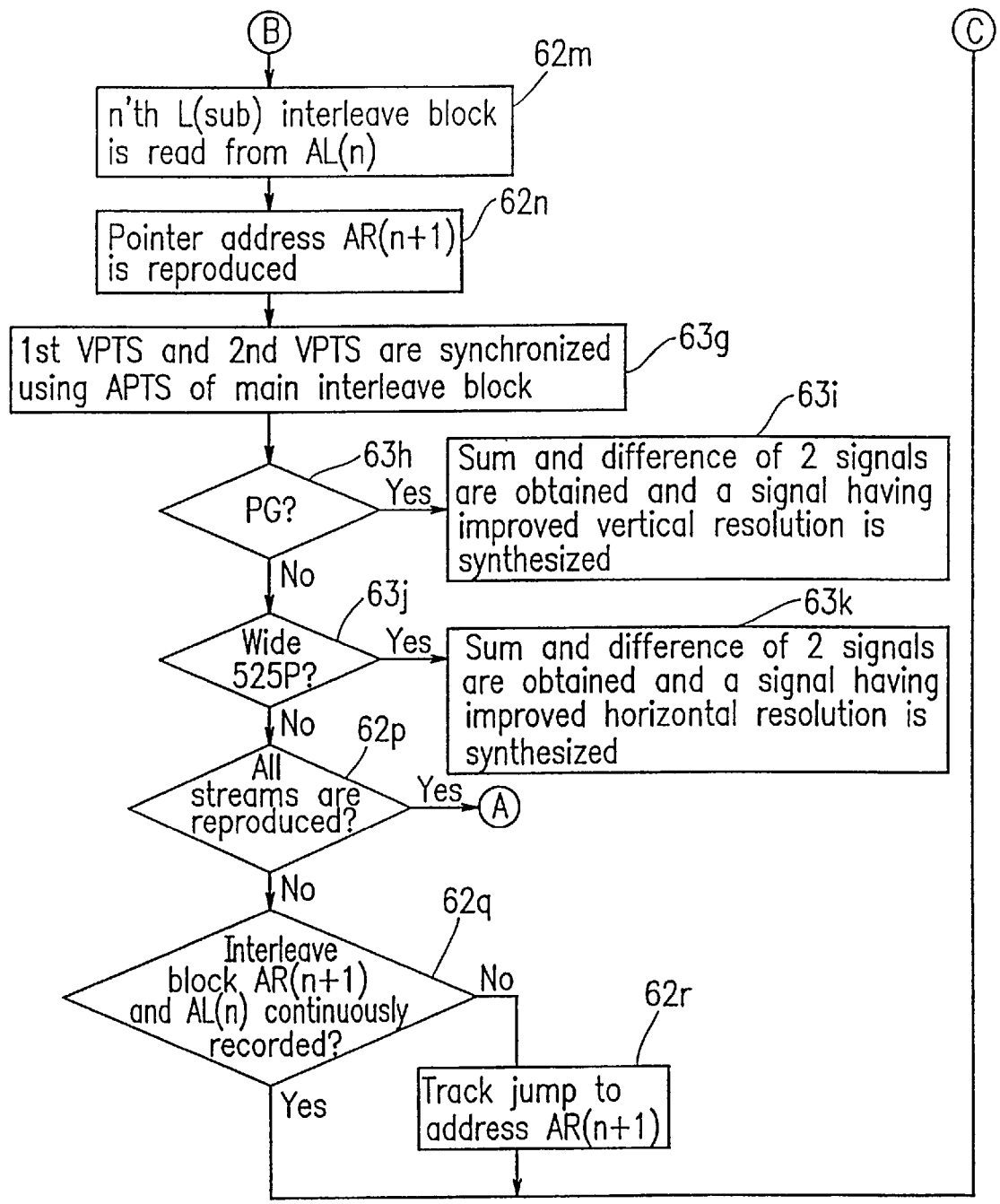
FIG. 16 is a flowchart (II) illustrating how a process of accessing a pointer is changed in accordance with whether a 3D video signal is reproduced or not in one example according to the present invention.

As shown in FIG. 16, in step 62*m*, the n'th L interleave block is reproduced. In step 62*n*, the first VPTS and the second VPTS are output in synchronization using the pointer AR(n+1). In step 63*g*, the first VPTS and the second VPTS are synchronized using APTS of the main interleave block. If in step 63*h*, the signal is found to be a PG, i.e., progressive signal, in step 63*i*, a sum and a difference of the two decoding output signals are found to and a vertical synthesis is performed. Thus, a picture having an improved vertical resolution such as a 525P picture is obtained.

If the signal is found to be wide 525P(i) in step 63*j*, a sum and a difference of the two decoding output signals are found and a horizontal synthesis is performed. Thus, a picture having an improved horizontal resolution such as a wide 525P(i) picture of, for example, 1440×480 pixels is obtained. In step 62*p*, it is checked whether or not the reproduction of all the streams is completed. In step 62*q*, it is checked whether or not the n'th L interleave block and the (n+1)th R interleave block are recorded continuously with each other. If no, a track jump to the AR(n+1) is performed in step 62*r* and the processing goes back to step 62*f*. If yes in step 62*q*, the processing directly goes back to step 62*f*.

In the case where the "3D" mark mentioned regarding step 62*t* is not displayed on the screen, the starting address A(1) of cell h is accessed and the first interleave block is reproduced. Then, in step 62*u*, the n'th interleave blocks of address A(n) are sequentially reproduced. In step 62*v*, the pointer address A(n+1) for accessing the next interleave block by jumping is read. In step 62*w*, it is checked whether or not the reproduction of all the data is completed. If yes, the processing goes back to step 62*a*. If no, in step 62*x*, it is checked whether or not A(n) and A(n+1) are continuous with each other. If yes, the processing goes back to the step before step 62*u* without jumping. If no, in step 62*y*, a jump to the address A(n+1) is performed.

Figure 20:
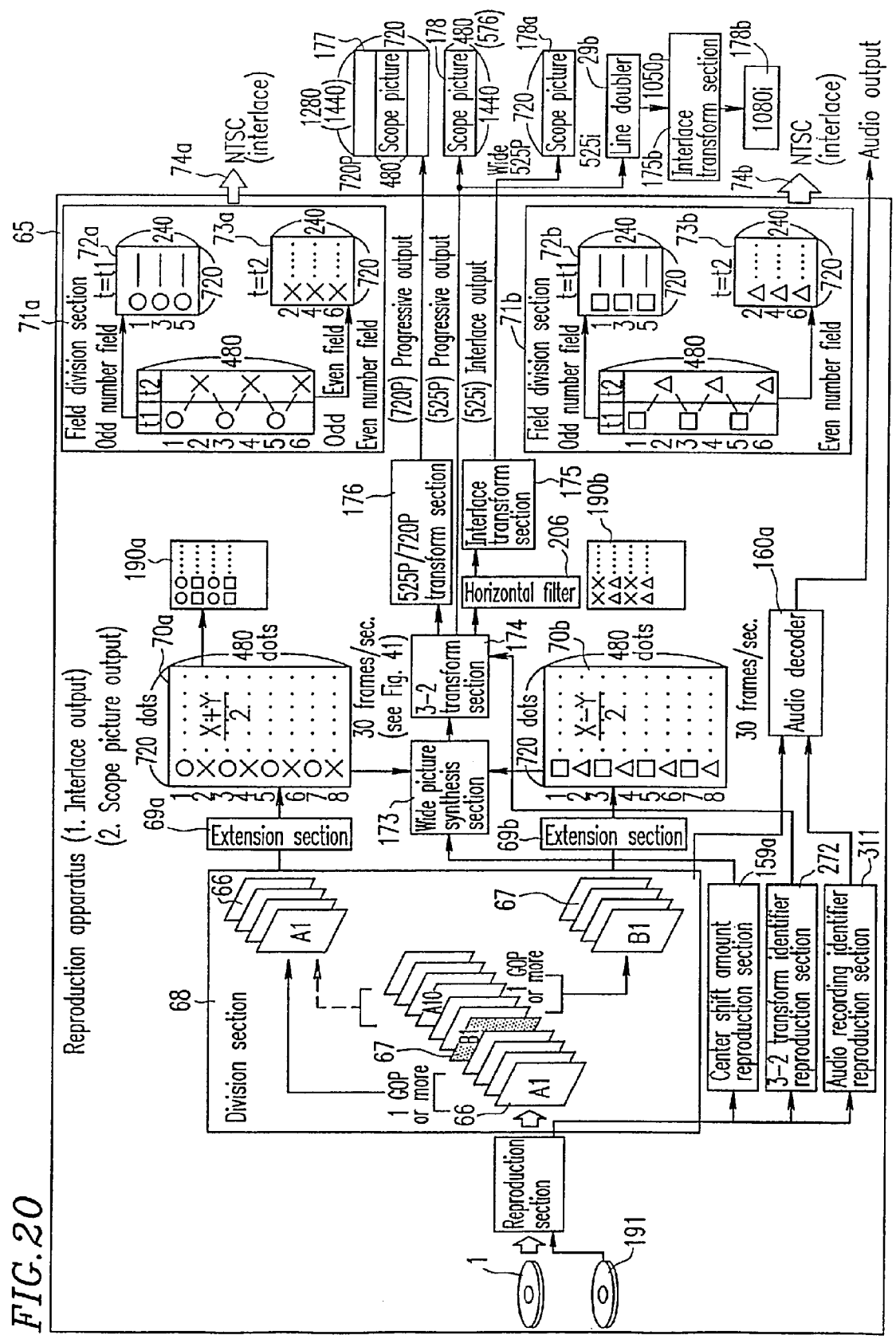
FIG. 20 is a block diagram of a reproduction apparatus in an interlace picture signal output mode in one example according to the present invention.

FIG. 20 is a block diagram of a reproduction apparatus 65 according to the present invention. An operation of the reproduction apparatus 65 for reproducing 2× progressive pictures, wide screen pictures and 720P pictures will be described. A signal reproduced from an optical disk 1 is divided by a division section 8 into a first interleave block 66 and a second interleave block 67 each including frames corresponding to 1 GOP or more. The blocks are respectively MPEG-extended into frame video signals 70*a* and 70*b* each having 30 frames/sec. The video signal 70*a* is divided by a field division section 71*a* into an odd field signals 72*a* and 73*a*. The video signal 70*b* is divided by a field division section 71*b* into an odd field signals 72*b* and 73*b*. Thus, 2-ch NTSC interlace signals 74*a* and 74*b* are output. The wide screen picture reproduced by the reproduction apparatus in FIG. 20 will be described later.

Figure 22:
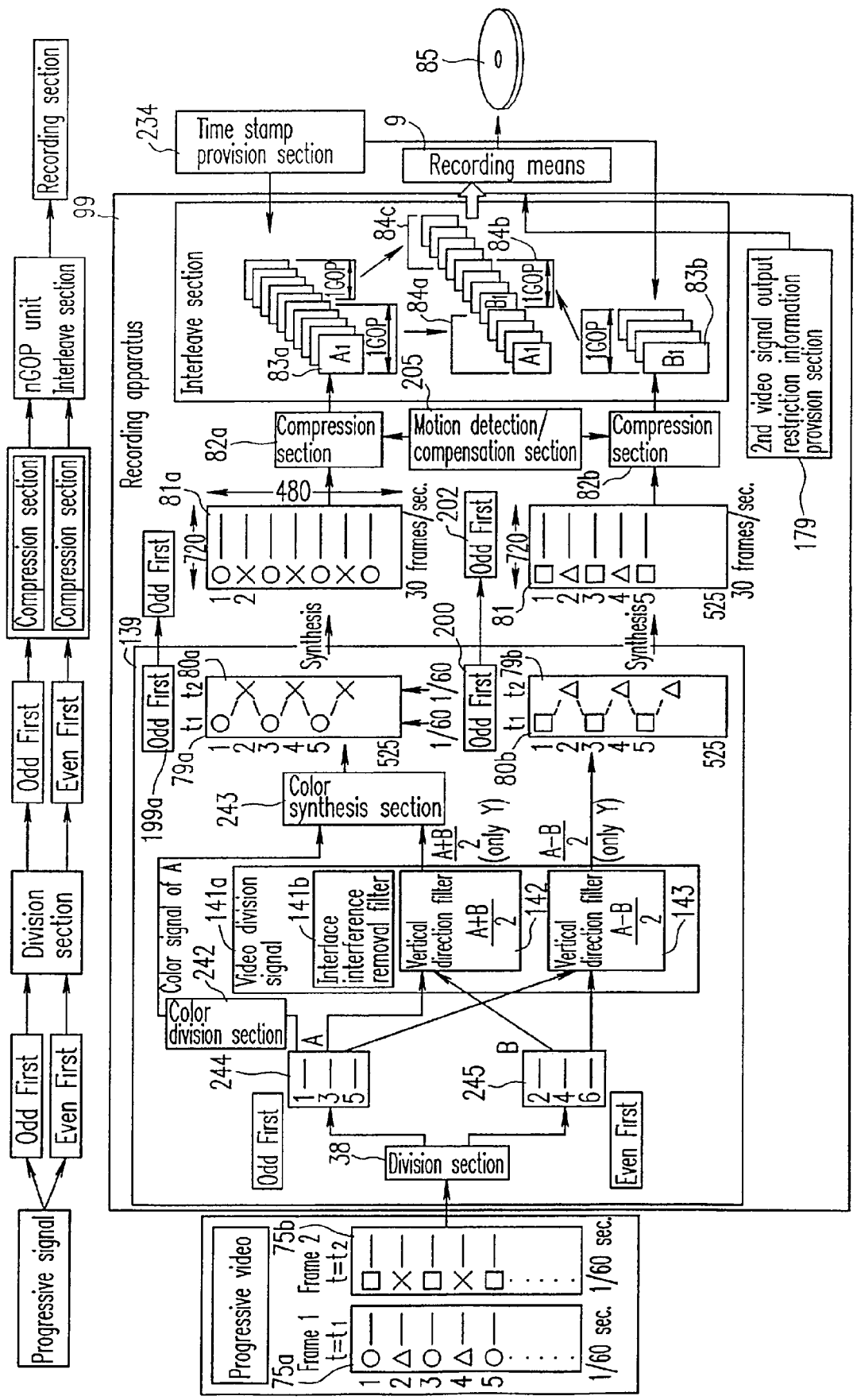
FIG. 22 is a block diagram of a recording apparatus in a progressive picture signal input mode in one example according to the present invention.

With reference to FIG. 22, an encoding operation of a progressive video signal will be described. Progressive video signals 75*a* and 75*b* are input at time t1 and t2, and divided by a division section 38 into an Odd First interlace signal 244 and an Even First interlace signal 245. Where the n'th line (e.g., 1st line) of the interlace signal 244 is labeled as "An" and the n'th line (e.g., 2nd line) of the interlace signal 245 is labeled as "Bn", a vertical filter 142 performs a sum calculation, i.e., $\frac{1}{2}(An+Bn)$, thus obtaining a low frequency component. In other words, a function of an interlace interference removal filter 141 is performed. In the case where the resultant component is reproduced from only one angle by a conventional reproduction apparatus, an NTSC signal with no interlace interference is obtained. "An" of the interlace signal 244 is also divided by a color division section 242 and input to a color synthesis section 243 without passing through the vertical filter 142. In the color synthesis section 243, the signal from the color division section 242 and the signal from the vertical filter 142 are synthesized ($\frac{1}{2}(A+B)$). Then, the resultant signal is compressed by an MPEG encoder.

A vertical filter 143 performs a difference calculation, i.e., $\frac{1}{2}(An-Bn)$, thus obtaining a high frequency component, i.e., difference information. This signal is compressed by an MPEG encoder without being combined with the color signal. Accordingly, the amount of the difference information is advantageously reduced by the amount of the color signal.

Figure 23:
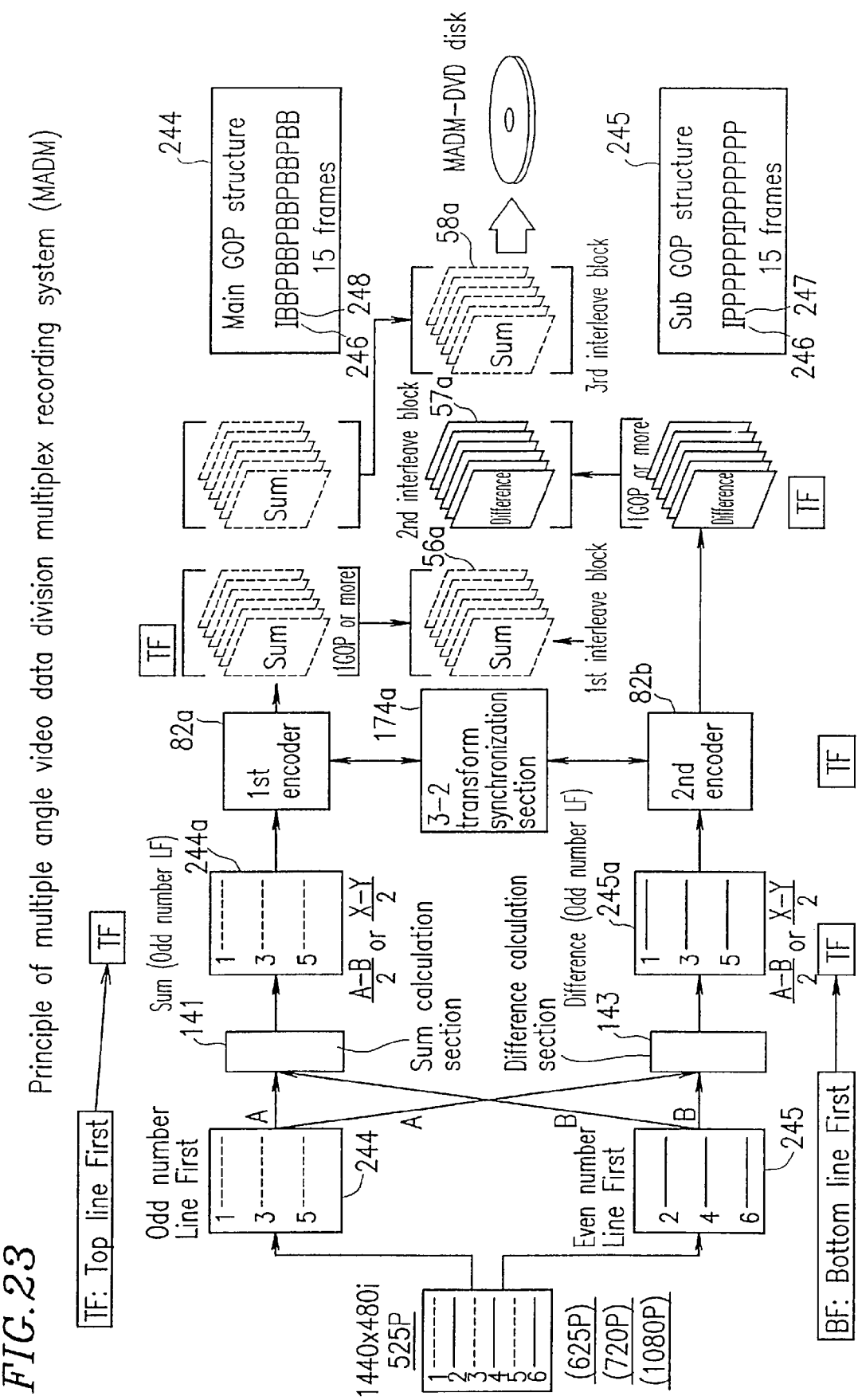
FIG. 23 is a view illustrating the principle of multiple angle video data division multiplex system in one example according to the present invention.

FIG. 23 is a view representing the concept of the structure of FIG. 22. This system is referred to as multiple angle video data division multiplex system (MADM) since a video signal is divided into vertical or horizontal high frequency and low frequency components and recorded in the state of being divided into pictures of multiple angles. As shown in FIG. 23, a signal is divided into a basic signal (sum signal) and a sub signal (difference signal) by a sum calculation section 141 and a difference calculation section 143. The resultant signals are MPEG-encoded and then recorded as an interleave block in units of 1 GOP. At this point, the amount of the information can be reduced by 20% by performing 3-2 transform of the basic signal and the sub signal in synchronization with each other. It is efficient to use, as the basic signal, "IBBPBBPBBPBBPBB" which is shown as a main GOP structure 244 used for the ordinary MPEG encoding. In this structure, an I frame 246, B frames 248 and P frames 247 are alternately arranged. In the case of the difference signal, experiments have shown that it is efficient to have a structure including only I frames 246n and P frames 247 due to the profile pattern, for example, "IPPPPPPPIPPPPPPP" shown in a sub GOP structure 245. The efficiency is improved by changing the setting for the sub GOP structure.

Figure 58:
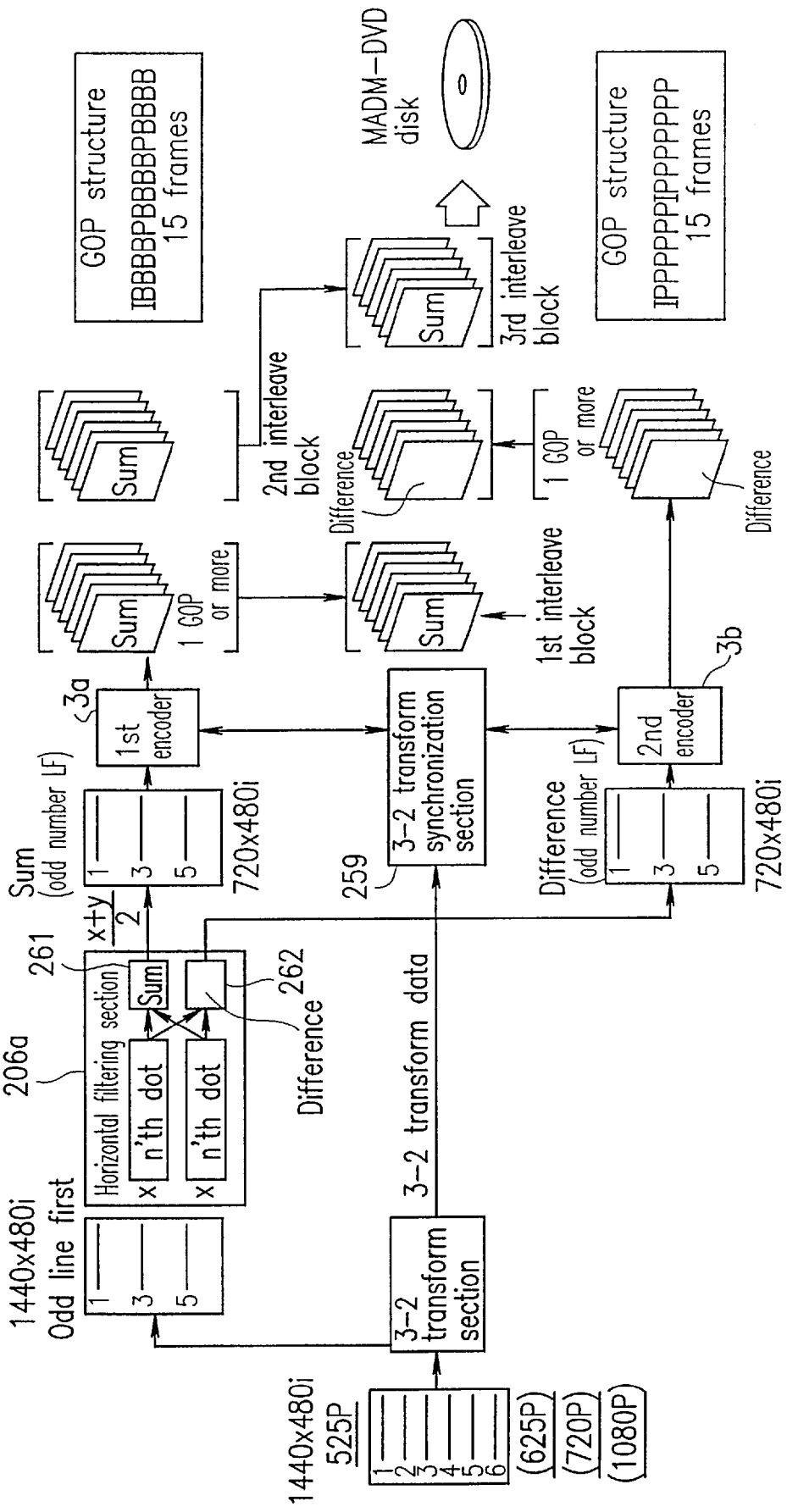
FIG. 58 is a view illustrating the principle of an MADM system for dividing a signal into two in a horizontal direction in one example according to the present invention.

FIG. 23 shows an example in which a 525P video signal is divided into two in a vertical direction. FIG. 58 (described below) shows an example in which a 525P video signal is divided into two in a horizontal direction. In an alternative manner, a 60-frame 525P signal is divided by frame division means into 30 odd frames and 30 even frames. In this case, the respective 30P signals are transformed into two 60-field interlace signals, and each of the signals are MPEG-encoded to be recorded in the MADM system. Such encoding is performed in a progressive manner, and therefore encoding efficiency is improved as in the case of the movie. Thus, the recordable time period of the same disk is extended.

When such a signal is reproduced by a non-MADM reproduction apparatus, a 30P (one-channel) 525 interlace signal is reproduced. Such a signal lacks necessary frames and is distorted.

When such a signal is reproduced by an MADM reproduction apparatus, a 30P signal as a basic signal and a 30P signal as a sub signal are reproduced. These two 30-frame signals are synthesized into a 60-frame normal 525P signal by frame synthesis means including a frame buffer, and then output.

When a line doubler is added to an output section for the 525P signal, a 1050P video signal is obtained.

When a 525 interlace signal is input to a sum signal section of the synthesis section of the MADM reproduction apparatus and the value of 0 is input to a difference signal section of the synthesis section, a 525P picture is obtained. Such a manner of input has the same effect as the line doubler. This method allows even an 525 interlace signal to be output as a 525P signal. Accordingly, all types of pictures can be viewed by simply connecting one cable to a progressive input terminal of the MADM reproduction apparatus.

In FIG. 23, $\frac{1}{2}(A+B)$ and $\frac{1}{2}(A-B)$ are used as expressions for calculation for a two-tap filter. The separation frequency corresponds to about 300 scanning lines.

Figure 46:
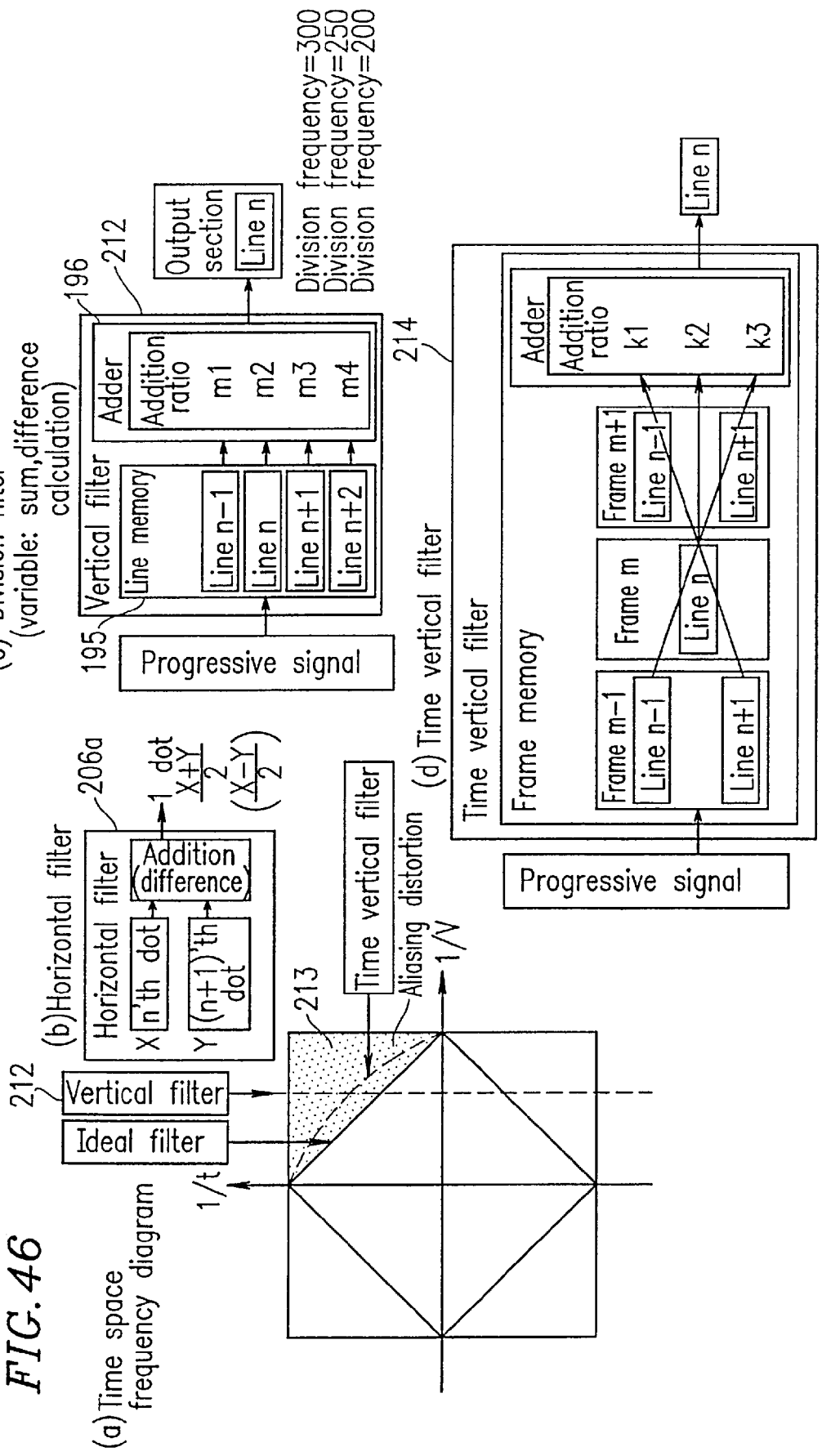
FIG. 46 is a structural view of a horizontal filter and a vertical filter in one example according to the present invention.
Figure 47:
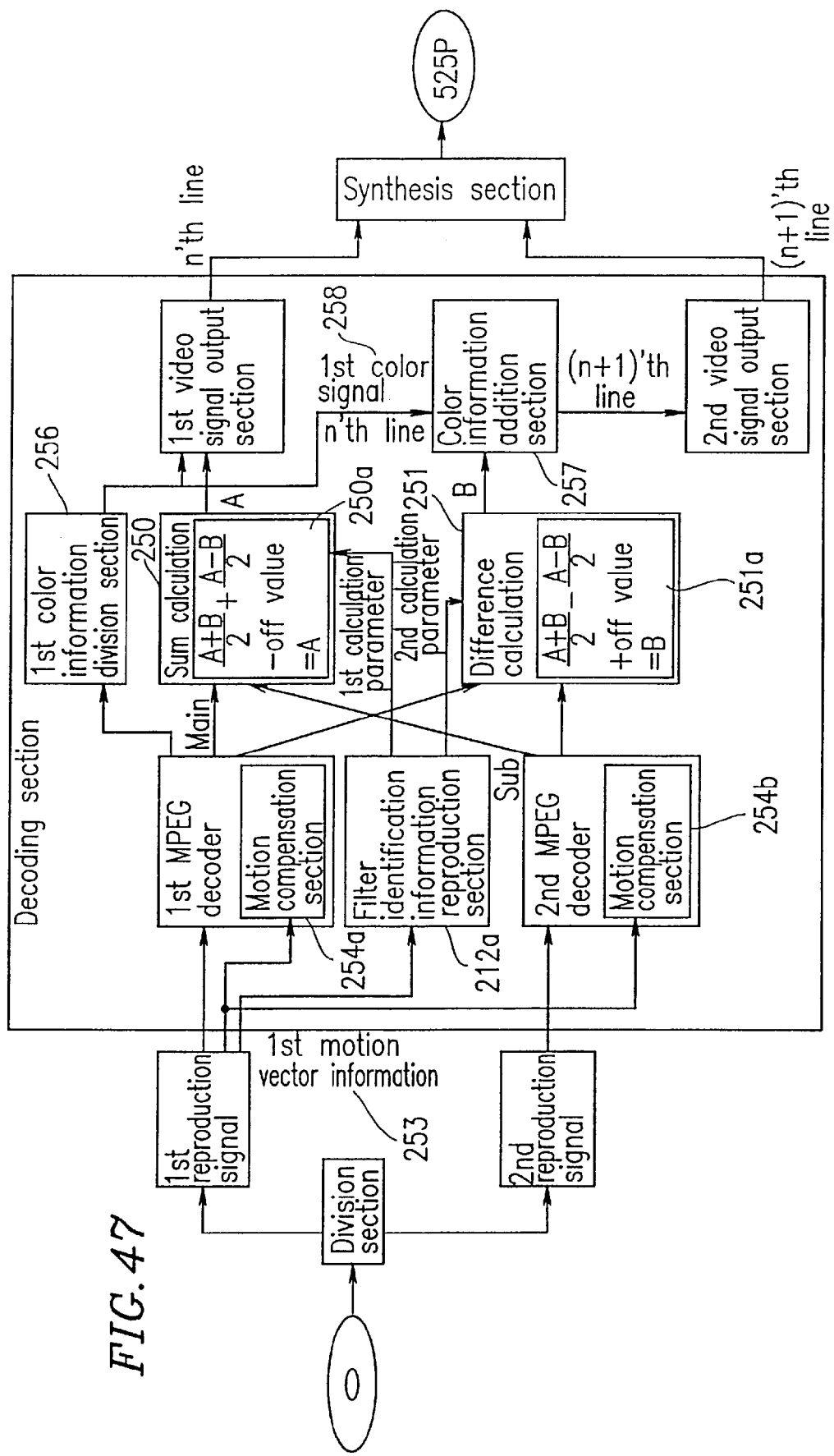
FIG. 47 is a block diagram of a reproduction apparatus which shares a common motion vector signal and color information in one example according to the present invention.
Figure 48:
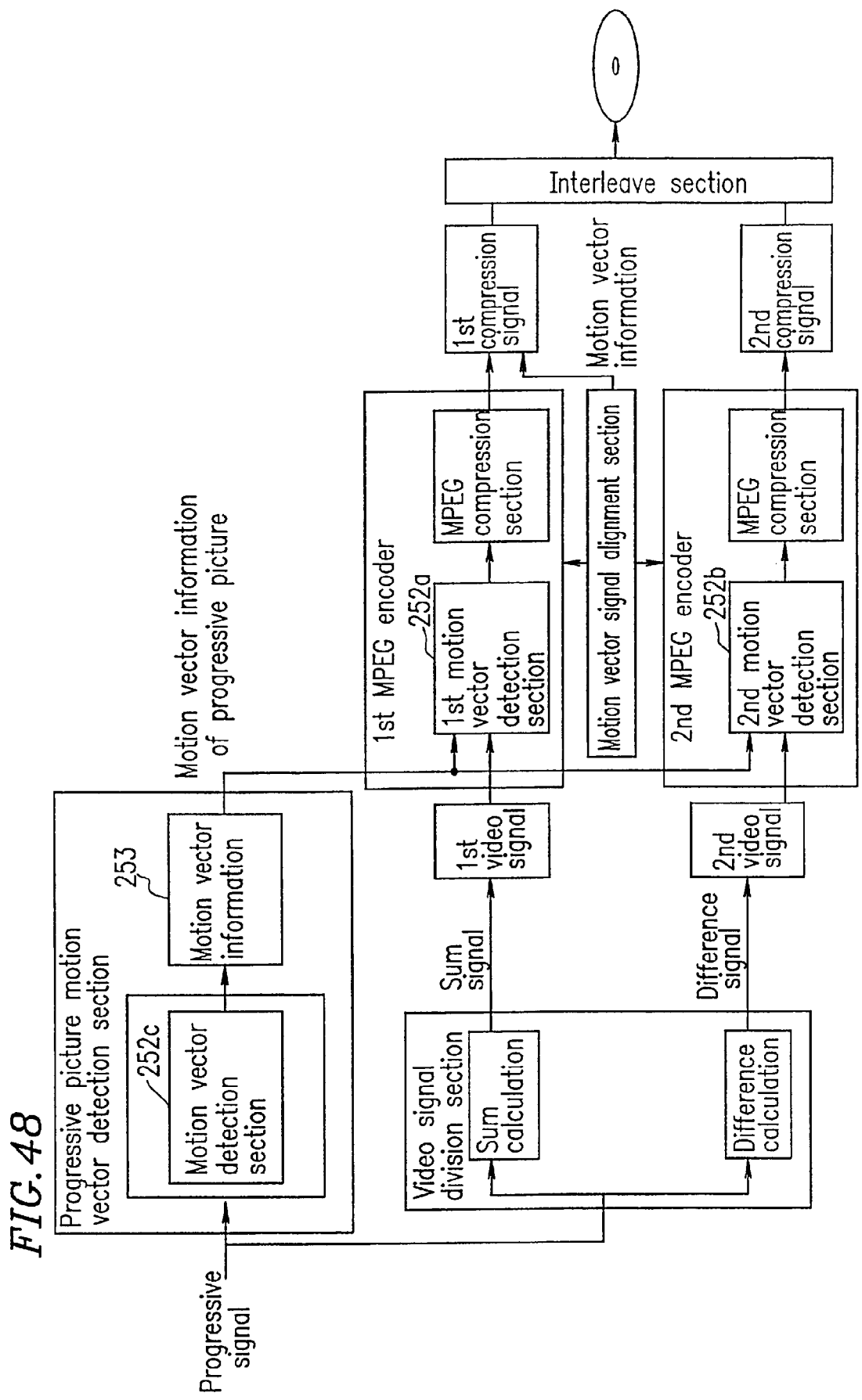
FIG. 48 is a view illustrating the principle of motion detection of a progressive picture using a motion detection vector in one example according to the present invention.

When a four-tap filter as shown in part (c) of FIG. 46 is used, the number of scanning lines corresponding to the separation frequency can be reduced to about 200. An example of using such a frequency will be described. When the amount of information represented by the basic signal is too large to encode the information, it is advantageous to reduce the number of scanning lines corresponding to the separation frequency to less than 300, for example, 220. In this case, the amount of information represented by the basic signal is significantly reduced and thus the information can be encoded. Although the amount of information represented by the sub signal, i.e., difference signal is increased, it is not serious because the difference signal does not include color information and thus originally contains only a small amount of information. Therefore, there is no problem of insufficiency in the encoding capability of the encoder. An original picture is reproduced normally by the following setting. The filter information can be contained in a filter identifier 144 in FIG. 50. The filter characteristics are changed in units of 1 cell or 1 GOP by altering the constant of the sum calculation section and the difference calculation section by filter separation frequency alteration means of the reproduction apparatus with reference to identifiers 100, 101 and 111. By such setting, a high rate picture, which is usually difficult to encode, can be encoded.

Returning to FIG. 22, the MPEG encoder section synthesizes an odd interlace signal 79a and an even interlace signal 80a and also synthesizes an odd interlace signal 79b and an even interlace signal 80b, thus obtaining frame signals 81a and 81b. The frame signals 81a and 81b are compressed by MPEG compression sections 82a and 82b to generate compression signals 83a and 83b. Interleave blocks 84a, 84b and 84c each including 10 to 15 frames of the compression signals 83a and 83b corresponding to 1 GOP or more are generated. Compression signals obtained from an identical progressive signal are provided with an identical time stamp by time stamp provision means, and then the signals are recorded on an optical disk 85.

Figure 21:
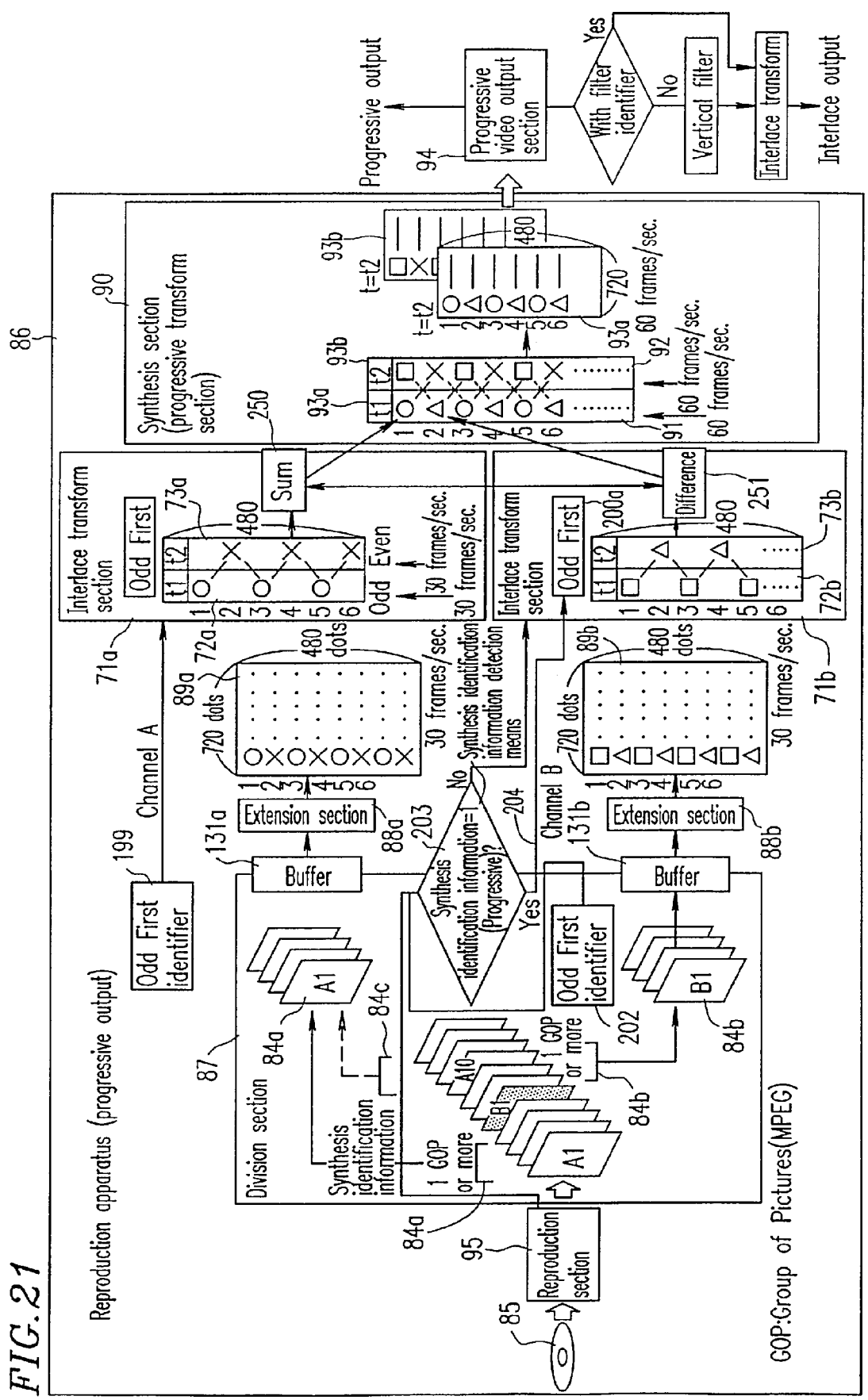
FIG. 21 is a block diagram of a reproduction apparatus in a progressive picture signal output mode in one example according to the present invention.

The progressive signal recorded on the optical disk 85 is reproduced by a 2× reproduction apparatus shown in FIG. 21. The reproduced signal is divided by a division section 87 into a stream of interleave blocks 84a and 84c and another stream of an interleave block 84b. Then, the streams are extended by extension sections 88a and 88b into frame signals 89a and 89b each having 720×480 pixels. The progressive signal is divided by field division sections 71a and 71b into odd fields 72a and 72b, and even fields 73a and 73b on a time axis, as by the reproduction apparatus shown in FIG. 20.

In FIG. 21, unlike the apparatus in FIG. 20, the odd fields 72a and 72b of channel A 91 and channel B 92 are synthesized by a synthesis section 90 using a sum calculation circuit and a difference calculation circuit. The even fields 73a and 73b are synthesized in the same manner. Thus, channel A 91 and channel B 92 are synthesized in a zigzag manner. As a result, progressive signals 93a and 93b are obtained and output from a progressive video output section 94.

In this manner, a progressive video signal, i.e., non-interlace NTSC signals of 525 scanning lines is obtained by the reproduction apparatus according to the present invention. In this example, a progressive signal of 480 scanning lines is obtained. The reproduction section 95 performs 2× reproduction.

Advantageously, a movie or the like recorded in a conventional optical disk are also reproduced as a progressive picture.

FIG. 23 shows an example in which the signal is divided in a vertical direction by the MADM system. With reference to FIG. 58, an example in which the signal is divided in a horizontal direction by the MADM system will be described. A wide 525P picture of, for example, 1440×480P has been studied for movies. Such a signal is transformed into an interlace signal of 1440×480i by a 3-2 transform section 174. The signal is divided by a horizontal filter section 206a into two in a horizontal direction. FIG. 59 illustrates the principle of the filter in parts (a) and (b). As shown in part (b), 1440 dots are divided into odd dots 263a and 263b, and even dots 264a and 264b. Where the odd dots are labeled as "Xn" and the even dots are labeled as "Yn", a sum signal is obtained by X+Y and a difference signal is obtained by X−Y. As a result, two 525P or 525i signals, each of 720×480, are obtained as shown in part (b) of FIG. 59.

Returning to FIG. 58, the number of horizontal dots of such a horizontal sum signal is reduced to 720. Since the signal is passed through the horizontal filter, however, aliasing distortion is as low as that of an NTSC signal. A conventional reproduction apparatus reproduces only the sum signal and accordingly provides a DVD picture of the same quality. The difference signal represents only a profile formed of line-drawing. However, since the difference signal is restricted by a second video signal output restriction provision section 179 so as not to be reproduced by an ordinary reproduction apparatus, no problem occurs. The sum signal and the difference signal are respectively encoded into MPEG streams by a first encoder 3a and a second encoder 3b, and subjected to interleaving in units of an interleave block of 1 GOP or more and MADM-multiplexed.

Figure 50:
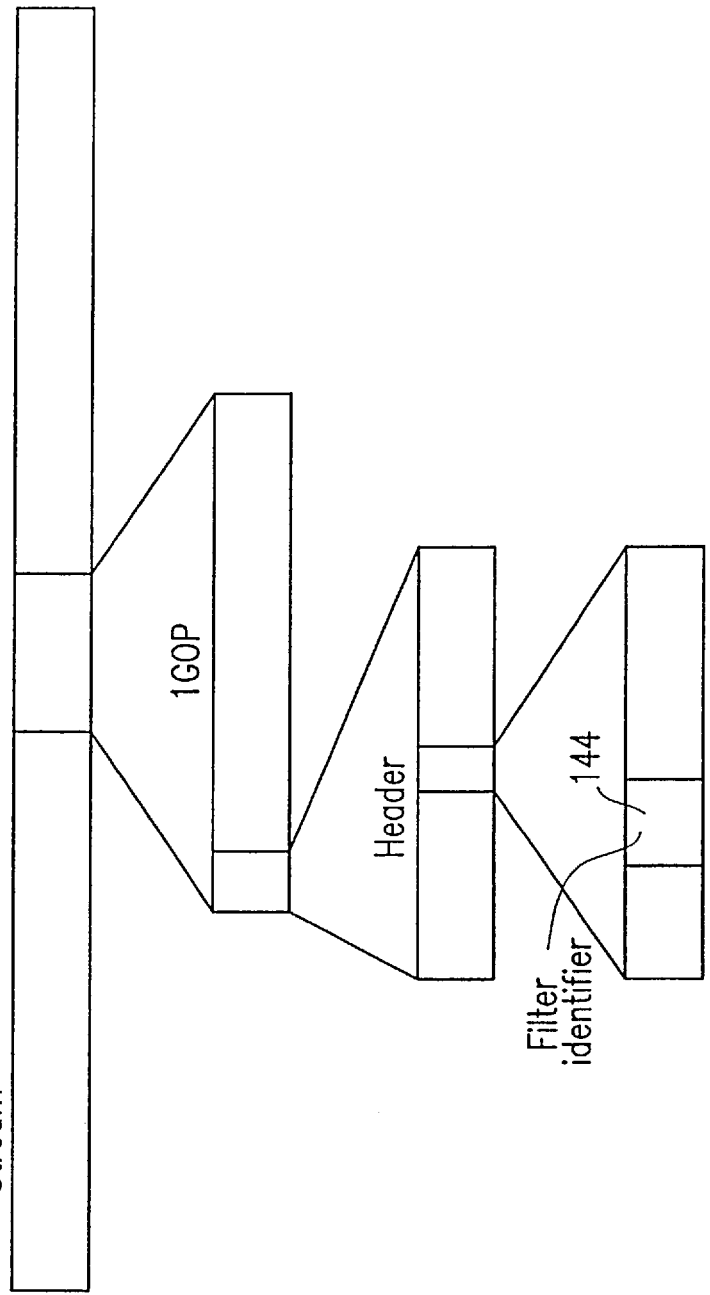
FIG. 50 shows contents of a vertical filter and a horizontal filter in one example according to the present invention.
Figure 51:
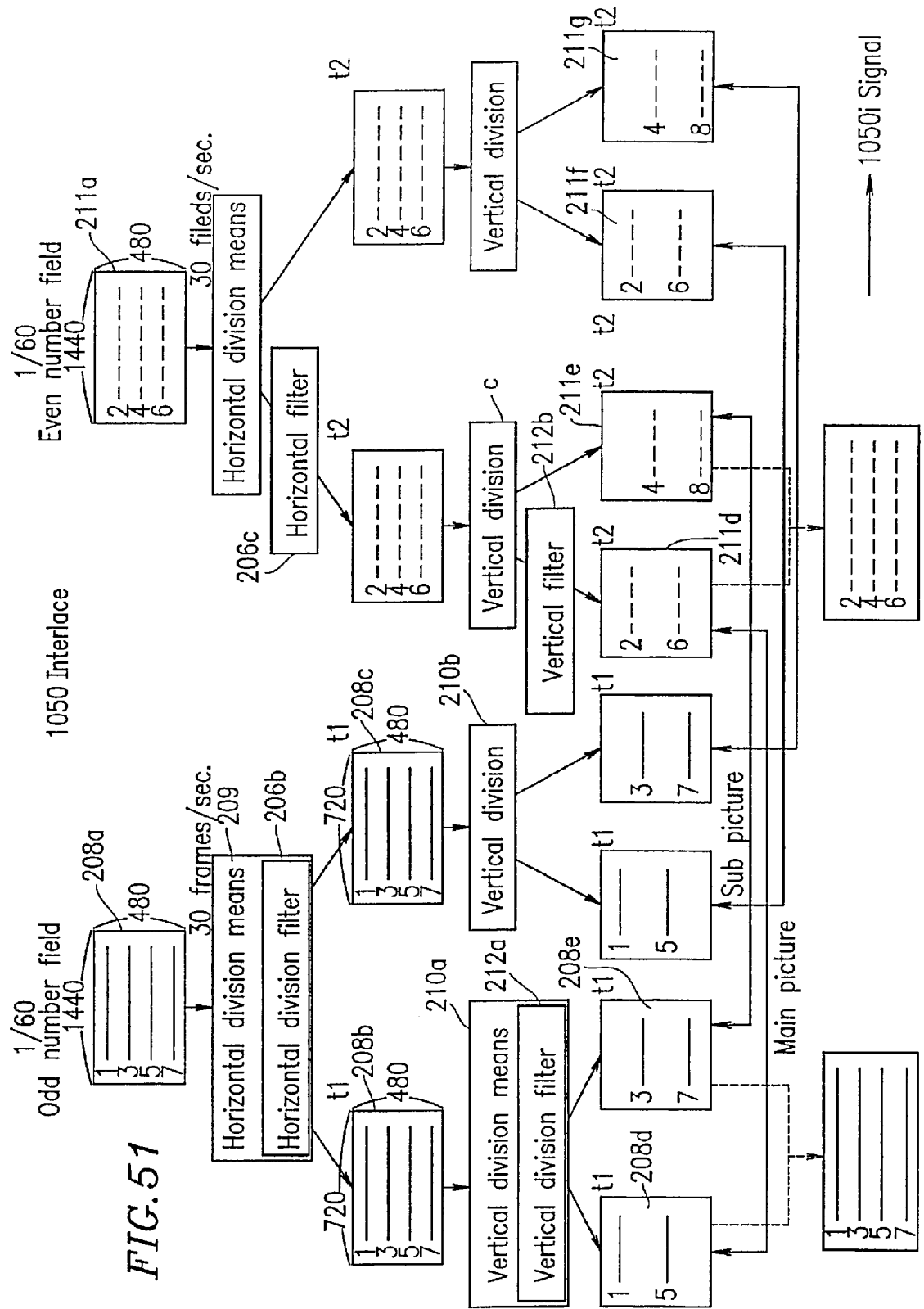
FIG. 51 is a view illustrating the principle of dividing and recording a 1050 interlace signal in one example according to the present invention.

As shown in FIG. 50, in the case of a movie, a signal is transformed by a 3-2 transform section 174 and MADM-recorded as an MPEG signal together with 3-2 transform information 174a.

In the case of the movie, 24 frames are reproduced in one second. Accordingly, a 1440×480P progressive picture is reproduced based on two interlace signals by a 2× reproduction apparatus. The scope size of the movie is 2.35:1. The format of 1440×480P is suitable for the scope size of 2.35:1 in terms of the aspect ratio. Thus, a wide screen 525P is effectively reproduced.

When a movie on the optical disk for a IX interlace reproduction apparatus is reproduced by the reproduction apparatus shown in FIG. 20, a 24-frames/sec. progressive signal is obtained in an MPEG recorder since a movie signal is a progressive signal having 24 frames/sec. The progressive signal is reproduced by detecting that the optical disk includes a movie by detection means or by transforming the 24-frame/sec. signal into a 60-frame/sec. progressive signal by the 3-2 transform section 174. An interlace picture with no interference is obtained by filtering the progressive signal by a vertical filter with reference to the filter identifier.

An optical disk 85 encoded with reference to FIG. 22 is reproduced by the reproduction apparatus 65 conforming to the progressive system. Then, a channel-A interlace signal 74a is reproduced. A conventional interlace DVD player has only channel A but not channel B. Therefore, when the optical disk 85 according to the present invention is mounted on the conventional interlace DVD player, the channel-A interlace signal is obtained. As can be appreciated, an optical disk according to the present invention provides a progressive signal when reproduced by a reproduction apparatus according to the present invention, and provides an interlace signal of the same contents when reproduced by a conventional reproduction apparatus. Thus, the optical disk according to the present invention realizes complete compatibility even with the conventional reproduction apparatus.

In the MPEG encoder shown in FIG. 22, an interlace interference removal compression filter 141 is provided to significantly reduce the aliasing distortion.

Hereinafter, encoding of a 3D picture will be described in detail.

Figure 24:
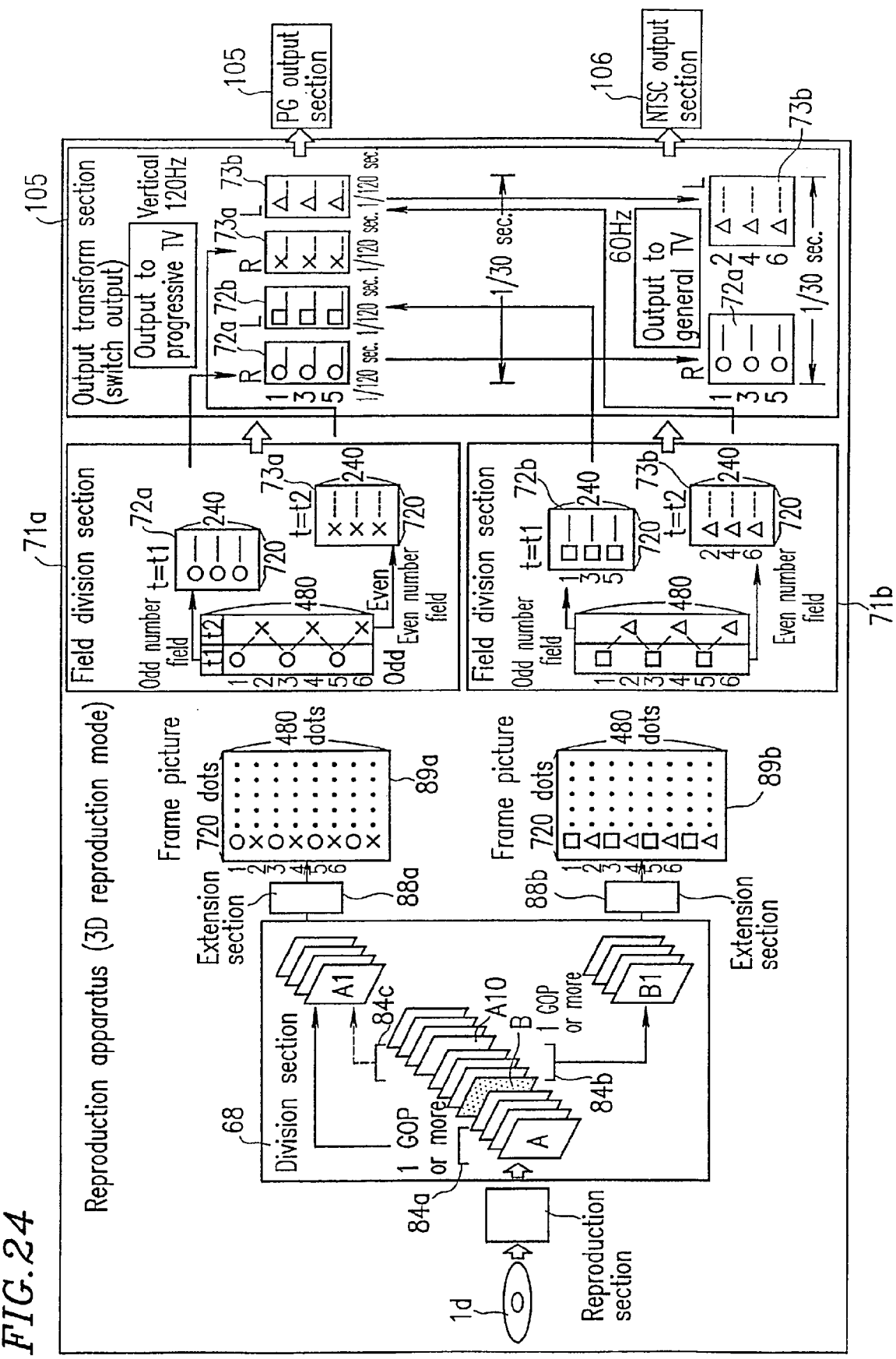
FIG. 24 is a block diagram of a reproduction apparatus in a 3D picture signal reproduction mode in one example according to the present invention.

A right-eye signal 97 and a left-eye signal 98 are input into a recording apparatus 99 in the same manner as the sum signal and the difference signal of the progressive signal described with reference to FIG. 22. Since this is an interlace signal, odd field signals 72a and 72b and even field signals 73a and 73b are input every 1/60 second. The signals 72a and 73a and the signals 72b and 73b are synthesized by synthesis sections 101a and 101b into 1/30 sec. frame signals 83a and 83b. These signals are compressed by compression sections 103a and 103b into compression signals 83a and 83b. Interleave blocks 84a, 84b and 84c, each including frames of these signals corresponding to 1 GOP or more, are generated. The interleave blocks 84a, 84b and 84c are alternately located and recorded on the optical disk 1. When data in the resultant optical disk is mounted on the reproduction apparatus shown in FIG. 24 for reproduction, the 3D/PG picture arrangement information reproduction section 26 described above with reference to FIG. 5 detects a PG identifier in the disk. Therefore, the reproduction apparatus (104) is put into a 3D reproduction mode as shown in FIG. 24. The 3D picture in the optical disk is divided by a division section 68 into channel A and channel B. The data in the channels are extended respectively by extension sections 88a and 88b and then divided into field signals by field division sections 71a and 71b. The operation of the reproduction apparatus up to this point is the same as in the case of FIG. 21.

A feature of the reproduction apparatus shown in FIG. 24 is that the field division section 71a outputs odd field signals and even field signals while switching the output order thereof by an output transform section. When the signals are sent to a progressive TV, i.e., a TV having a field frequency of 120 Hz, the signals are output from a progressive output section 105 in the order of a channel-A odd field signal 72a, channel-B odd field signal 72b, channel-A even field signal 73a, and channel-B even field signal 73b. Thus, the right-eye signals and the left-eye signals are output alternately and in the order of the odd field and then the even field. Accordingly, a flickerless picture having matching right-eye and left-eye information is obtained through switch-type 3D spectacles.

When the signals are sent to an ordinary TV, the channel-A odd field signal 72a and the channel-B even field signal 73b are output from an NTSC output section 106. Then, a 3D picture displaying natural motions is obtained through 3D spectacles although the picture includes flicker.

Figure 25:
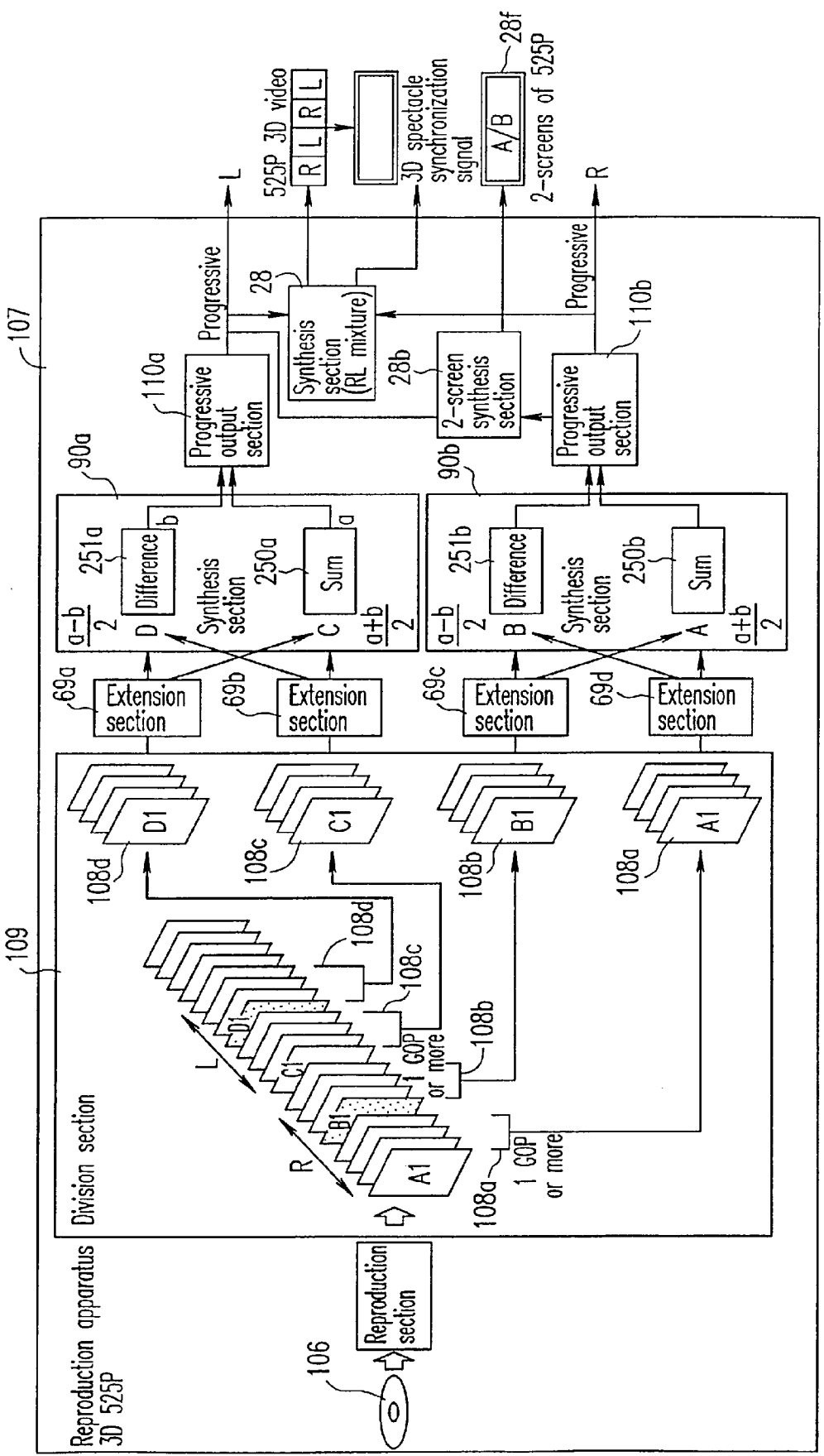
FIG. 25 is a block diagram of a 4× reproduction apparatus in a 3D progressive picture signal reproduction mode in one example according to the present invention.

By combining the progressive system and the 3D picture reproduction system according to the present invention, a high definition 3D picture including a right-eye picture and a left-eye picture is realized. This will be described with reference to FIG. 25. A reproduction apparatus 107 performs 4× reproduction. When reproducing a DVD, 80% of such a transfer rate is sufficient. In the embodiment where interleave blocks 108a, 108b, 108c and 108d of right progressive signals A and B and left progressive signals C and D are arranged with no interval as shown in FIG. 25, the optical pickup does not need to jump for continuous reproduction. In the case of a DVD, only 80% of the information is reproduced. The reproduction rate can be 3.2× in lieu of 4× in the case of continuous reproduction. Such a continuous arrangement advantageously reduces the reproduction rate.

The signal is divided into interleave blocks 108a, 108b, 108c and 108d, and signals for channels A, B, C and D are reproduced. The video signals extended by extension sections 69a, 69b, 69c and 69d are synthesized by synthesis sections 90a and 90b as in FIG. 21, and two progressive signals are output from progressive output sections 110a and 110b. The two progressive signals are respectively a right-eye signal and a left-eye signal. Accordingly, a progressive 3D picture is obtained by the reproduction apparatus 107. When a 4×MPEG chip is used, only one chip is sufficient and avoids an increase in the number of components. The 4×MPEG chip realizes recording and reproduction of pictures of four different contents. In this case, pictures are displayed on a 4-part multi-screen TV simultaneously with one optical disk.

A feature of the present invention is to provide compatibility among all the apparatuses and media. When data on a disk 106 in FIG. 25 is reproduced by a conventional reproduction apparatus, an interlace signal for either the right eye or the left eye is output The picture is not deteriorated although the reproduction time is reduced to ¼. However, a two layer DVD stores data for 2 hours and 15 minutes. Almost all movies are accommodated in such a DVD.

When data on the disk 106 in FIG. 25 is reproduced by a 2×3D/progressive reproduction apparatus according to the present invention, the user switches from a 3D interlace picture to a one-channel progressive picture or vice versa by sending an instruction to a control section 21 through a channel selection section 20 from an input section 19 (see FIG. 9). As described above, the present invention has an effect of providing complete compatibility analogous to that between the monaural records and stereo records discussed in the past.

According to the 2× and 4× reproduction apparatuses according to the present invention, pictures of various qualities are obtained in various display manners.

As described above, according to the present invention, when a 3D identifier is not available, the pointer is read and the optical head jumps. When a 3D identifier is available, the reproduction process is changed so that the pointer of one of the immediately previous interleave blocks is read and accessed. Thus, a 3D picture is recorded without changing the format.

A method for performing recording and reproduction while a scope-size movie screen is divided into two.

In FIG. 20, an optical disk 1 having two-screen interlace signals is reproduced. Now, with reference to FIG. 40, this concept is applied to a scope-size (2.35:1) super wide screen 154. The super wide screen 154 is divided into three, i.e., a center screen 156 and side screens 157 and 158 by a screen division section 155. The position of division is represented by a center shift amount 159. The center picture 156d is compressed as a first video signal. The side pictures 157 and 158 are compressed together as a second video signal. The compression signals are processed with interleaving and are recorded on an optical disk 191 together with the center shift amount 159. In this case, the second video signal, which represents a picture obtained by sewing together two different quality pictures, is not desired to be output. Accordingly, a second video signal restriction information provision section 179 adds reproduction restriction information such as, for example, password protection to the second video signal stream. Then, the reproduction apparatus cannot reproduce the second video signal independently. In this manner, it is prevented that the user views an abnormal picture of only the second video signal. In this case, a progressive reproduction apparatus reproduces both the first and second video signals to realize a wide screen.

Figure 41:
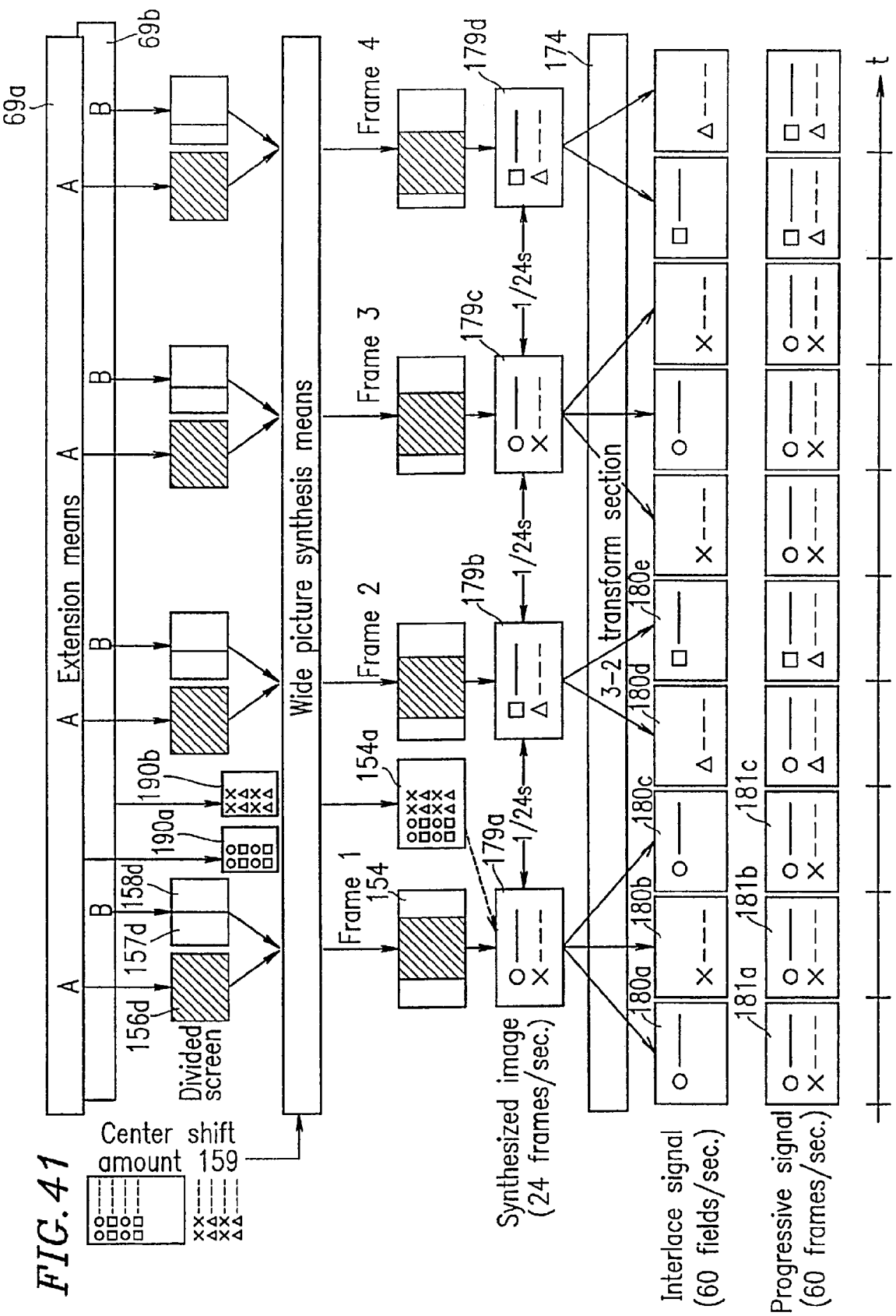
FIG. 41 is a view illustrating the principle of synthesizing a scope (wide) picture from an optical disk having the scope picture in a divided state and processing the synthesized picture with 3-2 transform in one example according to the present invention.
Figure 42:
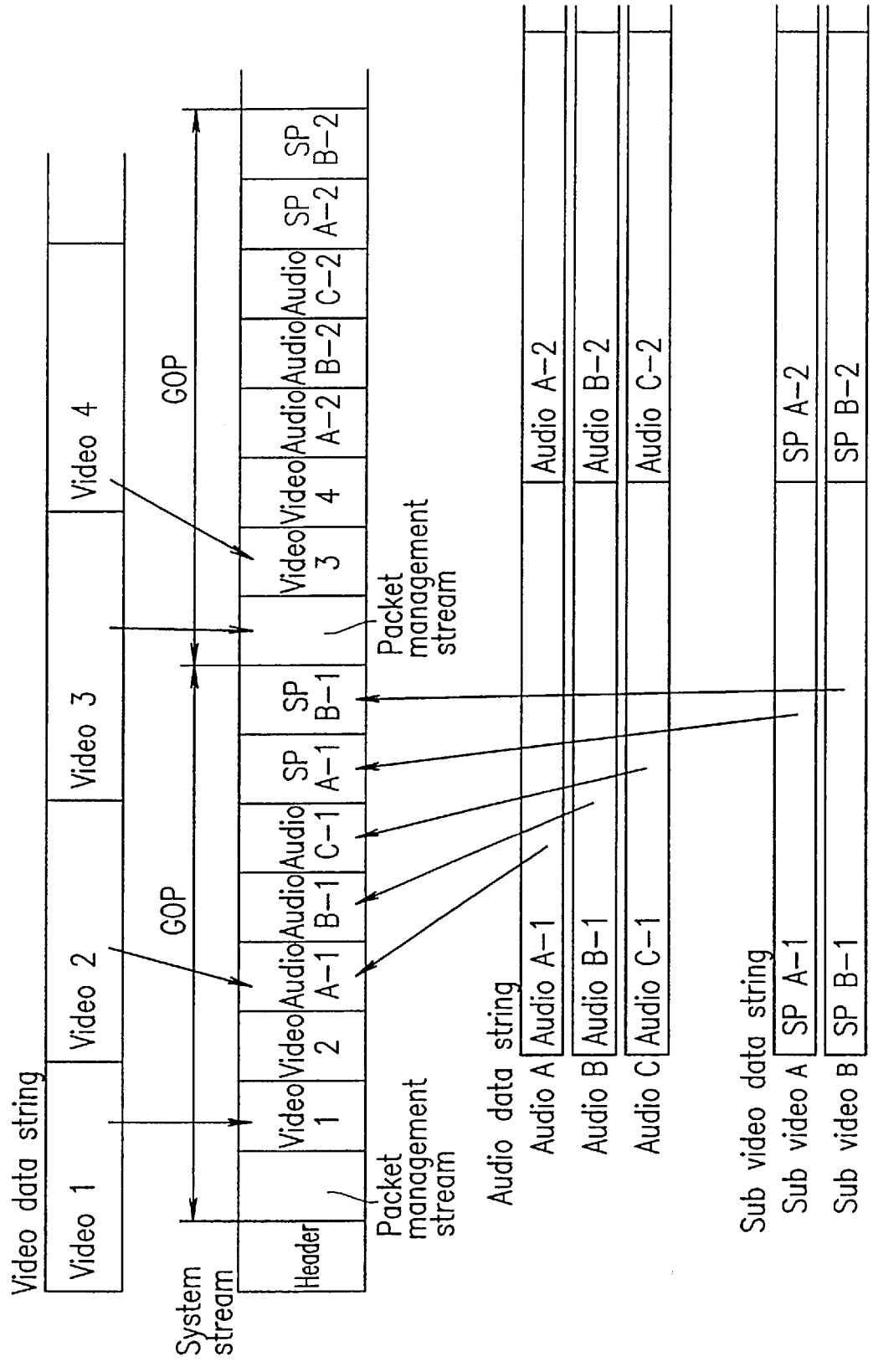
FIG. 42 is a structural view of a system stream and video data on an optical disk in one example according to the present invention.

When such an optical disk is reproduced by the reproduction apparatus in FIG. 20, the second video signal is not independently output. From the optical disk, the center shift amount 159 is reproduced by a center shift amount reproduction section 159b. A wide picture synthesis section 173 uses the center shift amount 159 to synthesize a scope-size picture. The 3-2 transform section 174 performs 3-2 pull-down transform shown in FIG. 41 to transform a 24-frame/sec. signal of the movie into a 60-fields/sec. interlace signal or a 60-frames/sec. progressive signal. As shown in FIG. 41, both the extension and wide picture synthesis are performed. The 3-2 transform performed by the 3-2 transform section 174 is as follows. A synthesis picture 179a having 24 frames/sec. is transformed into three interlace pictures 180a, 180b and 180c. A synthesis picture 179b is transformed into two interlace pictures 180d and 180e. Thus, the picture having 24 frames/sec. is transformed into a 60-fields/sec. interlace picture. A progressive picture 181 can be output as three progressive pictures 181a, 181b and 181a and two progressive pictures 181d and 181e.

Figure 40:
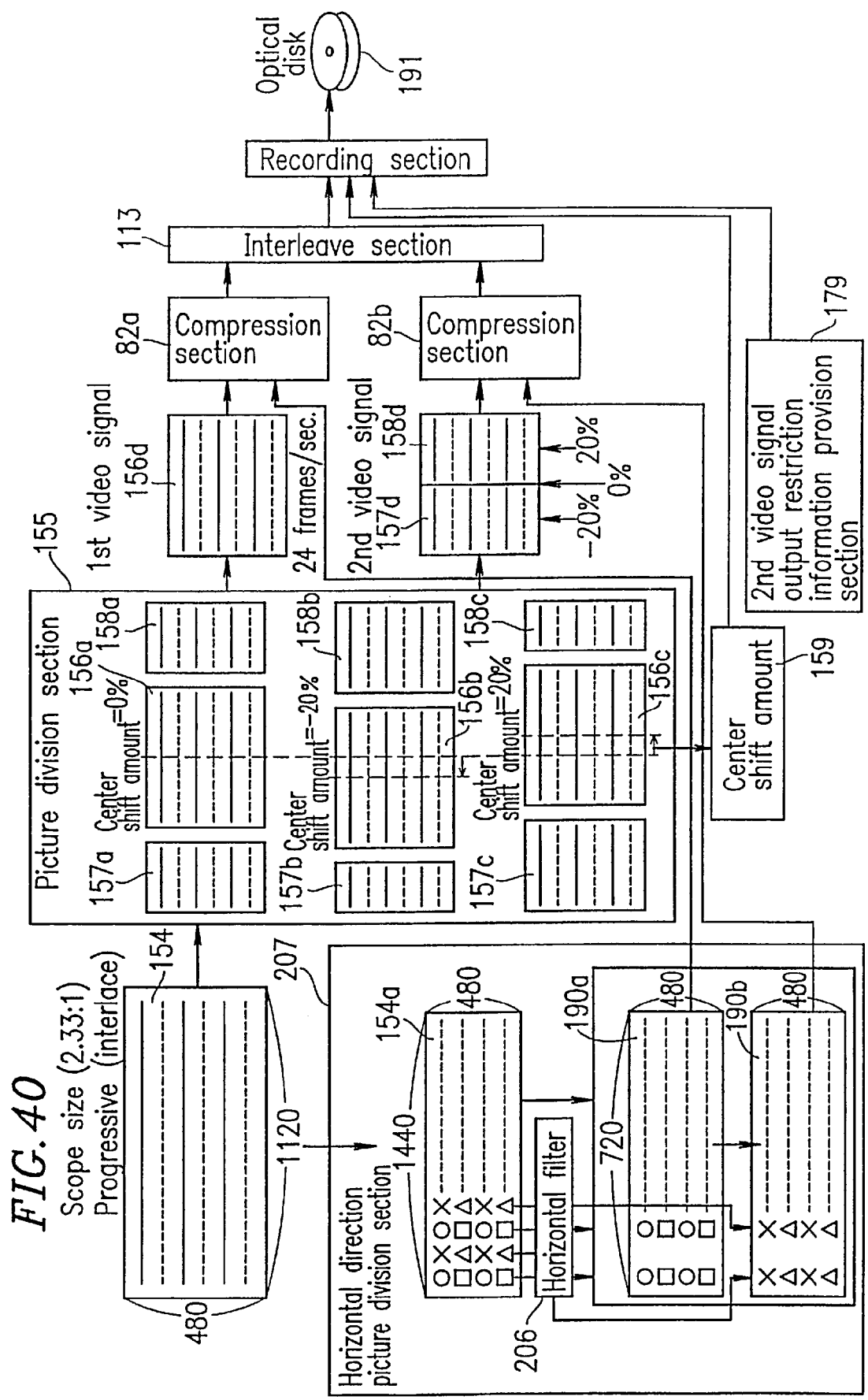
FIG. 40 is a view illustrating the principle of dividing a scope (wide) picture in a horizontal direction and recording the resultant signals as interleave blocks in one example according to the present invention.

An other method for dividing a screen is as follows. As shown in FIG. 40, a 1440×480 screen 154 is divided into two horizontal separation screens 190a and 190b each having 720×480 pixels. Such division is performed by separating odd number of columns of pixels from even number columns of pixels by a picture horizontal division section 207. These screens 190a and 190b are compressed as a first video signal and a second video signal in a similar manner to the above-described manner and recorded on the optical disk 191. In order to avoid aliasing distortion, two pixels are added by a horizontal filter 206 shown in FIG. 46 at a specific addition ratio, so that the high frequency component in the horizontal direction is attenuated. Such processing avoids generation of moiré, which appears when the optical disk is reproduced by an existing reproduction apparatus at 720 dots.

When the optical disk 191 is reproduced by the reproduction apparatus 65 shown in FIG. 20, the horizontal separation screens 190a and 190b are decoded. When the decoded signals are synthesized by the wide picture synthesis section 173, an original 1440×480-pixel screen 154a is obtained. In the case of movies, 3-2 transform is performed by synthesizing the screen 154a as shown in FIG. 41.

The second method of horizontally dividing the screen is advantageous in providing a level of high compatibility for the following reason. The first video signal and the second video signal both represent an ordinary 720×480-pixel picture obtained by dividing the original 1440×480-pixel picture into two by a horizontal line. Accordingly, even when the second video signal is erroneously reproduced by an ordinary reproduction apparatus such as a DVD player, the resultant picture has the same aspect ratio as that of the original picture. Such a division system advantageously realizes reproduction of an interlace picture by an ordinary reproduction apparatus, reproduction of a 525 progressive picture by a progressive reproduction apparatus, and reproduction of a wide screen picture having a scope of, for example, 720P by a 720P high resolution reproduction apparatus. Such advantages are conspicuous in the case of movies, which can be reproduced at the rate of 2×.

Figure 44:
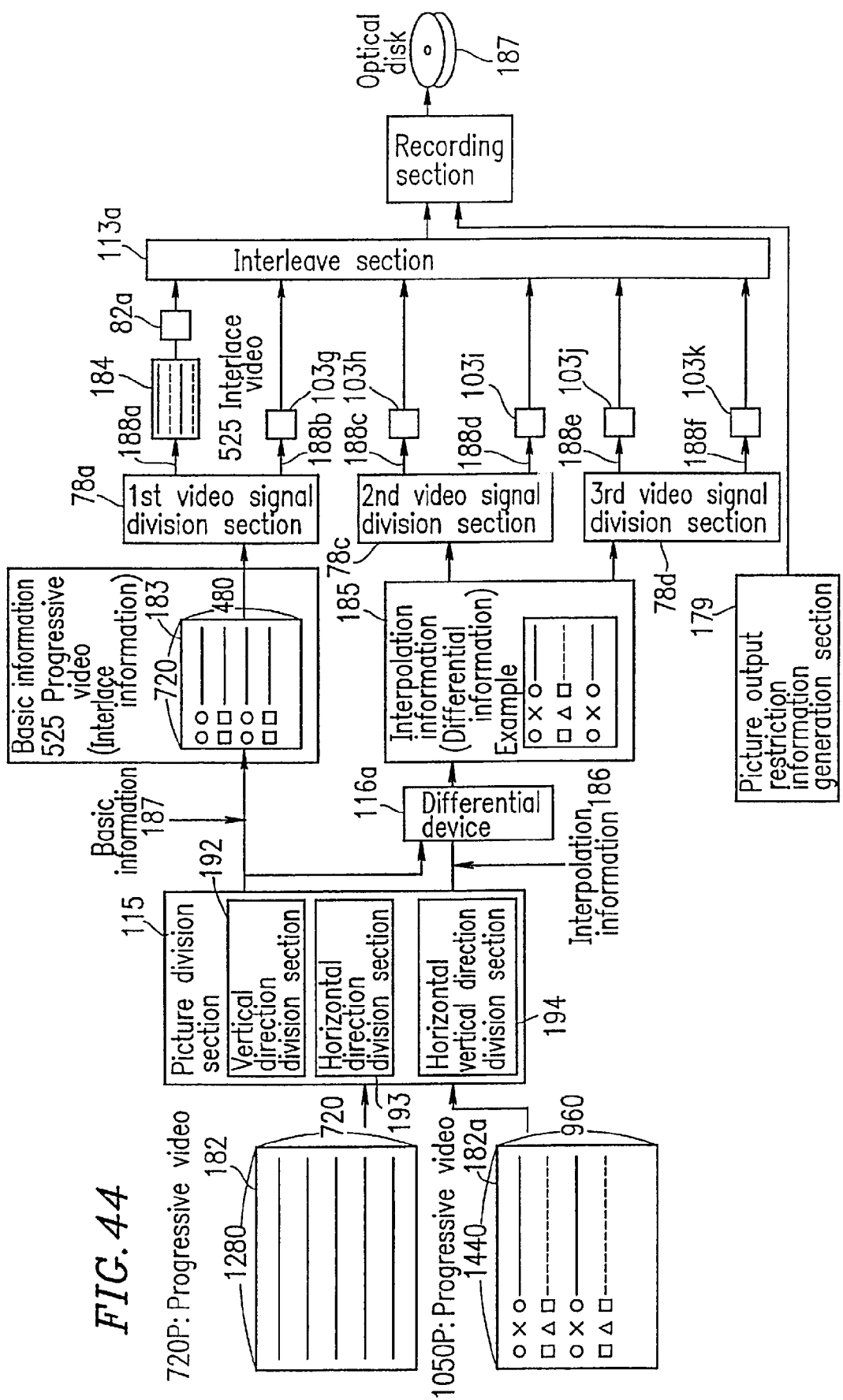
FIG. 44 is a view illustrating a method for dividing interpolation information in horizontal and vertical directions and recording the resultant signals in interleave blocks in one example according to the present invention.

This method is applied as shown in FIG. 44. A 1440×960 progressive picture 182*a* is divided in horizontal and vertical directions by a horizontal and vertical division section 194 of a picture division section 115 using, for example, sub-band filter or wavelet transform. Then, a 525 progressive picture 183 is obtained. This is divided into interlace signals 184 and recorded as a stream 188*a*.

Interpolation information 185 is divided into four streams 188*c*, 188*d*, 188*e* and 188*f* in a similar manner and recorded in units of an interleave block. The maximum transfer rate of each interleave block is 8 Mbps by the DVD format. When the interpolation information 185 is divided into four streams, the transfer rate of 32 Mbps is obtained. In the case of six angles, the transfer rate of 48 Mbps is obtained. Thus, 720P and 1050P HDTV pictures can be recorded. In a conventional reproduction apparatus, a stream 188*a* is reproduced and an interlace picture 184 is output. Regarding the streams 188*c*, 188*d*, 188*e* and 188*f*, output restriction information is recorded on an optical disk 187 by a picture processing restriction information generation section 179. Therefore, an ugly picture of interpolation information 185 such as differential information or the like is not output in error. An optical disk compatible with HDTV and NTSC is realized by dividing a signal in a horizontal direction by the system shown in FIG. 44.

In FIG. 20, an interlace signal is obtained by the transform performed by the interlace transform section 175, and as a result, a scope-size screen 178 is obtained. A 525P progressive signal is also output on a scope-size screen in a similar manner. When viewed by a 720P monitor, a 525P signal is transformed into a 720P progressive signal by a 525P/720P transform section 176, as a result of which a letter box-type 720P screen 177 having 1280×720 or 1440×720 pixels (picture has 1280×480 or 1440×480 pixels) is output. A scope-size picture (2.35:1) has 1128×480 pixels. A picture having a similar aspect ratio to this is obtained. A movie signal has 24 frames/sec. Therefore, the transfer rate of the progressive picture is 4 Mbps. When the scope-size picture is recorded by the 2-screen system according to the present invention, the transfer rate is 8 Mbps. Since a two-layer DVD can store data for about 2-hours and 15 minutes, a 720P or 525P high definition progressive picture can be recorded on one optical disk. Such data is output on a conventional TV as an interlace signal, needless to say. As described above, the scope-size (2.33:1) picture of the movie can be output as a 525P or 720P picture.

Hereinafter, a specific method for recording and reproducing a 1050 interlace signal will be described. An even field 208*a* of a 1050 interlace signal is divided into two pictures 208*b* and 208*c* by horizontal division means 209. Two pictures 208*b* and 208*c* are respectively divided by vertical division means 210*a* and 210*b* to obtain pictures 208*d* and 208*e*, and 208*f* and 208*g*. An odd field 211*a* is divided in a similar manner to obtain pictures 211*d*, 211*e*, 211*f* and 211*g*. In this case, the pictures 208*d* and 211*d* act as main signals and an interlace picture is output by an existing reproduction apparatus. Horizontal filters 206*b* and 206*c* and vertical filters 212*a* and 212*b*, inserted for preventing interlace interference and the like, reduce aliasing distortion of the reproduced picture.

Figure 27:
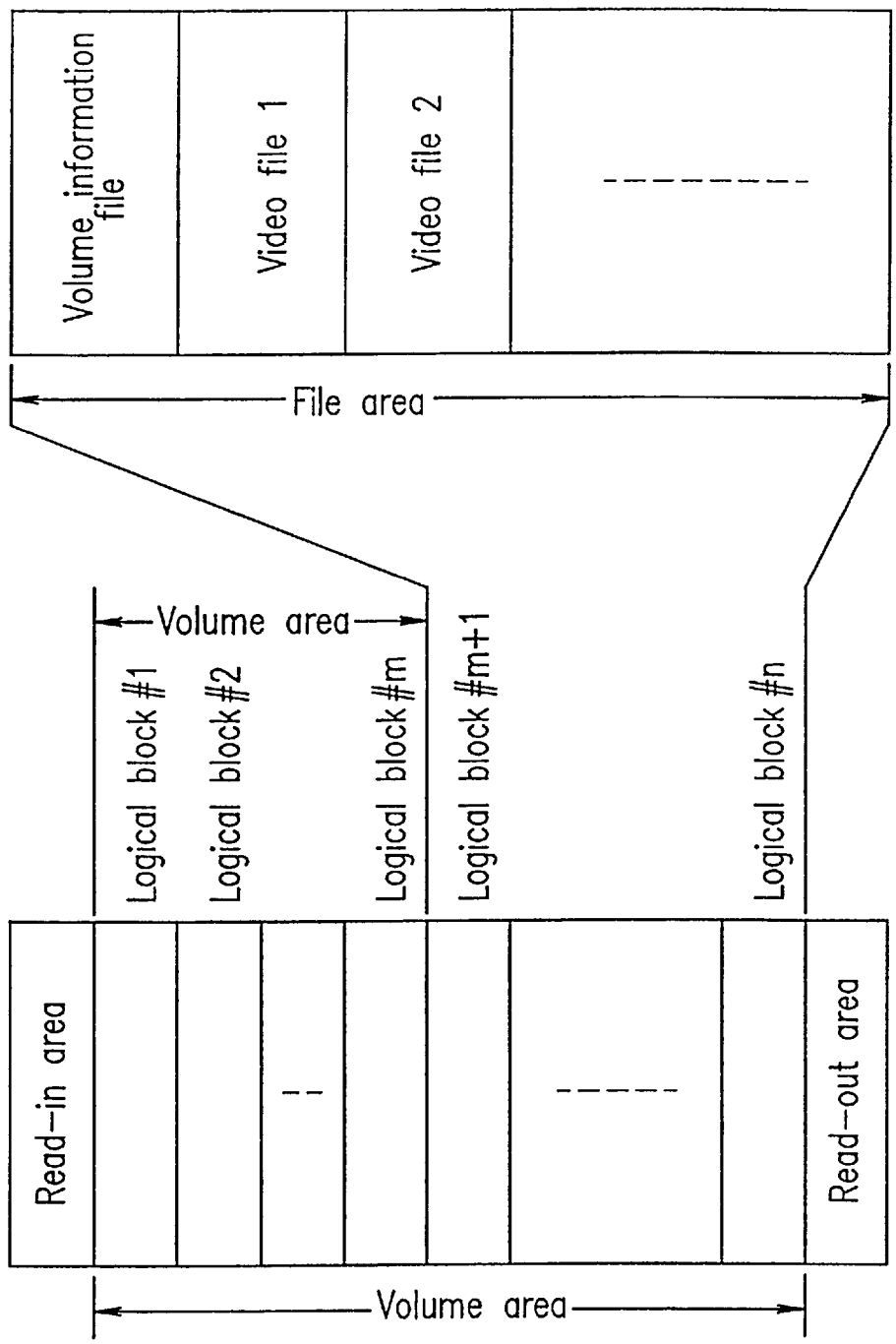
FIG. 27 is a view illustrating a data structure of the entire optical disk in one example according to the present invention.
Figure 28:
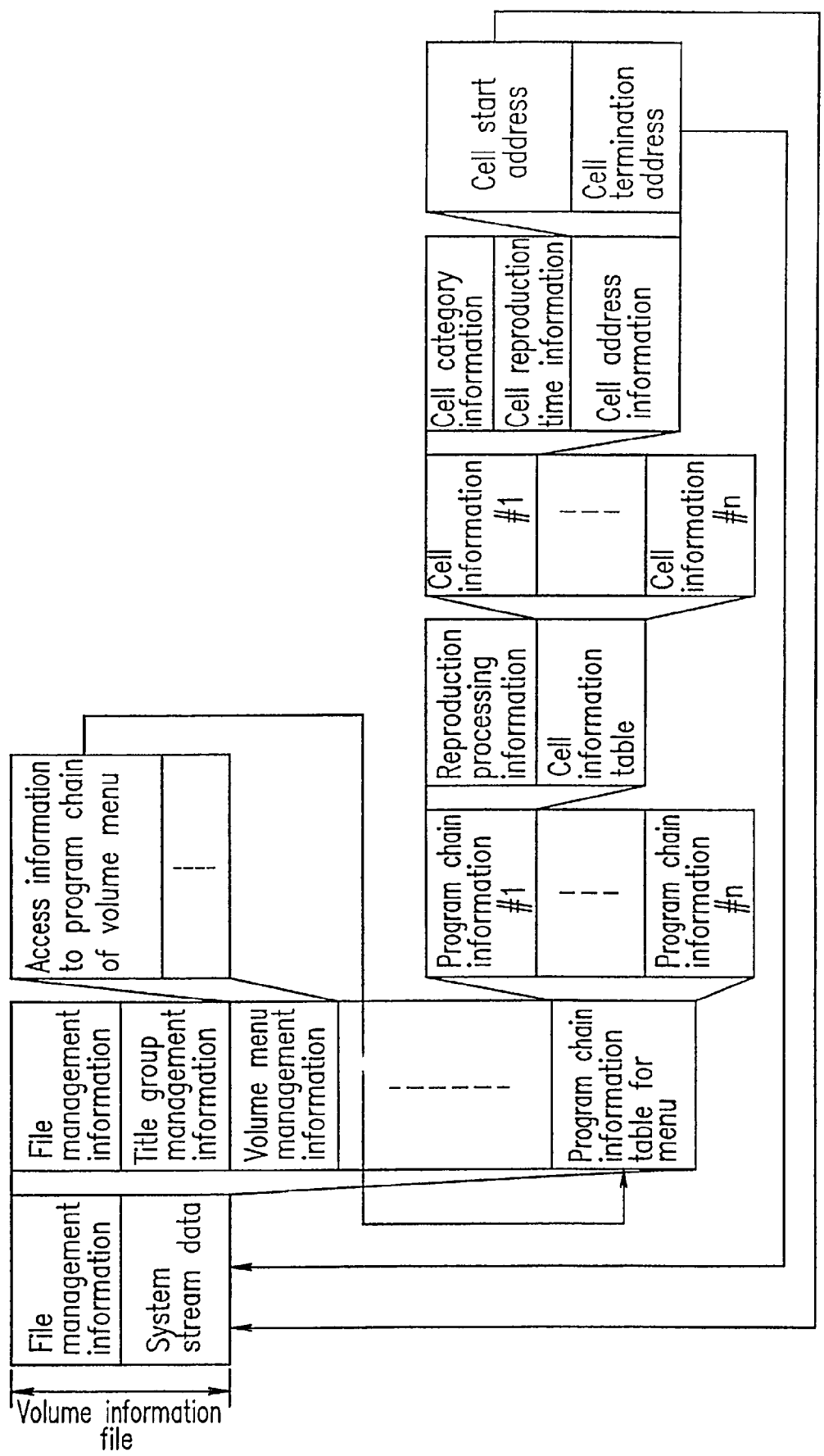
FIG. 28 is a view illustrating an inner structure of a volume information file in FIG. 27 in one example according to the present invention.

With reference to FIGS. 27, 28, 42 and 49, the file structure and identifiers for pictures will be described. FIG. 27 shows a logical format of DVD. Each logical block includes a video file. As shown in FIG. 28, a minimum unit of a system stream is referred to as a "cell". In a cell, picture data, audio data and sub picture are recorded in a packet in units of 1 GOP.

A cell 216 (see FIG. 18) of a main signal of a first stream has a packet 217. A provider defined stream in the packet 217 has a capacity of 2048 bytes. The provider defined stream includes a progressive identifier 218 indicating whether the signal is progressive or interlace, a resolution identifier 219 indicating whether the resolution is 525, 720 or 1050, a differential identifier 220 indicating whether or not the interpolation signal is a differential signal from the main signal, a filter identifier (described later), and sub stream number information 221 indicating the stream number of a first sub stream.

Figure 52:
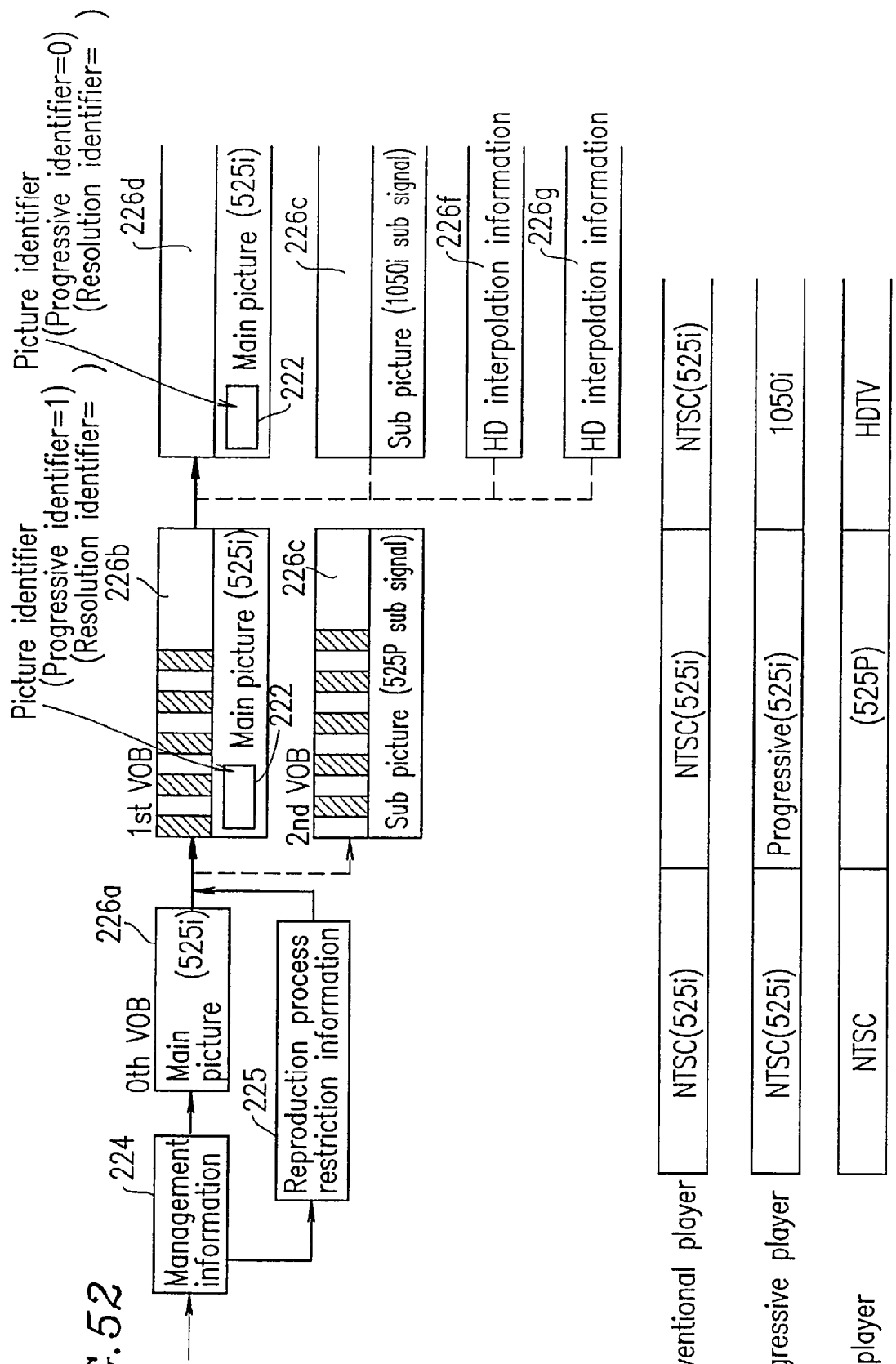
FIG. 52 is an arrangement view for outputting a progressive signal, an NTSC signal and a HDTV signal in one example according to the present invention.

With reference to FIG. 52, a process for performing reproduction using a picture identifier 222 will be described.

From the optical disk, reproduction process control information 225 is first read from management information 224. Since the information 225 includes restriction information on VOB, a 0th VOB 226*a* is only connected to a first VOB 226*b* having a main picture in an existing reproduction apparatus. Since the 0th VOB 226*a* is not connected to a second VOB 226*c* having an interpolation signal such as differential information, an ugly picture such as differential information is not output by the existing reproduction apparatus. Each VOB of the main signal has a picture identifier. Since the progressive identifier=1 and resolution identifier=00 (525) in the first VOB 226*b* and the second VOB 226*c*, a progressive signal having 525 scanning lines is reproduced from a progressive or high definition HD reproduction apparatus.

In a picture identifier 222 of the next VOB 226*d*, the progressive identifier=0 and the resolution identifier 219=10. An interlace signal having 1050 scanning lines is output. VOBs 226*e*, 226*f* and 226*g* are interpolation information. Thus, an NTSC signal is output by a conventional reproduction apparatus, an interlace signal having 720 horizontal pixels and 1050 vertical pixels is output by a progressive reproduction apparatus, and a full HDTV-format signal having 1050 scanning lines is output by a high definition reproduction apparatus. The picture identifier 222 can be recorded in the management information 224.

Figure 53:
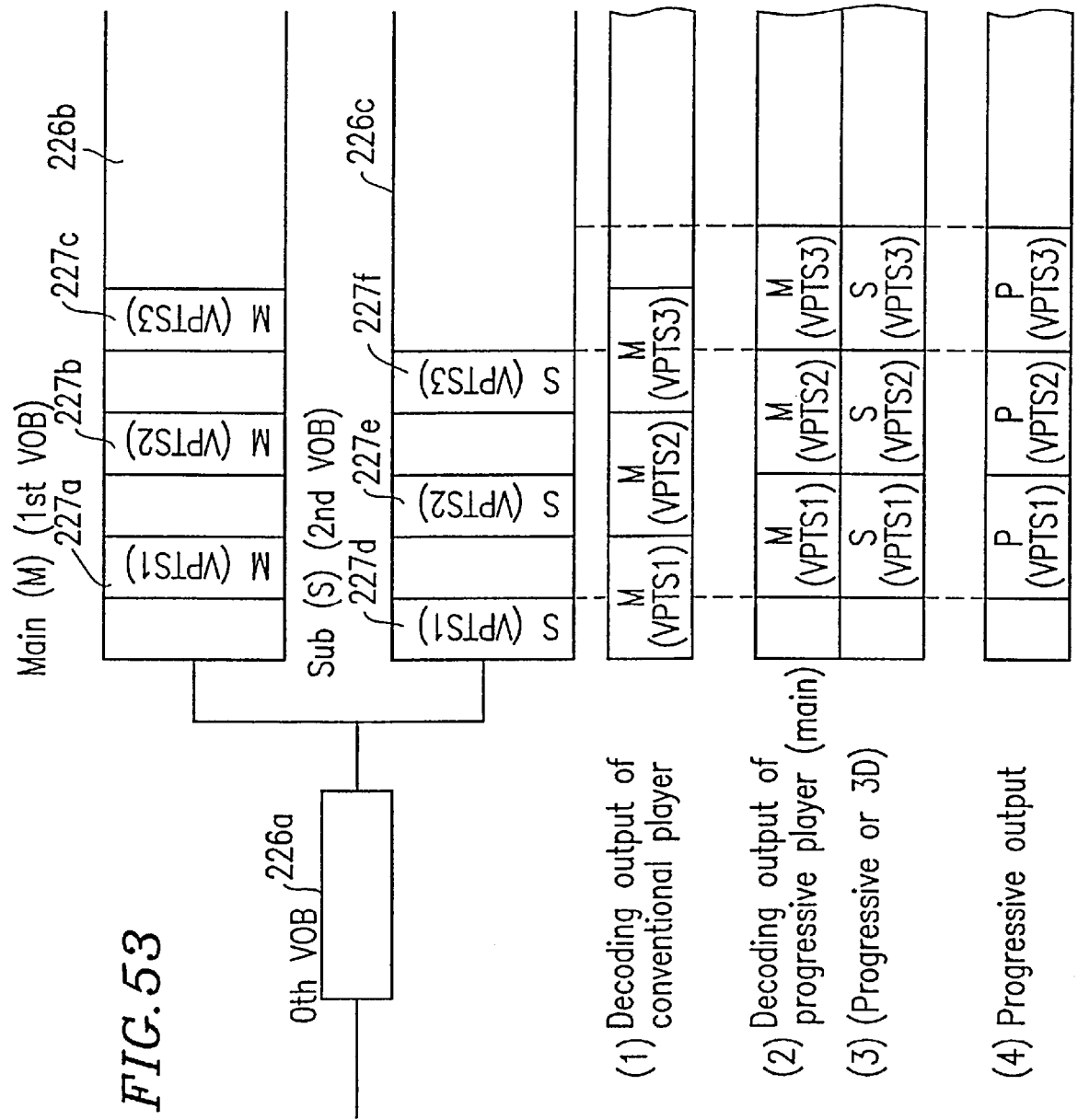
FIG. 53 is a view showing a progressive reproduction method for reproducing an interleave block while referring to a video presentation time stamp in one example according to the present invention.

With reference to FIG. 53, the relationship among VPTS (video presentation time stamp) of the sub track of interleave blocks, i.e., decoding output time, will be described. In the first VOB 226*b* as the main signal, interleave blocks 227*a*, 227*b* and 227*c* are recorded together with VPTS1, VPTS2 and VPTS3. In the second VOB 226*c*, interleave blocks 227*d*, 227*e* and 227*f* are recorded together with VPTS1, VPTS2 and VPTS3. A conventional player reproduces the interleave blocks 227*a*, 227*b* and 227*c* at 1×. Since the main signal includes an audio signal, the audio signal is also reproduced. A progressive player first reproduces the interleave block 227*d* of the second VOB 226*a* as a sub signal and stores the block in a buffer memory. After the storage, the progressive player reproduces the interleave block 227*a* of the first VOB 226*b*. The audio and video signals are synchronized with the synchronization information of the interleave block 227*a*. Since the audio signal is included in the main signal, the main signal and the sub signal shown in parts (2) and (3) of FIG. 53 are output in synchronization with the audio signal. In this case, a track jump is performed between the interleave blocks 227*a* and 227*e*.

Thus, a progressive signal shown in part (4) of FIG. 53 is output. By checking the VPTS of the interleave blocks by the reproduction apparatus, the main signal and the sub signal are decoded in synchronization and synthesized, thereby obtaining a normal progressive signal.

Figure 54:
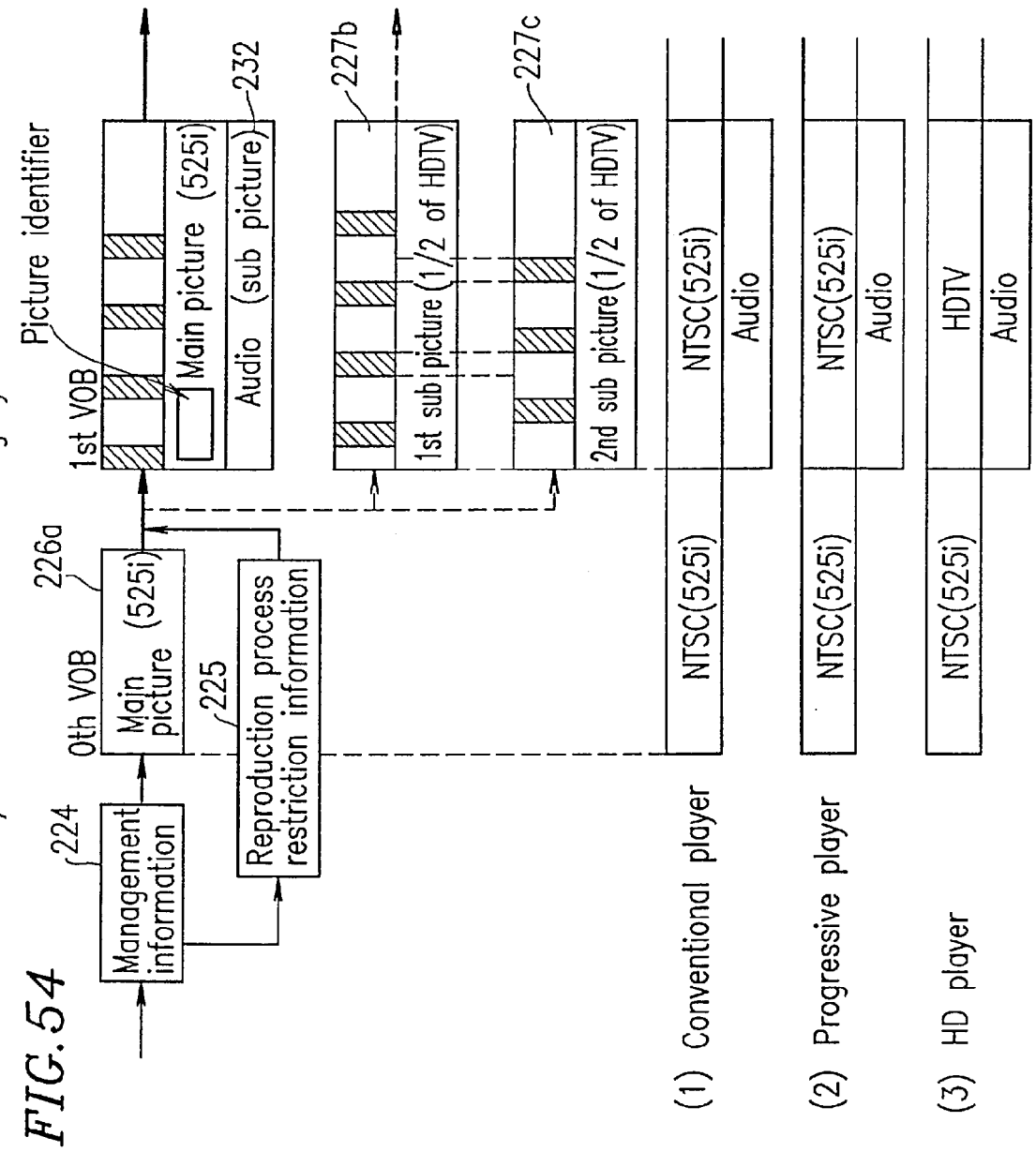
FIG. 54 is an arrangement view of an HDTV sub signal and an NTSC signal by simultaneous casting in one example according to the present invention.
Figure 55:
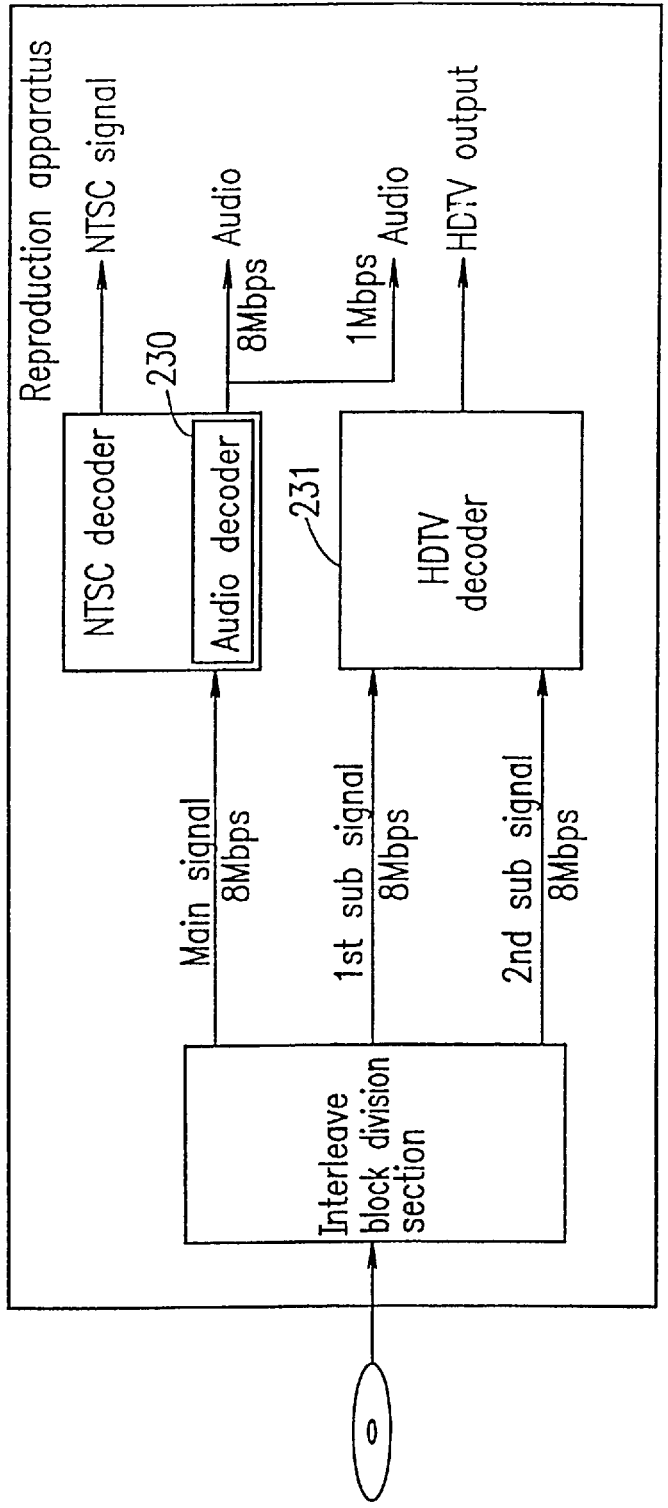
FIG. 55 is a block diagram of a reproduction apparatus for an HDTV/NTSC disk by simultaneous casting in one example according to the present invention.

FIG. 54 shows an arrangement of signals in a simultaneous cast system by which an NTSC signal and an HDTV signal are recorded as interleave blocks independently at the same time. In the VOB 227a as the main signal, a video signal and an audio signal 232 are recorded. In the VOBs 227b and 227c, an HDTV compression video signal corresponding to about 16 Mbps is recorded, 8 Mbps for each, by the interleave system. A conventional player and a progressive player shown in parts (1) and (2) of FIG. 54 reproduces an NTSC (525i) signal. An HDTV player shown in part (3) of FIG. 54 reproduces a 16 Mbps HDTV signal as a result of obtaining only audio data from the first VOB 227a, reproducing a first sub picture and a second sub picture from the VOBs 227b and 227c, and synthesizing these data. Since the reproduction of the sub signals is restricted by the reproduction process control information 225, an existing DVD player does not reproduce an HDTV compression signal even when the user erroneously operates the player. Thus, an NTSC signal is output by the existing player, and an HDTV signal is output by the HDTV player. FIG. 55 is a block diagram of a reproduction apparatus. The operation of the reproduction apparatus is not described in detail since it is similar to the operations described above. A reproduction signal from the optical disk is divided by an interleave block division section 233. A main signal is decoded by an audio decoder 230 of an NTSC decoder 229, and a first sub signal and a second sub signal which are each an 8 Mbps stream, are decoded by an HDTV decoder 231. Thus, an HDTV signal and an audio signal are output. The data in the optical disk is reproduced as an NTSC signal even by a conventional reproduction apparatus by simultaneous casting. Moreover, according to the present invention, a transfer rate of 16 Mbps is obtained when two interleave streams are used. Accordingly, a standard HDTV MPEG-compression signal is recorded as it is. With a DVD, a transfer of only 16 Mbps is obtained with two interleave blocks. Since an HDTV compression video signal is a 16 Mbps signal, audio data cannot be recorded. According to the present invention, audio data of the NTSC signal of the main signal is used. Therefore, an audio signal can be recorded even when an HDTV signal is recorded with two interleave blocks.

Now, a method for removing interlace interference will be described. When a progressive signal is transformed into an interlace signal by removing unnecessary components, aliasing distortion is generated and thus a moiré of a low frequency component is generated. A 30 Hz line flicker is also generated. In order to avoid these inconveniences, the signal needs to be passed through interlace interference removal means. Interlace interference removal means 140 is added to a progressive signal section of a progressive/interlace transform section 139 of the recording apparatus in FIG. 22 (described above). When a progressive signal is input, the interlace interference removal means 140a detects a video signal having a high probability of being interfered with from the input progressive signal, and passes only such a video signal through an interlace interference removal filter 141. For example, in the case of a picture having a low vertical frequency component, interlace interference does not occur. In such a case, the filter is bypassed by a filter bypass route 143. Such an operation alleviates the deterioration in the vertical resolution of the picture. The interlace interference removal filter 141 includes a vertical filter 142.

In part (a) of FIG. 46 (time and space frequency diagram), the hatched area represents an aliasing distortion generation area 213.

The aliasing distortion generation area 213 can be removed by a vertical filter. Specifically, as shown in part (c) of FIG. 46, three line memories 195 are provided. Regarding a progressive signal having 480 lines, picture information on the target line (n'th line) and picture information on the immediately previous and subsequent lines ((n−1)th line and (n+1)th line) are added together by an adder 196. Thus, information of one line is obtained, and 240 interlace signals are generated. Such processing filters the information in a vertical direction, resulting in alleviation in the interlace interference. By changing the adding ratio of the three lines, filter characteristics can be changed. This is referred to as a "vertical three-line tap filter". By changing the adding ratio of the center line with respect to the immediately previous and subsequent lines, a simpler vertical filter can be obtained. As shown in part (d) of FIG. 46, line information can be processed with a vertical filter after, for example, the (n−1)th line of the previous frame and the (n+1)th line of the subsequent frame (even lines) are developed on an identical space, in lieu of a simple vertical filter. Such a time vertical filter 214 has an effect of alleviating interlace interference, which occurs when a progressive signal on the optical disk is reproduced by a non-progressive player and only an interlace signal is listened. A horizontal filter 206a is realized by adding two pixels in a horizontal direction to synthesize one pixel. Needless to say, however, such a filter deteriorates the resolution of the progressive picture. The filter effect is alleviated by preventing filtering on a picture having a low probability of being interfered with or by changing the adding ratio to realize a vertical filter. When the filter effect is weakened, the deterioration in the resolution of the progressive picture is alleviated. A progressive reproduction apparatus according to the present invention filters the information sufficiently to remove interlace interference during reproduction, so that it is not necessary to filter the information when being recorded. When such progressive reproduction apparatuses replace the existing reproduction apparatuses in the future, filtering during recording will not be necessary. In such a case, there will be both filtered optical disks and unfiltered optical disks. The interlace interference removal means 140 outputs an interlace interference removal identifier 144 to check whether or not the picture has been filtered and records the information on the optical disk 85 by recording means 9.

With reference to FIG. 50, a specific method for recording a filter identifier will be described. A filter identifier 144 is put in a header in 1 GOP, which is an MPEG recording unit in one stream. "00" indicates that the signal is not filtered. "10" indicates that the signal has been passed through a vertical filter. "01" indicates that the signal has been passed through a horizontal filter. "11" indicates that the signal has been passed through a vertical and a horizontal filter. Since the filter identifier 144 is put in the minimum unit of 1 GOP, the filter can be turned on or off in units of 1 GOP in the reproduction apparatus. Accordingly, deterioration of the picture quality by double filtering is avoided.

Figure 32:
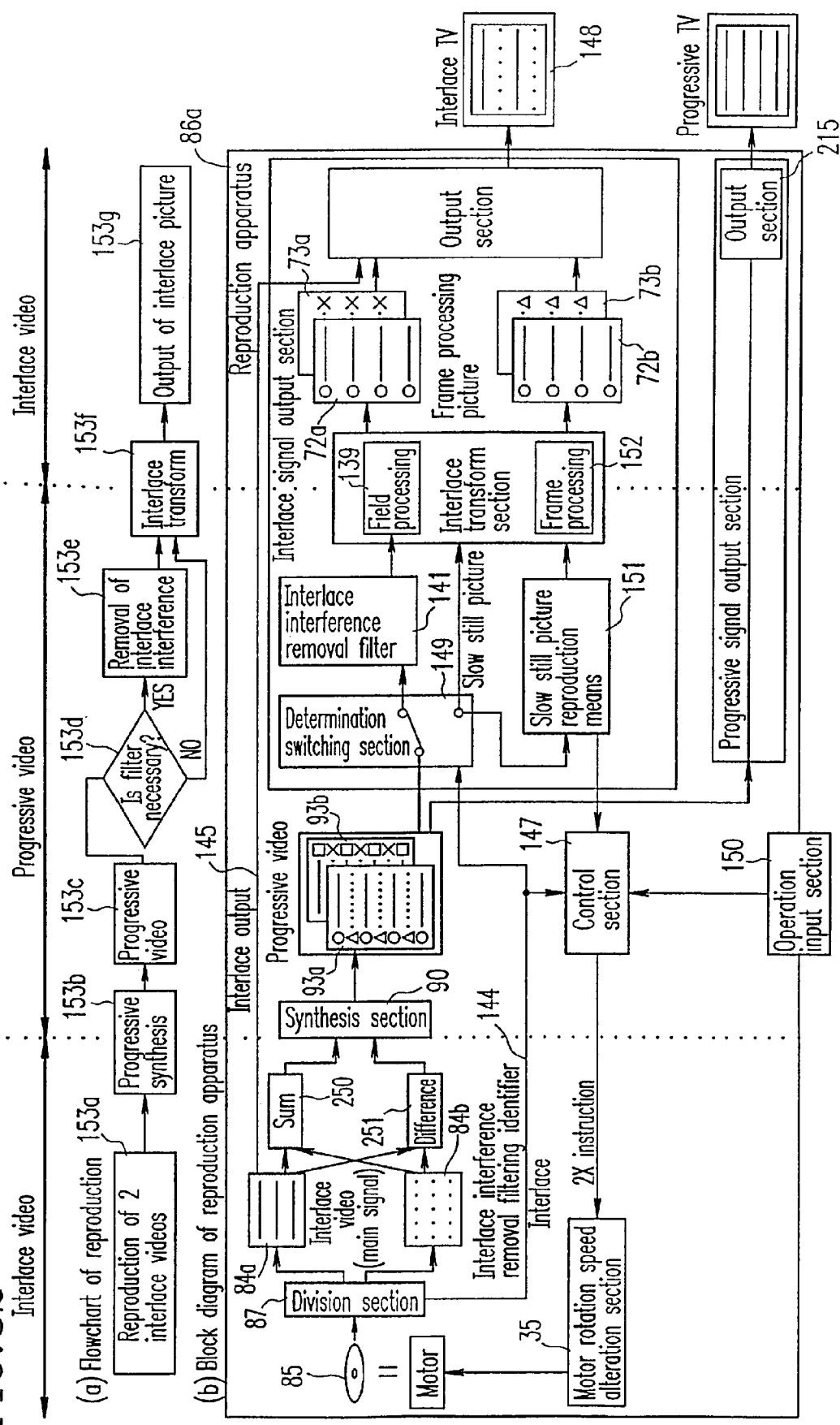
FIG. 32 is a view illustrating a method for reducing interlace interference by turning on or off a filter in one example according to the present invention.
Figure 33:
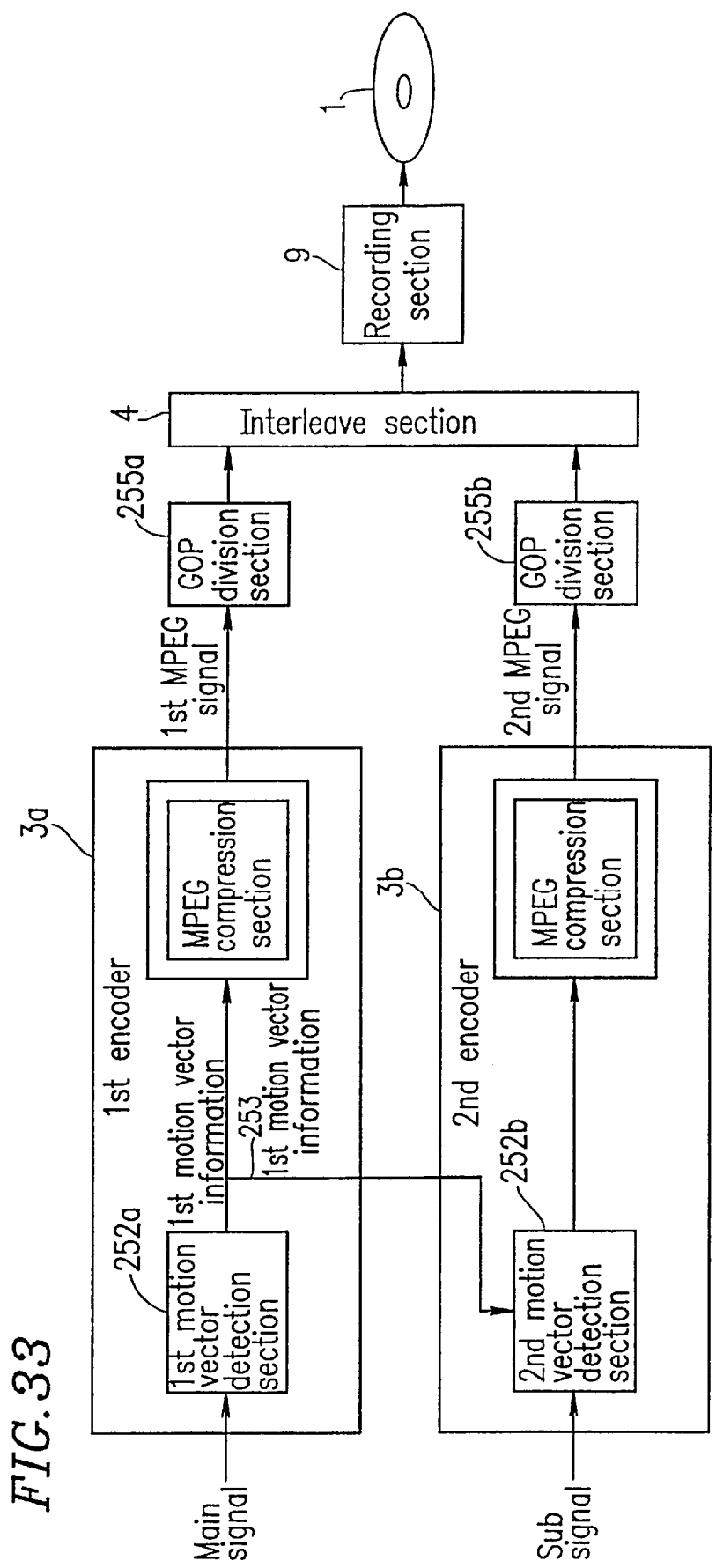
FIG. 33 is a view illustrating the principle of an encoding system using a common motion detecting vector in one example according to the present invention.

With reference to parts (a) and (b) of FIG. 32, an operation of a reproduction apparatus 86a for reproducing an optical disk 85 will be described. As in FIG. 21, two interlace pictures 84a and 84b are reproduced to synthesize a progressive picture 93a. Notably, when the interlace interference removal filtering identifier 144 is "ON" or when special reproduction such as "slow" or "still picture" is not performed and a progressive picture is not output either, an interlace signal is output directly by an interlace output section at 1×. This is energy efficient.

When special reproduction is performed or when the interlace interference removal filtering identifier 144 is off, a "2×" instruction 146 is sent from a control section 147 to a motor rotation speed alteration section 35. Then, the optical disk 85 rotates at 2×, and a progressive picture is reproduced.

A method for removing interlace interference when the progressive picture reproduced in this manner is output to an interlace TV 148 as an interlace signal will be described. When the interlace interference removal filtering identifier 144 is off, a determination switch circuit 149 is switched to pass the progressive signal through the interlace interference removal filtering identifier 144. Then, two frames 93a and 93b are transformed by an interlace transform section 139 into odd and even interlace signals 72a and 73a. Thus, an ordinary interlace signal is output. In this case, a picture with no interlace interference is displayed on the interlace TV 148. Since the interlace interference removal filter does not influence the interlace signal significantly, the interlace signal is not deteriorated. A progressive signal with no interlace interference removal filter is output to a progressive signal output section 215. By the system of turning on and off the interlace interference removal filter by the reproduction apparatus, a progressive picture with no quality deterioration and an interlace picture with no quality deterioration such as interlace interference are both obtained.

When slow reproduction of a speed of ½ or less and still picture reproduction is performed, the removing filter is weakened since the interlace interference is alleviated.

Next, a method for improving special reproduction will be described. When an instruction to perform a slow or still picture reproduction is issued from the control section 147 through an operation input section 150 to slow/still picture reproduction means 151, the interlace transform section 149 divides the 480 lines of the frame 93a into two fields using a frame processing section 152 to create and output an odd interlace signal 72b and an even interlace signal 73b. Then, a low or still interlace picture having a resolution of 480 with no blurring is displayed on the interlace TV 148. In a conventional interlace reproduction apparatus, the resolution needs to be lowered to 240 in order to obtain a slow or still picture with no blurring. According to the present invention, a slow or still picture having a resolution of 480 with no blurring is obtained by transforming the interlace signal into a progressive signal once and then transforming the progressive signal back to the interlace signal. FIG. 32 illustrates this process in the flowchart in part (a) (steps 153a through 153g). The detailed description of the flowchart is omitted.

Figure 26:
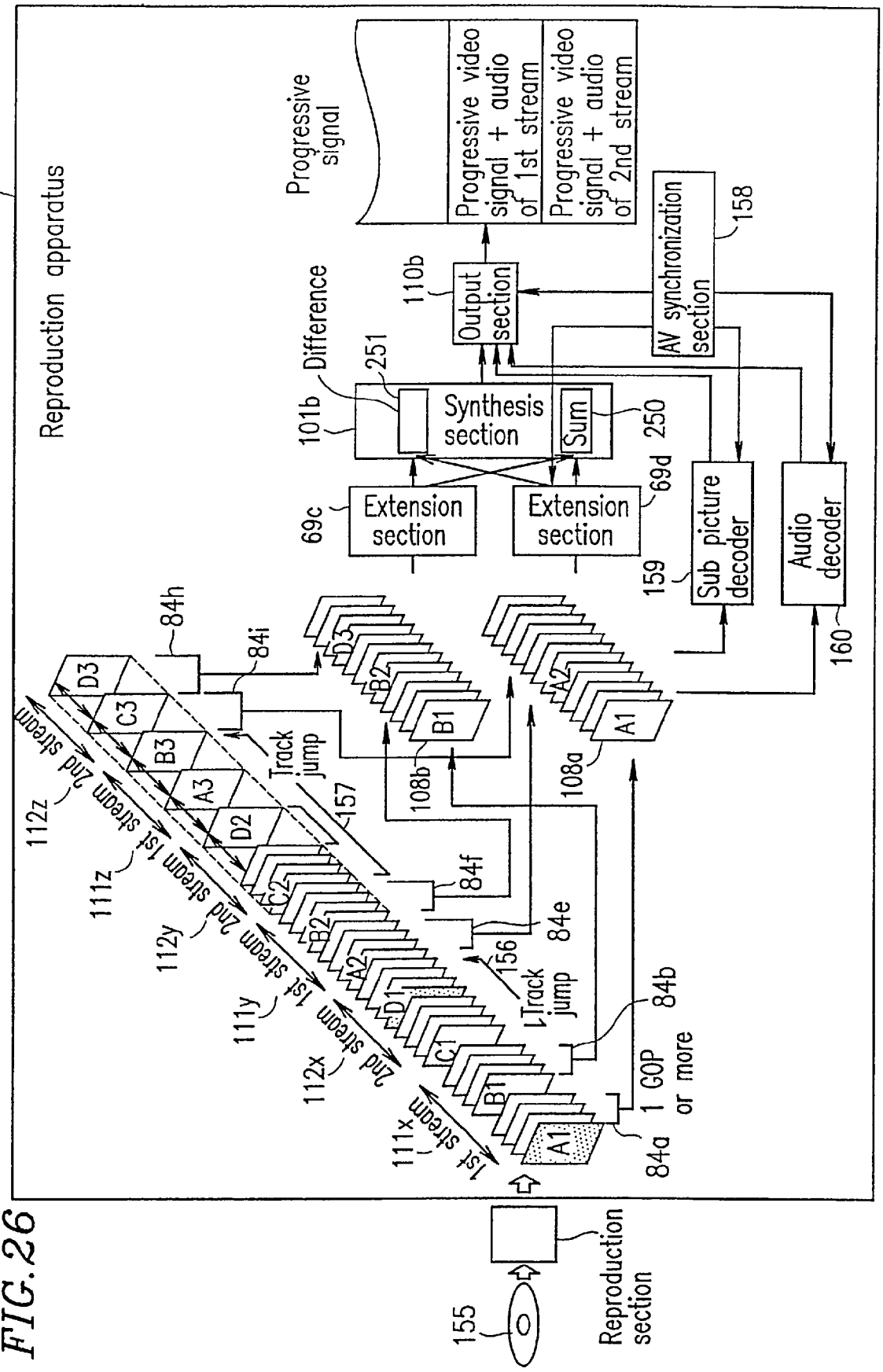
FIG. 26 is a block diagram of a reproduction apparatus in a multi-stream progressive picture signal reproduction mode in one example according to the present invention.

With reference to FIG. 26, a method for outputting streams in two channels continuously will be described. The two-channel streams are recorded on an optical disk as pictures in cameras 1 and 2 by an interleave system. A first stream from the disk is reproduced and then switched to a second stream.

Figure 35:
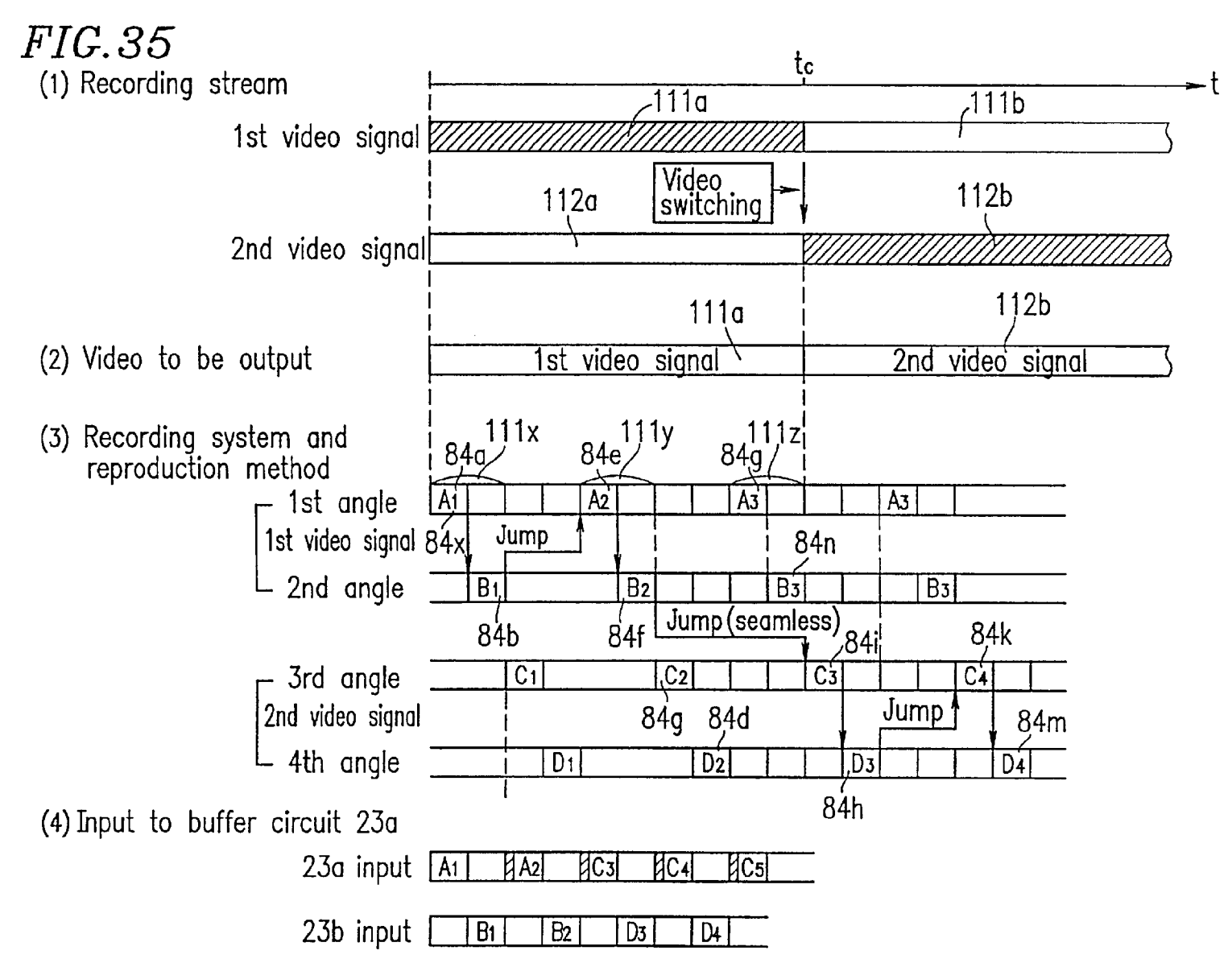

With reference to FIG. 35, a method for switching a specific stream to another stream smoothly with no disconnection when the contents of the optical disk include a plurality of streams, i.e., when a plurality of streams are multiplexed will be described. As shown in part (1) of FIG. 35, an optical disk 106 includes two different streams as a first stream 111 of a first video signal and a second stream 112 of a second video signal. The two streams are basically recorded substantially at the same radius.

Usually, only the first video signal as a basic stream is reproduced. Accordingly, a first stream 111a is reproduced and then a first stream 111b is continuously reproduced. When the user issues an instruction to switch the first video signal to the second video signal from an instruction input section 19 in FIG. 5 at time t=tc, a tracking control circuit 22 in FIG. 5 is used to access a track at a different radial position, thereby outputting a second stream 112b of the second video signal at time t=tc.

Thus, as shown in part (2) of FIG. 35, the first video signal is switched to the second video signal seamlessly with no disconnection at time t=tc in terms of the video, audio and sub picture signals.

A method for realizing such a seamless reproduction by synchronizing the video, audio and sub picture signals will be described later.

With reference to a timing diagram of parts (3) and (4) of FIG. 35, a specific method for reproducing data will be described. As described with reference to the block diagram of FIG. 22, a progressive picture as the first video signal is divided into main interlace video signals A1 through An (Odd First) and sub interlace video signals B1 through Bn (Even First). The signals are recorded separately in first-angle and second-angle sub channels. Although not described with reference to FIG. 22, a progressive picture as the second video signal is also divided into main interlace video signals C1 through Cn and sub interlace video signals D1 through Dn. The signals are recorded separately in third-angle and fourth-angle sub channels as shown in part (3) of FIG. 35. Part (3) of FIG. 35 is a timing diagram of the principle shown in FIG. 36. The operation is the same.

Figure 36:
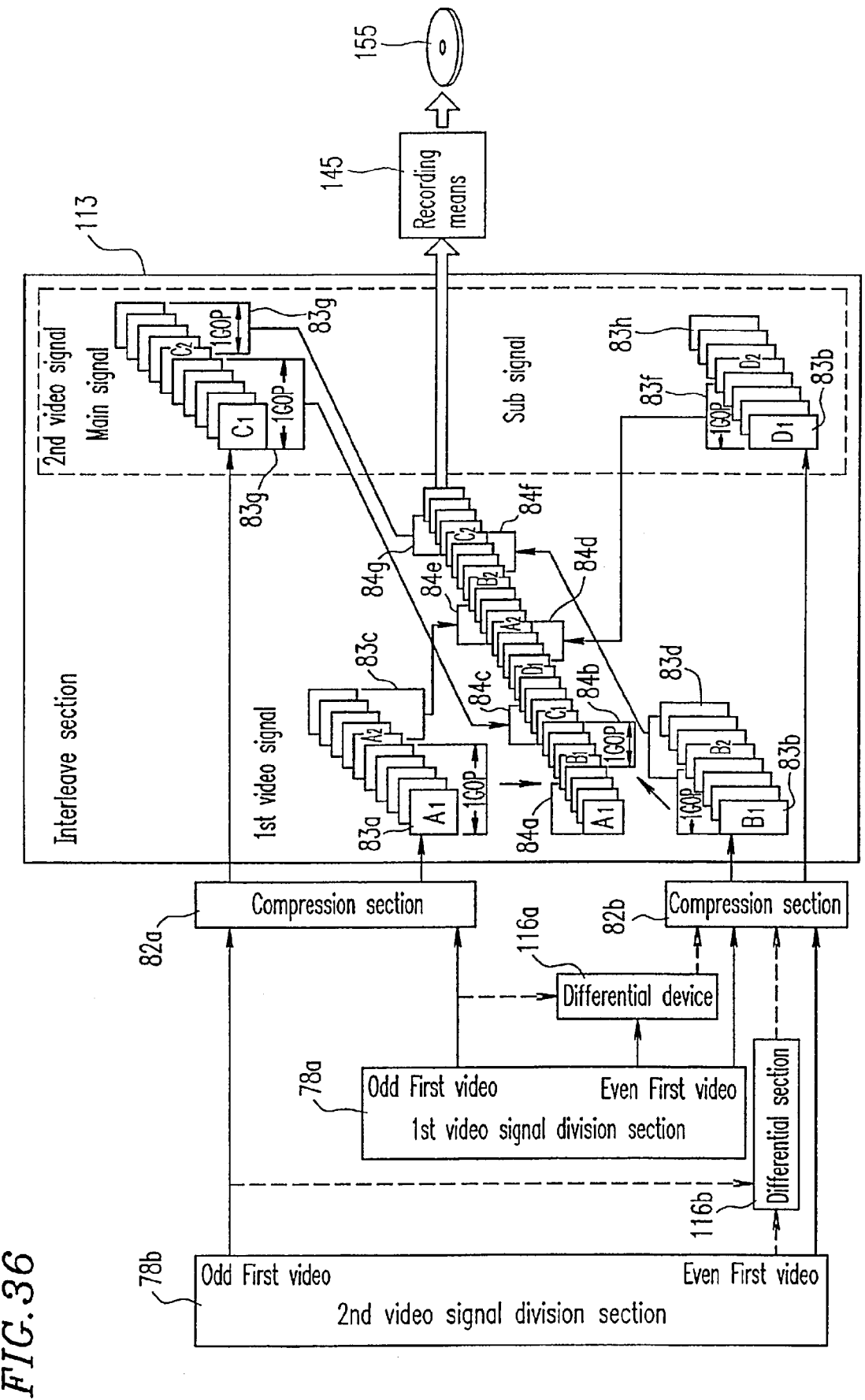
FIG. 36 is a view illustrating the principle of recording two progressive video signals after dividing them into interleave blocks in one example according to the present invention.

FIG. 36 puts a focus on an interleave section of the recording apparatus shown in FIG. 22. A progressive signal as the first video signal is divided by a first video signal division section 78a into a main signal (Odd First) and a sub signal (Even First). The amount of information can be reduced by finding a differential signal between the main signal and the sub signal by a differential section 116a and compressing the main signal and the sub signal to be recorded on the disk. In the case of a progressive signal, the correlation between adjacent odd and even lines is quite strong, and accordingly the amount of information of a differential signal between the two lines is small. Thus, the amount of information to be recorded can be significantly reduced by finding the differential signal.

According to the present invention, the signals are recorded in a divided manner using the differential device 116a as shown in FIG. 44. A 720P signal, i.e., a progressive picture having 720 lines or a 1050P signal is divided by the picture division section 115 into 525 basic information 187, progressive picture 183 (or 525 interlace picture 184) and interpolation information 186. Differential information 185 between the basic information 187 and the interpolation information 186 is obtained by the differential device 116a. The differential information 185 is divided by a second video signal division section 78c and a third video signal division section 78d into four streams 188a, 188d, 188e and 188f. These streams are sent to a compression section 103 and processed with interleaving by an interleave section 113a. Thus, six streams are recorded in the angles on an optical disk 187.

At this point, the streams 188c, 188d, 188e and 188f are differential information or interpolation information, and thus do not provide a normal picture when being decoded by the reproduction apparatus and output onto a TV screen. Such an abnormal picture makes the viewer feel uncomfortable. In order that the streams 188c, 188d, 188e and 188f, including the interpolation information 186, recorded in different angles not be output by a non-progressive reproduction apparatus, restriction information is generated by the picture output restriction information generation section 179 and recorded on the optical disk 187. Specifically, such information prevents a specific stream from being opened without a password. Processing the streams 188c, 188d, 188e and 188f with such password protection prevents a conventional reproduction apparatus from opening these streams and avoids the situation where the user views the abnormal picture obtained by decoding the interpolation information.

Returning to FIG. 36, the first video signal is thus compressed, so that the main signal of the first video signal is divided into A1 and A2 interleave blocks 83b and 83d, each including 1 GOP or more. The main signal of the second video signal is divided into C1 and C2 interleave blocks 83a. The sub signal of the second video signal is divided into B1 and B2 interleave blocks 83e and 83g and D1 and D2 interleave blocks 83f and 83h. As shown in FIG. 36, a recording stream 117 is generated from these four pieces of data. In the recording stream 117, the blocks are arranged in the order of A1, B1, C1, D1, A2, B2, C2, and D2. The recording stream 117 is recorded on an optical disk 115 by recording means 145. A1, B1, A2 and B2 correspond to the first video signal of the progressive signal. Accordingly, the signals are recorded on the optical disk 115 in the order of the first video signal, the second video signal, the first video signal and the second video signal. A seamless reproduction performed by the AV synchronization section will be described later.

In the above description, 1 GOP or more of the MPEG signal is recorded in each interleave block. Precisely, one interleave block is restricted to about 0.5 seconds or less. Therefore, only 30 fields of a video signal can be recorded at the maximum. Accordingly, only 30 GOPs can be recorded in one interleave block at the maximum. One interleave block of the present invention is limited to 1 GOP or more and 30 GOP or less.

A method for compression will be described. Interlace signals 79a and 80a of a first VOB 118 are put together as a field pair 125a and encoded by a frame encoding section 123a into a frame encoded signal 127a.

A dummy field 121 of a second VOB 119 is first encoded by a field encoding section 124b in a compression section 82b on a field-by-field basis into a field encoded signal 129. Next, an even interlace signal Bob and an odd interlace signal 79b, which are sub signals, are put together as a first field pair 126a, frame-encoded by a frame encoding section 123b in the compression section 82b into a frame encoded signal 128a.

Thus, an Odd First dummy field is added to the second VOB 119. Thus, the second VOB signal 119 starts with an odd interlace signal. Since the signals are recorded in the order of an odd interlace signal and then an even interlace signal, the signals are reproduced smoothly by a DVD player. In this case, one progressive signal corresponds to frame encoded signals 127a and 128a. Due to the field encoded signal 129 obtained from the dummy field, there is an offset time period 130 of td between the frame encoded signal 127a from the main signal and the frame-encoded signal 128a from the sub signal. Accordingly, it is required to output the sub signal earlier by the offset time period when reproducing the progressive signal.

Figure 34:
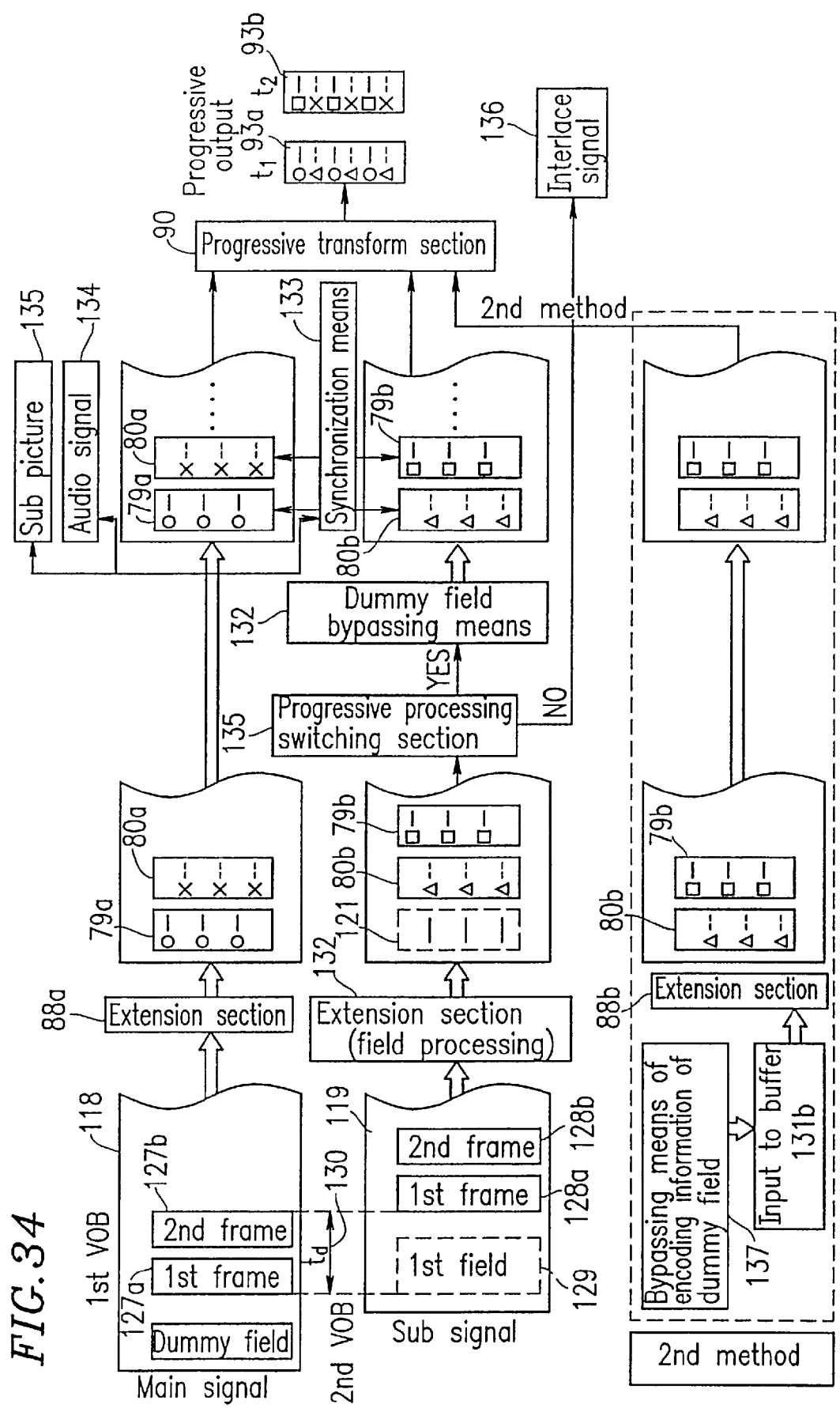
FIG. 34 is a view illustrating a method for adjusting the timing for reproducing data from a DVD disk in one example according to the present invention.

With reference to FIG. 34, the operation of the reproduction apparatus 86 described referring to FIG. 21 will be described in more detail. A signal from the reproduction section 95 is divided into a first VOB 118 as the main signal and a second VOB 119 as the sub signal. The first VOB 118 originally starts with an odd line and thus can be extended as it is. The second VOB 118 has a dummy field 129 at the start thereof for authoring. Reproduction of the second VOB 118 as it is results in generating an offset time period 119 of td between the main signal and the sub signal. Since it is time-consuming to synthesize the first progressive signal in such a case, a picture corresponding one VOB and a picture corresponding the next VOB are not continuous. In order to avoid this, the present invention provides two method for skipping a dummy field 121.

According to a first method, a field encoded signal 129 at the start of the second VOB 119 is once input to an extension section 132. When progressive identification information is detected during or after field extension, a progressive processing switching section 135 is switched to Yes. Thus, the dummy field 121 is skipped by dummy field bypassing means 132 so that an even interlace signal 80b is first output and then an odd interlace signal 79b is output. This signal is synchronized by synchronization means 133 with an audio signal 134 and a sub picture signal 135 such as subtitles which are recorded in the main signal. As a result, progressive pictures 93a and 93b are output through a progressive transform section 90. In the embodiment where the dummy field 121 is bypassed in this manner, an odd field and an even field are output in synchronization with each other. Thus, a progressive signal, an audio signal and a sub picture signal with matching time axes are output. When progressive identification information is absent, the progressive switching section 135 is switched to No, and thus the dummy field 121 is not bypassed. Progressive transform is not performed. Thus, an interlace signal 136 is output. Such an output of the interlace signal 136 occurs in a conventional DVD player without a progressive function. As described above, the dummy field bypassing means 132 is turned on for processing a progressive signal. Otherwise, the dummy field bypassing means 132 is turned off, so that an ordinary field encoded interlace signal is normally output without dropping the field.

A second method is used when the dummy field 129 is field-encoded into 1 GOP frames and can be separated from the frames of the sub signal. Before decoding, the field encoded signal 129 obtained by encoding the dummy field is skipped by 1 GOP by dummy field encoded information bypassing means 137. The skipped information is input to a buffer 131b, or skipping is performed when data is output from the buffer. To the extension section 88b, only the frames of the sub signal paired with the main signal or field information is input. Thus, by ordinary means described above referring to FIG. 21, the even interlace signal 80 and the odd interlace signal 79b are extended, interlace-transformed, synchronized with the main signal, and transformed into progressive signals 93a and 93b by the progressive transform section 90.

According to the second method, the dummy field is removed while the dummy field is in the form of the encoded information. Therefore, the dummy field is not required to be processed by the buffer section 131b or the extension section 88. This method is appropriate for putting a field encoded in units of 1 GOP to the start of the second VOB.

According to the first method, the dummy field 129 and the field signals in each frame 127a are field-encoded together to generate a unit of 1 GOP. This is efficient where a dummy field is inserted at the start of one interleave block in, for example, a seamless multiple angle system having a high recording efficiency. The first method has an effect of extending the recording time period.

By skipping the dummy field 121 only for progressive processing in this manner, progressive pictures can be reproduced with no disconnection at the border between adjacent VOBs or between interleave blocks in the case of a seamless multiple angle system.

Figure 37:
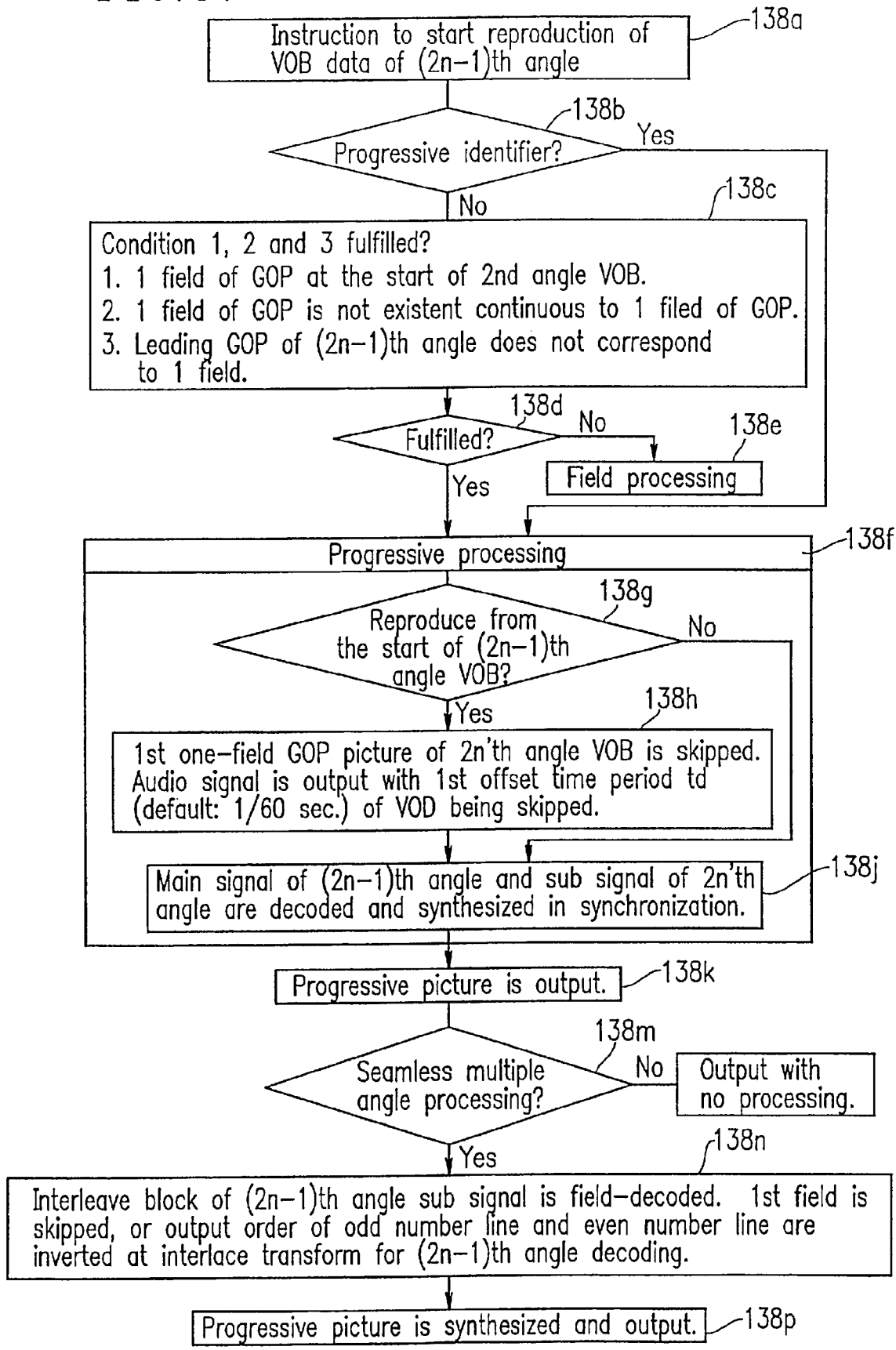
FIG. 37 is a flowchart showing a method for skipping a first dummy field of a VOB in one example according to the present invention.

Such processing will be described with reference to the flowchart in FIG. 37. In step 138a, an instruction to start reproduction of (2n−1)th angle data is issued. In step 138b, whether or not a progressive identifier is present is checked. If yes, the processing jumps to step 138f. If no, in step 138c, whether or not the following three conditions are fulfilled is checked. Condition 1 is that there is one field (or an odd number of pieces of fields) of GOP at the start of the n'th angle VOB. Condition 2 is that one field of GOP is not existent continuous to one field of GOP. Condition 3 is that the leading GOP of the (2n−1)th angle does not correspond to one field. Then, in step 138d, whether or not the three conditions are fulfilled is checked. If no, in step 138e, interlace processing is performed to output only the (2n−1)th angle. If yes, in step 138f, the processing is switched to progressive processing. In step 138g, whether or not the reproduction is to be performed from the start of the (2n−1)th angle VOB is checked. If no, the processing jumps to step 138J. If yes, in step 138h, the n'th angle VOB is output while dropping the picture of the first one field or GOP corresponding to one field. When the (2n−1)th angle includes an audio signal, the VOB is output while skipping the first offset time period dt (default value: 1/60 sec.). In step 138j, the main signal of the (2n−1)th angle and the sub signal of the 2n'th angle are decoded, synchronized and synthesized into a progressive signal. In step 138k, a progressive picture is output. When a seamless multiple angle output is performed in step 138m, the processing advances to step 138n, where each interleave block of the (2n−1)th angle (i.e., sub signal) is field-decoded, and the output is performed while the first block is skipped. Alternatively, the outputting order of the odd lines and the even lines is inverted at the time of interlace transform. In step 138p, the progressive picture is synthesized and output.

Due to authoring, several seconds of dummy field is inserted at the start of the multiple angle VOB. The dummy field group at the start of the VOB is read. In a similar manner, the leading address at which the multiple angle VOB starts is read from the PGC data. For ordinary reproduction, data is read from the start of the VOB. For only 3D or progressive reproduction, the dummy field is skipped and the data is read from the starting address of the VOB corresponding to each of the multiple angle VOB. Thus, 3D or progressive pictures are prevented from being interrupted at the border of adjacent VOBs.

Figure 62:
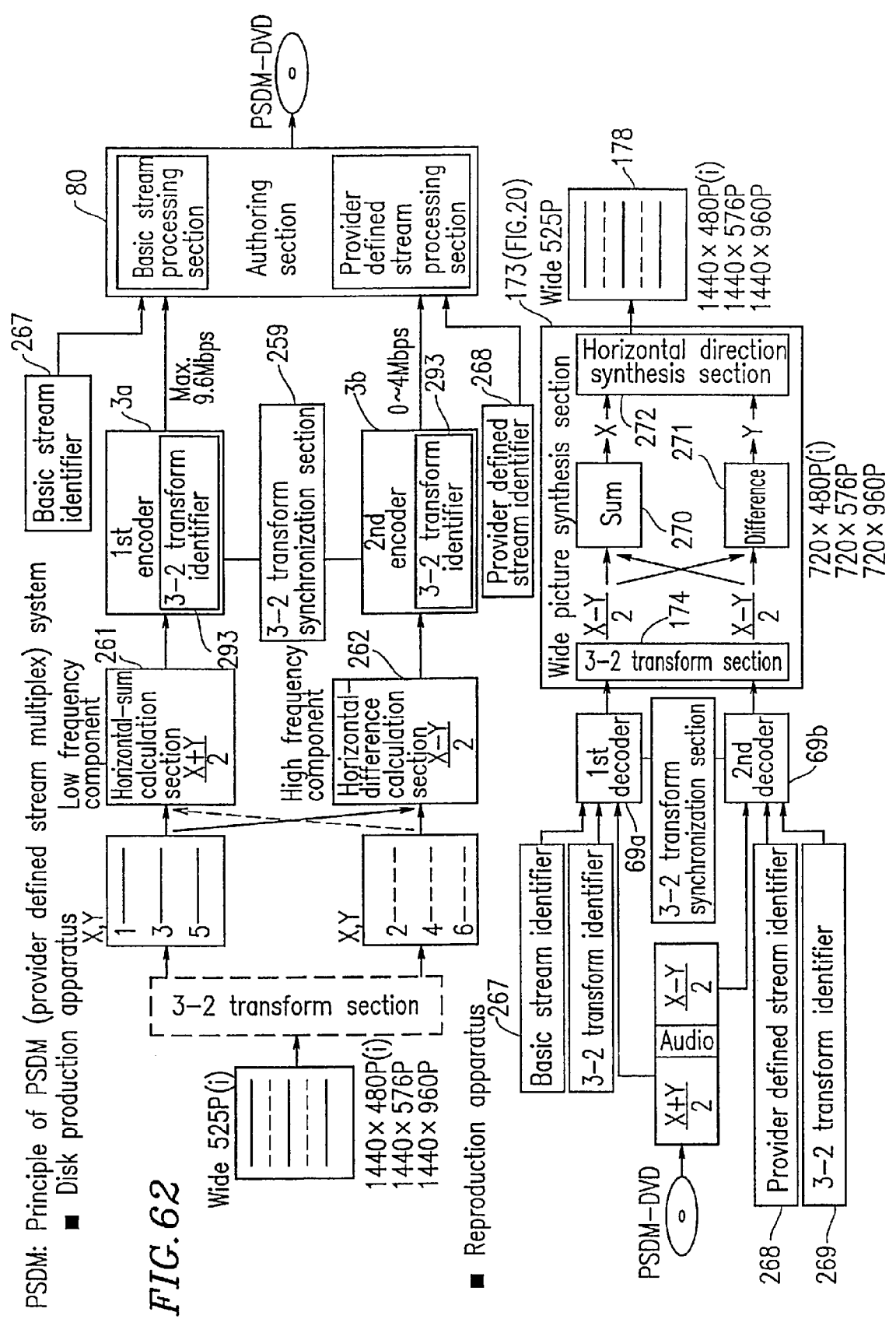
Figure 63:
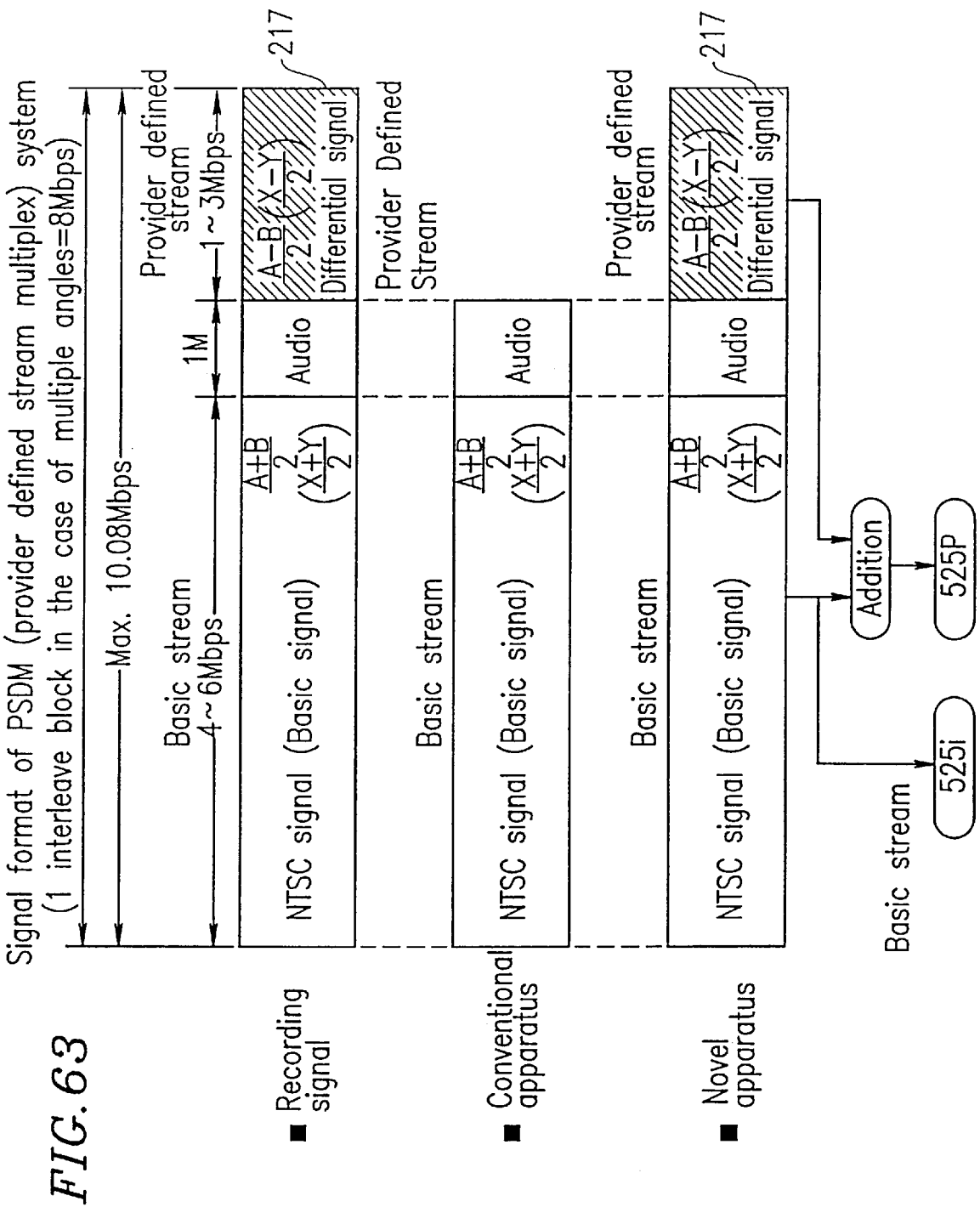
FIG. 63 shows a signal format of provider defined stream multiplex system in one example according to the present invention.

So far, the MADM system has been described. Hereinafter, a provider defined stream picture division multiplex system (PSDM) as another system will be described. FIG. 61 is a block diagram of the PSDM system of a vertical division system. FIG. 62 is a block diagram of the PSDM system of a horizontal division system. FIG. 63 shows a signal format of the PSDM system.

As shown in FIG. 63, a DVD video signal has 10.08 Mbps, and a provider defined stream is defined separately from a basic stream. A sum signal described with reference to FIG. 23 can be added to the basic stream and put into the provider defined stream. Such a signal can be reproduced by changing the circuit even with a normal 1× drive. According to the experiments performed by the present inventors, a satisfactory progressive picture is obtained when the sum signal is 6 Mbps and the difference signal is 3 Mbps. Thus, a satisfactory progressive picture is obtained unless the encoding is difficult.

In the case of a movie, which contains a progressive picture of 241 frames, a sufficient picture is obtained by the PSDM system. The system shown in FIG. 61 is basically the same as those shown in FIGS. 22 and 23. In the latter half of the production of the disk, a sum signal is recorded in the basic stream with a basic stream identifier being added thereto in an authoring section, and a difference signal is recorded in a provider defined stream with a provider defined stream identifier being added thereto. In the case of a movie, a 3-2 transform identifier synchronized with the sum and difference signals is added.

The reproduction apparatus decodes the sum signal from a packet provided with the basic stream identifier 267 by a first decoder 69a, and decodes the difference signal from a packet provided with the provider defined stream identifier 268. Signals A and B are obtained by a sum calculation section 250 and a difference calculation section 251. Thus, a 525P signal is synthesized.

FIG. 62 shows a system for dividing a wide 525P signal in a horizontal direction and PSDM-recording the resultant signal as two interlace signals, like in FIG. 58.

With reference to FIG. 26 and part (3) of FIG. 35, a process for reproducing the optical disk 155 and switching the first video signal to the second video signal at t=tc will be described. As shown in FIG. 26, the optical disk 155 (provided as an example of an optical medium) has four channel stream recorded by an interleave system. The streams are recorded in the order of A1, B1, C1, D1, A2, B2, C2, D2, A3, B3, C3 and D3 in interleave units of 1 GOP. Since the first video signal is first output, interleave blocks (herein after, referred to simply as "ILB") 84a and 84b (i.e., A1 and B1) are continuously reproduced and a track jump 156 is performed, thus reproducing ILBs 84e and 84f (i.e., A2 and B2). When the first video signal is switched to the second video signal at t=tc, a track jump 157 is performed, thus reproducing ILBs 84i and 84h (i.e., C3 and D3). Thus, A1, A2 and C3 as main signals and B1, B2 and D3 as sub signals are reproduced, extended by the extension section, and sent through the synthesis section 101b to the output section 110b. The resultant signal is synchronized with a sub picture signal from a sub picture decoder 159 and an audio signal from an audio signal reproduction section 160 by the AV synchronization section 158. Thus, these signals are output with matching timing. Accordingly, the progressive signal in the first stream and the progressive signal in the second stream are reproduced seamlessly with no disconnection. A method for synchronization for providing a seamless reproduction will be described later.

With reference to FIG. 45, a method for synchronizing two picture signals and an audio signal when two streams are simultaneously reproduced as in the case of, for example, a 3D picture or scope picture will be described. When three or four streams are simultaneously reproduced as in the case of a 720P signal, a similar method is usable and will not be described.

Figure 39:
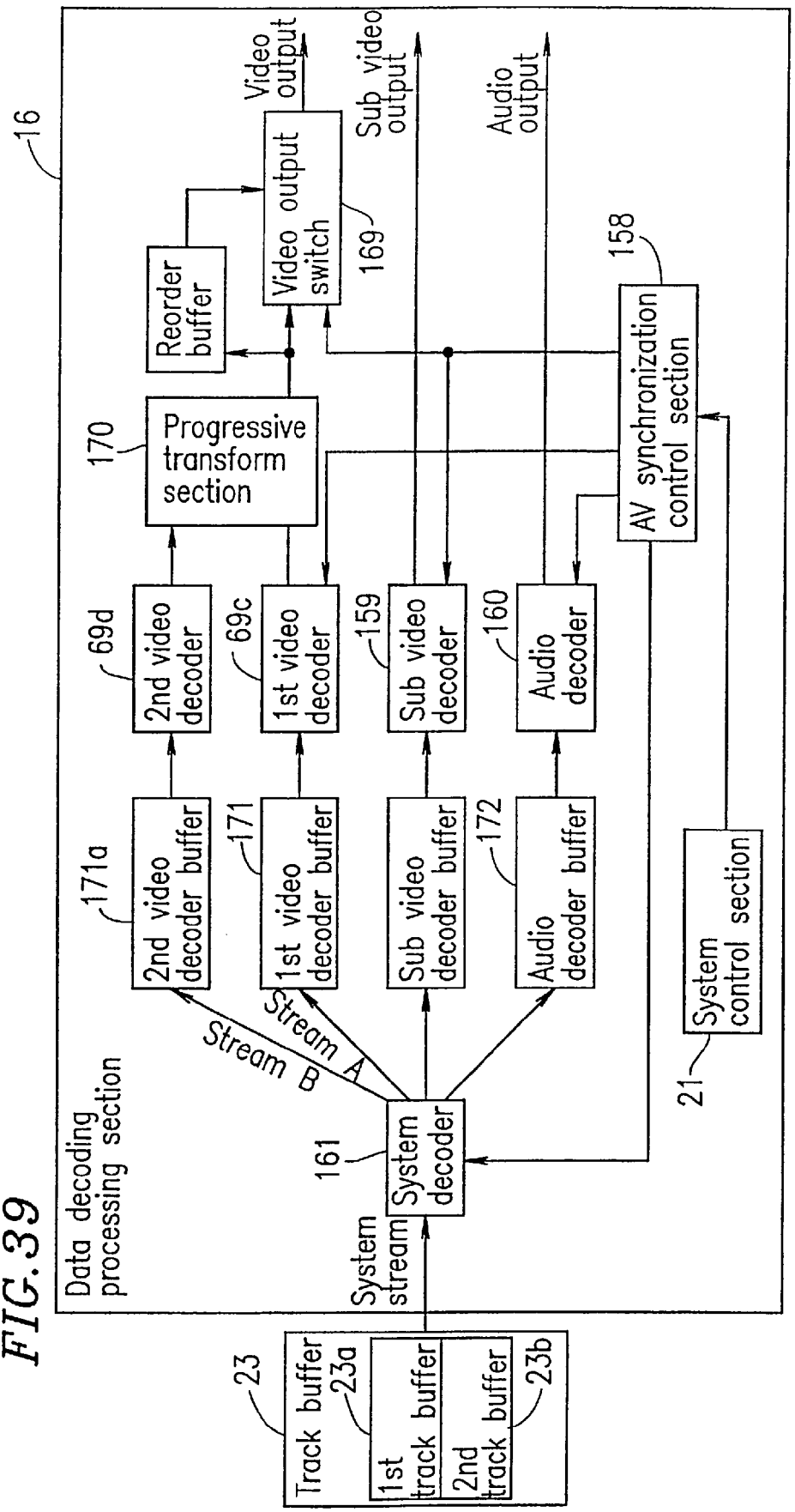
FIG. 39 is a block diagram of data decoding in one example according to the present invention.

First, a method for synchronizing two streams according to the present invention will be described. First, as shown in FIG. 39, a system reproduced from the optical disk is once accumulated in a track buffer 23 and then sent to a first video decoder 69d and a second video decoder 69c. In the track of the optical disk, a first stream A and a second stream of the progressive signal are alternately recorded on an interleave block-by-interleave block basis.

First, the stream A is reproduced at 2× rotation, and data accumulation in a first track buffer 23a of the track buffer 23 is started. As shown in part (1) of FIG. 45, when t=t1 to t2, data for 1 interleave block (ILB) I1 of the first video signal for 1 interleave time T1 is accumulated. A first track buffer data amount is increased, and becomes equal to 1 ILB at t=t2. Thus, data accumulation for 1 ILB of the first video signal is completed. At t=t2, after accumulation of data for 1 ILB of the first video signal corresponding to 1 GOP or more is completed, the second video signal (stream B) is reproduced from the optical disk starting from the interleave block I2. As shown in the solid line in part (4) of FIG. 45, data accumulation of the second video signal in a second track buffer 23b is started at t=t2 and continued until t=t6. From t=t2 through t8, as shown in parts (7) and (10) of FIG. 45, the video presentation stamps (VPTS) of the first video signal and the second video signal are synchronized and respectively sent to the first video decoder 69c and the second video decoder 69d from the track buffer 23a and the track buffer 23b. As shown in parts (8) and (11) of FIG. 45, the input signals are output as two pieces of video data after being extended by the first and second video decoders 69c and 69d. The output of these pieces of data starts at t=t3, which is delayed by a video delay time period twd, which is required for MPEG extension of the data. From t=t4 through t10, the streams A and B are synthesized into a progressive signal by a progressive transform section 170. Thus, a progressive signal for one interleave block is output.

As described above, from t=t2 through t8, data for one interleave block is input to the decoders. Accordingly, the data in the first track buffer 23a and the data in the second track buffer 23b are consumed and reduced at substantially the same rate. Therefore, as shown in part (2) of FIG. 45, the data amount in the first track buffer is reduced from t=t2 through t7. At t=t7, the data amount is ½ of 1 ILB. Since data reproduction for the interleave block I5 starts at t=t7, the data amount increases until t=t8, when the data amount reaches 1 ILB. Since data input to the first decoder 69c starts at t=t8 as at t=t2, the data amount reduces until t=t11. Finally, the buffer memory amount becomes ½ ILB.

With reference to part (4) of FIG. 45, a change in the memory amount in the second track buffer 23b for stream B will be described. At t=t2, input of data B1 for the interleave block I2 of stream B in the second track buffer 23b starts. At the same time, transfer of data B1 to the second video decoder 69d starts. Accordingly, the buffer amount at t=t6 is ½ ILB. When 2-angle recording of a progressive signal according to the present invention is performed, it is necessary to perform a track jump to the interleave block I5 over the interleave blocks I3 and I4 since there are four streams, i.e., four interleave blocks. During the jump period 197 (tj), data input from the optical disk is interrupted. Thus, the buffer amount of the stream B is reduced until t=t8, when the buffer amount is close to zero.

Since input of data B2 of the interleave block I6 starts at t=t8, the buffer amount starts increasing again. At t=t11, the memory amount of the second track buffer is ½ ILB. At t=t11, a track jump to the interleave block I9 of A3 over the interleave blocks I7 and I8 is performed.

The above-described operation is repeated.

Now, the minimum necessary memory capacity for a track buffer 23 (total capacity of the first and second track buffers 23a and 23b) according to the system of the present invention will be checked. A track buffer capacity 198 indicated by dotted line in part (4) of FIG. 45 shows the total data amount in the first and second track buffers 23a and 23b. A continuous reproduction is realized by setting the total capacity of a minimum 1 ILB in the track buffer.

According to the present invention, the total capacity of the track buffers 23a and 23b is set to be 1 interleave block or more for progressive reproduction. Thus, overflow and underflow of the track buffer are prevented. A method for switching the system clock STC between two streams will be described with reference to FIG. 31. A progressive signal includes two streams A and B. Here, the streams of two interlace signals forming a 1 ILB progressive signal are referred to as A1 and B1. As shown in part (1) of FIG. 31, data A1 for stream A is reproduced during the ½ ILB time period and all the data is recorded in the buffer. Then, as shown in part (2) of FIG. 31, data for stream B is reproduced as B1 and stored in the buffer after A1 is reproduced. Since the data reproduced from the optical disk is restricted with stream B (part (2) of FIG. 31) as described above, the track buffer does not overflow. Stream A (part (3) of FIG. 31) or stream clock (SCR) from the track buffer for stream B is reset substantially in synchronization with the start J of the reproduction of stream B (part (2) of FIG. 31). Since stream B is output at the speed of 2×, the stream clock is counted at the speed of 1× as shown in part (3) of FIG. 31, i.e., at half the speed of stream B due to the buffer. At point G, the stream clock is reset. Time VPTS2 at which the video signal for stream B is output needs to be synchronized with time VPTS1 in consideration of the delay time period Tvd due to, for example, MPEG decoding time period. In this case, at point I (t=Ti), when the VPTS stops rising, AV synchronization control is restarted. By checking VPTS2 of stream B and synchronizing VPTS1 of stream A to VPTS2, synchronization is realized by one-system simple control. VPTS1 can be used additionally.

Audio data of synchronizing stream B is reproduced and the system clock is switched at point H using APTS of stream B as shown in part (4) of FIG. 31. Regarding a sub picture signal of stream B, the system clock can be switched in a similar manner.

By using data of stream B with priority, AV synchronization is realized with simple control.

All the data in streams. A1 and A2 is stored in the buffer memory, the buffer memory does not overflow. Stream B1 may possibly overflow. However, according to the present invention, the synchronization control is performed using stream B and the system clock is switched to control the signal flow so that VPTS2 does not exceed the VPTS threshold level as shown in part (6) of FIG. 31. Therefore, the buffer does not overflow.

According to the present invention, the audio signal of stream B is used for audio reproduction. Therefore, the buffer amount of audio decoder is reduced to ½. Furthermore, by the system clock is switched at point H (t=Th) as shown in part (4) of FIG. 31, the audio signal is reproduced smoothly without exceeding the APTS threshold level. The sub picture information is also reproduced with smooth synchronization. Accordingly, picture, audio and sub picture (subtitles or the like) signals are synchronized, and picture and audio are reproduced seamlessly. The audio signal and the sub picture signals of stream A can be omitted. In the embodiment where the audio and sub picture signals are put into stream B so that stream B2 is reproduced by an existing reproduction apparatus, and reproduction of stream A is controlled by the second video signal output control information provision section 179; a picture with no audio signal is prevented from being output. By omitting the audio and sub picture data of stream A, progressive picture software, for example, a 2-hour movie, can be recorded in one two-layer disk by the interleave block recording system according to the present invention. Such an effect will be described. In the case of a movie, data for about 2 hours and 15 minutes can be recorded on a one-layer 4.7 GB DVD. In order to perform 2-channel recording of a progressive picture without finding a differential, 9.4 GB is required. A picture signal requires 4 Mbps, and sub picture and audio signals require almost 1 Mbps. When the audio signal of 1 Mbps is recorded in one stream, a total of only 9 Mbps is sufficient. In other words, only 90% of the data amount, i.e., 8.5 GB (90% of 9.4 GB) is sufficient. Therefore, a two-layer disk accommodates the data for one layer and a progressive signal.

The synchronization method of the present invention functions as follows. Where an interleave block of stream A is recorded first and then an interleave block of stream B is recorded on the optical disk, when the first data (e.g., stream A) is stored in a track buffer and the next data (e.g., stream B) is reproduced, the synchronization information of stream B is mainly used. Specifically, the system clock is switched so that the video time stamp of stream B (VPTS2) does not exceed the threshold value of VPTS2. In this manner, video and audio signals are reproduced in synchronization with each other with no disconnection. Stream A can be read from the buffer in synchronization with the time information such as VPTS2 (time stamp of stream B). Thus, the control is simple.

As described above, according to the present invention, the first stream is once accumulated in a buffer and only the second stream is processed with synchronization. Thus, the control is accurate and simple. Overflow and underflow can be prevented by setting the size of the buffer memory to be 1 ILB or more.

An existing DVD reproduction apparatus uses a 100 to 300 kB buffer memories, which is about ⅕ of the standard 1 ILB. According to the present invention, smooth reproduction is performed with the standard 1 ILB buffer memory. 1 ILB corresponds to 0.5 to 2 seconds. Since the wait time period in the case of multiple angle reproduction can be only about 1 second, 1 ILB is actually considered to correspond to 0.5 to 1 second. In order to handle an 8 Mbps stream corresponding to 1 second, a buffer memory of 1 MB or more is usable in the reproduction apparatus according to the present invention.

Figure 30:
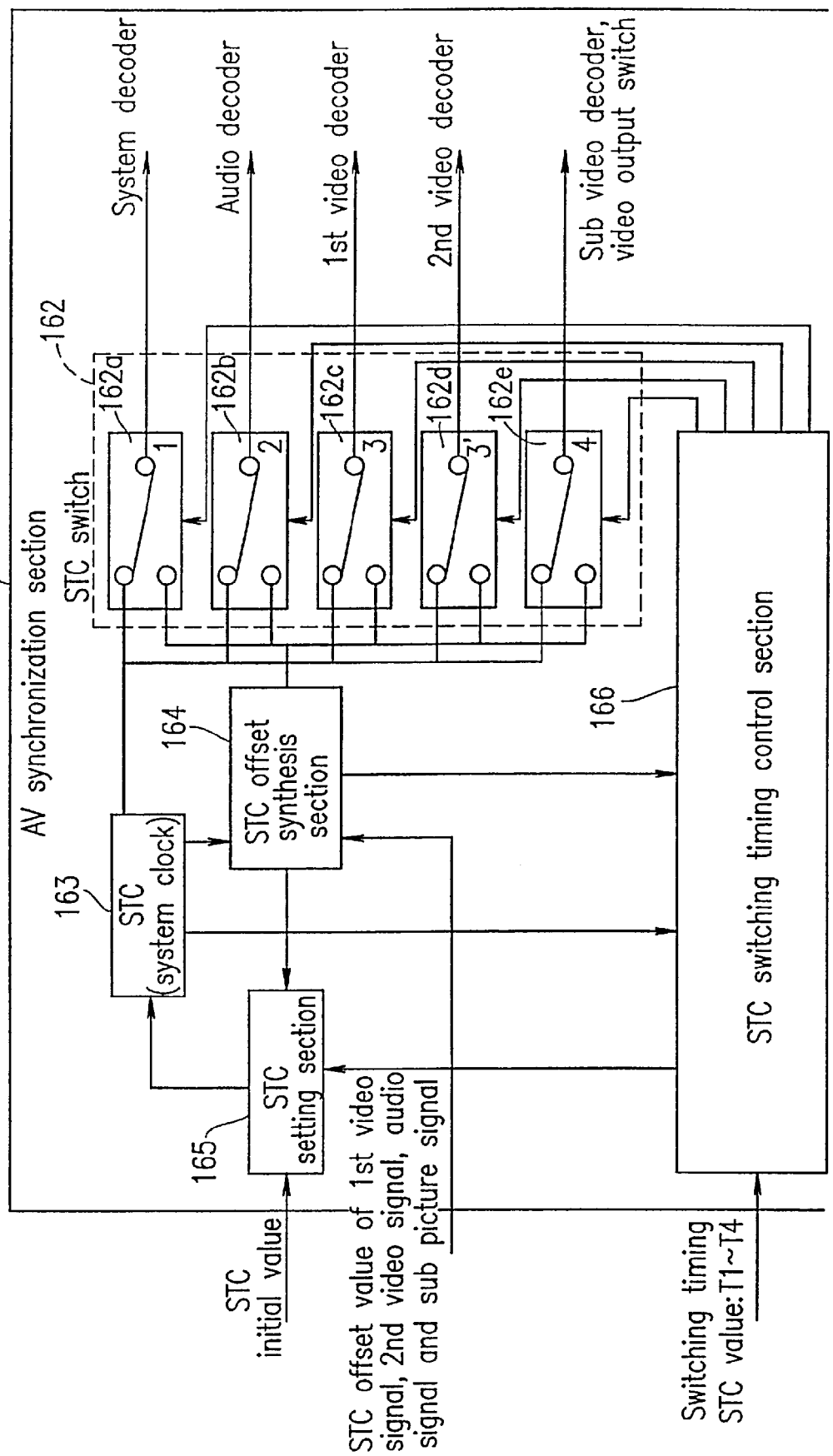
FIG. 30 is a block diagram showing a structure of a part of an AV synchronization control 12-10, the part performing AV synchronization, in one example according to the present invention.

The synchronization control section 166 in FIG. 30 can switch the system clock using the synchronization data regarding the interleave blocks I2 and I6 of the second video signal to realize seamless reproduction between interleave blocks. During data reproduction for interleave blocks I2 and I6, the motor rotation speed reproduction track is controlled while monitoring the buffer amount of stream B. Thus, the memory amounts of the track buffers 23a and 23b can be optimized so as not to overflow. All the data for the interleave blocks I2 and I6 of stream A is in the track buffer 23a and is not suitable to optimize the buffer size. When audio data of the interleave blocks I1 and I5 is used for reproduction, it is required to accumulate the one interleave block or more of audio data and sub picture data in the track buffer 23 (FIG. 39) and the audio decoder buffer 172 (FIG. 39) as shown in part (3) of FIG. 45 in order to match the time stamp of the audio data with the time stamp of the video output of parts (8) and (11) of FIG. 45. By contrast, when the audio data of the interleave blocks I2 and I6 is used, ½ ILB data is sufficient as shown in part (5) of FIG. 45. Accordingly, the required memory amount of the track buffer 23 (FIG. 39) and the audio decoder buffer 172 (FIG. 39) is reduced to half.

As shown in FIG. 45, for reproducing data of interleave blocks I1 and I2 including the main signal of a progressive signal and data of interleave blocks I5 and I6 including the interpolation of the progressive signal, the interleave blocks I5 and I6 can be stored in the buffer and then the motor rotation can be controlled based on the reproduction data regarding the interleave blocks I2 and I6. Thus, the memory amount of the buffer is reduced. The system clock of the AV synchronization control section 158 in FIG. 30 can be switched based on the system clock of the interleave blocks I2 and I6. Thus, stable decoding is realized without causing the buffer to overflow.

The method of skipping the first field of a VOB of a progressive signal is described with reference to FIG. 37. A second practical method is carried out with the recording apparatus 99 shown in FIG. 22. Among an Odd First identifier 199 obtained by interlace transform and an Even First identifier 200, only the Even First identifier 200 is transformed by an Even/Odd transform section 201 into an Odd First identifier 202 and provided to each piece of MPEG data. Thus, all the VOBs start with an Odd First identifier.

As shown in FIG. 21, the reproduction apparatus reproduces the data regarding the Odd First identifier 199 and the data regarding the Odd First identifier 202 obtained from the Even First identifier. In step 203, it is checked whether or not a progressive signal is reproduced. If yes, in step 204, the Odd First identifier of the second video signal is transformed into an Even First identifier 200a and sent to the interlace transform section 71b of the MPEG decoder. If no, the identifier is not transformed. The interlace transform section 71b outputs the field of the frame picture of the second video signal first. Thus, an Even First picture is output. The synthesis section 90 synthesizes the Even First picture of the second video signal and the Odd First picture of the first video signal and outputs a normal progressive picture. By this method, all the interleave blocks start with an Odd First picture, and thus seamless multiple angles are reproduced with no problem by a DVD reproduction apparatus. Since each interleave block is restricted to start with an Odd First picture for seamless multiple angle reproduction, the dummy field need not be inserted. Thus, the recording efficiency is not reduced.

According to the second method of even/odd transform, the first video signal is normally reproduced even with an existing reproduction apparatus. However, when interlace transform is performed in accordance with the Odd First identifier of the second video signal by the existing reproduction apparatus, the odd field and the even field are inverted. Thus, a low quality picture with a lower resolution is output. In order to avoid this, when a conventional reproduction apparatus is used, information regarding the restriction on the reproduction of the second video signal by the DVD format is recorded on the optical disk 85 by the second video signal output restriction information provision section described with reference to FIG. 40. Thus, the second video signal is not reproduced by the existing reproduction apparatus, and the situation where the user views unpleasant picture is avoided.

With the recording apparatus, an Odd First picture (field picture) and a transformed Odd First picture (field picture), both of which are field pictures, are compressed respectively by compression sections 81a and 81b by variable encoding. When motion detection and compensation are performed separately, encoding of a picture which is difficult to compress results in separate block distortions. When such encoded signals are synthesized into a progressive signal, the decoded picture is deteriorated with noise. In order to avoid this, motion detection compensation is performed with an identical motion vector by one motion detection/compensation section 205 for encoding. Such processing matches the block distortion when the two fields are decoded. The matched block distortion is less conspicuous. Furthermore, the load for encoding is reduced.

Next, an operation of the AV synchronization section 158 will be described in detail.

The AV synchronization section is one of the most important sections of the present invention.

First, an operation of a system control section in FIG. 5 will be described. The system control section 21 determines whether or not an optical disk has been set (inserted) in the reproduction apparatus. Once the optical disk is detected to be set, the system control section 21 controls a mechanism control section and a signal control section to control the disk rotation until stable reading is performed. When the stable reading is performed, the optical pickup is moved to read a volume information file shown in FIG. 28.

The system control section 21 further reproduces a program chain group for a volume menu in accordance with volume menu management information in the volume information file shown in FIG. 28. When the program chain group for the volume menu is reproduced, the user can designate data numbers of desired audio data and sub picture data. Reproduction of the program chain group for the volume menu during the reproduction of the data on the optical disk can be omitted when it is not necessary for the specific use of the multi-media data.

The system control section 21 reproduces and displays a program chain group for a title menu in accordance with title group management information in the volume information file. Thus, the system control section 21 reads the file management information of the video file including the title selected based on the user's selection and is directed to the program chain at the start of the title. The program chain group is reproduced.

Figure 29:
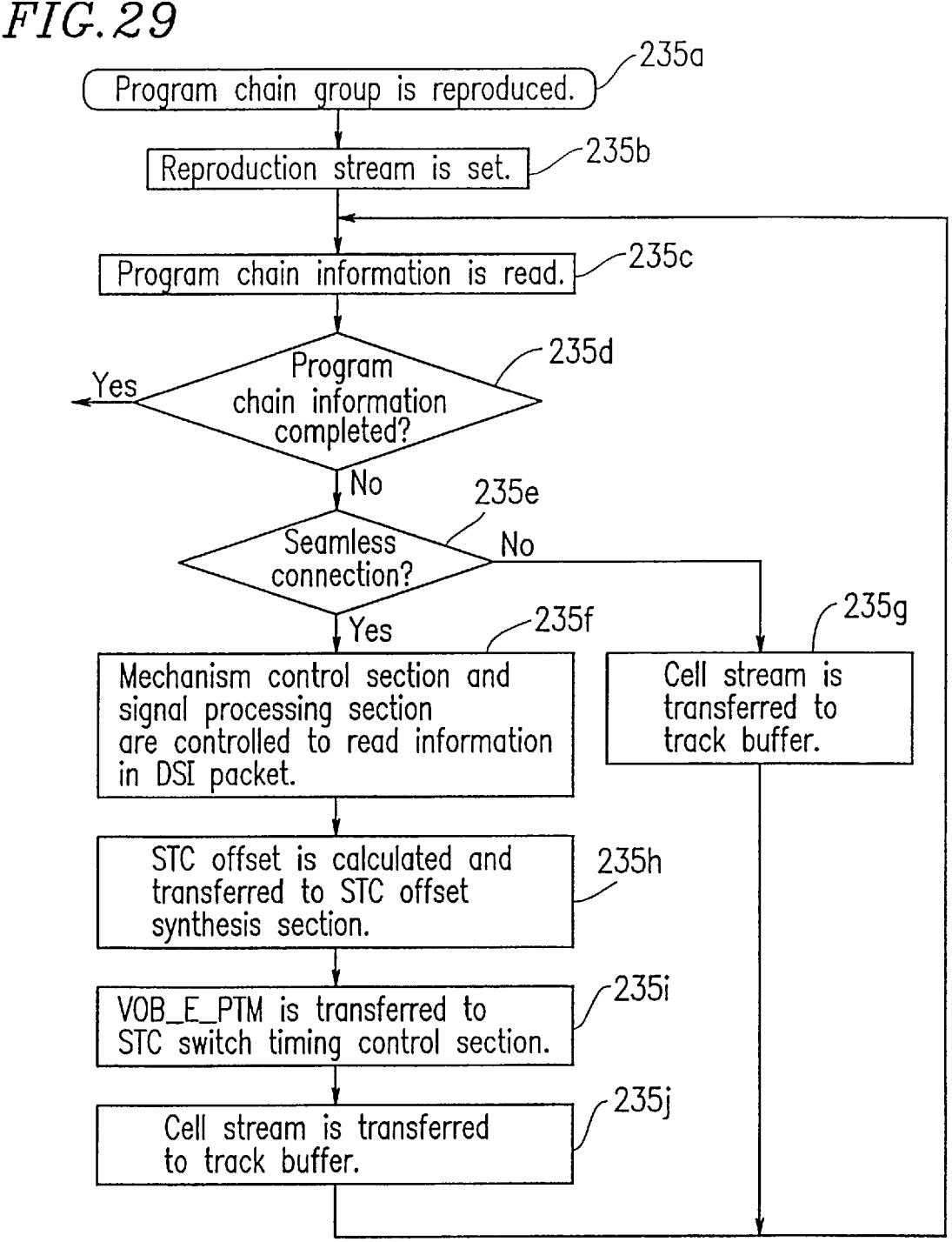
FIG. 29 is a flowchart showing a detailed process for reproducing a program chain group by a system control section M1-9 in one example according to the present invention.

FIG. 29 is the flowchart showing a detailed process of reproduction of the program chain group performed by the system control section 21. As shown in FIG. 29, in steps 235*a*, 235*b* and 235*c*, the system control section 21 reads corresponding program chain information from the volume information file or a program chain information table of the video file. When the program chain is not completed in step 235*d*, the processing advances to step 235*e*.

In step 235*e*, it is determined whether or not the current cell and the immediately previous cell should be connected seamlessly referring to seamless connection instruction information for the cell to be transferred next in the program chain information. If yes, the processing goes to step 235*f* for seamless connection processing. If no, ordinary connection is performed.

In step 235*f*, the mechanism control section and the signal processing section, for example, are controlled to read DSI packets, so that VOB reproduction end time (VOB_E_PTM) in the DSI packet of the cell which has been transferred and VOB reproduction start time (VOB_S_PTM) in the DSI packet of the cell to be transferred next are read.

In step 235*h*, "VOB reproduction end time (VOB_E_PTM)-VOB reproduction start time (VOB_S_PTM)" is found. The resultant value is sent to the STC offset synthesis section 164 in the AV synchronization control section 158 in FIG. 30 as an STC offset value between the current cell and the immediately previous cell which has been transferred.

Simultaneously, in step 235*i*, VOB reproduction end time (VOB_E_PTM) is transferred to an STC switch timing control section 166 as switching time T4 for an STC switch 162*e*.

The system control section 21 then instructs the mechanism control section to continue reading data until the terminal position of the current cell. Thus, the data for the current cell is transferred to the track buffer 23 in step 235J. Upon completion of the transfer, the program chain information is read in step 235*c*.

If it is determined a seamless connection is not necessary in step 235*e*, the data is transferred to the track buffer 23 until the end of the system stream, and then program chain information is read in step 235*c*.

Hereinafter, two examples of a method for AV synchronization control for seamless connection and seamless reproduction will be described. In other words, the AV synchronization control section 158 shown in FIGS. 26 and 39 will be described in detail.

Referring to FIG. 39, a system decoder 161, an audio decoder 160, video decoders 69*c* and 69*d*, and a sub picture decoder 159 are all synchronized to a system time clock given by the AV synchronization control section in FIG. 30 to process the data in the system stream.

Regarding a first method, the AV synchronization control section 158 will be described with reference to FIG. 30.

In FIG. 30, the AV synchronization control section includes STC switches 162*a*, 162*b*, 162*c* and 162*d*, an STC 163, an STC offset synthesis section 164, an STC setting section 165 and an STC switch timing control section 166.

The STC switches 162*a*, 162*b*, 162*c*, 162*d* and 162*e* switch between an output value of the STC 163 and an output value of the STC offset value synthesis section 164 as a reference clock to be provided to the system decoder 161, the audio decoder 160, the main video decoder 69*c*, the sub video decoder 69*d* and the sub picture decoder 159, respectively.

The STC 163 is a reference clock of the entire MPEG decoder shown in FIG. 39 in ordinary reproduction.

The STC offset synthesis section 164 continues outputting a value obtained by subtracting the STC offset value provided by the system control section from the value of the STC 163.

The STC setting section 165 sets an STC initial value given by the system control section or an STC offset synthesis value given by the STC offset synthesis section 164 in the STC 163 at the timing given by the STC switch timing control section 166.

The STC switch timing control section 166 controls the STC switches 162*a* through 162*e* and the STC setting section 165 based on STC switch timing information given by the system control section, the STC 163, and the STC offset synthesis value given by the STC offset synthesis section 164.

The STC offset value is an offset value used for changing the STC value when system stream #1 and system stream #2 having different STC initial values are continuously reproduced.

The STC offset value is specifically obtained by subtracting the "VOB reproduction start time (VOB_S_PTM)" described in the DSI of system stream #2 to be reproduced next from the "VOB reproduction end time (VOB_E_PTM)" described in the DSI of system stream #1 reproduced first. The information regarding the display of such a value is pre-calculated by reading data from the optical disk in FIG. 5 by the system control section 167 when the data is input to the track buffer 23.

The calculated offset value is supplied to the STC offset synthesis section 164 before the last pack of system stream #1 is input to the system decoder 161.

Except for seamless connection control, the data decoding processing section 165 in FIG. 5 operates as an MPEG decoder. The STC offset value given by the system control section 21 is 0 or an arbitrary value. The STC switches 162*a* through 162*e* always is selected to be connected to the STC 163.

Figure 38:
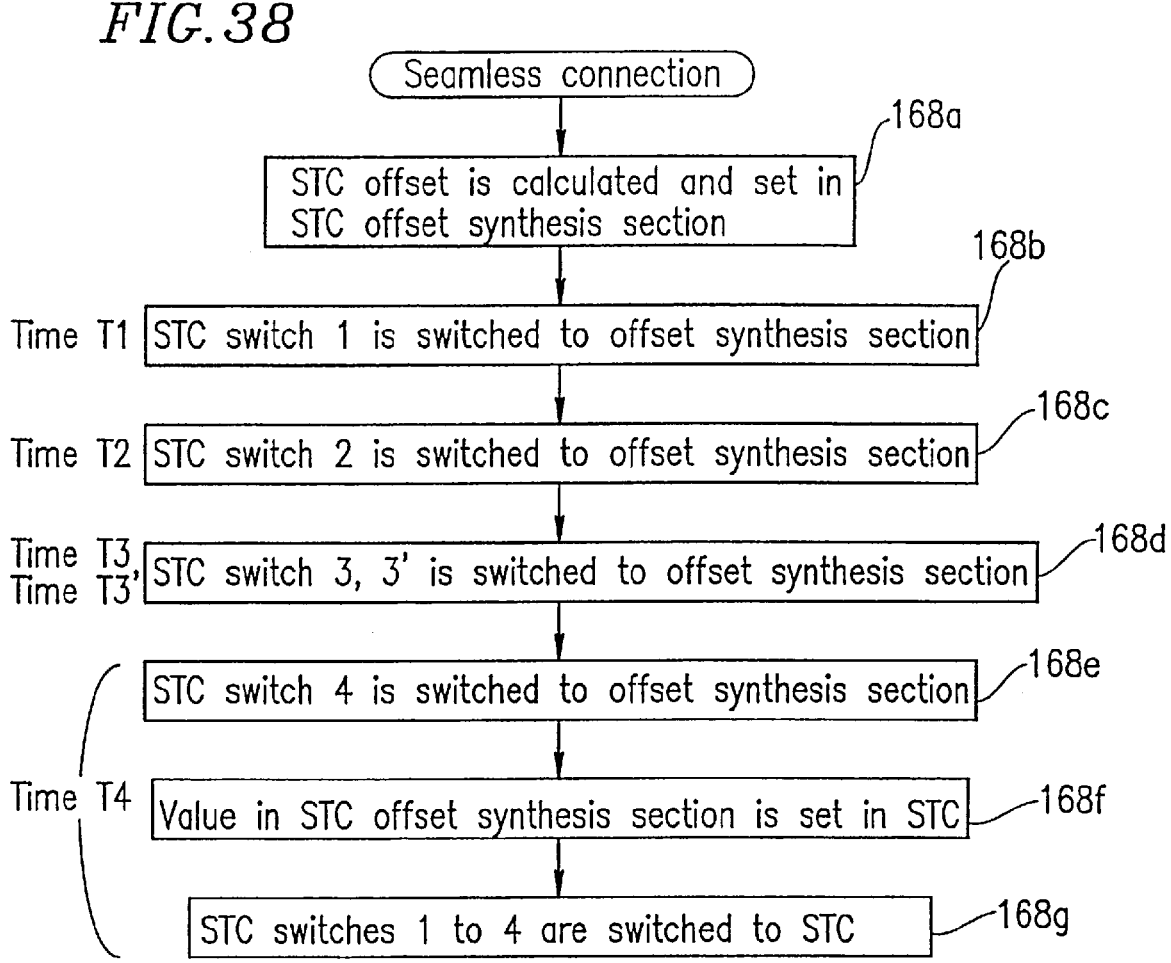
FIG. 38 is a flowchart illustrating a process of STC switching for seamless connection in one example according to the present invention.

With reference to FIG. 38, switching of the STC switches 162*a* through 162*e* in the connection part of the system control section and an operation of the STC 163 when two system streams having non-continuous STC values, such as system streams #1 and #2, are continuously input to the system decoder 161 will be described.

The SCR, APTS, VPTS and VDTS of the system streams #1 and #2 to be input will not be described.

In the STC 163, an initial STC value corresponding to system stream #1 which is being reproduced is set by the STC setting section 165, and the value is sequentially counted up in accordance with the reproduction. The system control section 167 (FIG. 5) calculates the STC offset value by the above-described method and sets this value in the STC offset synthesis section 164 before the last pack of system stream #1 is input to the decoder buffer. The STC offset synthesis section 164 continues outputting a value obtained by subtracting the STC offset value from the value of the STC offset 163.

The STC switch timing control section 166 obtains time T1, at which the last pack of system stream #1 reproduced first is input to the decoder buffer, and switches the STC switch 162a to the output side of the STC offset synthesis section 164 at time T1 (step 168b).

Thereafter, the STC value referred to by the system decoder 161 is provided with an output from the STC offset synthesis section 164. The transfer timing of system stream #2 to the system decoder 161 is determined by the SCR described in the pack header of system stream #2.

Next, the STC switch timing section 166 obtains time T2, at which the reproduction of the last audio frame of system stream #2 is terminated, and switches the STC switch 162b to the output side of the STC offset synthesis section 164 at time T2 (step 168c) at time T2. A method for obtaining time T2 will be described later.

Thereafter, the STC value referred to by the audio decoder 160 is provided with an output from the STC offset synthesis section 164. The output timing of system stream #2 is determined by the APTS described in the audio packet of system stream #2.

Next, the STC switch timing section 166 obtains time T3 and T3', at which the decoding of the last video frame of the main signal and the sub signal of system stream #1 reproduced first is terminated, and switches the STC switches 162c and 162d to the output side of the STC offset synthesis section 164 at time T3 and T3' (step 168d). A method for obtaining time T3 will be described later. Thereafter, the STC value referred to by the video decoders 69c and 69d is provided with an output from the STC offset synthesis section 164. The video decoding timing of system stream #2 is determined by the VPTS described in the video packet of system stream #2.

Next, the STC switch timing section 166 obtains time T4, at which the reproduction output of the last video frame of system stream #1 reproduced first is terminated, and switches the STC switch 162e to the output side of the STC offset synthesis section 164 at time T4 (step 168e). A method for obtaining time T4 will be described later.

Thereafter, the STC value referred to by the video output switch 169 and the sub picture decoder 159 is provided with an output from the STC offset synthesis section 164. The video output timing and sub picture output timing of system stream #2 are determined by the VPTS and SPTS described in the video packet and the sub picture packet of system stream #2.

When switching of the STC switches 162a through 162e is completed, the STC setting section 165 sets the value given by the STC offset synthesis section 164 in the STC 163 (step 168f) (referred to as "reloading of the STC 163) and switches all the switches 162a through 162e to be connected to the STC 163 (step 168g).

Thereafter, the STC value referred to by the audio decoder 160, the video decoders 69c and 69d, the video output switch 169 and the sub picture decoder 159 is provided with an output from the STC 163, and the operation returns to the ordinary operation.

Now, two means for obtaining time T1 through T4 for switching the STC will be described.

According to first means, information representing time T1 through T4, which can be easily calculated when the streams are created, is recorded on the disk. The system control section 21 reads the information and sends the information to the STC switch timing control section 166.

Especially as T4, "VOB reproduction end time (VOB_E_PTM)" described in the DSI is used as it is.

On the disk, the value obtained based on the STC value used in system stream #1 reproduced first is described, and the STC switch timing control section 166 switches the STC switches 162a through 162e at the moment the value of the STC 163 becomes time T1 through T4.

According to second means, based on the timing when the leading data of system stream #1 is written in the track buffer 23, the video decoder buffers 171 and 171a, and the audio decoder buffer 172, the time for reading the leading data is obtained.

Assuming that the track buffer 23 is a ring buffer including a writing pointer, a reading pointer and a data memory, the system control section 21 specifically reads an address indicated by the writing pointer and an address indicated by the reading pointer. Based on an address indicated by the writing pointer and an address indicated by the reading pointer when a target pack is written, the system control section 21 detects the moment when the pack written immediately before is read.

When reproduction of system stream #1 is completed and reproduction of system stream #2 is started, the system control section 21 indicates the leading address of system stream #2 on the optical disk for reading. Accordingly, the system control section 21 learns the moment when the leading data of system stream #2 is stored in the track buffer 23. Next, time T1 is obtained by marking the address where the leading pack of system stream #2 is written and setting the moment when reading of the immediately previous pack is completed as Ti.

The moment T1 is obtained, the system control section 21 informs T1 to the video decoders 69c and 69d and the audio decoder 160. Thus, the video decoders 69c and 69d and the audio decoder 160 learn that the leading packet of system stream #2 will be transferred to the video buffer 171 and the audio buffer 172 thereafter.

Accordingly, the two video decoders 69c and 69d and the audio decoder 160 learn the moment when the last packet of system stream #1 is transferred and obtain T2 and T3 by managing each decoder buffer in the same manner as the buffer management of the track buffer 23.

In the case where T1 is detected, all the data has been read from the video decoder buffer 171 or audio decoder buffer 172 (immediately after the last frame of system stream #1 is decoded), and no data to be written has arrived (when the transfer time period between packs is empty), there is no data to be written. Thus, address management is impossible. Even in this case, the packet of the frame to be decoded next before then next decoding timing (decoding timing of the leading frame of system stream #2) is transferred without fail. Accordingly, the switch timing is learned by setting the moment of transfer of the packet as T2 or T3.

Regarding T4, as described above, "display end time of last frame of the video of system stream #1 (VOB_E_PTM)" can be used as it is.

Next, a second method for seamless reproduction will be described.

FIG. 31 shows at which timing the system stream is reproduced and output after being input to the data decoding processing section in FIG. 38, passed through the decoder buffer and decoded. With reference to FIG. 31, a change in each of APTS and VPTS values at the connection point of system streams #1 and #2 will be described, and a method for AV synchronization control at the seamless connection area during the actual stream processing will be described.

Then, with reference to the graph in FIG. 31, a method for performing seamless connection control in accordance with the process represented by the flowchart in FIG. 43 will be described.

The starting timing of the seamless connection control is as shown in part (3) of FIG. 31 regarding SCR. While the SCR value in the graph is increasing, system stream #1 is transferred from the track buffer 23 (FIG. 5) to the data decoding processing section 16 (FIG. 5). Only at point G when the transfer of system stream #1 is completed and transfer of system stream #2 is started, the SCR value is "0". Accordingly, it is found that new system stream #2 is input to the data decoding processing section 16 by finding point G at which the SCR value is "0". At this point (time Tg), the synchronization mechanism control section can turn off (release) the AV synchronization mechanism of the reproduction output section.

It can be detected that the SCR value is "0" after the signal read from the optical disk is processed or written into the track buffer 23. The AV synchronization mechanism can be turned off based on the detection at this point.

In order to determine the timing at which AV synchronization mechanism once turned off should be turned on (started) again, it is necessary to know that both the audio output and the video output included in system stream #1 have changed to the audio output and the video output of new system stream #2 to prevent inconsistent reproduction by which the audio and video signals do not match. The moment the audio output of the previous system stream is changed to the audio output, new system stream #2 can be found by detecting point H at which the APTS value stops increasing. The moment the video output of the previous system stream is changed to the video output, new system stream #2 can be found by detecting point I at which the VPTS value stops increasing. Accordingly, the synchronization mechanism control section can restart the AV synchronization at time T1, i.e., immediately after finding that point H and point I both appear.

When the SCR value is not set in the SCR or the APTS value and VPTS value are directly compared with each other during the period from time Tg to time T1, the period in which the AV synchronization mechanism is of f can be further shortened.

In order to realize this, both the APTS value of the audio output data and the VPTS value of the video output data from the data decoding processing section 16 are monitored, and the value which becomes lower first is detected. At this point, i.e., time Th in FIG. 31, the AV synchronization mechanism is turned off.

As is apparent, in order to perform the timing determination based on whether the APTS and VPTS values continue increasing, the APTS and VPTS values need to be reduced at the point where the system streams are connected. In other words, the last APTS and VPTS values in the system stream need to be larger than the maximum initial values of APTS and VPTS in the system stream.

The initial APTS and VPTS values ($\Delta$Tad, $\Delta$Tvd in the figure) are determined as follows.

The initial APTS and VPTS values are each a sum of the time period in which video data or audio data is stored in the video buffer or audio buffer and the reorder of the video (in MPEG pictures, the decoding order and the display order of the pictures do not necessarily match, and display can be delayed by one picture at the maximum with respect to the decoding). Accordingly, the sum of the time period required for the video buffer or audio buffer to become full and the display delay (one frame) is the maximum initial value of APTS or VPTS.

The system stream can be created so that the last APTS and VPTS values in the system stream exceed such values.

In this example, the timing for turning on the AV synchronization mechanism after the system streams are connected has been described to be determined based on whether or not the APTS and VPTS values increase. The timing for turning on the AV synchronization mechanism can be determined using the threshold value as described below. First, audio and video threshold values shown in parts (4) and (5) of FIG. 31 are determined by the reproduction apparatus. These values equal to the maximum initial values of APTS and VPTS described above.

The timing is determined based on whether or not the APTS and VPTS values read by the APTS reading means and VPTS reading means are respectively below the audio threshold value and video threshold value. When the APTS and VPTS values are larger than the audio and video threshold values, data has not been changed to the data of the new system stream. When the APTS and VPTS values are equal to or smaller than the audio and video threshold values, data output of the new system stream has been started. Thus, the timing for turning on and off the AV synchronization mechanism may be found.

The above-described on/off control of the AV synchronization mechanism provides seamless reproduction which is not disturbed at the connection area of the system streams.

(Calculation of the Synthesis Section)

FIG. 98 illustrates in detail the calculation of the synthesis section of the reproduction apparatus shown in FIG. 21 and the division calculation of the recording apparatus shown in FIG. 23.

Part (a) of FIG. 98 illustrates FIG. 23 in detail. Regarding the 525P or other progressive signal, a q'th line data 283 represented by A and a (q+1)th line data 284 represented by B are subjected to the calculation of (A+B)÷2 by a first division calculation section 141 of a division calculation section 285, thereby obtaining a low frequency component M, which is set as the q'th line data of the first stream. In the case of an interlace signal, lines 1, 3 and 5 are created in the p'th field. In the (P+1)th field, the (q+1)th line data, i.e., lines 2, 4 and 6 are calculated on a line-by-line basis. The resultant interlace signal is encoded by a first encoder 82a.

A second division calculation section 143 performs the calculation of A-B. The DVD format and the like do not define a negative value. In order to realize compatibility with the conventional formats, (A−B)÷2 is added to a constant 257 so that a negative value is not obtained. In the case of 8-bit data, 128 is added as the constant 277. As a result of the calculation, an interlace signal is created as the q'th line data 280 (S). The interlace signal is encoded by a second encoder 28b and recorded on the disk by the MADM interleave system.

With reference to part (b) of FIG. 98, a calculation of the synthesis section of the reproduction apparatus shown in FIG. 21 will be described in detail. As shown in part (a) of FIG. 98, the data multiplexed by the MADM system according to the present invention and recorded on the disk 85 is divided into a first stream and a second stream, and processed with decoders 88a and 88b to obtain two video signals. This signal is an interlace signal and a top line first signal (herein after, referred to as "TF") in which the top line is an odd line. In the synthesis section 90, the calculation of (2M+2S−constant)÷2 is performed by the first calculation section 250, where M is the q'th line data of the master signal and S is the q'th line data of the sub signal. As a result, (A+B+A−B+256−256)÷2=A. The q'th line data (A) is obtained and is output as r'th line data 281 (output picture).

As shown in part (a) of FIG. 98, the constant 277 is added by the second calculation section 143. Accordingly, the original data is obtained by subtracting the twice the value of the value (128) obtained by synthesis, i.e., 256. Due to the compatibility, a conventional decoder in which negative values are not defined can be used.

Then, the calculation of (2M−2S+(2×constant)) is performed by a second calculation section 251. As a result, (A+B−A−B−256−256)÷2=B. The (q+1)th line data 284 is obtained and output as (r+1)th line data 282.

Thus, two interlace signals are synthesized, and a progressive video signal having 480 lines (1st through 480th lines) is output.

The system shown in FIGS. 98, 21 and 23 has a feature that division and synthesis can be conducted with only one adder and one subtractor for 8-bit data and 10-bit data and thus the circuit structure is simplified. Thus, a high resolution picture with progressive and wide video signals are obtained with no significant cost increase.

Since a negative value is reproduced simply by adding the constants 278a and 278b to the A-B signal, the conventional decoders 279 and 280 which cannot handle negative values are usable.

As shown in part (a) of FIG. 98, in both the first stream and the second stream, the first line of the first field is an odd line (Top Line First; TF). According an encoder of the DVD format, fields are dropped unless the streams are Top Line First streams. Since each stream is a Top Line First stream according to the system of the present invention, fields are not dropped.

Figure 96:
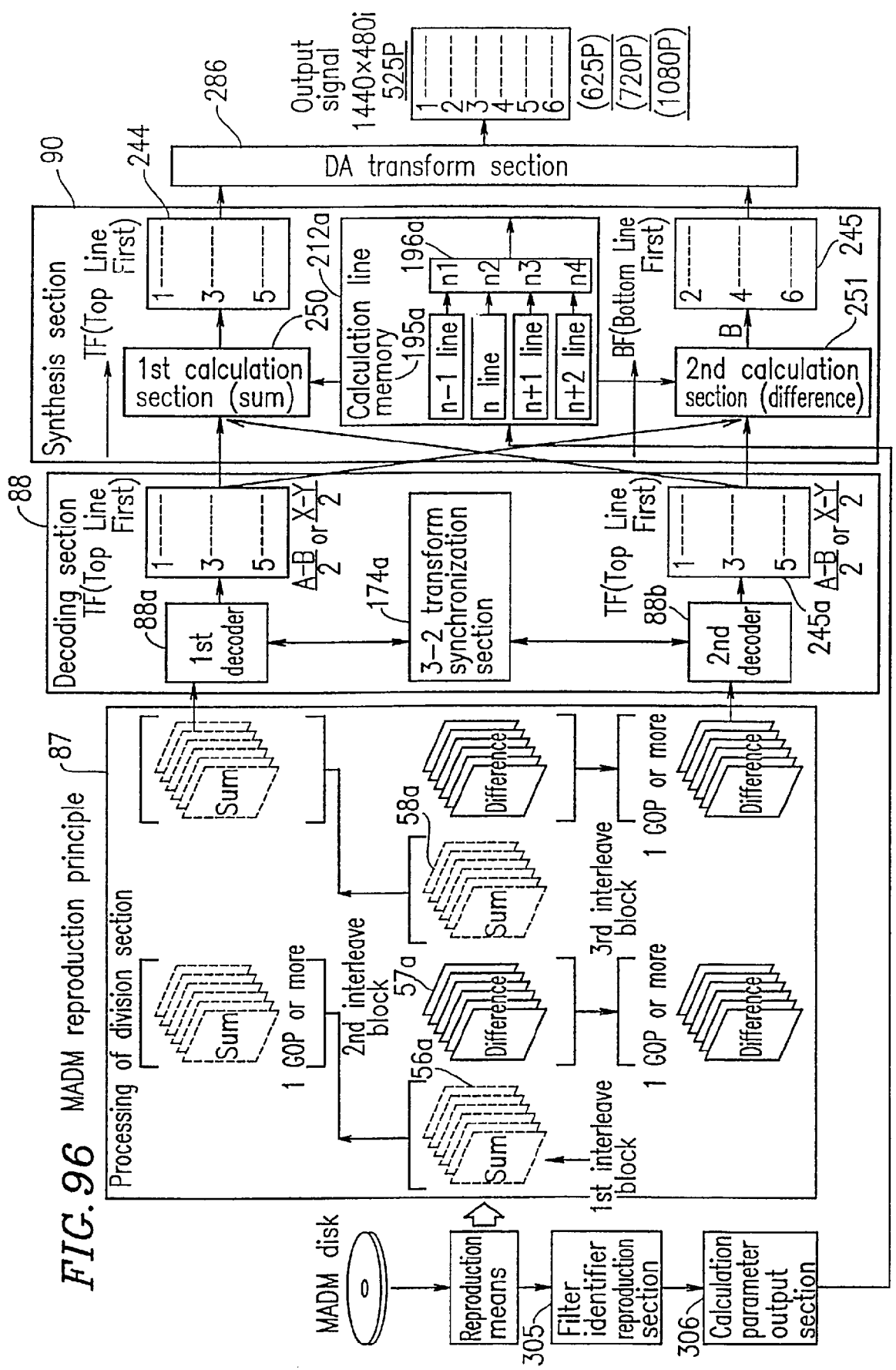
FIG. 96 is a block diagram of a reproduction apparatus for synthesizing two streams in the first example according to the present invention.

FIG. 96 shows an overall operation of the reproduction apparatus shown in part (b) of FIG. 98. A reproduction signal is divided by a division section 87 in units of nGOP into a first stream and a second stream. The first and second streams are decoded by first and second decoders 88a and 88b into two Top Line First (TF) streams. A Top Line First signal 244 and a Bottom Line First signal 245 are created by the first calculation section 250 and the second calculation section 251. Then, an analog signal such as 525P is output by a DA conversion section 266.

Figure 60:
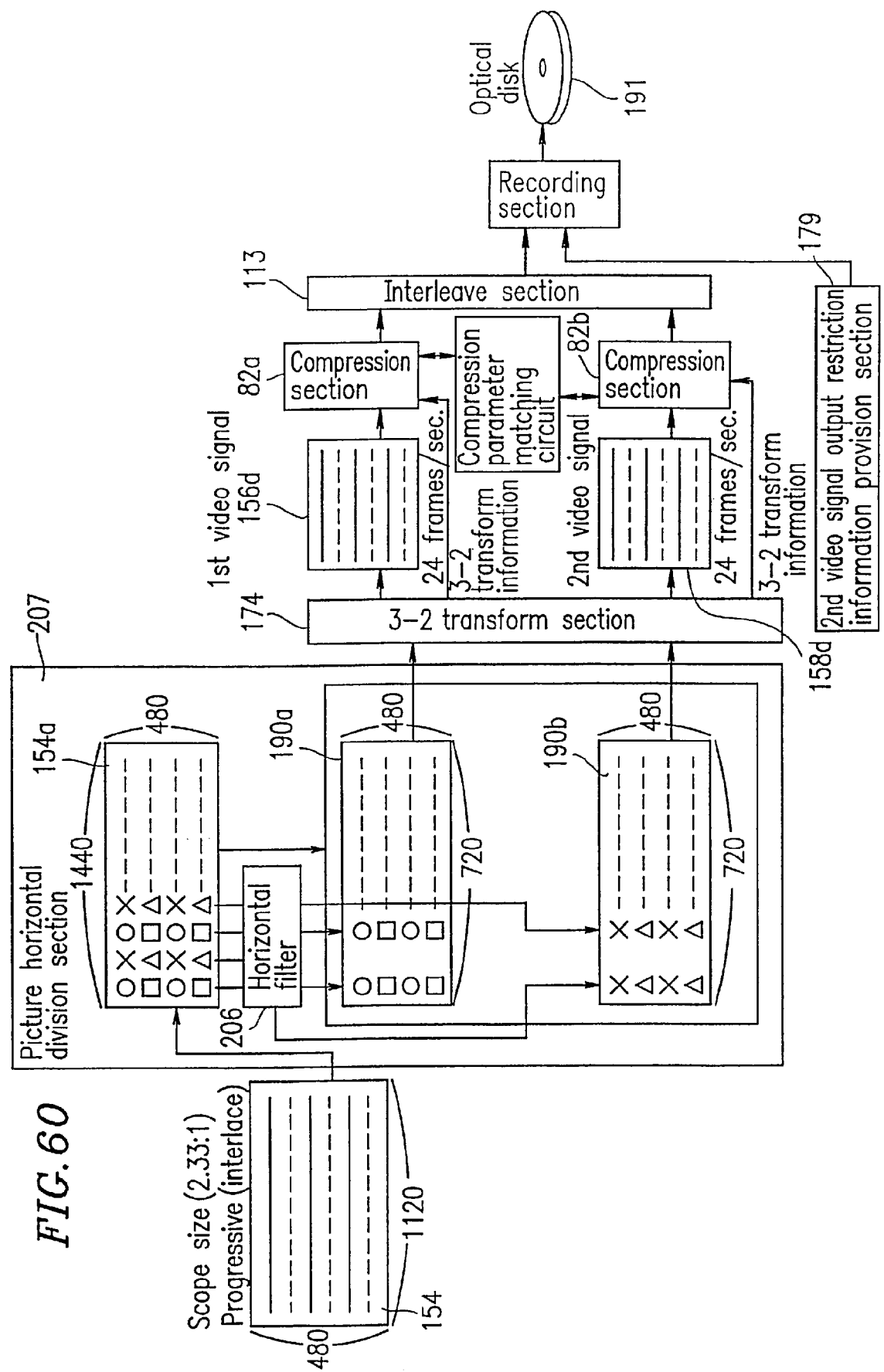
FIG. 60 is a block diagram of a system for dividing a scope-size picture into two in a horizontal direction and recording in the MADM system in one example according to the present invention.
Figure 91:
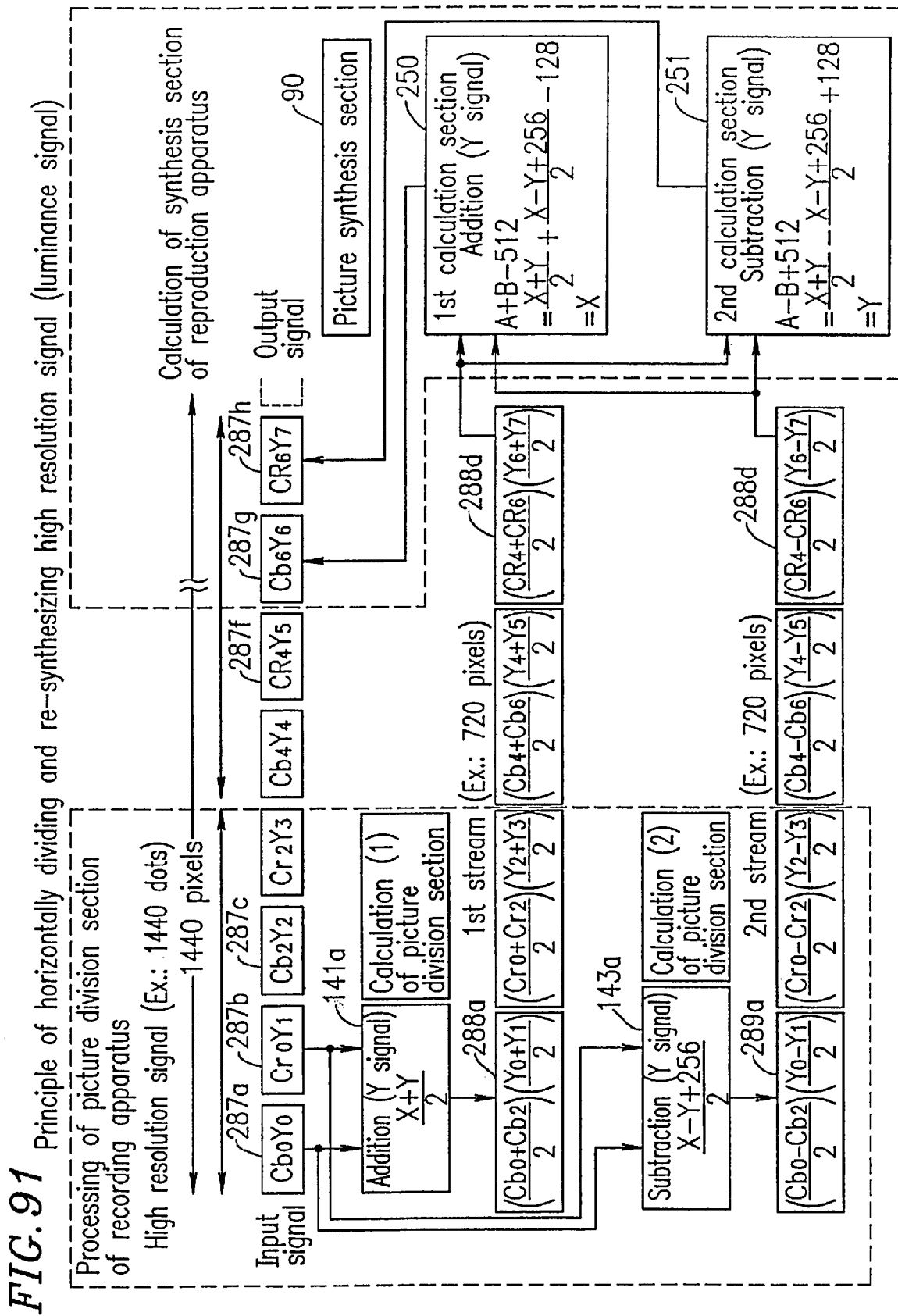
FIG. 91 is a view illustrating the principle of dividing a high resolution video signal in a horizontal direction to obtain two streams, recording the streams, synthesizing the two streams to reproduce the high resolution video signal (luminance signal) in the first example according to the present invention.
Figure 92:
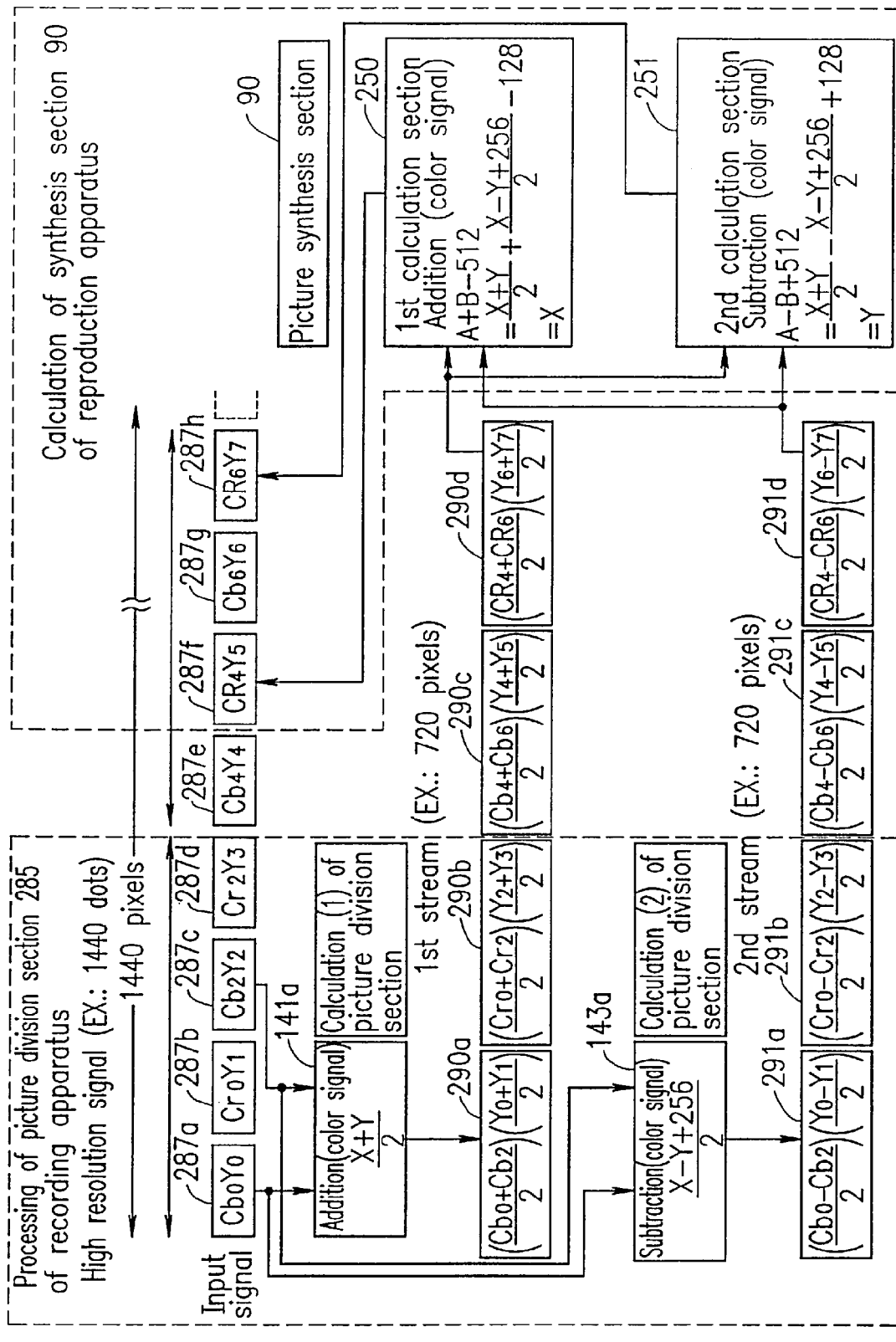
FIG. 92 is a view illustrating the principle of dividing a high resolution video signal in a horizontal direction to obtain two streams, recording the streams, synthesizing the two streams to reproduce the high resolution video signal (color signal) in the first example according to the present invention.

In FIG. 96, two field pictures having the same time stamp are synthesized in a vertical direction. By synthesizing the pictures in a horizontal direction according to the present invention, the horizontal resolution can be doubled. FIGS. 58, 59 and 60 show a recording apparatus, and FIG. 20 shows a reproduction apparatus including a wide picture synthesis section 173. With reference to FIGS. 91 and 92, the principle of the division section of the recording apparatus and the principle of the wide picture synthesis section 173 of the reproduction apparatus will be described in detail.

FIG. 91 shows a method for dividing a luminance signal and a color signal in the left half. Luminance signals Y0 and Y1 of input pixel signals 287a and 287b having a 1440 pixels in the horizontal direction are subjected to addition and subtraction respectively by a first division calculation section 141a and a second division calculation section 141b shown in FIGS. 91 and 92 of the division calculation section 285 in FIG. 98. Thus, a luminance signal of (Y0+Y1)/2 of the first stream and a luminance signal of (Y0−Y1)/2 of the second stream are generated. The input signal having 1440 pixels in the horizontal direction is divided into two video signals each having 720 pixels in the horizontal direction. The first stream is passed through a horizontal filter and thus deprived of a high frequency component. Accordingly, even when only the first stream is output on the screen by the conventional apparatus, aliasing distortion does not occur. Thus, compatibility with the conventional apparatus is obtained. FIG. 92 shows processing of a color signal. An input pixel signal 287a and an input pixel signal 287c with one input pixel signal interposed there between are used. From a signal Cb0 of input pixel signal 287a and a signal Cb2 of the input pixel signal 287c, a sum signal (Cb0+Cb2)/2 is obtained and set as a division pixel signal 290a of the first stream. A difference signal (Cb0−Cb2)/2 is set as a division pixel signal 291a of the second stream. In a similar manner, (Ct0+Cr2)/2 and (Ct0−Cr2)/2 are obtained from input pixel signals 287b and 287d. From these signals, division pixel signals 290b and 291b of the first and second streams are obtained. Thus, a high resolution signal having 1440 pixel in the horizontal direction is divided into two NTSC-grade digital video signals of the CCIR601 and SMPTE295M formats.

Next, the processing of the synthesis section 173 of the reproduction apparatus briefly described with reference to FIG. 20 will be described in detail. In the synthesis section 90 in FIG. 91, division pixel signals 288b and 289b of the first and second streams are added together by the first calculation section 250 by the calculation of (Y6+Y7)/2+(X−Y+256)/2−128=Y6. Thus, the input pixel 287g is obtained. Next, the difference calculation of (Y6+Y7)/2+(X6−Y7+256)/2+128=Y7 is performed. Thus, the luminance signal of the input pixel 287h is obtained. In this manner, a high resolution signal having 1440 pixels in the horizontal direction is obtained from two signals each having 720 pixels in the horizontal direction by a sum calculation and a difference calculation.

Next, synthesis calculation of color signals will be described with reference to FIG. 92. In the case of the Cr signal, the division pixel signals 290d and 291d of the first and second streams are subjected to sum calculation by the first calculation section 250 and difference calculation by the second calculation section 251. Specifically, the calculations of (Cr4+Cr6)/2+(Cr4−Cr6+256)/2−128=Cr4 and (Cr4+Cr6)/2−(Cr4−Cr6+256)/2+128=Cr6 are performed. Cr4 and Cr6 are obtained and assigned to input pixel signals 287f and 287h.

Regarding the Cb signals, similar calculations are conducted on the division pixel signals 290a and 291c. Cr4 and Cr6 are obtained and assigned to input pixel signals 287e and 287g. Thus, the luminance signals and color signals of the input signal are completely synthesized to obtain a high resolution signal having 1440 pixel in the horizontal direction.

By the 2× reproduction apparatus, an interlace signal having 1440 pixels in the horizontal direction is obtained. By the reproduction apparatus shown in FIG. 62, 3-2 transform is performed. In the case where a 24-frames/sec. signal of a movie or the like is recorded, the 24-frames/sec. signal is output a plurality of times by the frame memory by the 3-2 transform section 174. Thus, a 60-frames/sec. progressive video signal is obtained. By doubling the horizontal resolution to 1440 pixels, a wide 525P picture is obtained. Thus, a 1440×480P progressive picture is output.

Thus, by combining the 3-2 transform section 174 and the wide picture synthesis section 173, a 1440×480P high resolution progressive picture is output from a 24P picture such as a movie even by the 2× reproduction apparatus. When such a picture is reproduced by an existing DVD player, only the sum signal of the first stream is reproduced, but horizontal interlace interference does not occur since the picture is horizontally filtered.

Figure 97:
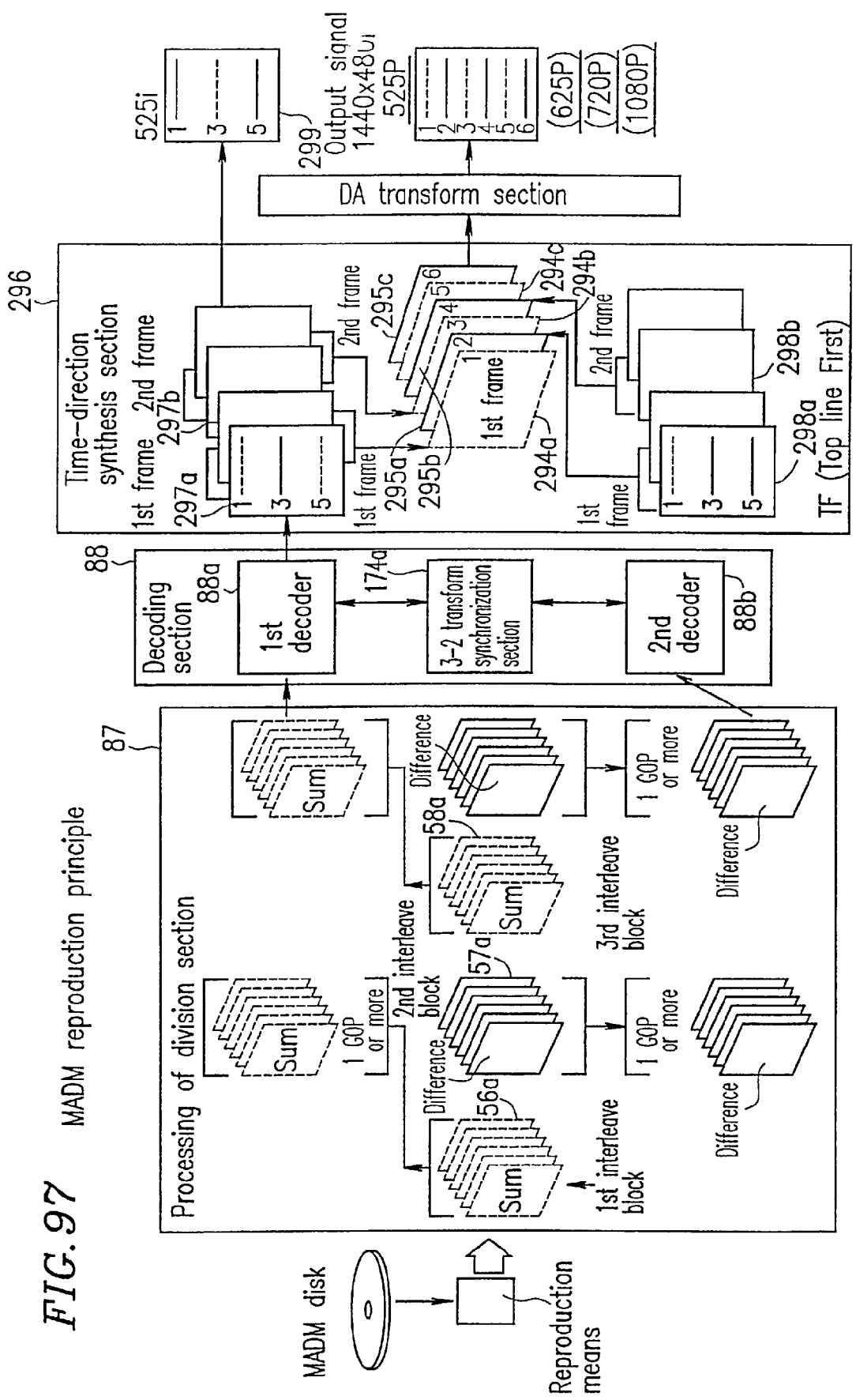
FIG. 97 is a block diagram of a system for reproducing two streams obtained by being divided on a frame-by-frame basis and synthesizing the streams in a time axis in the first example according to the present invention.

With reference to FIG. 97, an operation of reproducing data on an MADM disk will be described. On the MADM disk, a 60-frames/sec. progressive picture is divided into two frames, i.e., an odd frame 294 and an even frame 295. The operation of the division section 87 and the decoding section 88 is the same as described with reference to FIG. 96 and will not be described. In the time direction synthesis section 296, a first field 297a and a second field 297b of the first stream are synthesized into a first odd frame 294a. A first field 298a and a second field 298b of the second stream are synthesized into a first even frame 295a. These frames are synthesized in the time direction in the order of the first odd frame 294a, the first even frame 295a, the first odd frame 294b, and the second even frame 295b every ¹⁄₆₀ second. Thus, a 60-frames/sec. progressive picture is reproduced. By the existing 1× reproduction apparatus, only the first stream is reproduced; i.e., a 525P interlace signal is reproduced and the compatibility is realized. However, the motion is slightly unnatural since the picture is a 30-frames/sec. picture. This system is an MADM system for recording two 30-frames/sec. streams and has the effect of a high encoding efficiency of the MPEG encoder due to the progressive picture.

(Optimization of Buffer Amount)

Figure 87:
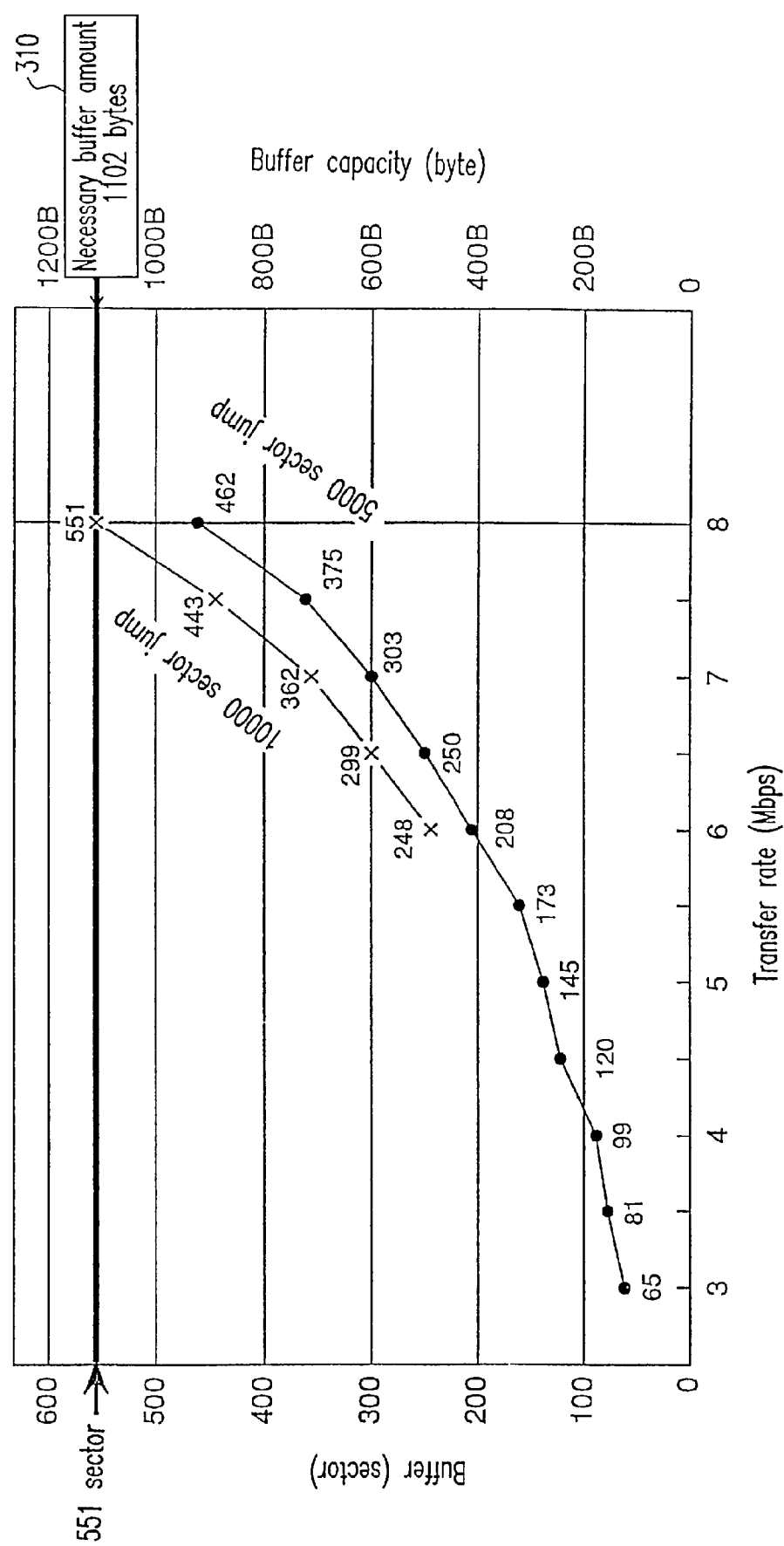
FIG. 87 shows simulation calculation results showing a buffer amount required for simultaneous reproduction in one example according to the present invention.

Regarding the total capacity of the track buffer circuit 23 in FIG. 5, it was described that data for at least one interleave block needs to be accommodated in the track buffer circuit 23 in order to reproduce two streams simultaneously as shown in FIG. 45. With reference to FIG. 87, a buffer amount required for the MADM system reproduction according to the present invention will be calculated. As the capacity of one interleave block, the values in FIG. 87 are obtained by calculation. FIG. 87 shows interleave unit lengths required for 5000-sector and 10000-sector track jumps with respect to each of transfer rates. The maximum transfer rate is 8 Mbps, and the maximum jump length is 10000 sectors. With the minimum of 551 sectors as the interleave unit length, a stable track jump is realized for switching to an interleave unit of another stream even by a 1× drive. In actuality, a drive of more than 1× is used, and thus the length of 551 sectors is not necessary. In consideration of the worst case, the disk manufacturers record an interleave unit of 551 or more sectors for an 8 Mbps stream. Accordingly, a buffer memory for one interleave unit is required by the MADM system according to the present invention as shown in FIG. 45. Stable simultaneous reproduction of two streams is realized by setting a buffer memory of 551 sectors or more and 1102 bytes or more.

(Switching Between Two Pieces of Reproduction Information)

Figure 93:
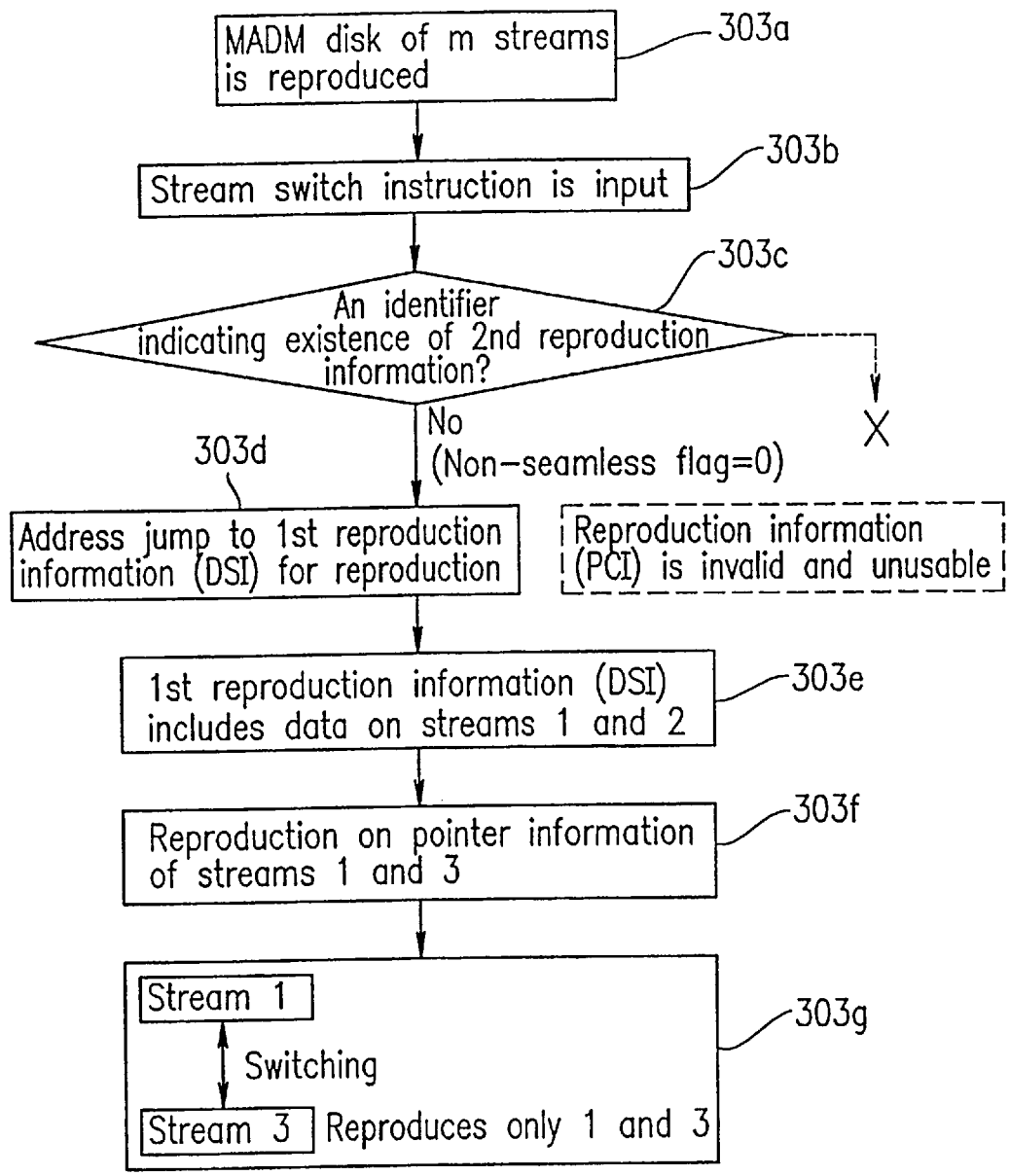
FIG. 93 is a flowchart illustrating the compatibility when an MADM disk in the first example according to the present invention is reproduced by a conventional reproduction apparatus.
Figure 94:
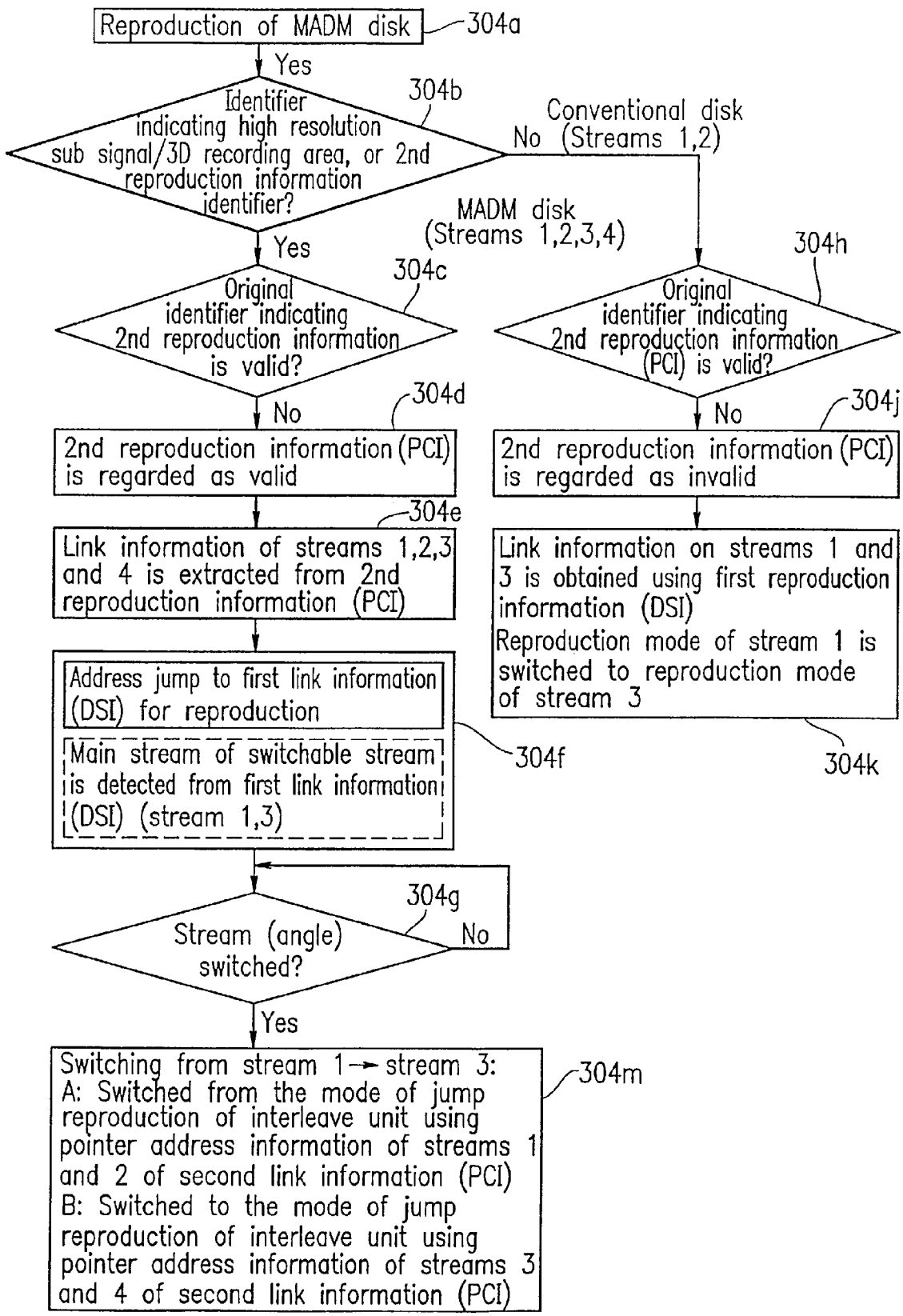
FIG. 94 is a flowchart illustrating an operation of reproducing an MADM disk in the first example according to the present invention by an MADM reproduction apparatus.
Figure 95:
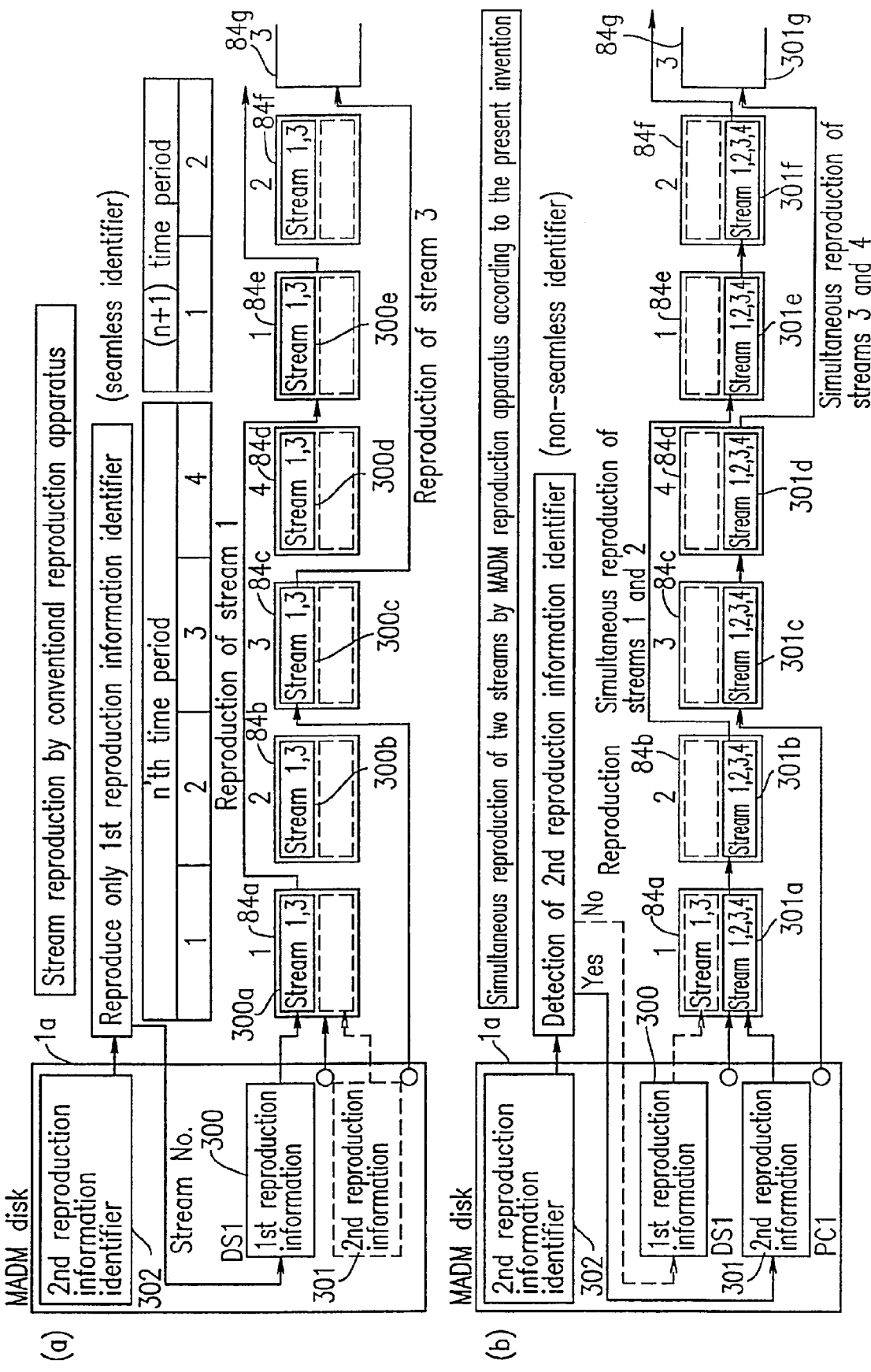
In FIG. 95, (a) is a view illustrating an accessing process using a pointer of first reproduction information when an MADM disk in the first example according to the present invention is reproduced by a conventional reproduction apparatus, and (b) is a view illustrating an accessing process using second reproduction information when an MADM disk in the first example according to the present invention is reproduced by an MADM reproduction apparatus.

FIGS. 93, 94 and 95 illustrate a system for maintaining the compatibility by reproducing the same disk by a conventional apparatus and an apparatus according to the present invention.

FIG. 95 shows an operation of the conventional apparatus for reproducing an MADM system disk according to the present invention in part (a), and shows an operation of an MADM system apparatus for reproducing the MADM system disk in part (b).

An optical disk 1a includes a plurality of (four in the figure) streams recorded in a divided manner. Accordingly, four interleave units 84a, 84b, 84c and 84d having the same information on an n time period are recorded on the optical disk 1a in an order. Also on the optical disk 1a, a second reproduction information identifier 302 is recorded. The second reproduction information identifier 301 indicates that first reproduction information 300 for reproducing streams 1 and 3 and second reproduction information 301 for reproducing streams 2 and 4 are recorded on the optical disk 1a.

As shown in part (c) of FIG. 95, the first reproduction information 300, 300a and 300c has only leading address information regarding the interleave blocks 84a and 84a corresponding to streams 1 and 3, i.e., a pointer. The second reproduction information identifier 302 is not reproduced by an existing reproduction apparatus which does not consider reproduction of MADM data. Thus, the second reproduction information identifier 301 cannot be read or utilized effectively. Accordingly, the conventional apparatus operates as if only streams 1 and 3 are recorded. Streams 2 and 4 are not reproduced at all. A conventional reproduction apparatus reproduces, for example, only the left-eye information from an optical disk having a 3D signal recorded in an MADM system. When 3D display is not conducted, display of a meaningless right-eye picture is prevented.

In the case of an optical disk having a high definition picture recorded in an MADM system, streams 1 and 3 have basic components, for example, NTSC. Streams 2 and 4 have a differential signal, i.e., color less line-drawing. Since streams 2 and 4 are not reproduced by the conventional apparatus, it is prevented that the user views such an unpleasant picture. When such an MADM disk is reproduced by a conventional reproduction apparatus, a normal picture of streams 1 and 3 is reproduced but an abnormal picture of streams 2 and 4 is not reproduced. Accordingly, complete compatibility is realized. This operation will be described with a flowchart. As shown in FIG. 93, in step 303a, an MADM disk having m streams is reproduced. First reproduction information 300a has pointer information on streams 1 and 3, i.e., the leading address of the interleave unit 84e to be jumped to next. The address information is used to conduct a track jump over a plurality of tracks as shown in FIG. 3 to access the leading address of the interleave block 84e. The interleave block 84e is the first block among the subsequent blocks in stream 1 having time information. Thus, data in stream 1 is continuously reproduced.

When an instruction to switch the stream is issued in step 303b, whether there is an identifier showing the existence of a PCI table is present or not is checked in step 303c. A DVD has a PCI identifier (non-seamless) showing the existence of the second reproduction information 301. An MADM disk has a DSI identifier (seamless) showing the existence of the first reproduction information is recorded in lieu of the PCI identifier. When the disk is an MADM disk, the processing advances to step 303d to utilize the DSI table having the first reproduction information. The first reproduction information has pointer information on only streams 1 and 3 in step 303e. Therefore, in step 303f, a track jump is conducted based on the pointer information on streams 1 and 3 to maintain the continuous reproduction mode of stream 1. Alternatively, stream 1 is switched to stream 3, and reproduction is conducted continuously in terms of time but while skipping from data to data. As shown in step 303g, an ordinary NTSC picture of streams 1 and 3 is reproduced, but an unpleasant, unnecessary picture of streams 2 and 4 is not output. Thus, complete compatibility is realized.

A process for simultaneously reproducing two streams out of streams 1, 2, 3 and 4 by the MADM reproduction apparatus will be described with reference to FIGS. 94 and 95. As shown by second reproduction information 301, 301a, 301b, 301c and 301d in part (b) of FIG. 95, the interleave unit 84a has leading address information of the interleave unit 84e, which is the next time information of streams 1, 2, 3 and 4. Since a physical addresses of a sector of an arbitrary interleave unit 84e, 84f, 84g or 84h is found, a track jump is easily conducted. The reason is that the MADM reproduction apparatus reproduces the second reproduction information identifier 302, learns the existence of the second reproduction information, and utilizes the second reproduction information 301.

Thus, simultaneous reproduction of streams 1 and 2 or streams 3 and 4 is performed, and reproduction of a 3D or high resolution signal from an MADM disk is realized. The second reproduction information identifier 302 only needs to distinguish a conventional disk from an MADM disk, and can be even 1-bit data. An MADM identifier indicating the existence of a high resolution signal or 3D signal can be used.

This operation will be described with reference to the flowchart in FIG. 94. In step 304a, an MADM disk is reproduced. In step 304b, it is checked whether there is a second reproduction information identifier 302 or not, or whether there is an MADM high resolution/3D identifier or not. If no, the disk is determined to be a conventional disk and the processing goes to step 304h. If yes, the processing goes to step 304c to check for the identifier of the interleave unit 84. If there is an identifier showing the existence of the second reproduction information, or if there is a seamless identifier in the case of the DVD, the seamless identifier is interpreted as a non-seamless identifier. The second reproduction information, which is not actually valid, is regarded as being valid in step 304d. In step 304e, link information on steps 1, 2, 3 and 4 is extracted from the second reproduction information.

In step 304f, first reproduction information, or a main stream which is switchable from the DSI table in the case of the DVD, is detected. In the example shown in FIG. 95, streams 1 and 3 are found to be main streams. The first reproduction information includes main stream information, and the second reproduction information includes main and sub stream information. Accordingly, the main and sub streams can be distinguished based on the first and second reproduction information. In the case of FIG. 95, the number of stream groups (angles) is found to be 2 by checking the second reproduction information.

When an instruction to switch the stream (angles) is issued in step 304g, a switch from stream 1 to stream 3 is conducted in step 304m. For this, simultaneous reproduction mode (A) for streams 1 and 2 using pointer information on streams 1 and 2 of the second reproduction information is switched to simultaneous reproduction mode (B) for streams 3 and 4. In other words, stepping access to the interleave units 84a, 84b, 84e and 84f is switched to stepping access to the interleave units 84c, 84d and 84g. Thus, two-stream groups can be switched in units of two streams.

Returning to step 304h, when a seamless identifier indicating the second reproduction information is invalid is recorded on the disk, the conventional apparatus regards the second reproduction information (PCI) as being invalid in step 304j. Thus, only streams 1and 3 are reproduced using only the first reproduction information (DSI) in step 304k.

As described above, by detecting either the conventional or the MADM identifier, the second reproduction information which is not valid in accordance with the conventional rule is regarded as being valid. Accordingly, a meaningless or unpleasant picture is not output from the MADM disk even by a conventional apparatus. Thus, the compatibility is improved.

(2-Screen Simultaneous Reproduction)

With reference to FIG. 90, an operation of the 2-screen synthesis section 28 described with reference to FIG. 5 will be described in detail. Although n pieces of screens are used, the representation of 2-screen is used in this specification. To the n-screen synthesis section 28b in FIG. 90, a first picture (A) and a second picture (B) of the first stream, a first sub picture and a second sub picture are input. In a simple structure, a line memory 28c is included. In this case, line-synthesis of the first picture (A) 28p and the second picture (B) 28q results in a picture of mode 1L having two screens side by side is obtained. Audio signals (A) and (B) of the first and second streams are synthesized by an audio mixer 28f. In the case of mode 1L, only the audio signal (A) is output. In mode 2L, a first sub picture of the first stream is synthesized on the screen. Only one sub picture 28r such as subtitles is selected and displayed by the n-screen synthesis section 28b. This has an effect of enlarging the display. In mode 2L, a second audio signal B is output after mixing to the speaker to the right of the screen. Thus, the second audio signal 28s of the second picture B can be listened to at a low volume.

As a higher structure, a frame memory 28d can be used. In this case, zooming of two screens is realized. A zoom signal generation section 28e which has received a zoom instruction signal 28p sends a ratio change signal to the n-screen synthesis section 28 band the audio mixer 28f. When the first picture (A) is enlarged as shown in the 2-screen picture 28i in mode 1, the first audio signal is used. In an opposite case, the second audio signal is output as in the 2-screen picture 28j. Thus, by changing the ratio of the video signals and audio signals of the first and second streams, video and audio can be matched. Pictures of streams 3 through 6 can be displayed in a divided manner as shown in a 2-screen picture 28m.

As described above, in the embodiment where two streams are simultaneously reproduced to output two video signals, and the synthesis of video signals and synthesis of audio signals are performed using the 2-screen synthesis sections 28 and 28b and the audio mixer 28f, two streams, for example, pictures taken by two cameras can be viewed simultaneously.

(Alteration of the Filter)

According to the present invention, a video signal is divided into a low frequency component and a high frequency component by a picture division section 141a shown in, for example, FIG. 22. The division filter can be represented as in FIG. 46. In FIG. 22, division calculation of the first stream is conducted by calculation parameters of m1=0, m2=½, m3=½, and m4=0. Division calculation of the second stream is conducted by calculation parameters of m1=0, m2=½, m3=-½, and m4=0. Under these conditions, a 525P progressive signal is divided into a low frequency component and a high frequency component at the vertical resolution of 250.

The dividing frequency of the border can be altered by changing the calculation parameters of m1, m2, m3 and m4. As shown in FIG. 50, the dividing frequency can be changed from 200, to 250 and to 300, and each filter identifier 144 can be recorded on the optical disk. Thus, the filter identifier 144 is detected by a filter identifier reproduction section 305 of the reproduction apparatus in FIG. 96 during data reproduction, and the set values of calculation parameters of n1, n2, n3 and n4 of the calculation section 212a are changed by a calculation parameter output section 306 in accordance with the filter identifier in FIG. 50. The calculation section 212a of the synthesis section 90 performs calculation by the set values and processes vertical lines n−1, n, n+1 and n+2 based on the calculation parameters 196 of n1, n2, n3 and n4, thereby obtaining the n-line signal. This processing can be actually performed in the first calculation section 250 and the second calculation section 251.

By changing the dividing frequency of the picture division filter, the distribution of the data amount between the first and second streams can be changed. In the case of the DVD format, the first and second streams each have a maximum capacity of 8 Mpbs. When the dividing frequency is fixed, a picture having a high ratio of high frequency component causes the second stream data to overflow, resulting in collapse of MPEG encoding signal in the high frequency range. A picture having a high ratio of low frequency component causes the first stream data to overflow, resulting in collapse of encoding to significantly deteriorating the picture quality. In the case where the dividing frequency is variable, when the high frequency component is excessive, the dividing frequency in FIG. 50 can be increased to 300. Thus, the second stream data amount is reduced and the first stream data amount is increased. Thus, the distribution of the data is optimized, so that the collapse of encoding is avoided.

When the low frequency component is excessive, the dividing frequency can be decreased to 200. Thus, the first stream data amount is reduced, which avoids collapse. Collapse is usually avoided this way, and the variable dividing frequency is effective. By changing the border of the division filter in accordance with the condition of the picture, collapse of encoding of one of the streams can be avoided. Accordingly, a satisfactory video signal is obtained. In other words, the overflow of the first or second stream is avoided by changing the division point, so that recording and reproduction are performed with the data amount being distributed in a satisfactory manner.

(Scanning Line Transform)

An operation of a scanning line transform section 29a described with reference to FIG. 5 will be specifically described. An MADM disk includes both an area having a high resolution signal such as a progressive signal and an area having a standard resolution signal such as an NTSC signal. The two streams are reproduced simultaneously and independently. The output is changed from progressive to NTSC or from NTSC to progressive. When a signal is output from the output section 29b with no processing at the point of change, the scanning frequency is changed from 31.5 kHz to 15.7 kHz. Therefore, the deflection frequency of the TV 29c is switched, thus disturbing the picture for a few seconds. Even in a TV having a built-in line doubler, the picture is disturbed when a progressive picture is switched to an NTSC picture. According to the present invention, this is avoided by automatically switching the progressive signal by the output section 29b. In more detail, the NTSC picture of the first stream is scanned at 2× by the scanning transform section 29a using an MADM disk identifier 10h recorded on the MADM disk 1 or the progressive signal is output as it is. Since the high resolution area for reproducing two streams is switched to an ordinary resolution area for reproducing one stream, the output signal is immediately changed. Therefore, a progressive signal is continuously input to the TV 29c. This system eliminates disturbance from the TV picture.

(Stream Switching Prohibiting Flag)

As a method for preventing a differential signal of a high resolution signal from being output in an existing apparatus, a method for recording a stream switching prohibiting flag will be described.

Figure 86:
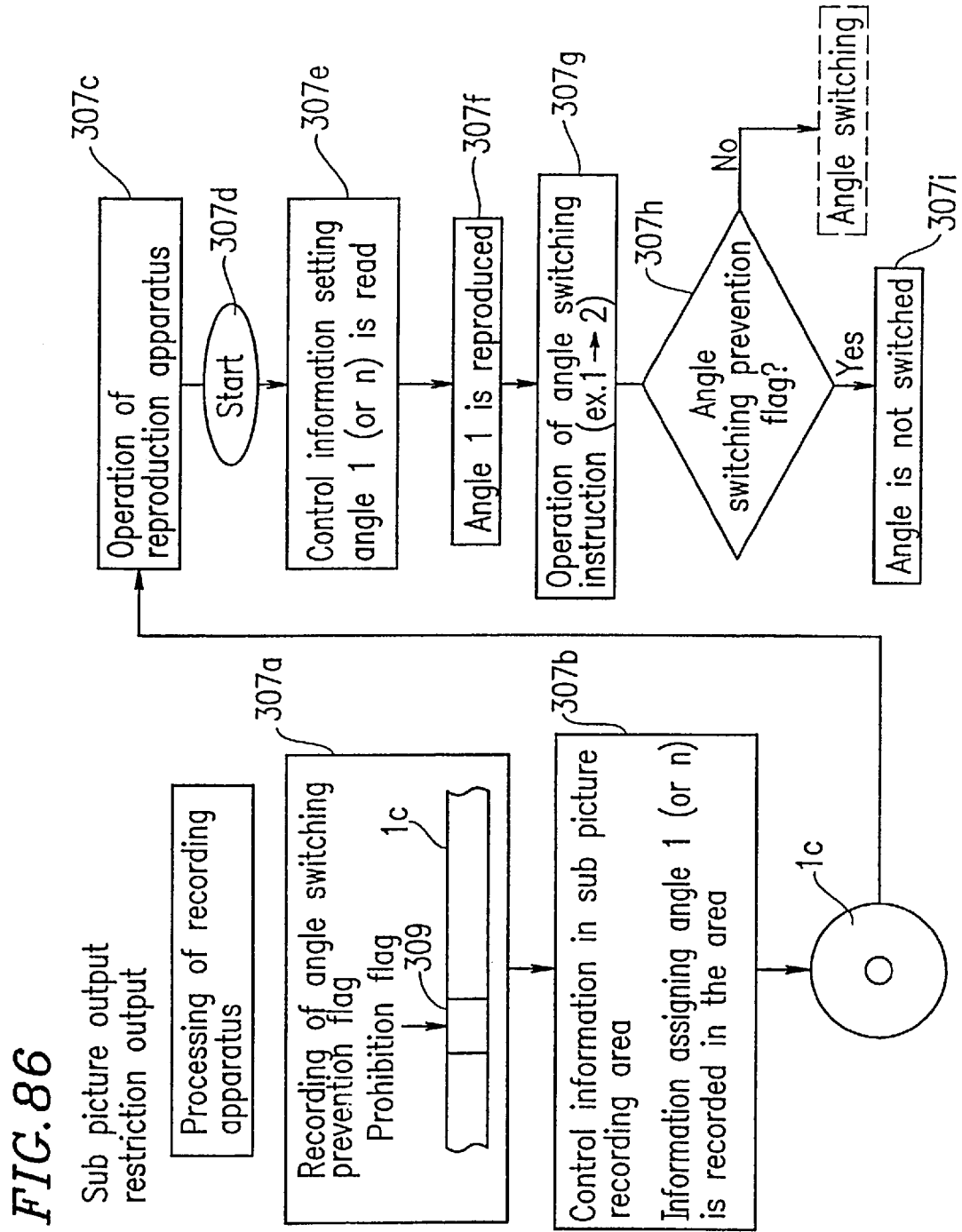
FIG. 86 shows a method for preventing a conventional reproduction apparatus from outputting a sub picture signal in one example according to the present invention.

As shown in FIG. 86, in step 307a, a stream switching prohibiting flag 309 is recorded on a disk 1c. In step 307b, stream 1 is set as the initial stream value in the management information.

When the disk 1c is set in an existing reproduction apparatus, in step 307a, management information for angle 1, i.e., stream 1 is read. In step 307f, angle 1 is reproduced. When an angle switch instruction is issued in step 307g, an angle (stream) switching prohibiting flag is checked in step 307h. In an MADM disk, the angle (stream) is not switched since the flag is recorded. Accordingly, the output of the differential picture is prevented and the compatibility is maintained.

(HDTV (1080i) Output)

A method for creating a 1080i picture to be output to an HDTV will be described. In FIG. 20, a wide 525P picture is displayed as shown in the scope screen 178. The output is transformed into a progressive signal having 1050 lines by a line doubler. The progressive signal is further transformed into an interlace signal having 1050 lines by an interlace transform section 175b. That is, an interlace picture 178b having about 1080 lines is obtained. Thus, output to the HDTV is realized.

(High Definition Audio Output)

Figure 88:
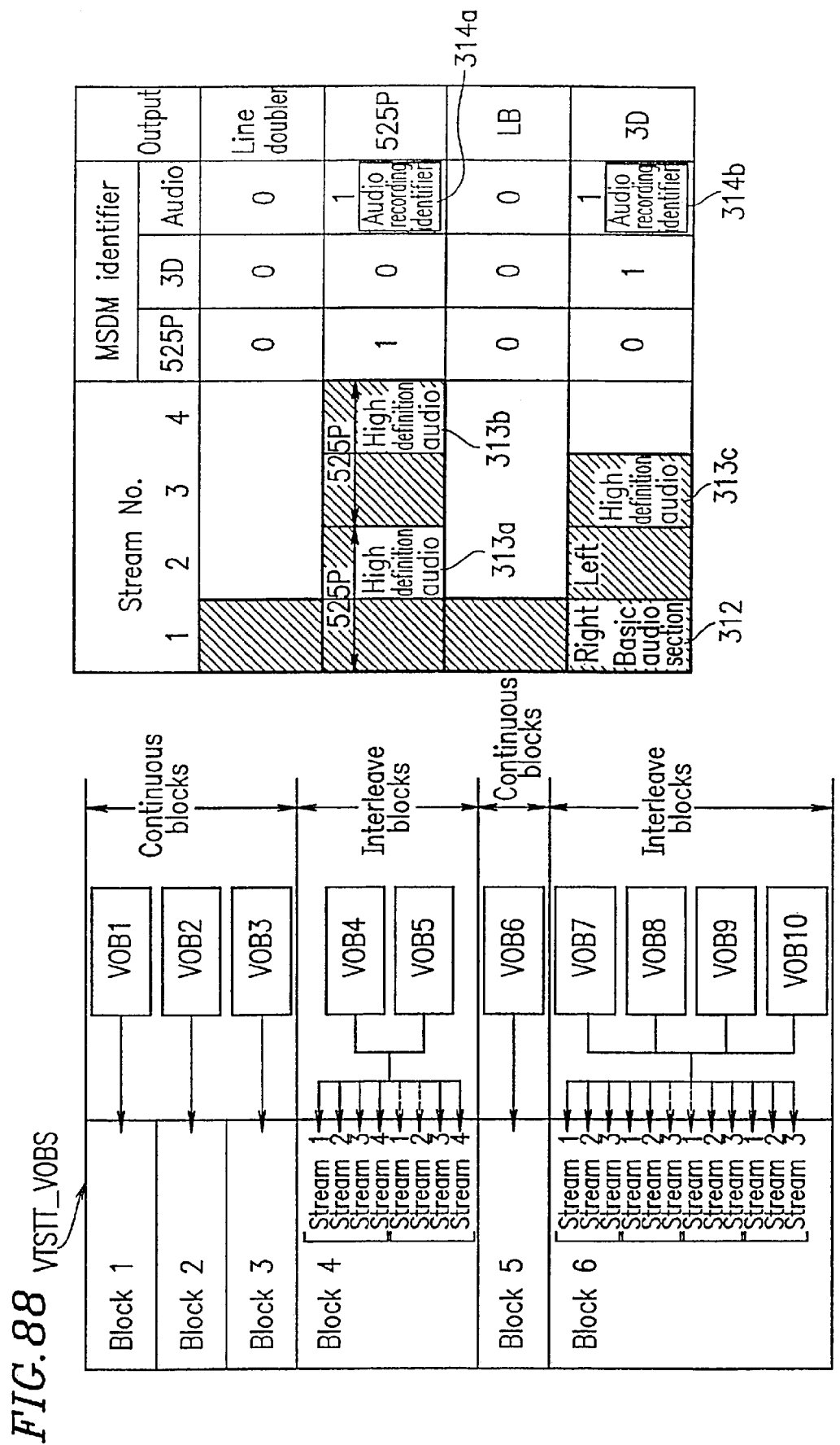
FIG. 88 is an arrangement view of continuous blocks and interleave blocks in one example according to the present invention.
Figure 89:
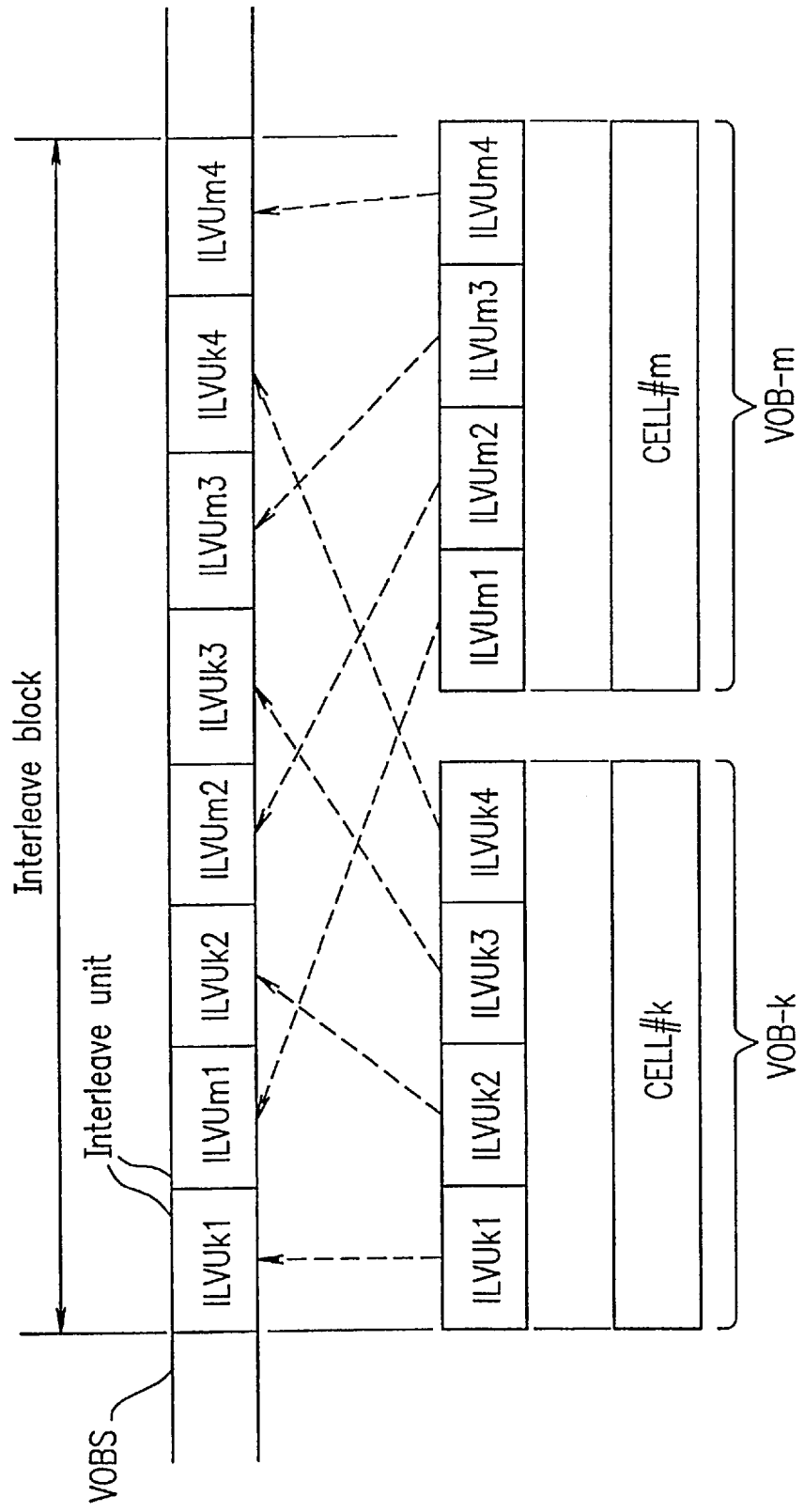
FIG. 89 is an arrangement view of interleave blocks in one example according to the present invention.

In FIG. 20, a high definition audio signal is reproduced. In the case of linear PCM, a range of 1.5 Mbps to 4 Mbps is required. In MADM, as shown in FIG. 88, a basic audio section 312 is recorded in stream 1 with 380 kbps AC3, and a high definition audio section 313 is in stream 3. An audio recording identifier 314 is recorded as an MADM identifier. In the reproduction apparatus in FIG. 20, when an audio recording identifier 314 is reproduced by an audio recording identifier reproduction section 111, an audio signal is separated from the stream 2, and a high definition audio signal is reproduced by an audio decoder 160a and output as an audio signal in the figure.

In the case of DVD, one stream has only a maximum of 8 Mbps. When a high definition audio signal which can have a maximum 4 Mbps is recorded into stream 1 which already has a basic picture, the basic picture is restricted to only 4 Mbps and deteriorated in terms of quality. Thus, compatibility is not maintained. According to the present invention, the audio signal is accommodated in streams 2, 3 and 4 as the high definition audio signals 313a, 313b and 313c in FIG. 88. In this manner, the high definition audio signals can be recorded without deteriorating the quality of the basic picture. Especially, the data amount of 525P differential signal in stream 2 is ½ to ⅓ of the basic picture, and thus stream 2 still has about 4 Mbps. Even when the differential video signal and the high definition signal are recorded in streams 2 and 4 as the high definition audio signals 313a and 313b in FIG. 88, the high definition video and audio signals can be reproduced by a 2× reproduction apparatus without deteriorating the differential signal.

(Comparison Method of MADM Identifier)

As shown in FIG. 4, an MADM disk has an MADM identifier in management information such as a TXT file. However, the TXT file may possibly have the same data as the MADM identifier in error. When the non-MADM disk is reproduced as an MADM disk, malfunction occurs and an abnormal picture is synthesized and output. In order to avoid such malfunction, authentification data for comparison is recorded according to the present invention.

As shown in FIG. 1, an authentification data generation section 315 is provided. The MADM identifier 10b and inherent attribute information 316 of the disk (master disk) such as the title of the disk, disk ID, disk capacity, and final address value are calculated by authentification data generation calculation section 316. Thus, MADM authentification data 318 is generated. The MADM authentification data 318 is recorded on the optical disk 1 together with the MADM identifier 10b and the authentification data 318 or progressive/3D arrangement information.

Then, the optical disk 1 is reproduced by the reproduction apparatus in FIG. 5 and compared by an MADM identifier comparison section 26a.

The operation will be described in detail with reference to FIG. 9. The MADM identifier comparison section 26a reads the MADM identifier 10b, the MADM authentification data 318, and the inherent attribute information 316 such as the title of the disk, disk number, capacity, and address from the optical disk 1, and compares the three types of data by the comparison calculation section 319. Only when it is determined that the data is correct by the determination section 320, an instruction to reproduce the MADM disk by the MADM reproduction section 321 is sent to the control section 21. Thus, the two streams are synthesized to output a high resolution picture or a 3D picture. When it is determined that the data is incorrect by the determination section 320, an instruction to perform ordinary reproduction by an ordinary reproduction section 322 without MADM reproduction is sent.

In this manner, even when the same data as the MADM identifier 10b is recorded in the TXT file in error, the MADM reproduction apparatus performs comparison using the comparison data. Accordingly, malfunction is prevented. The authentification data and the MADM identifier can be one piece of data, or encrypted data of the MADM identifier and the disk attribution information can be recorded.

So far, applications of a system for reproducing and synthesizing a plurality of streams, i.e., an MADM system according to the present invention have been described. Hereinafter, MADM synchronization systems will be described.

Example 2

The MADM system according to the present invention simultaneously reproduction of a plurality of streams. Synchronization methods are important. In the second through eighth examples, various methods of synchronization will be described. The MADM system is also applicable to recording and reproduction of high resolution pictures such as 3D or 525P pictures, which will not be described below.

As an example, in the second example, an operation of a reproduction apparatus for reading data from an optical disk having three compression video signals to be reproduced simultaneously and extending and reproducing the three compression video signals simultaneously will be described.

Figure 66:
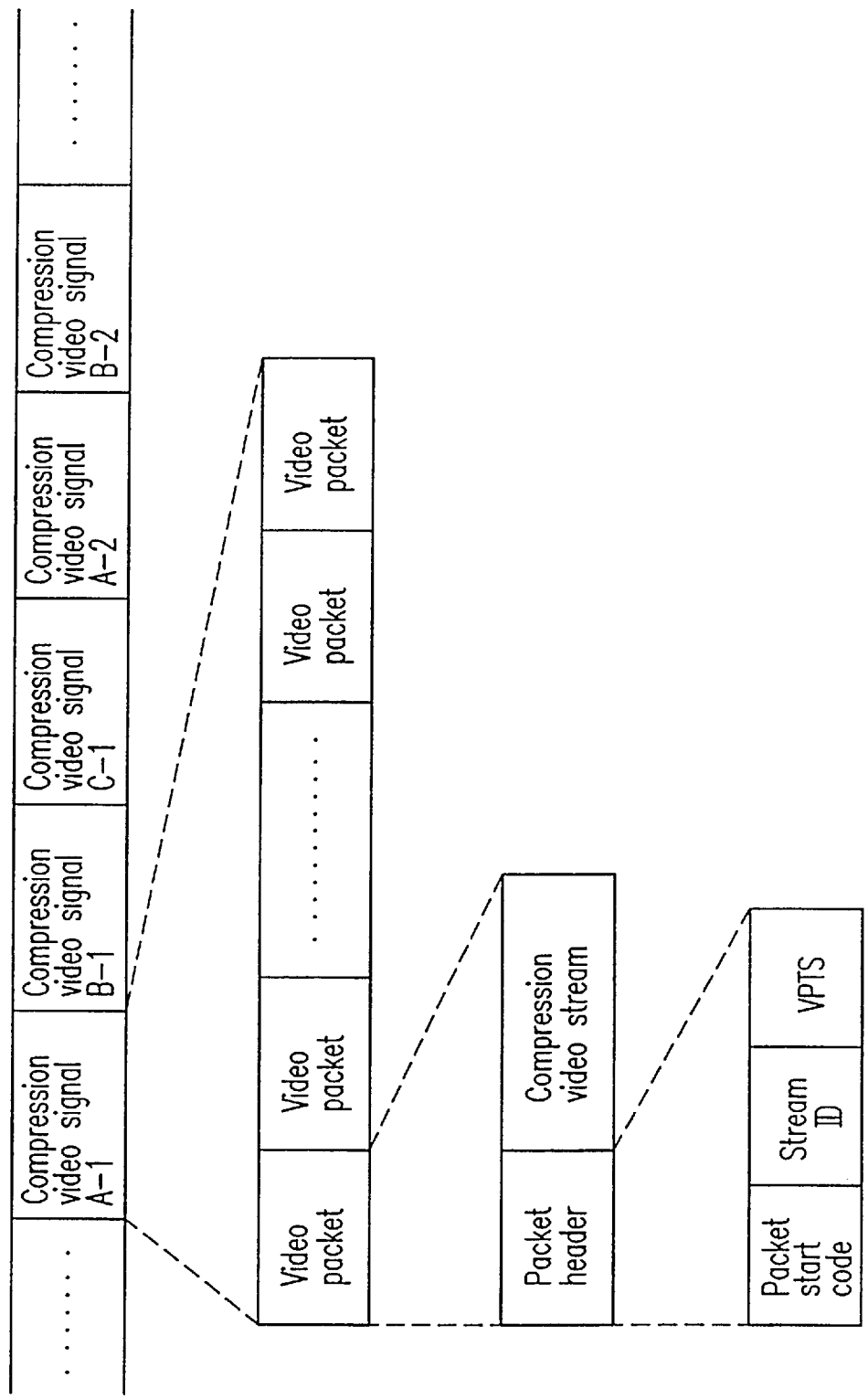
FIG. 66 shows a data structure of an optical disk in one example according to the present invention.

FIG. 66 shows a data structure of the optical disk used in the optical disk reproduction apparatus in the second example.

Video signals A, B and C are MPEG-compressed to obtain compression video streams A, B and C.

The compression video streams A, B and C are each packeted in units of 2 kB into packets. A packet header of each packet includes a stream ID for indicating which one of the compression video streams A through C is stored. When the packet stores a leading part of the video frame, the packet header also includes VPTS (video presentation time stamp) as video reproduction time information indicating the time to reproduce the frame. In the second example, an NTSC signal is used as the picture signal, and the video frame cycle is about 33 msec.

On the optical disk, video packets created in the above-described manner are grouped into, for example, compression video signals A-1, B-1 and C-1 each including an appropriate number of packets based on the data stored, and multiplexed.

Figure 64:
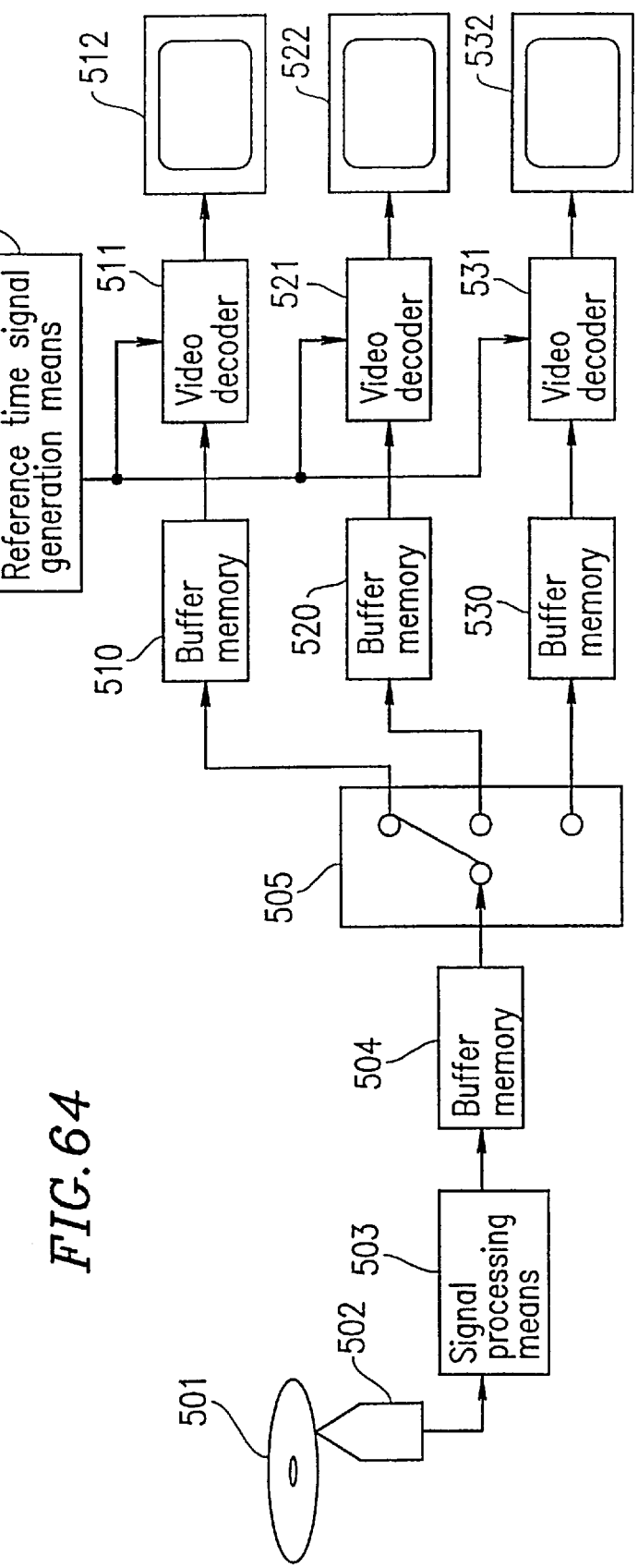
FIG. 64 is a block structural view of an optical disk reproduction apparatus in one example according to the present invention.

FIG. 64 is a block diagram of the optical disk reproduction apparatus in the second example.

In FIG. 64, the optical disk reproduction apparatus includes an optical disk 501 described above, an optical pickup 502 for reading data from the optical disk 501, signal processing means for performing a series of signal processing such as binarization, demodulation, and error correction to the signal read by the optical pickup 502, a buffer memory 504 for temporarily storing the data output from the signal processing means 503, division means 505 for dividing the data read from the buffer memory 504 into compression video signals, and reference time signal generation means 506 for generating a reference time signal 506 including a counter (not shown) for counting 90 kHz clocks. Reference numerals 510, 520 and 530 represent buffer memories for temporarily storing the compression video signals divided by the division means 505. Reference numerals 511, 521 and 531 represent video decoders for extending and reproducing the compression video signals. Reference numerals 512, 522 and 532 represent monitors for displaying the video signals.

Figure 65:
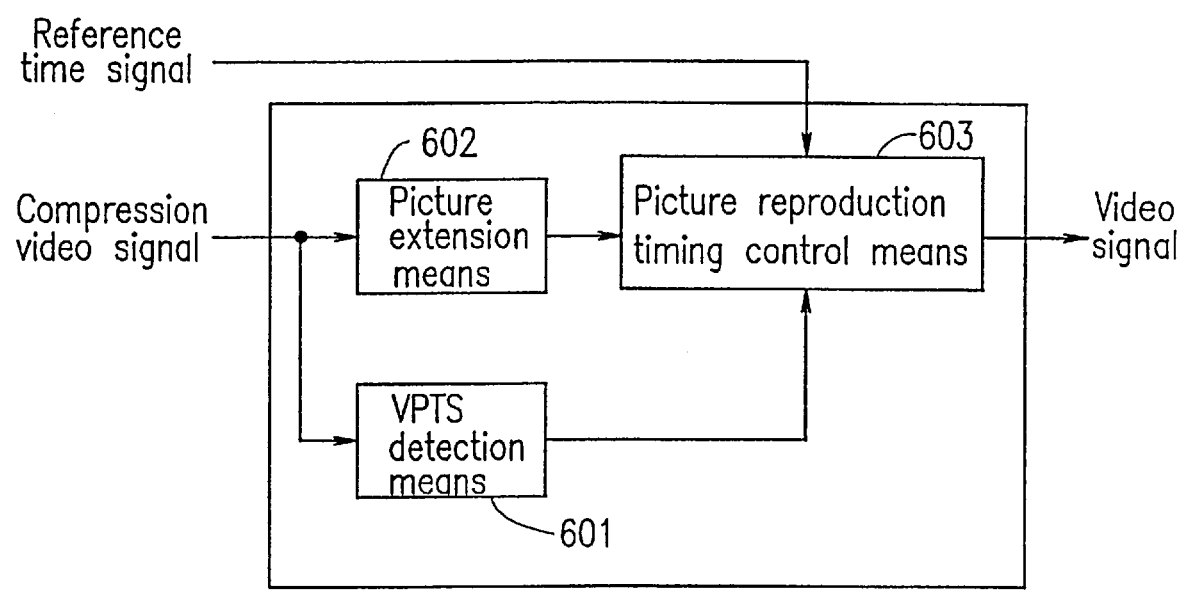
FIG. 65 is a structural view of a video decoder in one example according to the present invention.

FIG. 65 shows the structure of each of the video decoders 511, 521 and 531.

As shown in FIG. 65, the video decoder includes VPTS detection means 601 for detecting a VPTS stored in the packet header of the video packet, video extension means 602 for MPEG-extending the compression video stream, and video reproduction timing control section 603 for comparing the reference time signal and the VPTS and skipping or repeating the video reproduction on a frame-by-frame basis when the comparison result exceeds the threshold value.

The optical disk reproduction apparatus shown in FIG. 64 operates in the following manner.

The optical pickup is focus-controlled or tracking-controlled by servo means (not shown) to read a signal from the optical disk 501 and outputs the signal to the signal processing means 503. The signal processing means 503 subjects the signal to a series of processings including binarization, demodulation, error correction and the like. Then, the signal processing means 503 stores the resultant signal in the buffer memory 504 as digital data.

The buffer memory 504 functions so that, even when the data supply from the optical disk 501 is temporarily stopped by, e.g., wait state, data supply to the subsequent-stage sections is not stopped.

The data read from the buffer memory 504 is divided into compression video signals A through C by the division means 505 and output. The division means identifies which of the compression video signals A through C is stored in each packet with the packet ID in the packet header of the packeted data, and determines the destination based on the identification result.

The divided compression video signals are respectively stored in buffer memories 510 through 530.

The buffer memories 510 through 530 act to continuously supply data to the video decoders 511 through 531.

The video decoders 511 through 531 read data from the buffer memories 510 through 530 respectively, extend the compression signals, and output the signals as video signals to the monitors 512 through 532 respectively.

With reference to FIG. 65, an operation of the video decoders 511 through 531 will be described.

The compression video signal read from the buffer memory is input to the VPTS detection means 601 and the video extension means 602.

The video extension means 602 MPEG-extends the compression video stream and outputs the video signal.

The VPTS detection means 601 detects the VPTS of the packet header.

The video reproduction timing control means 603 receives the video signal output from the video extension means 602, a reference time signal and the VPTS output from the VPTS detection means 601, and compares the reference time signal and the VPTS. When the difference between the two exceeds the threshold value, the video reproduction timing is controlled so that the difference between the VPTS and the reference time signal is equal to or less than the threshold value.

In the second example, 33 msec is used as the threshold value. The video reproduction timing control means 603 performs the following.

(reference time signal-VPTS)>33 msec.:1 frame is skipped.
(reference time signal-VPTS)<−33 msec.:1 frame is repeated.

In the second example, due to the precision error of the crystal oscillator used in the reference time signal generation means 506 and the video decoders 511 through 531, the video decoders 511 and 531 are slower and the video decoder 521 is faster in terms of extension and reproduction with respect to the reference time signal. Unless reproduction timing is corrected, the reproduced video signals are out of synchronization.

Figure 67:
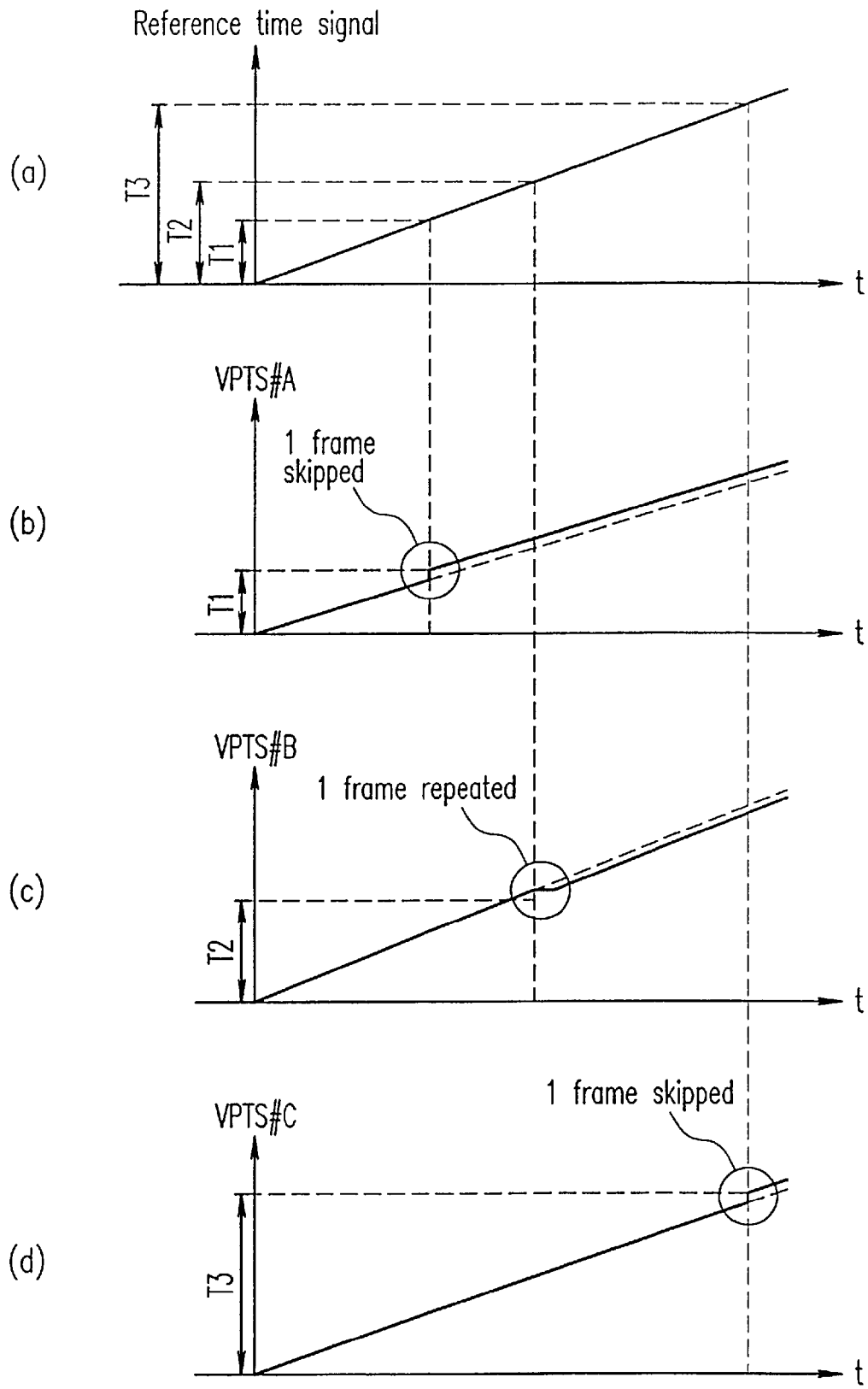
FIG. 67 is a timing diagram of video reproduction in one example according to the present invention.

FIG. 67 is a timing diagram of video reproduction in the second example. Part (a) of FIG. 67 shows the reference time signal with respect to reproduction time t. Part (b) shows the VPTS#A, which is a VPTS of the compression video signal A to be extended by the video decoder 511, part (c) shows the VPTS#B, which is a VPTS of the compression video signal B to be extended by the video decoder 521, and part (d) shows the VPTS#C, which is a VPTS of the compression video signal C to be extended by the video decoder 531.

The video decoder 511 continues extension and reproduction of the compression video signal A, and the difference between the VPTS#A and the reference time signal exceeds 33 msec. as the threshold value at T1. Accordingly, the video reproduction timing control means of the video decoder 511 skips one frame, which is originally to be reproduced, to correct the reproduction timing so that the difference between the VPTS#A and the reference time signal is equal to or less than the threshold value.

The video decoder 521 continues extension and reproduction of the compression video signal B, and the difference between the VPTS#B and the reference time signal exceeds −33 msec. as the threshold value at T2. Accordingly, the video reproduction timing control means of the video decoder 521 reproduces one frame in repetition, which has been already reproduced, to correct the reproduction timing so that the difference between the VPTS#B and the reference time signal is equal to or less than the threshold value.

Similarly, the video decoder 531 continues extension and reproduction of the compression video signal C, and the difference between the VPTS#C and the reference time signal exceeds 33 msec. as the threshold value at T3. Accordingly, the video reproduction timing control means of the video decoder 531 skips one frame, which is originally to be reproduced, to correct the reproduction timing so that the difference between the VPTS#C and the reference time signal is equal to or less than the threshold value.

As described above, in the second example, when the difference between the reference time signal and the VPTS detected by each video decoder exceeds the threshold value, the video reproduction timing control means of each video decoder performs correction so that difference between the reference time signal and the VPTS does not exceed the threshold value. In this manner, the pictures reproduced by video decoders can be synchronized with one another.

Example 3

The third example relates to a reproduction apparatus for correcting a reference time signal using audio reproduction time information indicating the time to reproduce the audio signal and synchronizes a plurality of video signals based on the reference time signal.

Figure 70:
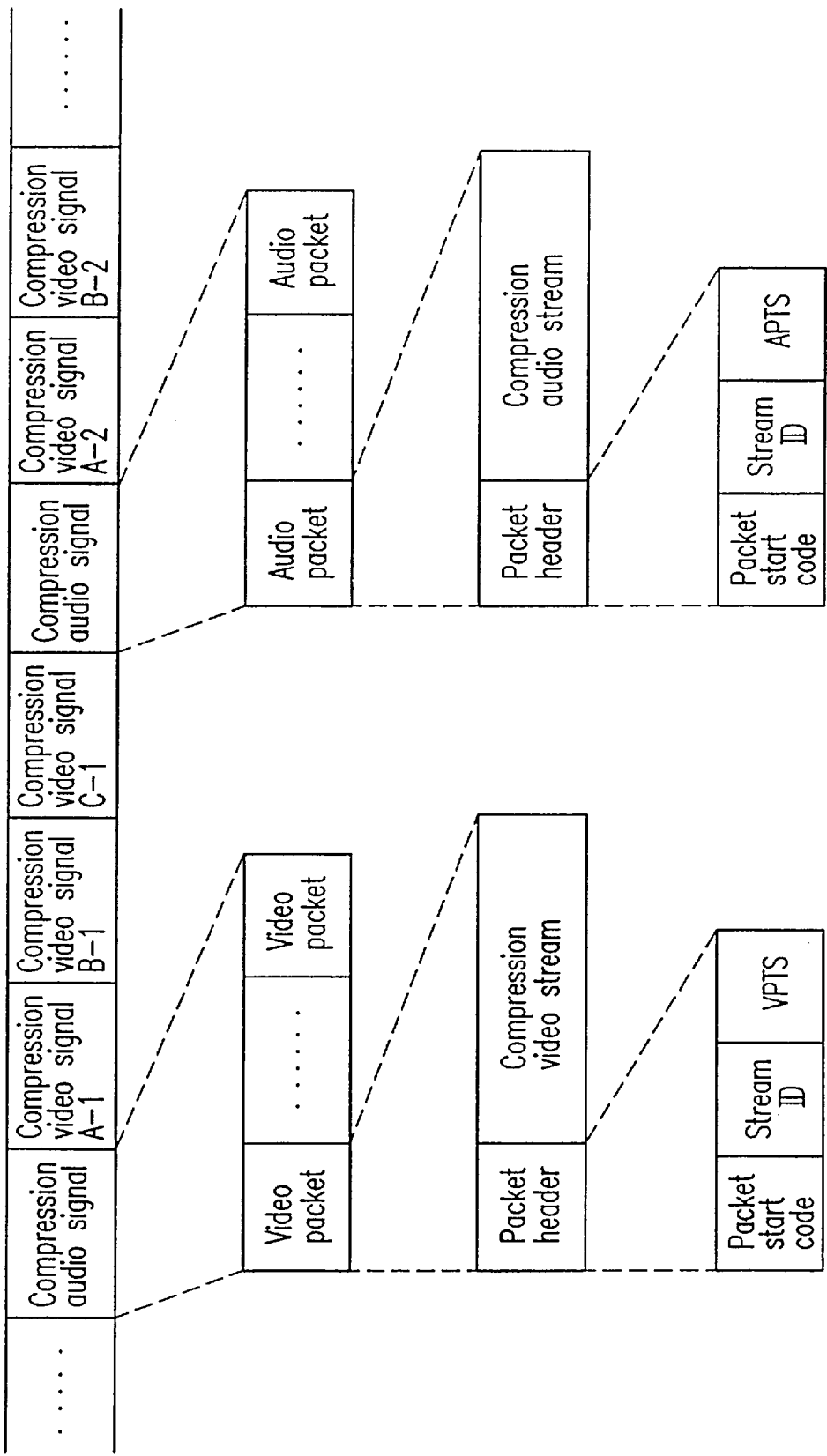
FIG. 70 shows a data structure of an optical disk in one example according to the present invention.

FIG. 70 shows a data structure of the optical disk used in the optical disk reproduction apparatus in the third example. The optical disk includes compression audio data in addition to the data included in the optical disk used in the second example.

An audio signal is audio-framed in units of 32 msec. for compression to obtain a compression audio stream. The audio stream is packeted in units of 2 kB into audio packets and recorded on the optical disk. A packet header of each audio packet includes a stream ID for indicating that the stored data is a compression audio stream. When the packet stores a leading part of the audio frame, the packet header also includes APTS (audio presentation time stamp) as audio reproduction time information indicating the time to reproduce the frame.

Figure 68:
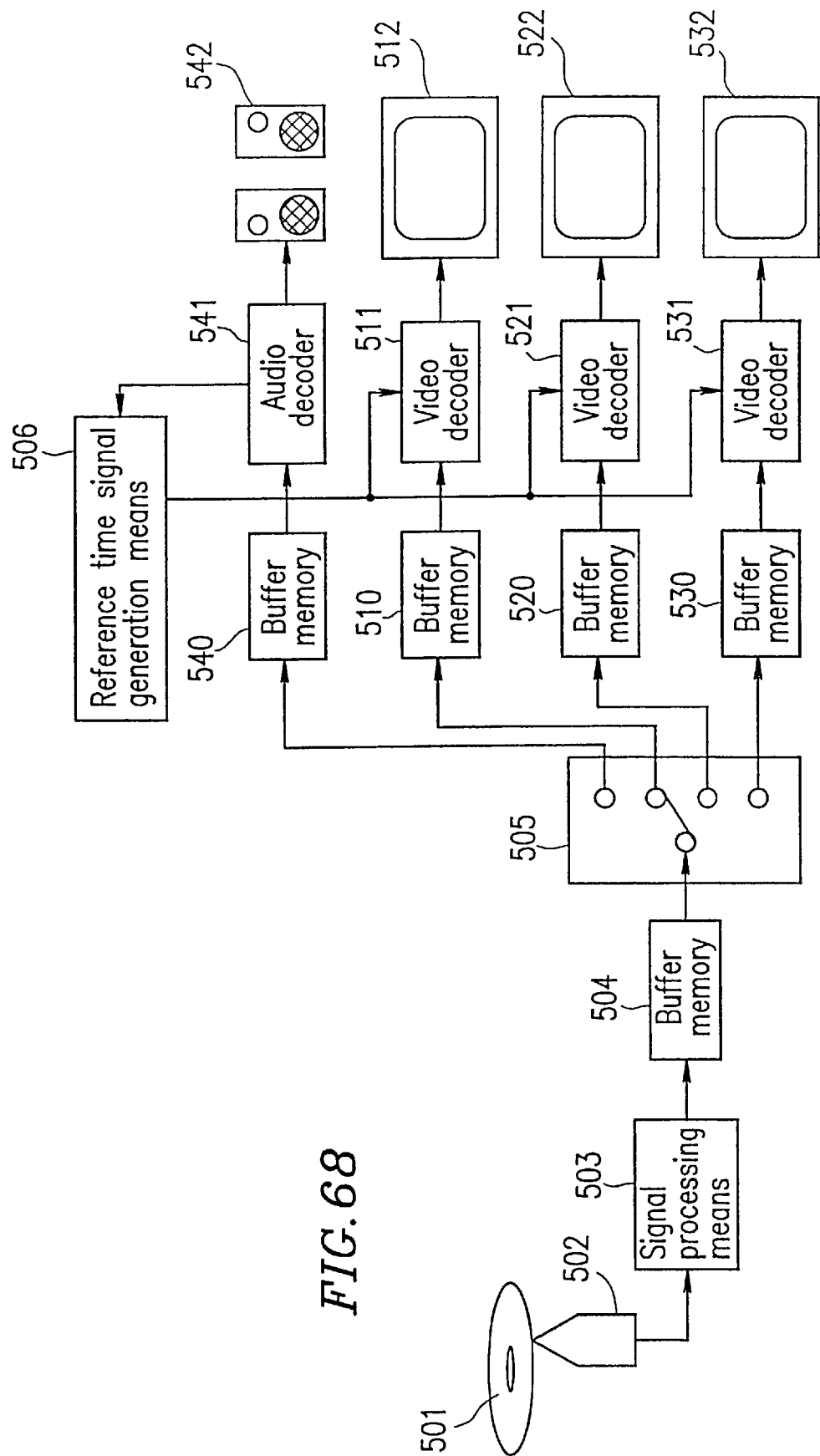
FIG. 68 is a block structural view of an optical disk reproduction apparatus in one example according to the present invention.

FIG. 68 is a block diagram of the reproduction apparatus in the third example.

Elements 501 through 532 are the same as those shown in FIG. 64 in the second example.

Reference numeral 504 represents a buffer memory for temporarily storing the compression audio signal. Reference numeral 541 represents audio extension means for extending the compression audio signal. Reference numeral 542 represents a speaker for reproducing the extended audio signal.

Figure 69:
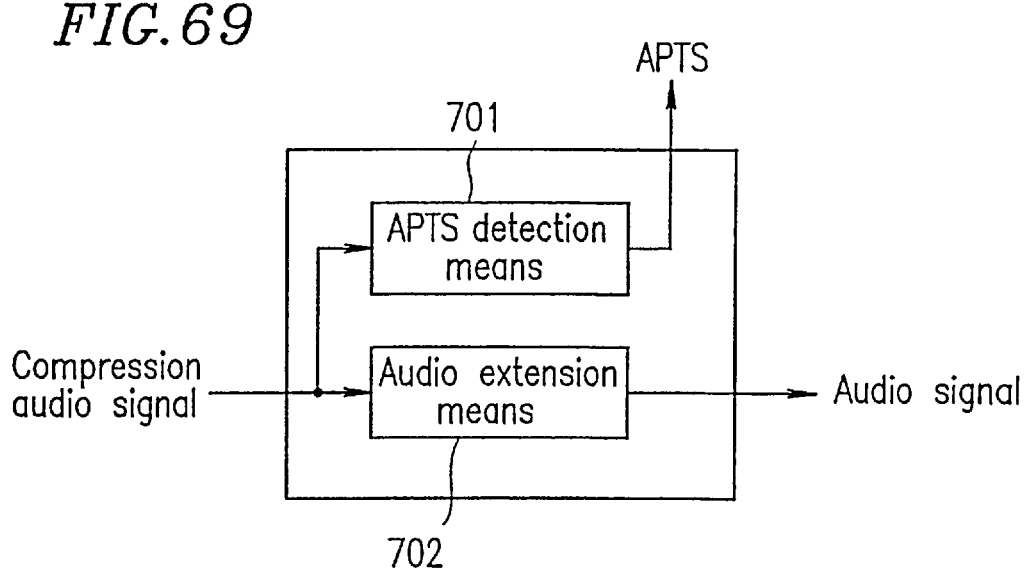
FIG. 69 is a structural view of an audio decoder in one example according to the present invention.

FIG. 69 shows a structure of the audio decoder 541. The audio decoder 541 includes APTS detection means 701 for detecting an APTS stored in a packet header of the audio packet, and audio extension means 702 for extending the compression audio stream.

An operation of the optical disk reproduction apparatus shown in FIG. 68 for reproducing the optical disk shown in FIG. 70 will be described.

The operation until the signal is input to the division means 505 is similar to that with the optical disk reproduction apparatus in the second example.

The data read from the buffer memory 504 is divided into compression video signals A through C and a compression audio signal by the division means 505 and output. The division means 505 identifies which of the compression video signals A through C and the compression audio signal is stored in each packet with the packet ID in the packet header of the packeted data, and determines the destination based on the identification result.

The divided compression video signals and compression audio signal are respectively stored in buffer memories 510 through 540.

The video decoders 511 through 531 read data from the buffer memories 510 through 530 respectively, extend the compression video signals, and output the signals as video signals to the monitors 512 through 532 respectively. The audio decoder 541 reads data from the buffer memory 540, extends the compression audio signal, and outputs the signal as an audio signal through the speaker 542.

The operations of the video decoders 511 through 531 for extending the compression video signals and for correcting the synchronization when the difference between the reference time signal and the VPTS exceeds the threshold value are the same as in the second example.

The compression audio signal read from the buffer memory 540 is input to the audio decoder 541. APTS detection means 701 detects an APTS and outputs. Audio extension means 702 extends the compression audio stream and outputs the audio signal.

The VPTS signal output from the audio decoder 541 is input to the reference time signal generation means 506, and the reference time signal is corrected by the APTS.

In the third example, due to the precision error of the crystal oscillator used in the reference time signal generation means 506, the video decoders 511 through 531 and the audio decoder 541, the reference time signal is faster in terms of extension and reproduction with respect to the audio decoder 541. The video decoder 511 is slower and the video decoder 521 is faster in terms of extension and reproduction with respect to the reference time signal. Unless reproduction timing is corrected, the reproduced video signals and audio signal are out of synchronization.

Figure 71:
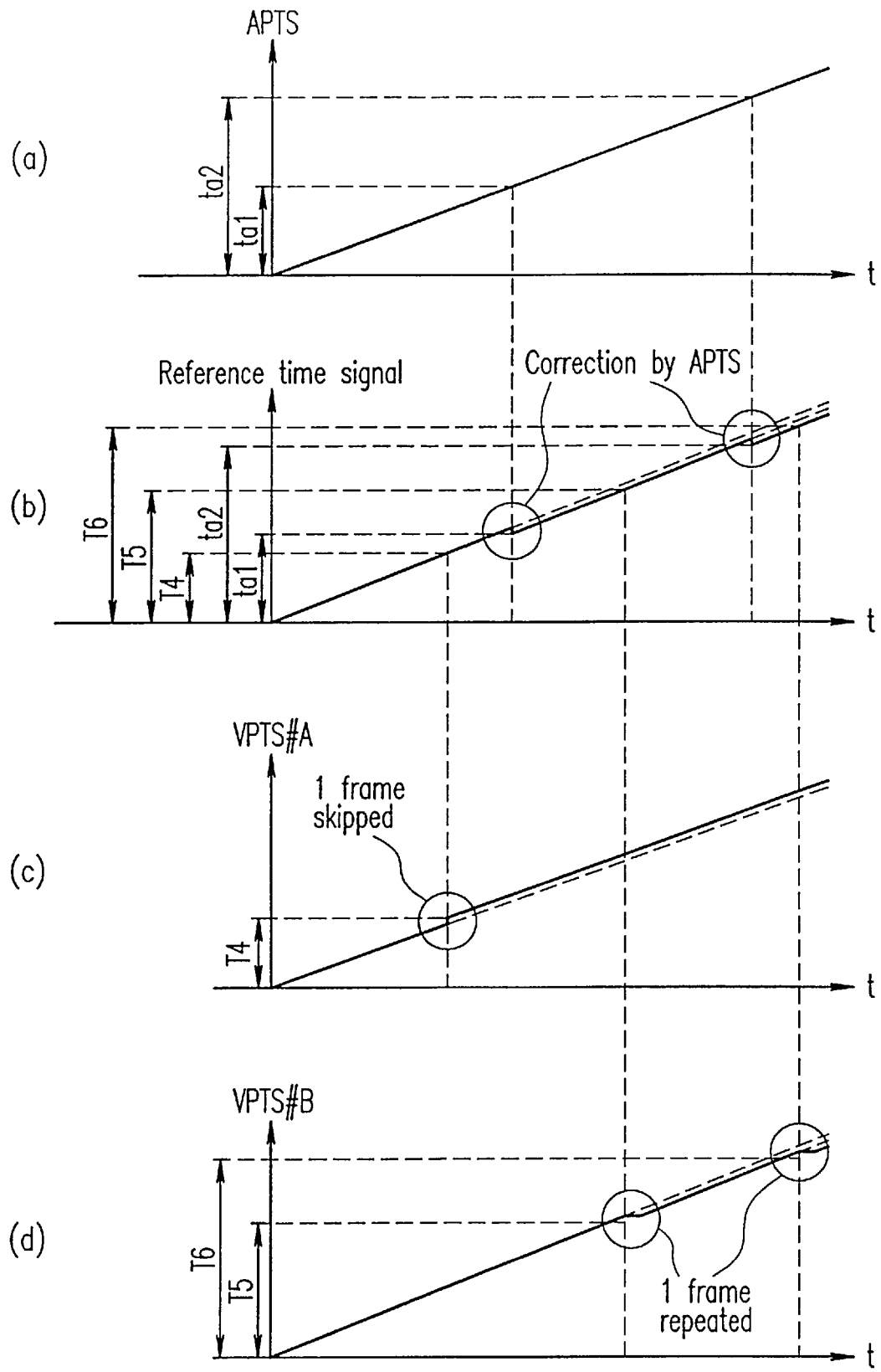
FIG. 71 is a timing diagram of audio and video reproduction in one example according to the present invention.

FIG. 71 is a timing diagram of audio reproduction in the third example. Part (a) of FIG. 71 shows the APTS with respect to reproduction time t. Part (b) shows the reference time signal. Part (c) shows the VPTS#A, at which the compression video signal A to be extended by the video decoder 511 is to be reproduced, and part (d) shows the VPTS#B, at which the compression video signal B to be extended by the video decoder 521 is be reproduced.

FIG. 71 does not show the VPTS#C, at which the compression video signal C to be extended by the video decoder 531, but the diagram is almost the same as in FIG. 67 regarding the second example.

The reference time signal generation means 506 is corrected using the APTS at time when the APTS shows ta1 and ta2, and the reference time signal is reset as ta1 and ta2 at the respective time.

The video decoder 511 continues extension and reproduction of the compression video signal A, and the difference between the VPTS#A and the reference time signal exceeds 33 msec. as the threshold value at T4. Accordingly, the video reproduction timing control means of the video decoder 511 skips one frame which is originally to be reproduced to correct the reproduction timing so that the difference between the VPTS#A and the reference time signal is equal to or less than the threshold value.

The video decoder 521 continues extension and reproduction of the compression video signal B, and the difference between the VPTS#B and the reference time signal exceeds −33 msec. as the threshold value at T5 and T6. Accordingly, the video reproduction timing control means of the video decoder 521 reproduces one frame in repetition which has been already reproduced to correct the reproduction timing so that the difference between the VPTS#B and the reference time signal is equal to or less than the threshold value.

As described above, in the third example, when the difference between the reference time signal and the VPTS detected by each video decoder exceeds the threshold value, the video reproduction timing control means of each video decoder performs correction so that difference between the reference time signal and the VPTS does not exceed the threshold value. In this manner, the pictures reproduced by video decoders can be synchronized with one another.

Regarding the difference between the reference time signal and the APTS, the APTS is not corrected using the reference time signal but the reference time signal is corrected using the APTS. Accordingly, audio and video signals are synchronized with no unnaturalness in the audio output.

Example 4

The fourth example relates to a reproduction apparatus for correcting the reference time signal using a VPTS detected by one video decoder and synchronizing a plurality of video signals based on the reference time signal.

Figure 72:
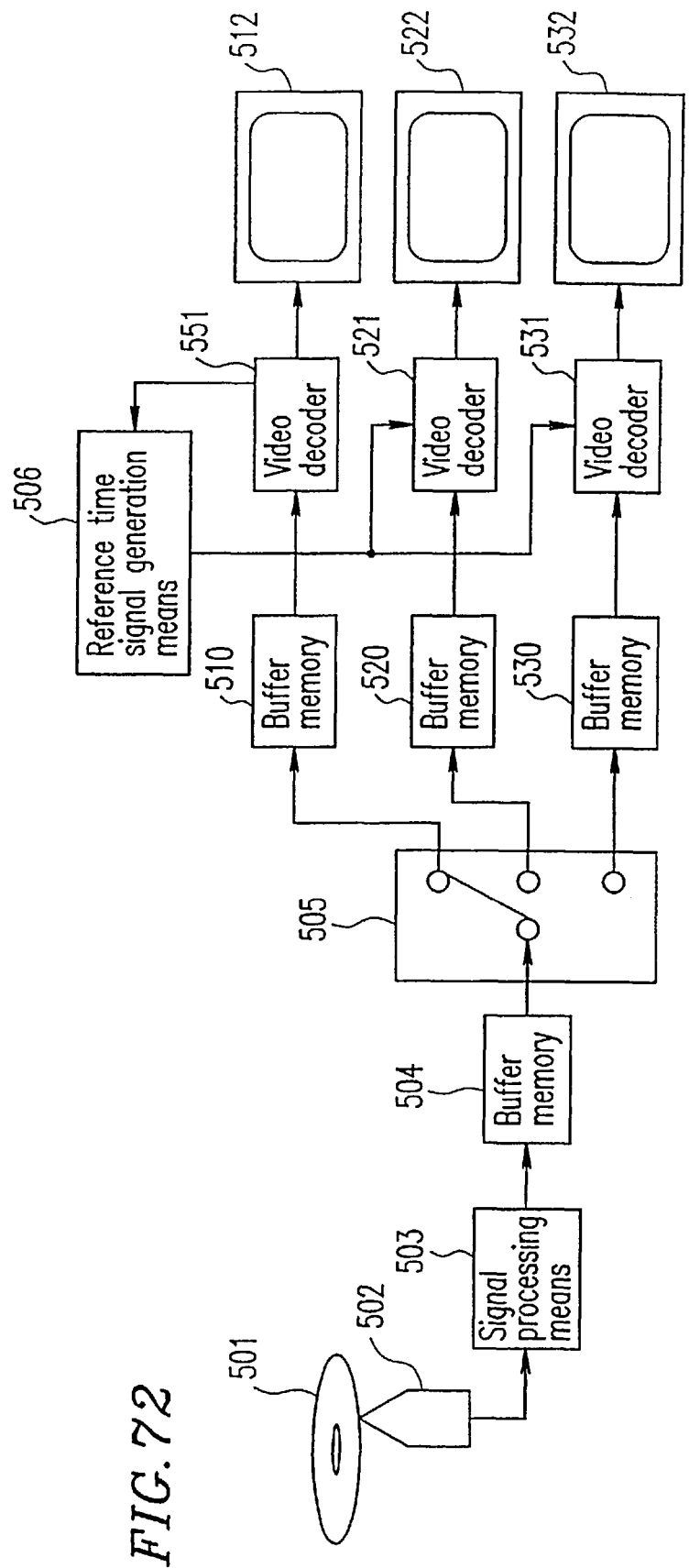
FIG. 72 shows an optical disk reproduction apparatus in one example according to the present invention.

FIG. 72 is a block diagram of an optical disk reproduction apparatus in the fourth example.

Elements 501 through 532 are the same as those in the second example. Reference numeral 551 represents a video decoder used in the fourth example.

Figure 73:
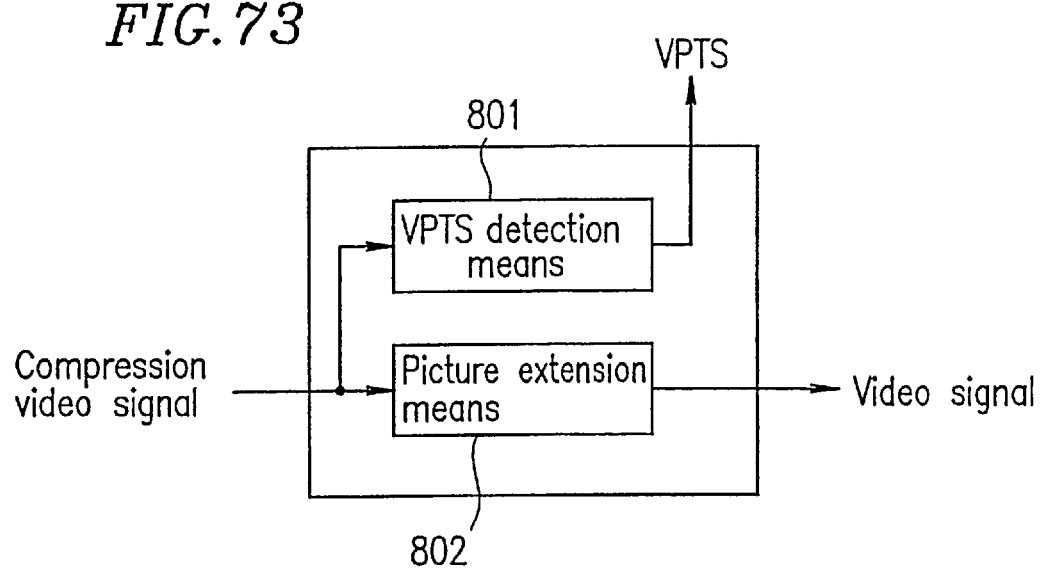
FIG. 73 is a structural view of a video decoder in one example according to the present invention.

The video decoder 551 has a function of outputting the detected VPTS. FIG. 73 shows a structure of the video decoder 551.

The video decoder 551 includes VPTS detection means 801 for detecting a VPTS indicating the reproduction time of the video signal multiplexed as the compression video signal and video extension means 802 for extending the compression video stream.

In the fourth example, due to the precision error of the crystal oscillator used in the reference time signal generation means 506 and the video decoders 521, 531 and 551, the reference time signal is faster in terms of extension and reproduction with respect to the video decoder 551. The video decoder 521 is slower and the video decoder 531 is faster in terms of extension and reproduction with respect to the reference time signal. Unless reproduction timing is corrected, the reproduced video signals are out of synchronization.

Figure 74:
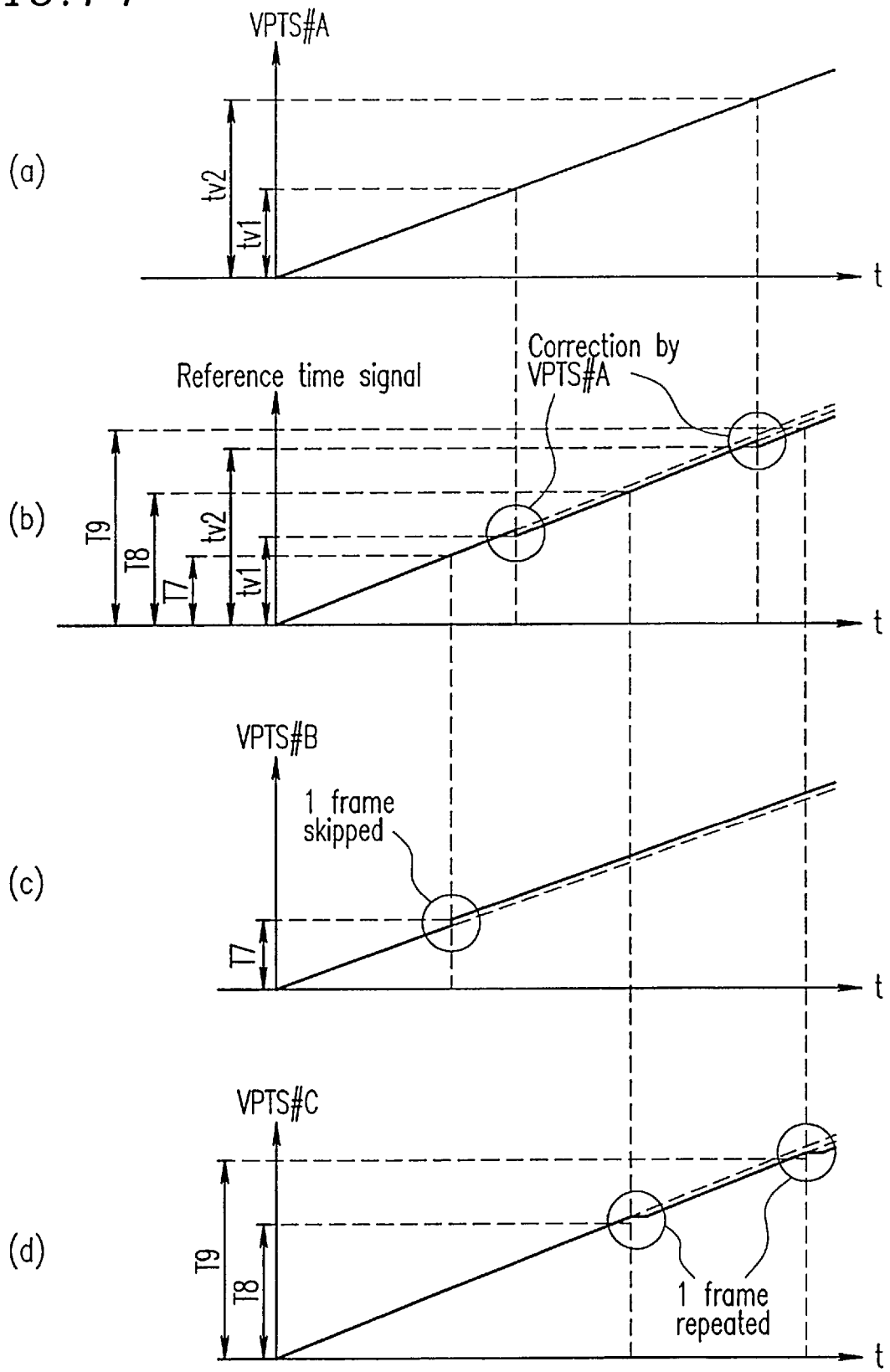
FIG. 74 is a timing diagram of video reproduction in one example according to the present invention.

FIG. 74 is a timing diagram of video output in the fourth example. Part (a) of FIG. 74 shows the VPTS#A detected by the video decoder 511 with respect to reproduction time t. Part (b) shows the reference time signal. Part (c) shows VPTS#B, at which the compression video signal B to be extended by the video decoder 521 is to be reproduced, and part (d) shows the VPTS#C, at which the compression video signal C to be extended by the video decoder 531 is to be reproduced.

The reference time signal generation means 506 is corrected using the APTS at time when the APTS shows tv1 and tv2, and the reference time signal is reset as tv1 and tv2 at the respective time.

The video decoder 521 continues extension and reproduction of the compression video signal B, and the difference between the VPTS#B and the reference time signal exceeds 33 msec. as the threshold value at T7. Accordingly, the video reproduction timing control means of the video decoder 521 skips one frame which is originally to be reproduced to correct the reproduction timing so that the difference between the VPTS#B and the reference time signal is equal to or less than the threshold value.

Similarly, the video decoder 531 continues extension and reproduction of the compression video signal C, and the difference between the VPTS#C and the reference time signal exceeds 33 msec. as the threshold value at T8. Accordingly, the video reproduction timing control means of the video decoder 531 reproduces one frame in repetition which has been already reproduced to correct the reproduction timing so that the difference between the VPTS#C and the reference time signal is equal to or less than the threshold value.

As described above, in the fourth example, when the difference between the reference time signal and the values of VPTSs detected by the video decoders 521 and 531 exceeds the threshold value, the video reproduction timing control means of each video decoder performs correction so that the difference between the reference time signal and the VPTS does not exceed the threshold value.

By correcting the reference time signal using the VPTS#A detected by the video decoder 551, the video signal reproduced by the video decoder 551 is not accompanied by any unnaturalness in the visual output due to the frame-by-frame skipping or repeated reproduction. Thus, the pictures can be synchronized with one another.

Example 5

The fifth example relates to a reproduction apparatus including a plurality of video decoders for extending and reproducing a compression video signal. Each of the video decoders includes reference time signal generation means. The reproduction apparatus corrects the reference time signal of each video decoder using an APTS indicating the time to reproduce an audio signal to realize synchronization.

In the fifth example, the optical disk shown in FIG. 70 is used.

Figure 75:
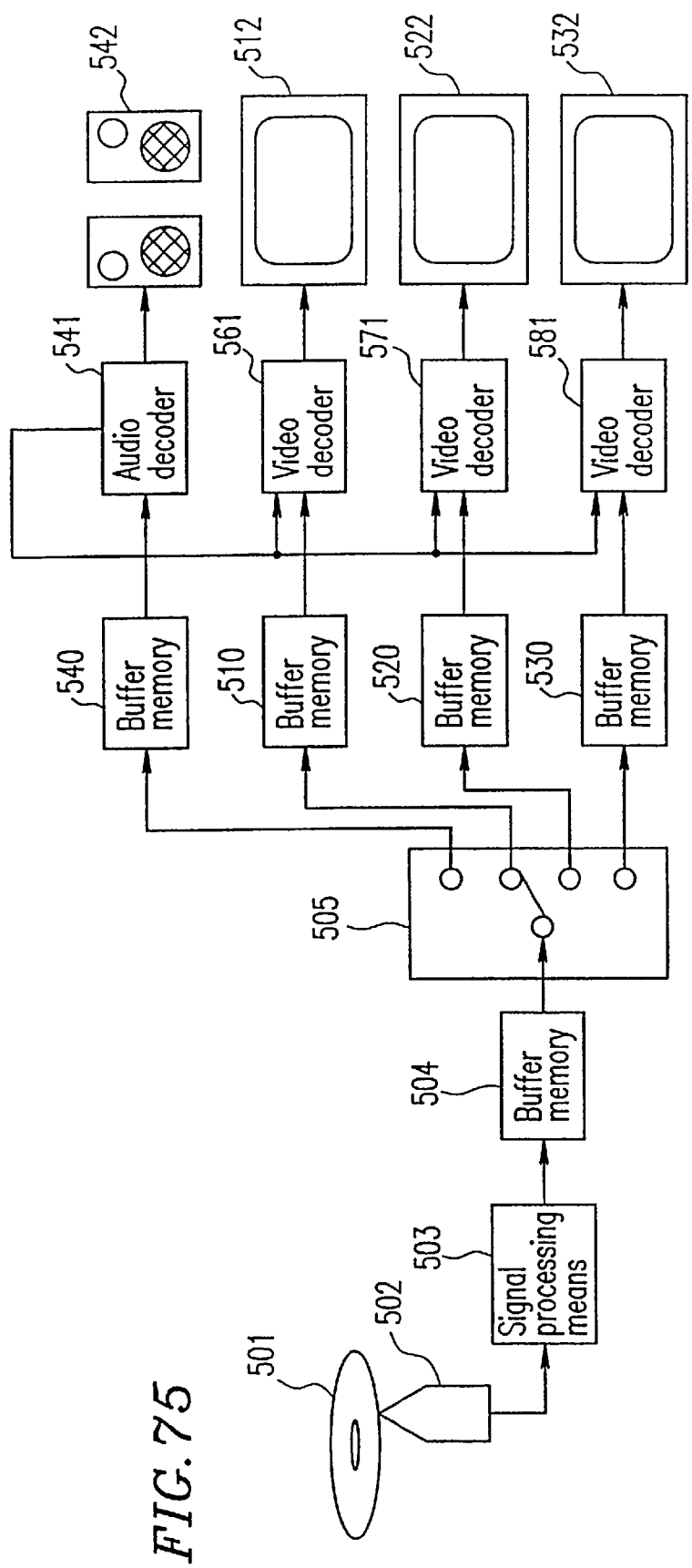
FIG. 75 is a block structural view of an optical disk reproduction apparatus in one example according to the present invention.

FIG. 75 is a block diagram of an optical disk reproduction apparatus in the fifth example.

Elements 501 through 542 are the same as those shown in FIG. 68 in the third example. Unlike the reproduction apparatus shown in FIG. 68, the reproduction apparatus in this example does not have reference time signal generation means 506 independently, but each video decoder has reference time signal generation means.

Reference numeral 561 represents a video decoder for extending and reproducing compression video signal A, reference numeral 571 represents a video decoder for extending and reproducing compression video signal B, and reference numeral 581 represents a video decoder for extending and reproducing compression video signal C.

Figure 76:
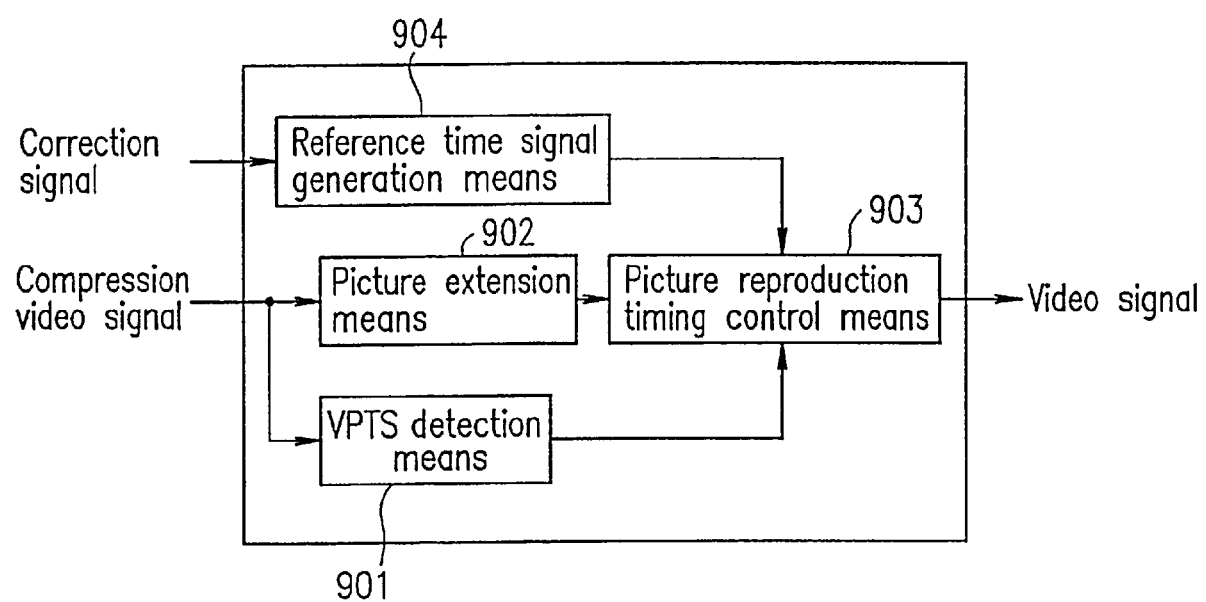
FIG. 76 is a structural view of a video decoder in one example according to the present invention.

FIG. 76 shows a structure of each of the video decoders 561 through 581 used in the fifth example.

The video decoder includes VPTS detection means 901 for detecting a VPTS indicating the reproduction time of the video signal multiplexed as the compression video signal, video extension means 902 for extending the compression video stream, and video reproduction timing control means 903 for comparing the reference time signal and the VPTS and skipping or repeating the video reproduction on a frame-by-frame basis when the comparison result exceeds the threshold value, and reference time signal generation means 904 for generating the reference time signal.

In the fifth example, the reference time signal of reference time signal generation means 904 included in each of the video decoders 561 through 581 is corrected using the APTS detected by the video decoder 541.

Since the reference time signals are corrected using the same APTS, the reference time signals generated in the video decoders 561 through 581 show the same value after being corrected.

After the correction using the APTS, as in the third example, when the difference between the reference time signal and the values of VPTS detected by each video decoder exceeds the threshold value, the video reproduction timing control means of each video decoder performs correction by skipping or repeating the reproduction on a frame-by-frame basis so that difference between the reference time signal and the VPTS does not exceed the threshold value.

As described above, in the fifth example, the reference time signal generated in each video decoder is corrected with an APTS, and the video reproduction timing control means of each video decoder maintains the difference between each reference time signal and each VPTS to be equal to or less than the threshold value. Thus, the pictures can be synchronized with one another.

As in the third example, the audio signal and the video signal can be synchronized without providing any inconvenience in the audio output.

In the fifth example, the reference time signals in the video decoders 561 through 581 are corrected using the APTS detected by the audio decoder 541. The pictures can be reproduced in synchronization in a similar manner by using one of the video decoders shown in FIG. 73 in the fourth example and correcting the reference time signals of the other video decoders using the VPTS detected by the one video decoder.

Example 6

The sixth example relates to a reproduction apparatus for simultaneously reproducing two compression video signals. The two compression video signals are obtained by dividing a signal into a right-eye video signal and a left-eye video signal and compressing the divided video signals.

Figure 77:
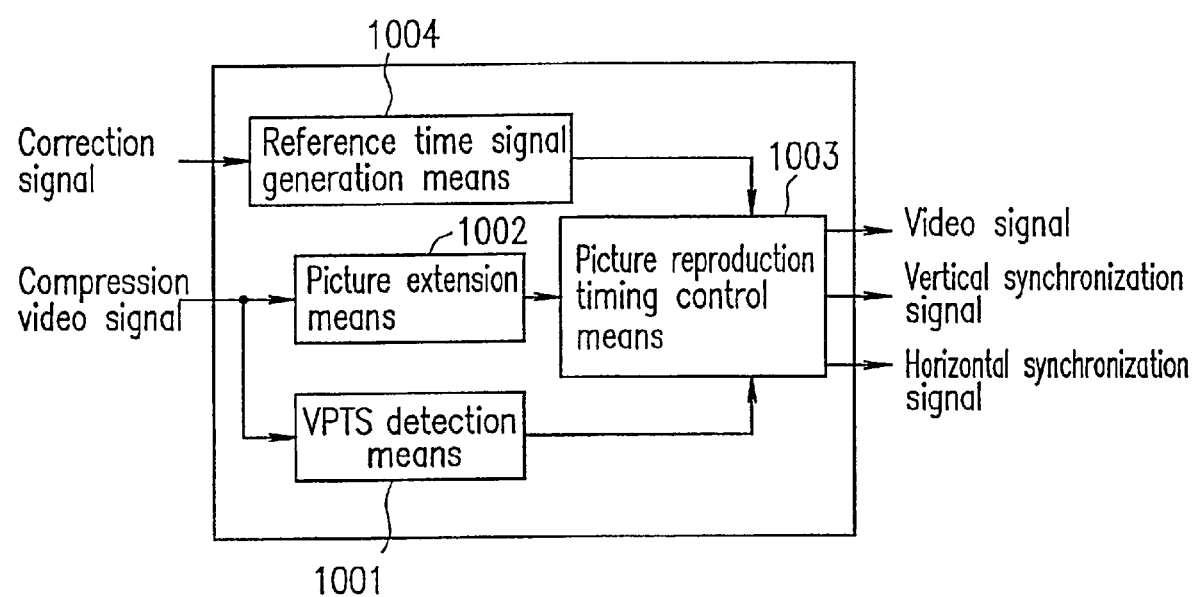
FIG. 77 is a structural view of a video decoder in one example according to the present invention.

The overall structure of the apparatus is generally similar to that of the optical disk reproduction apparatus shown in FIG. 75 in the fifth example, but the reproduction apparatus in the sixth example includes two video decoders for extending compression video signals obtained after the division means 505 since two video signals are to be reproduced simultaneously. FIG. 77 shows a structure of one of the video decoders used in the sixth example, and FIG. 78 shows a structure of the other video decoder used in the sixth example.

As shown in FIG. 77, the video decoder includes VPTS detection means 1001 for detecting a VPTS indicating the reproduction time of the video signal multiplexed as the compression video signal, video extension means 1002 for extending the MPEG compression video stream, reference time signal generation means 1004 for generating a reference time signal, and video reproduction timing control means 1003 for comparing the reference time signal and the VPTS and skipping or repeating the video reproduction on a frame-by-frame basis when the comparison result exceeds the threshold value and also for outputting a horizontal synchronization signal and a vertical synchronization signal for the picture reproduced.

Figure 78:
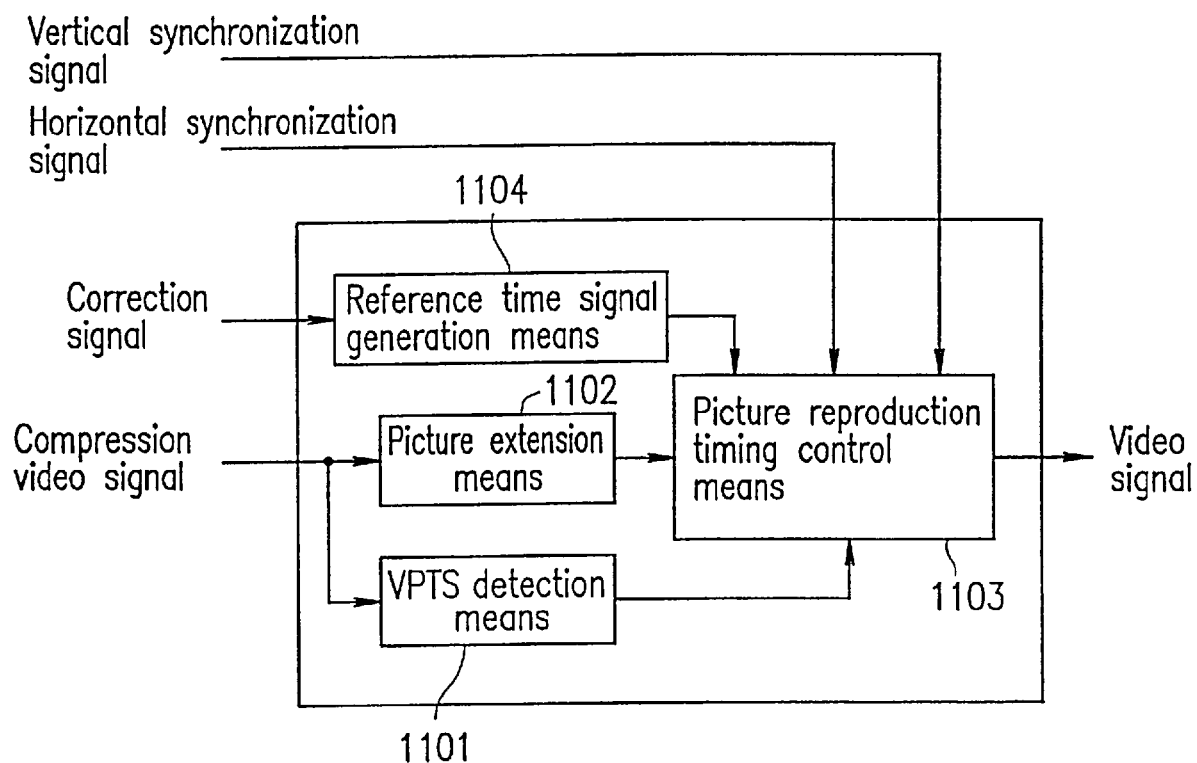
FIG. 78 is a structural view of a video decoder in one example according to the present invention.

As shown in FIG. 78, the other video decoder includes VPTS detection means 1101 for detecting a VPTS indicating the reproduction time of the video signal multiplexed as the compression video signal, video extension means 1102 for extending the MPEG compression video stream, reference time signal generation means 1104 for generating a reference time signal, and video reproduction timing control means 1003 for comparing the reference time signal and the VPTS and skipping or repeating the video reproduction on a frame-by-frame basis when the comparison result exceeds the threshold value, for outputting a horizontal synchronization signal and a vertical synchronization signal for the picture reproduced, and also reproducing the extended video signal in synchronization with the horizontal/vertical synchronization signals.

The video decoders are connected to each other so that the horizontal synchronization signal and the vertical synchronization signal output from the video decoder in FIG. 77 are sent to the video decoder in FIG. 78.

In the optical disk reproduction apparatus in the sixth example having the above-described structure, the reference time signal generated by each video decoder is corrected with an APTS, and the video reproduction timing control means of each video decoder maintains the difference between each reference time signal and each VPTS to be equal to or less than the threshold value. Thus, the right-eye picture and the left-eye picture can be synchronized with one another on a frame-by-frame basis. By using the horizontal and vertical synchronization signals output by one of the video decoder as the horizontal and the vertical synchronization signals of the other video decoder, two pictures can be reproduced in synchronization on a pixel-by-pixel basis.

In the sixth example, compression video signals obtained from a 3D video signal are used and divided into the right-eye and left-eye signals. Alternatively, for example, an original video signal having a first resolution is divided in a vertical and/or horizontal direction into at least two video signals including a first video signal and a second video signal having a second resolution which is lower than the first resolution. The resultant signals are compressed to be used. Thus, a plurality of video signals in synchronization with one another on a pixel-by-pixel basis can be obtained as from a 3D video signal. By synthesizing such resultant signals, the clear original video signal having the original resolution is reproduced.

Example 7

The seventh example relates to an optical disk reproduction apparatus for extending one compression video signal and two compression audio signals and reproducing the signals simultaneously.

Figure 81:
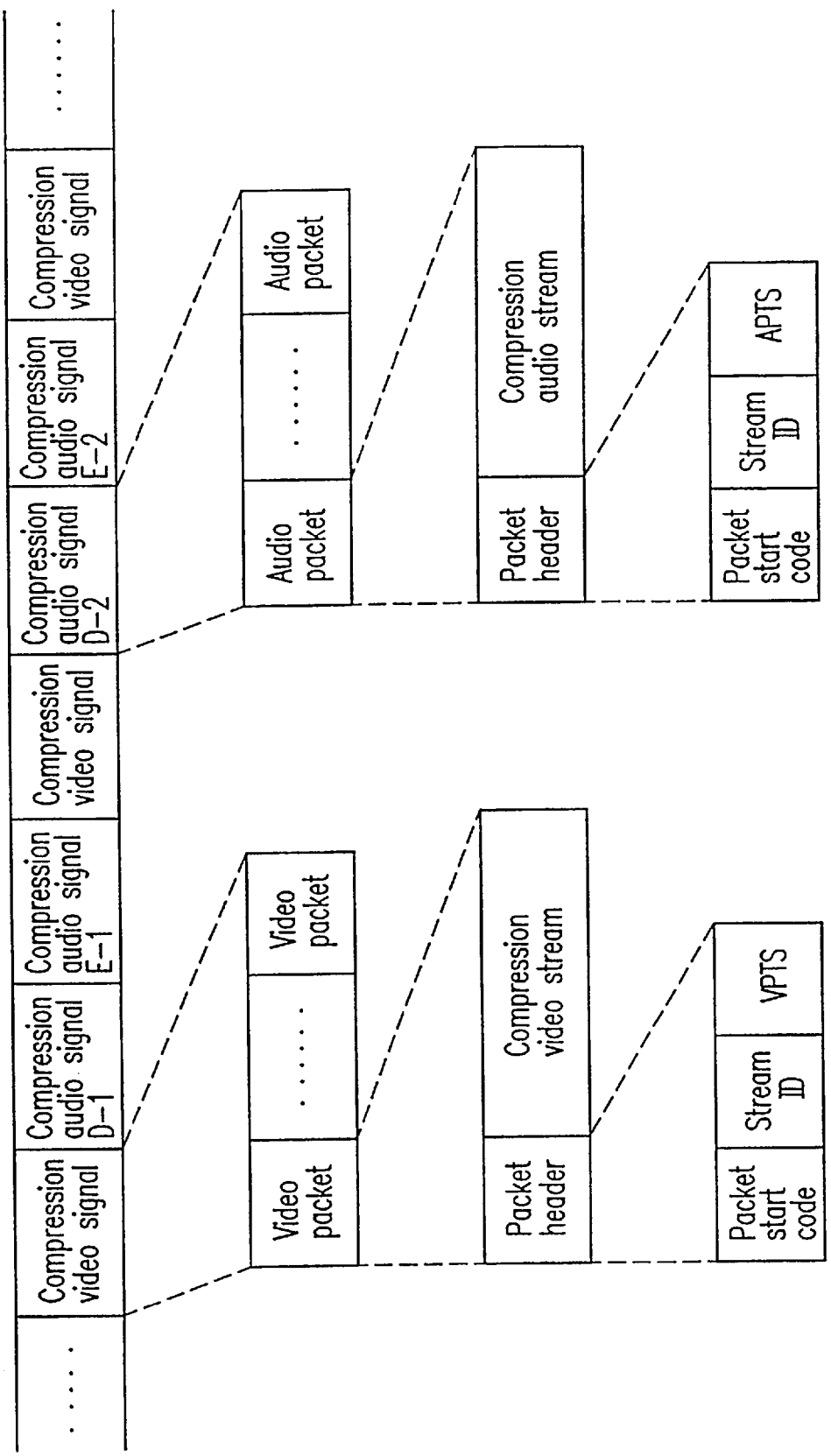
FIG. 81 shows a data structure of an optical disk in one example according to the present invention.

FIG. 81 shows a data structure of the optical disk used in the seventh example.

Two audio signals D and E are compressed to obtain compression audio streams D and E. A video signal is compressed to obtain a compression video stream.

The compression audio streams D and E and the compression video stream are packeted in units of 2 kB into audio packets and video packets. A packet header of each packet includes a stream ID for indicating which of the compression audio streams D and E and the compression video stream is stored, and the APTS and VPTS.

Figure 79:
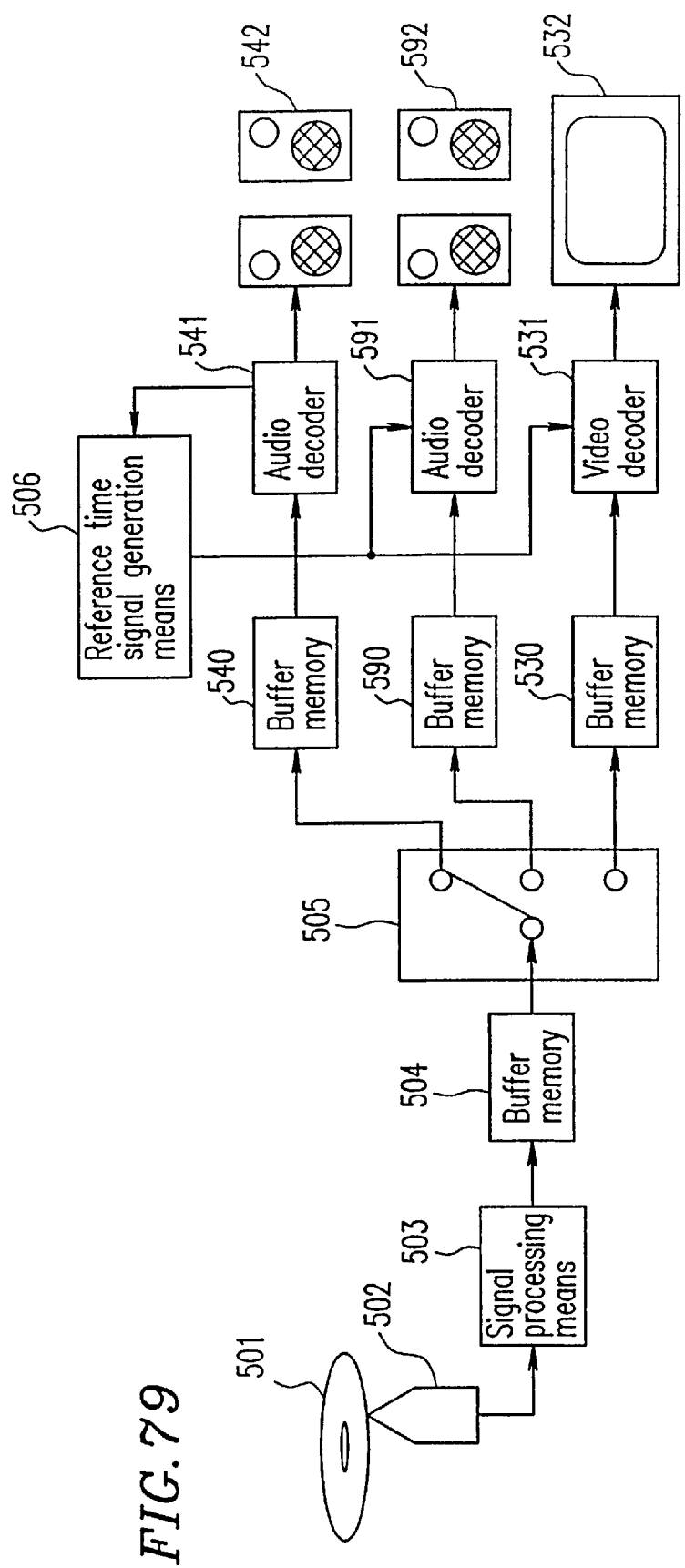
FIG. 79 is a block structural view of an optical disk reproduction apparatus in one example according to the present invention.

FIG. 79 is a block diagram of the reproduction apparatus in the sixth example.

The reproduction apparatus has a generally similar structure to that in FIG. 68. The audio decoder 541 has the same structure as that shown in FIG. 69, and the video decoder 531 has the same structure as that shown in FIG. 65. The audio decoder 591 has the same structure as that shown in FIG. 80.

Reference numeral 590 represents a buffer memory for temporarily storing the compression audio signal like the buffer memory 540. Reference numeral 592 represents a speaker for reproducing the audio signal.

Figure 80:
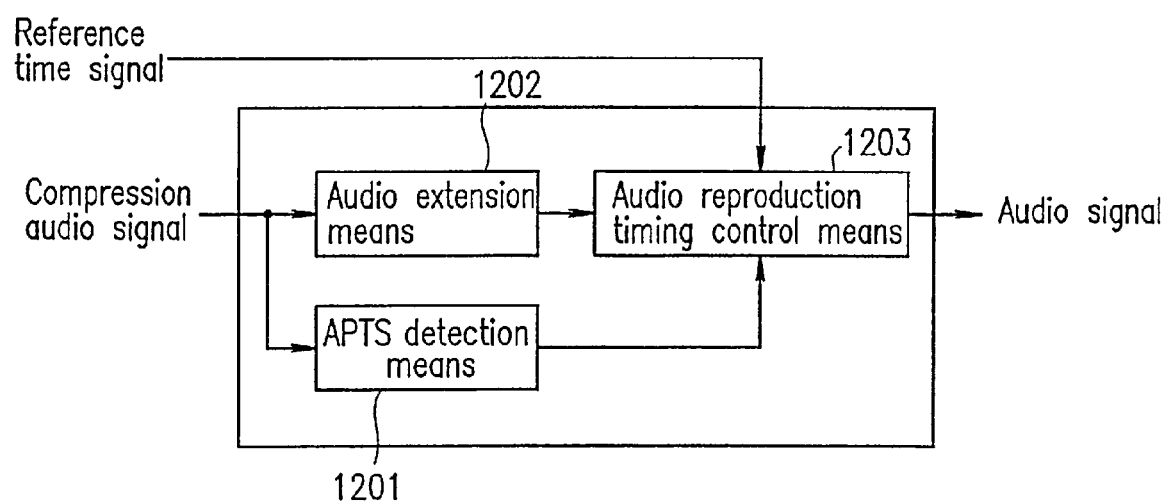
FIG. 80 is a structural view of an audio decoder in one example according to the present invention.

FIG. 80 shows a structure of the audio decoder 591. The audio decoder 509 includes APTS detection means 1201 for detecting an APTS stored in a packet header of the audio packet, audio extension means 1202 for extending the compression audio stream, and audio reproduction timing control means 1203 for comparing the reference time signal and the APTS and skipping or repeating the audio reproduction on an audio frame-by-audio frame basis when the comparison result exceeds the threshold value.

A reproduction operation in the seventh example will be described.

The operation until the signal read from the optical disk 501 is input to the division means 505 is similar to that in the other examples.

The data read from the buffer memory 504 is divided by the division means 505 into a compression video signal, the compression audio signal D and the compression audio signal E, and output. The division means 505 identifies which of the compression video signal, the compression audio signal D and the compression audio signal E is stored in each packet with the packet ID in the packet header of the packeted data, and determines the destination based on the identification result.

The divided compression video signal, the compression audio signal D and compression audio signal are temporarily stored in buffer memories 530, 540 and 590 respectively.

The video decoders reads data from the buffer memory 530, extends the compression video signal and outputs the signal as a video signal to a monitor 532. The audio decoders 541 and 591 read data from the buffer memories 540 and 590, extend the compression audio signals and output the signals as audio signals through the speakers 542 and 592.

The reference time signal generated by the reference time signal generation means 506 is corrected by an APTS#D detected by the audio decoder 541.

In the audio decoder 591, an APTS#E is detected by the APTS detection means 1201 and the compression audio signal E is extended by the audio extension means 1202. The audio reproduction timing control means 1203 receives the extended audio signal output from the audio extension means 1202, the reference time signal, and the APTS#E from the APTS detection means 1201, compares the reference time signal and the APTS#E. When the difference between the reference time signal and the APTS#E exceeds the threshold value, the audio reproduction timing control means 1203 controls the audio reproduction timing so that the difference is equal to or less than the threshold value.

In the seventh example, 32 msec is used as the threshold value. The video reproduction timing control means 1203 performs the following.

(reference time signal-APTS#E)>32 msec.:1 audio frame is skipped.

(reference time signal-APTS#E)<−32 msec.:1 audio frame is repeated.

The operation of the video decoder 531 for extending the compression video signal and correction performed when the difference between the reference time signal and the VPTS exceeds the threshold value are similar to those in the second example.

In the seventh example, due to the precision error of the crystal oscillator used in the reference time signal generation means 506, the video decoder 531, and the audio decoders 541 and 591; the audio decoders 541 and 591 are slower and the video decoder 531 is faster in terms of extension and reproduction with respect to the reference time signal. Unless reproduction timing is corrected, the reproduced video signals are out of synchronization.

Figure 82:
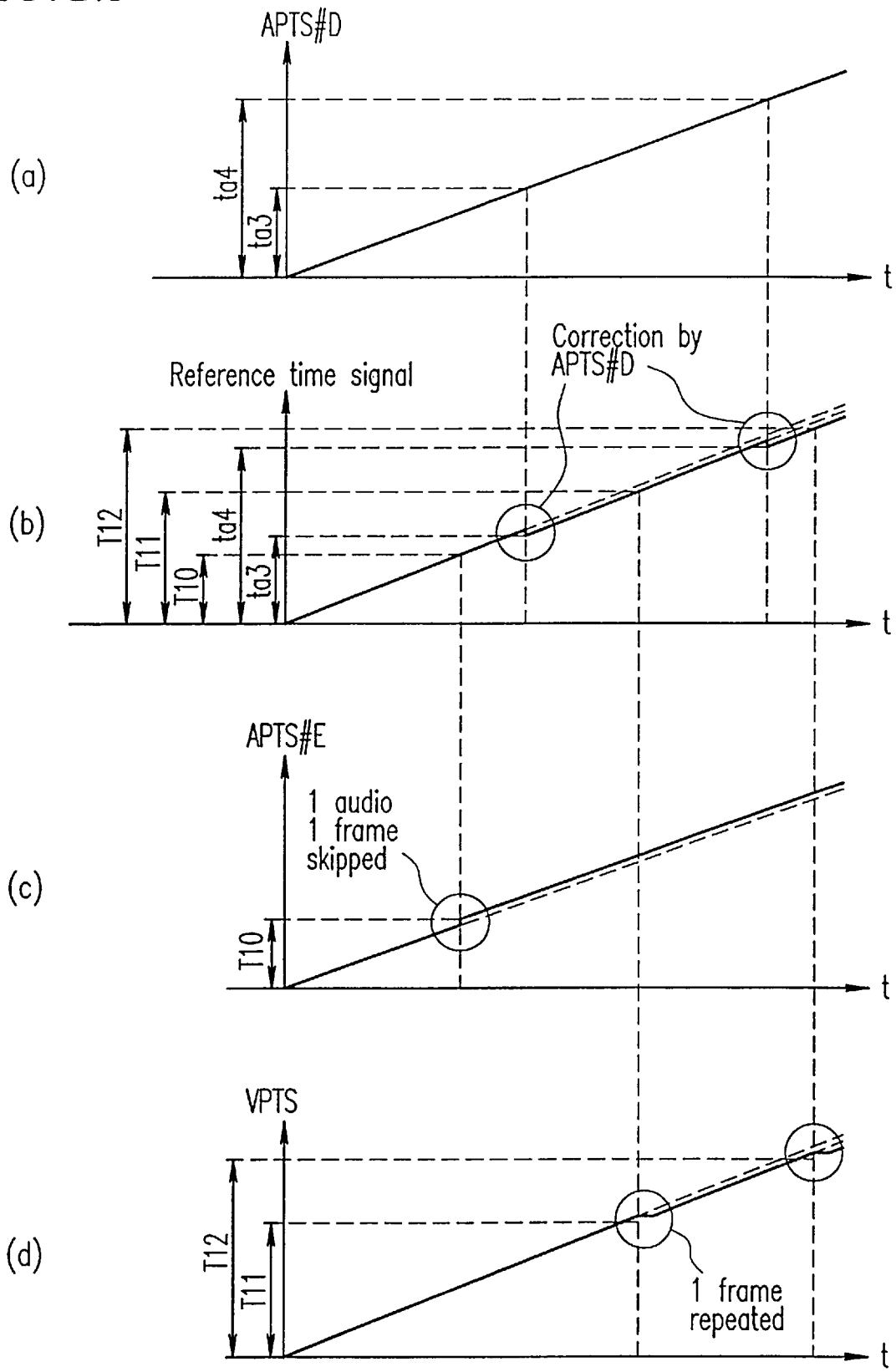
FIG. 82 is a timing diagram of audio and video reproduction in one example according to the present invention.

FIG. 82 is a timing diagram of video reproduction in the seventh example. Part (a) of FIG. 82 shows the APTS#D with respect to reproduction time t. Part (b) shows the reference time signal, part (c) shows APTS#E, at which the compression audio signal E to be extended by the audio decoder 531 is to be reproduced, and part (d) shows the VPTS, at the compression video signal to be extended by the video decoder 531 is to be reproduced. The reference time signal is corrected using the APTS#D when APTS#D shows ta3 and ta4. The reference time signal is reset to ta3 and ta4 at the respective time.

The audio decoder 591 continues extension and reproduction of the compression audio signal E, and the difference between the VPTS#E and the reference time signal exceeds 32 msec. as the threshold value at T10. Accordingly, the video reproduction timing control means 1203 of the audio decoder 591 skips one audio frame which is originally to be reproduced to correct the reproduction timing so that the difference between the VPTS#E and the reference time signal is equal to or less than the threshold value.

The difference between the VPTS and the reference time signal exceeds −33 msec. as the threshold value at T11 and T12. Accordingly, the video reproduction timing control means of the video decoder 531 reproduces one frame in repetition which has been already reproduced at the respective time to correct the reproduction timing so that the difference between the VPTS and the reference time signal is equal to or less than the threshold value.

As described above, in the seventh example, when the difference between the reference time signal and the VPTS#E detected by the audio decoder 591 exceeds the threshold value, the video reproduction timing control means of the audio decoder performs correction so that difference between the reference time signal and the APTS#E does not exceed the threshold value. In this manner, each audio signal and the picture can be synchronized with one another.

Example 8

In the eighth example, the clock for performing extension is changed for audio reproduction control.

Figure 83:
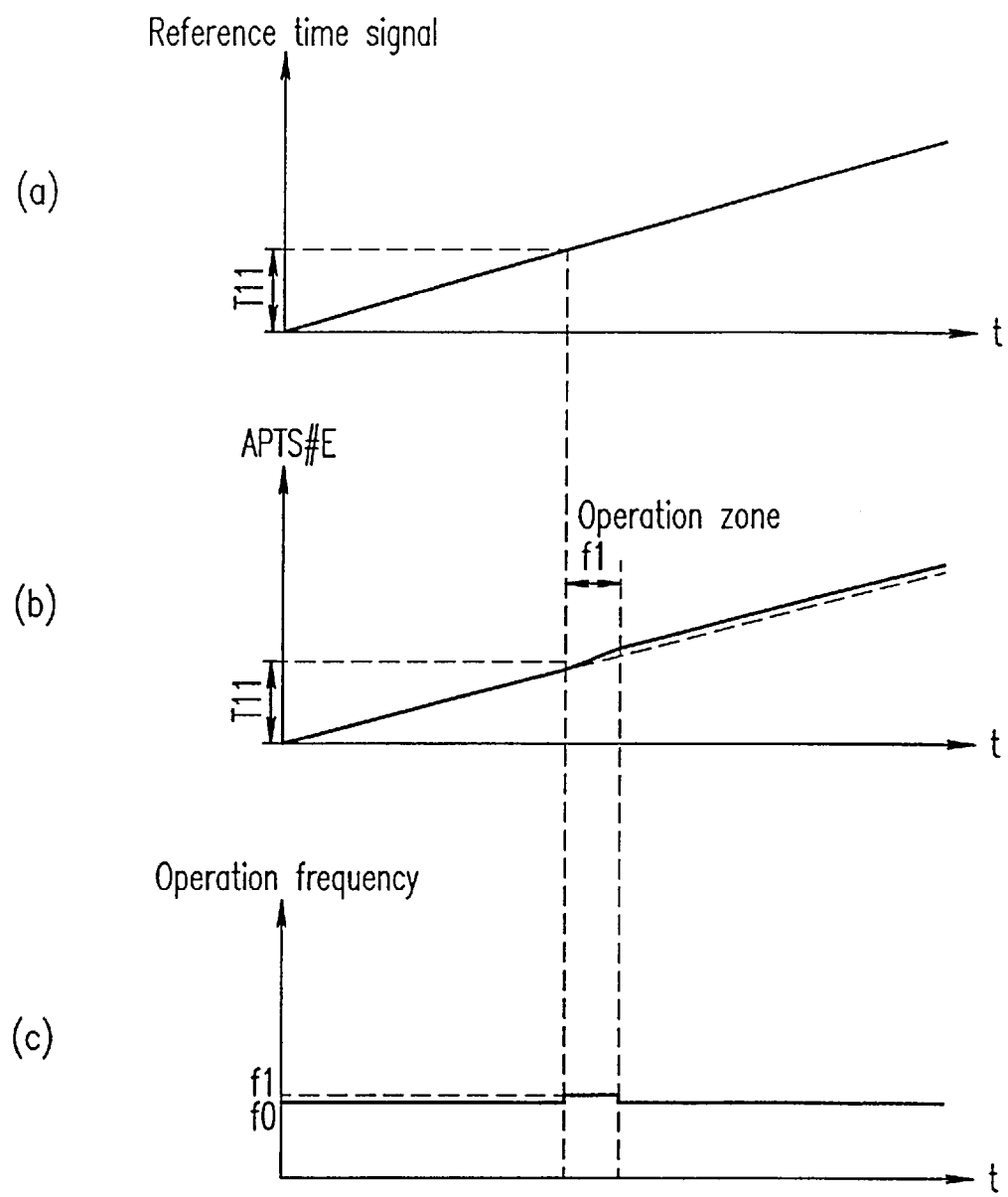
FIG. 83 is a timing diagram of operation frequencies of audio and video reproduction in one example according to the present invention.
Figure 84:
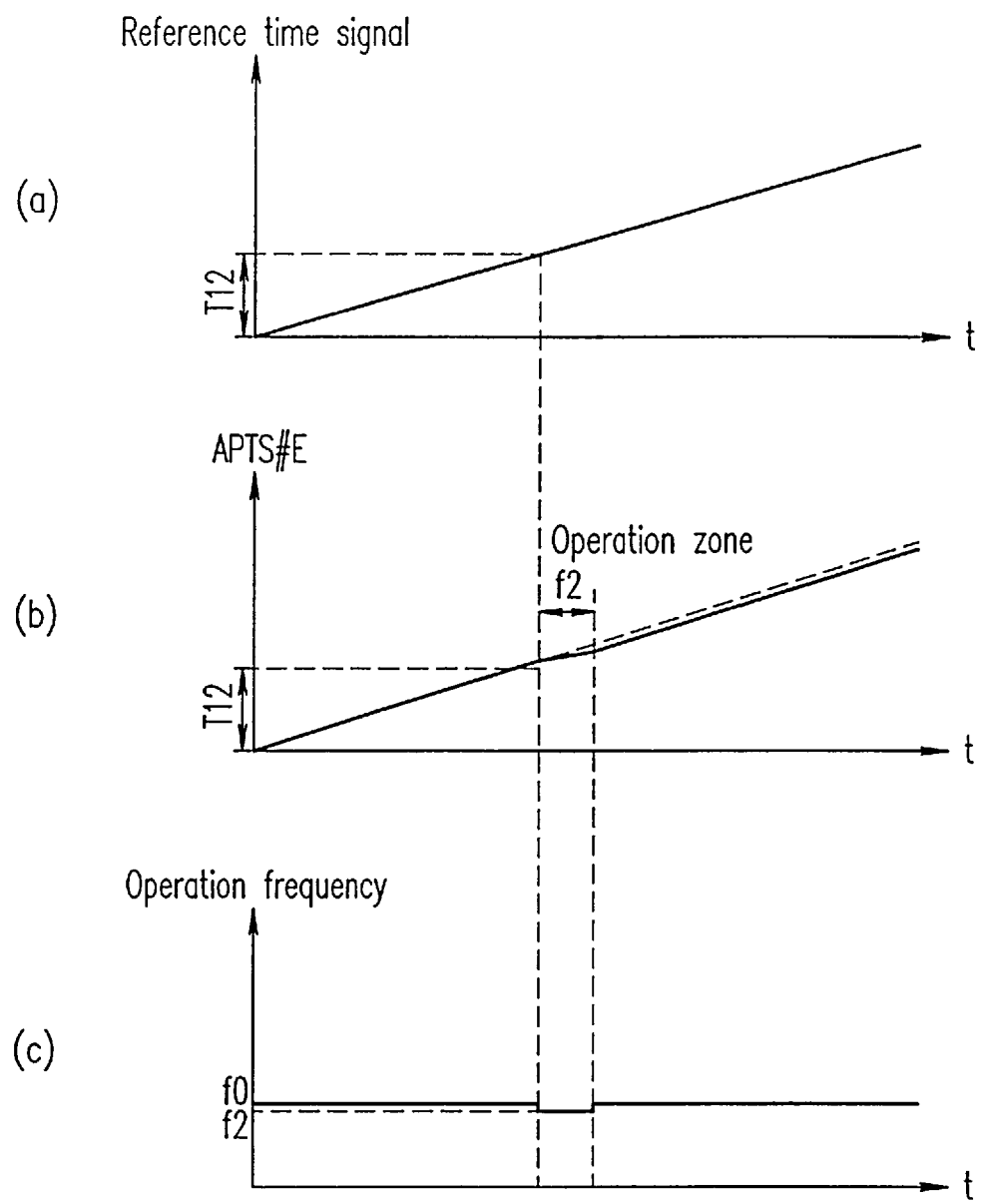
FIG. 84 is a timing diagram of operation frequencies of audio and video reproduction in one example according to the present invention.

The overall structure and operation of the reproduction apparatus in the eighth example are generally similar to those of the optical disk reproduction apparatus in the seventh example, but the operation of audio reproduction timing control performed when the reference time signal and the APTS#E exceeds the threshold value is different from that of the seventh example. With reference to FIGS. 83 and 84, audio reproduction timing control used in the eighth example will be described.

FIG. 83 shows an operation when the difference between the APTS#E and the reference timing signal exceeds 32 msec. which is the threshold for the audio reproduction. Part (a) of FIG. 83 shows the reference time signal with respect to reproduction time t. Part (b) shows the APTS#E, and part (c) shows the clock frequency at which the audio decoder 591 performs extension and reproduction. Ordinary extension and reproduction are performed by clock f0 having a frequency which is 384 times the sampling frequency fs of the audio signal. The difference between the APTS#E and the reference time signal exceeds 32 msec. at time T11, and accordingly, audio reproduction control means switches the clock f0 to f1. The frequency of clock f1 is higher by 10% than the frequency of clock f0. Extension performed with clock f1 proceeds faster than extension performed with clock f0 by 10%. With clock f1, the extension is performed for 320 msec. from the point where the difference between the APTS#E and the reference time signal exceeds 32 msec. which is the threshold value. Thus, the reproduction timing is corrected so that the difference between the APTS#E and the reference time signal is equal to or less than the threshold value.

FIG. 84 shows an operation when the difference between the APTS#E and the reference timing signal exceeds −32 msec. which is the threshold for the audio reproduction. Part (a) of FIG. 83 shows the reference time signal with respect to reproduction time t. Part (b) shows the APTS#E, and part (c) shows the clock frequency at which the audio decoder 591 performs extension and reproduction.

The difference between the APTS#E and the reference time signal exceeds −32 msec. at time T12, and accordingly, audio reproduction control means switches the clock f0 to f2. The frequency of clock f2 is lower by 10% than the frequency of clock f0. Extension performed with clock f2 proceeds more slowly than extension performed with clock f0 by 10%. With clock f2, the extension is performed for 320 msec. from the point where the difference between the APTS#E and the reference time signal exceeds −32 msec. which is the threshold value. Thus, the reproduction timing is corrected so that the difference between the APTS#E and the reference time signal is equal to or less than the threshold value.

As described above, when the difference between the APTS#E and the reference time signal exceeds the threshold value for the audio reproduction, the clock by which the signal is extended is changed so that the extension is performed at a higher speed or lower speed than the normal speed. By such an operation, the reproduction timing is controlled so that the difference between the APTS#E and the reference time signal is equal to or less than the threshold value. Thus, the audio signals and the video signal can be reproduced in synchronization with no unnaturalness in the audio output.

In the eighth example, the frequency of the clock is changed by 10%. Needless to say, a more natural audio signal is obtained by reducing the clock less or gradually.

In the seventh and eighth examples, the reference time signal is corrected using the APTS#D. Alternatively, the video decoder shown in FIG. 73 can be used, in which case the VPTS output from the video decoder can be used for correction.

The present invention has been described by way of specific examples.

The comparison between the reference time signal and the VPTS or APTS, control of the reproduction time, correction of the reproduction timing can be performed by a microcomputer which controls the entirety of the reproduction apparatus.

In the above examples, the present invention is applied to optical disk reproduction devices. The present invention is also applicable to a reproduction apparatus for extending signals supplied through communication networks and digital satellite broadcasting as compression signals.

INDUSTRIAL APPLICABILITY

A basic video signal and an interpolation signal are divided into frames each having 1 GOP or more and subjected to interleaving alternately to be recorded on the optical disk as interleave blocks 54 and 55; From such an optical disk, a progressive/3D reproduction apparatus reproduces both information in the interleave block for the odd field (right eye) and information in the interleave block for the even field (left eye). Thus, a progressive/3D picture is obtained. A non-progressive/3D reproduction apparatus reproduces information in the interleave block of only odd field (right eye) or even field (left eye) by track jump. Thus, a complete two-dimensional picture is obtained. Thus, compatibility is realized.

Especially, a progressive/3D picture arrangement information file and a progressive/3D picture identifier are recorded on the optical disk. Accordingly, the location of the progressive/3D is easily determined. Therefore, two ordinary interlace signals can be made into a progressive signal. Furthermore, it can be avoided that pictures for the right eye and left eye of different contents are output on the 3D TV.

In a 3D reproduction apparatus, a pointer used for two-dimensional display is used when an 3D identifier is available to change the access process. Thus, 3D pictures can be continuously displayed. Moreover, a 3D reproduction apparatus is realized without changing the two-dimensional format.

According to the synchronization method of the present invention, a plurality of video signals or a plurality of audio signals to be simultaneously reproduced are extended in synchronization for reproduction.

In the embodiment where a horizontal synchronization signal and a vertical synchronization signal which are output from one video decoder are used as the horizontal synchronization signal and the vertical synchronization signal of another video decoder, synchronization on a pixel-by-pixel basis is realized even when, for example, a plurality of compression video signals are extended and the extended signals are synthesized into a 3D picture or a high resolution picture.

In a reproduction apparatus in which the reference time signal is corrected using an APTS detected by an audio decoder and the video output timing is controlled so that the VPTS matches the corrected reference time signal, an audio signal and a plurality of video signals are synchronized for reproduction with no unnaturalness in the audio output.

In a reproduction apparatus in which the audio output timing is controlled by changing an extension clock, audio and video signals are synchronized for reproduction with no unnaturalness in the audio output with no interruption or pause in the audio signal.

The invention claimed is:

1. A decoding method for decoding a coded data, said method comprising the steps of:
receiving the coded data having i) a broadcast program having a coded sequence which includes a) a coded stereoscopic image which is encoded from a stereoscopic image, b) a coded non-stereoscopic image which is encoded from a non-stereoscopic image, c) first identification information included in each coded image which indicates whether the coded image is the coded stereoscopic image or the coded non-stereoscopic image, and d) second identification information which indicates whether the coded image includes a progressive image, and ii) broadcast program information separate from the broadcast program, the broadcast program information comprising an arrangement table which indicates whether sets of coded images in the broadcast program include a stereoscopic content or not, outputting a signal to inform a decoding broadcast program includes the stereoscopic content, when the broadcast program information indicates the decoding broadcast program includes the stereoscopic content, decoding the coded stereoscopic image and outputting the stereoscopic image, when the identification information indicates that the coded image is the coded stereoscopic image, and decoding the coded non-stereoscopic image and outputting alternately two field images which consist of the non-stereoscopic image, when the first identification information indicates that the coded image is the coded non-stereoscopic image and the second identification information indicates that the coded image is not the progressive image, wherein the coded stereoscopic image includes a third coded image which is encoded from a stereoscopic right image of the stereoscopic image and a fourth coded image which is encoded from a stereoscopic left image, the third coded image is different from the coded non-stereoscopic image, and the fourth coded image is different from the coded non-stereoscopic image.

* * * * *